United States Patent
Date et al.

(10) Patent No.: US 9,528,458 B2
(45) Date of Patent: Dec. 27, 2016

(54) INTERNAL COMBUSTION ENGINE CONTROL APPARATUS

(75) Inventors: Toshiaki Date, Tokyo (JP); Satoshi Wachi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 955 days.

(21) Appl. No.: 13/440,750

(22) Filed: Apr. 5, 2012

(65) Prior Publication Data

US 2013/0006499 A1 Jan. 3, 2013

(30) Foreign Application Priority Data

Jun. 30, 2011 (JP) .................................. 2011-120327
Nov. 11, 2011 (JP) .................................. 2011-247247

(51) Int. Cl.
 *F02D 41/04* (2006.01)
 *F02D 41/14* (2006.01)
 *F02N 11/08* (2006.01)

(52) U.S. Cl.
 CPC ......... *F02D 41/042* (2013.01); *F02D 41/1494* (2013.01); *F02N 11/0814* (2013.01); *F01N 2560/025* (2013.01); *F02D 41/1456* (2013.01); *Y02T 10/48* (2013.01)

(58) Field of Classification Search
 CPC .. F02D 41/14; F02D 41/1456; F02D 41/1494; F01N 11/0814; F01N 2560/20; Y02T 10/48
 USPC ....... 123/142.5 R, 179.4, 697, 703; 701/112, 701/113; 60/284, 286, 287, 300, 303; 73/114.69, 114.71, 114.73
 See application file for complete search history.

(56) References Cited

U.S. PATENT DOCUMENTS

| 3,938,479 | A | * | 2/1976 | Oberstadt | 123/695 |
| 4,915,082 | A | * | 4/1990 | Uchinami et al. | 123/697 |
| 6,781,098 | B2 | * | 8/2004 | Toyoda | G01N 27/4067 123/697 |
| 7,189,948 | B2 | * | 3/2007 | Kwon | F02D 41/1454 219/202 |
| 7,654,077 | B2 | * | 2/2010 | Zillmer et al. | 60/277 |
| 7,798,265 | B2 | * | 9/2010 | Rodatz et al. | 180/65.23 |
| 2008/0154485 | A1 | * | 6/2008 | Yasuda et al. | 701/113 |

(Continued)

FOREIGN PATENT DOCUMENTS

JP 09-088688 A 3/1997
JP 2000-065784 A 3/2000

(Continued)

*Primary Examiner* — Erick Solis
*Assistant Examiner* — Anthony L Bacon
(74) *Attorney, Agent, or Firm* — Sughrue Mion, PLLC; Richard C Turner

(57) ABSTRACT

An internal combustion engine control apparatus includes a first period in which the target heater applied effective voltage is set to a first target voltage with which the temperature of an exhaust gas sensor becomes a target temperature at a time when the internal combustion engine is being operated; a second control period in which after the automatic stop mode of the engine has started, the target heater applied effective voltage is set to a second target voltage lower than the first target voltage; and a third period in which after the second period, the target heater applied effective voltage is controlled to a third target voltage higher than the second target voltage and with which the temperature of an exhaust gas sensor becomes a target temperature at a time when the engine is in the automatic stop mode.

21 Claims, 78 Drawing Sheets

(56) References Cited

U.S. PATENT DOCUMENTS

| | | | |
|---|---|---|---|
| 2010/0326403 A1* | 12/2010 | Gonze et al. | 123/436 |
| 2011/0224851 A1* | 9/2011 | Jacques | B60K 6/48 |
| | | | 701/22 |
| 2012/0215426 A1* | 8/2012 | Sato et al. | 701/108 |
| 2012/0239271 A1* | 9/2012 | Tajima et al. | 701/102 |
| 2014/0047912 A1* | 2/2014 | Oesselke et al. | 73/114.73 |

FOREIGN PATENT DOCUMENTS

| | | |
|---|---|---|
| JP | 2001-295678 A | 10/2001 |
| JP | 2003-148206 A | 5/2003 |
| JP | 2005-002974 A | 1/2005 |
| JP | 2009-156108 A | 7/2009 |
| JP | 2010-185345 A | 8/2010 |

\* cited by examiner

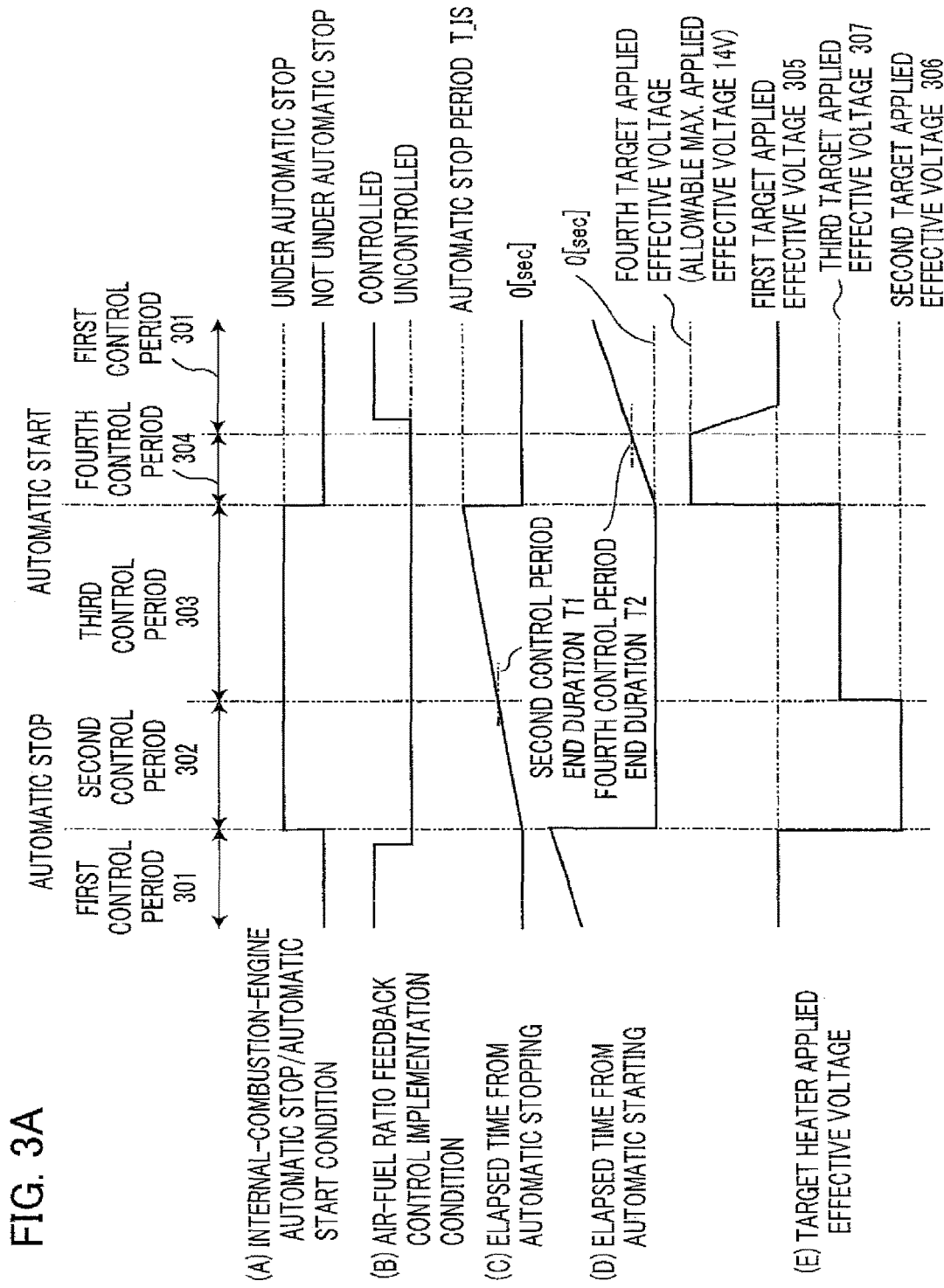

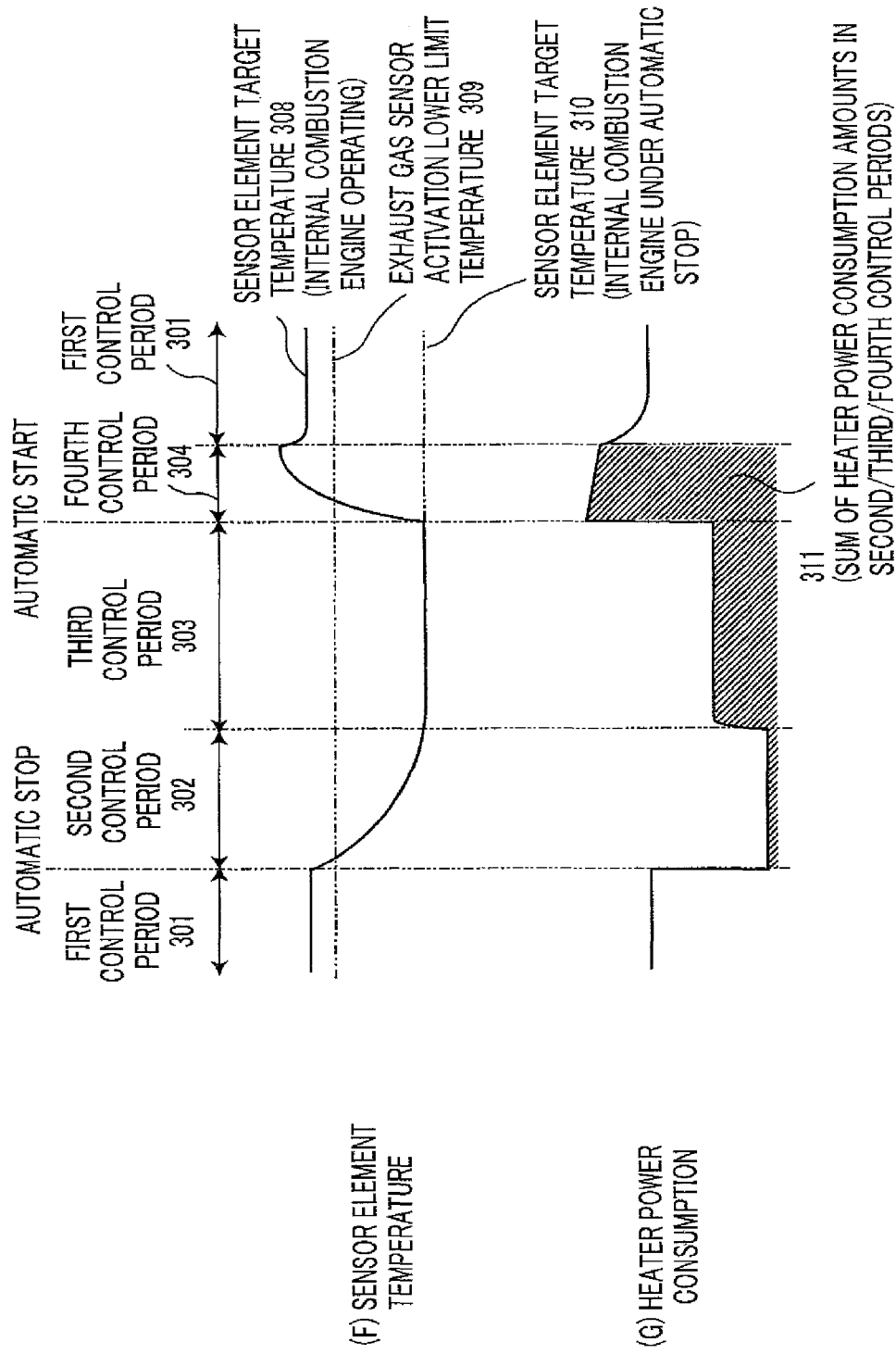

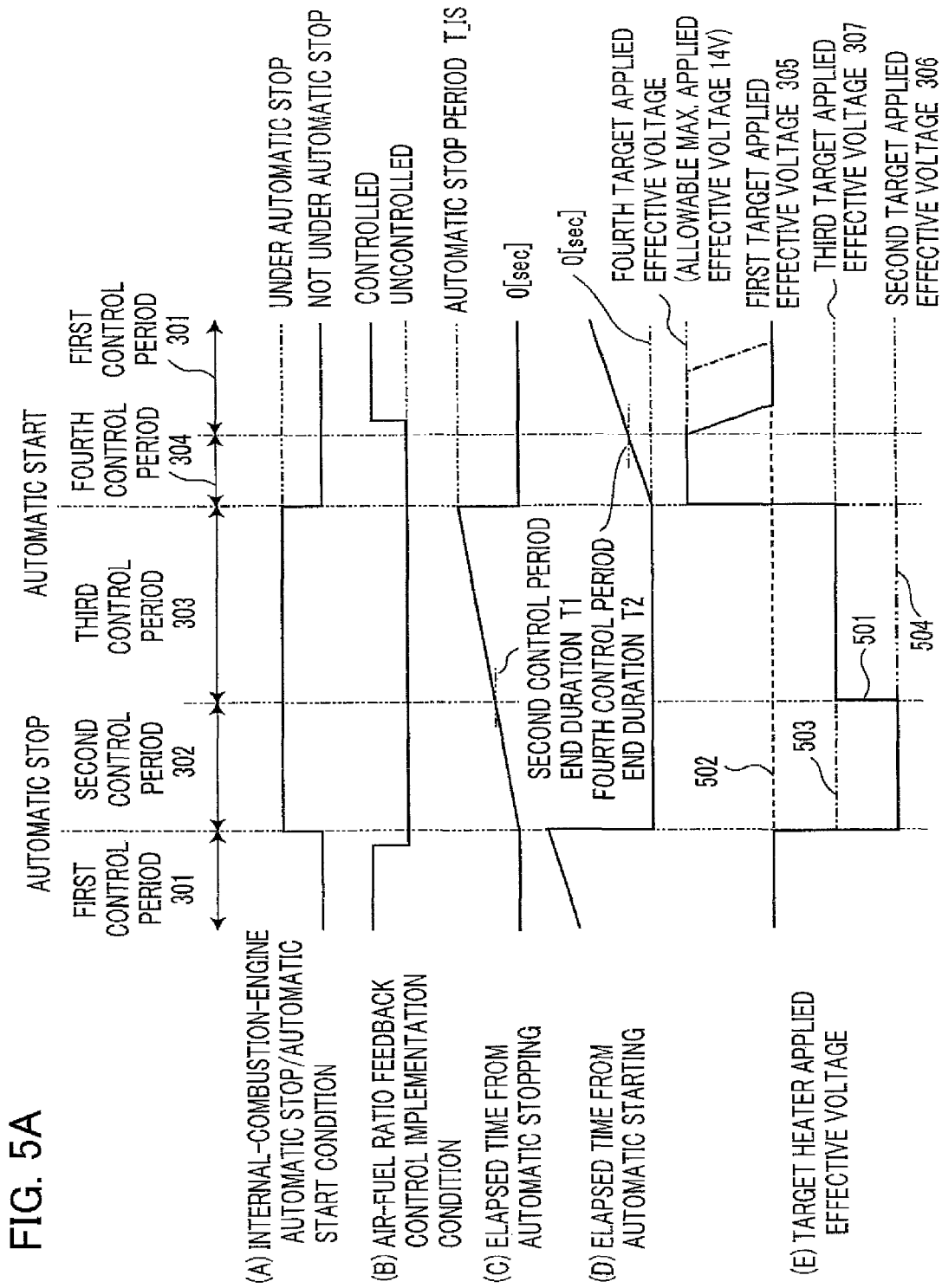

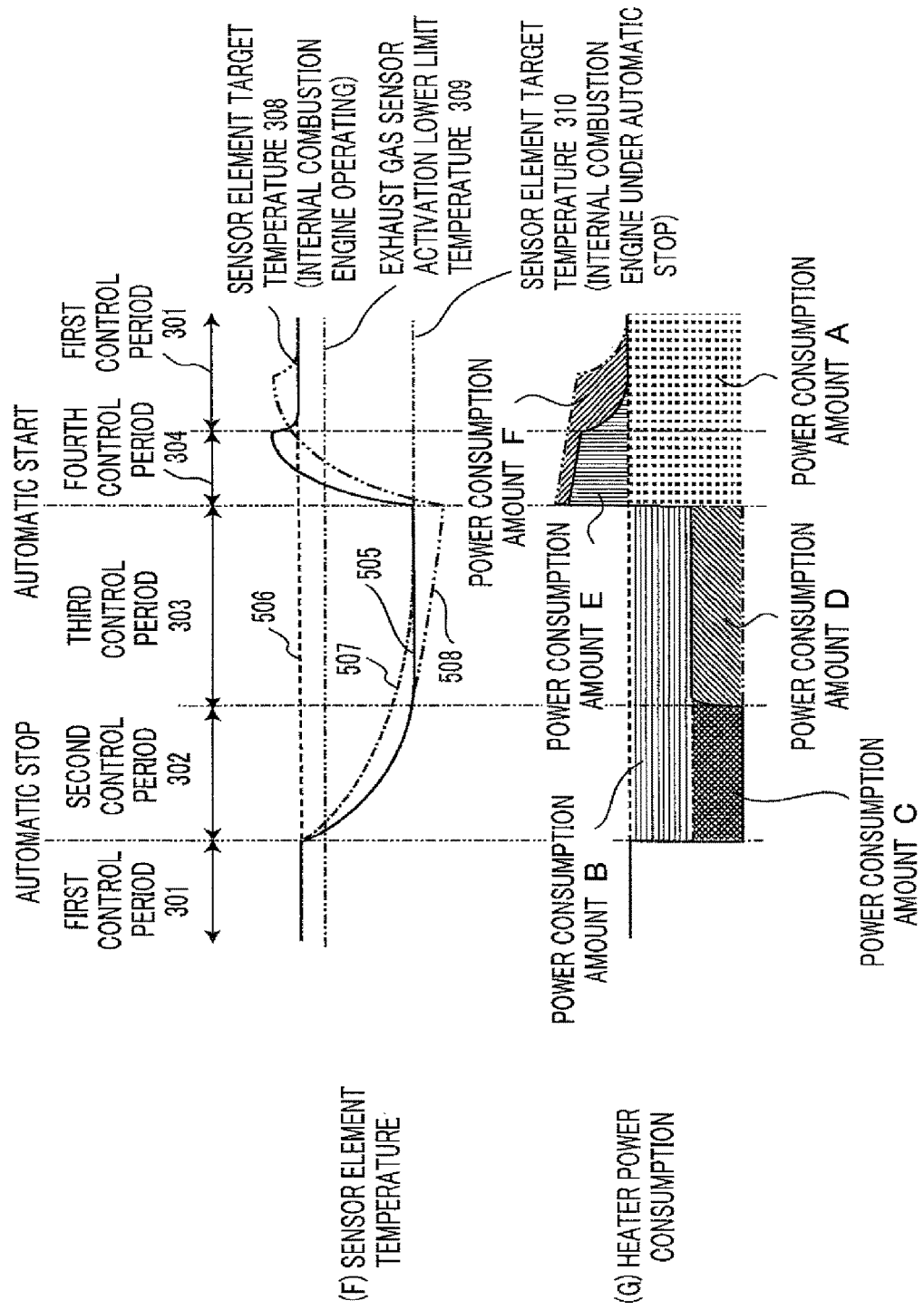

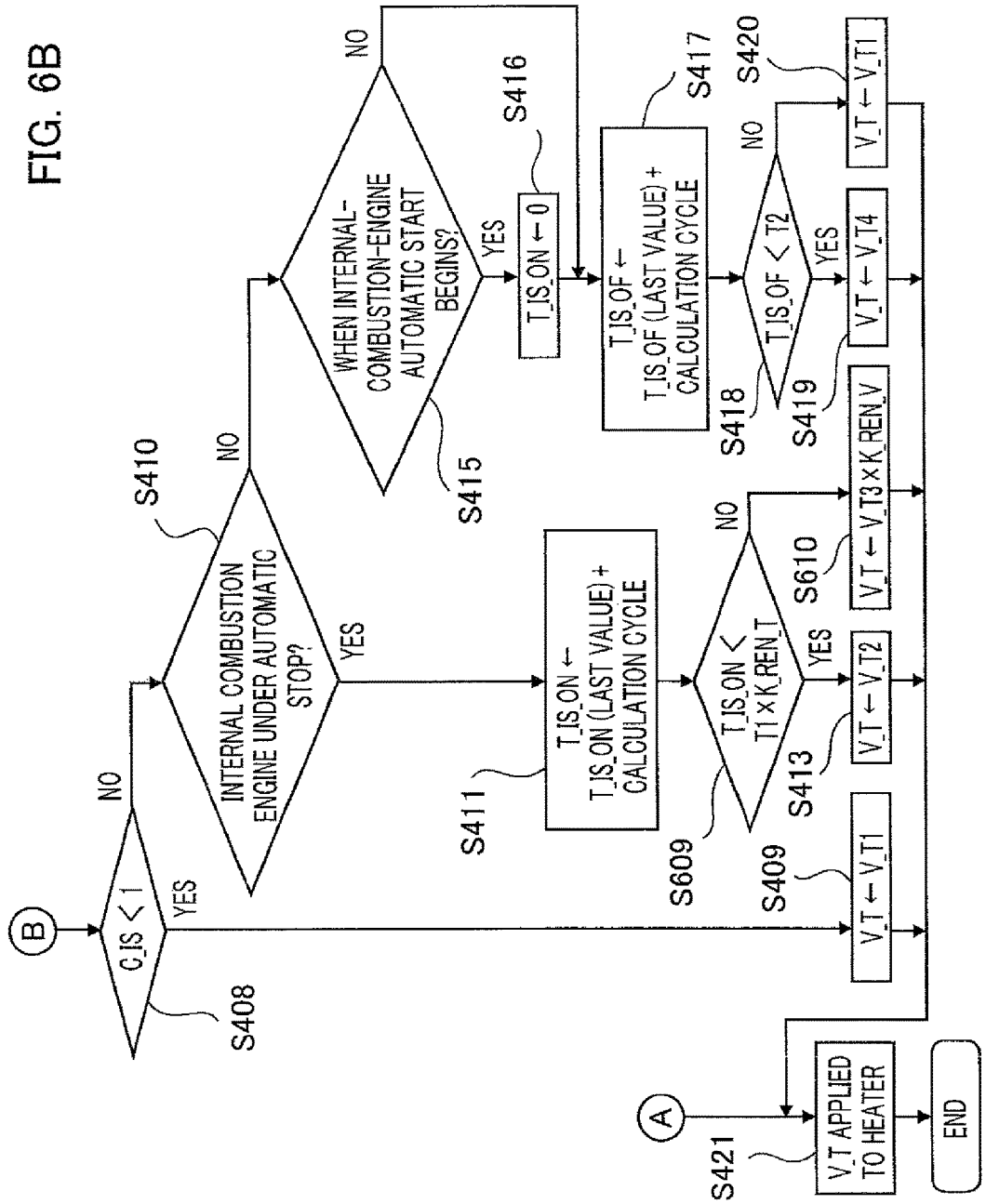

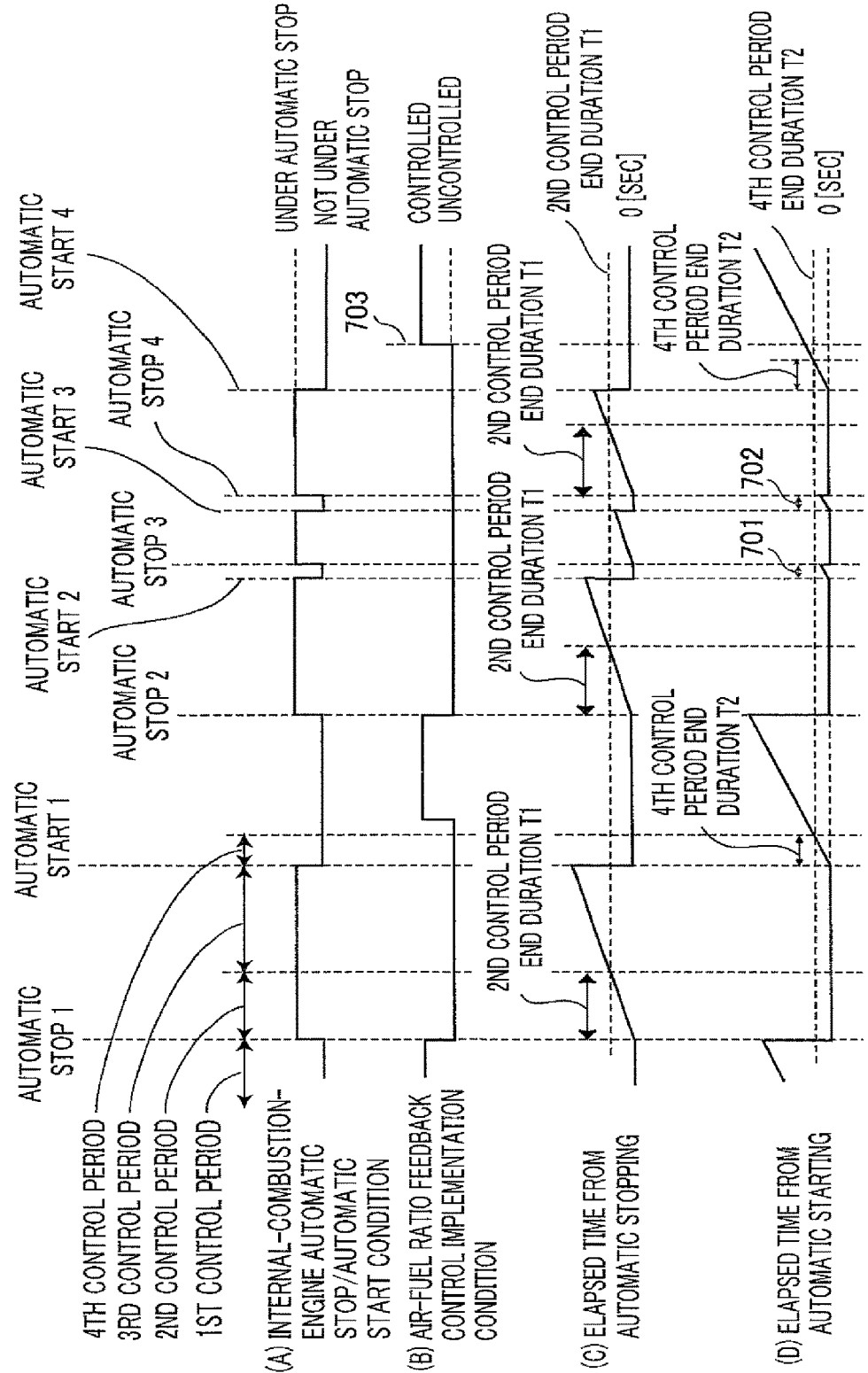

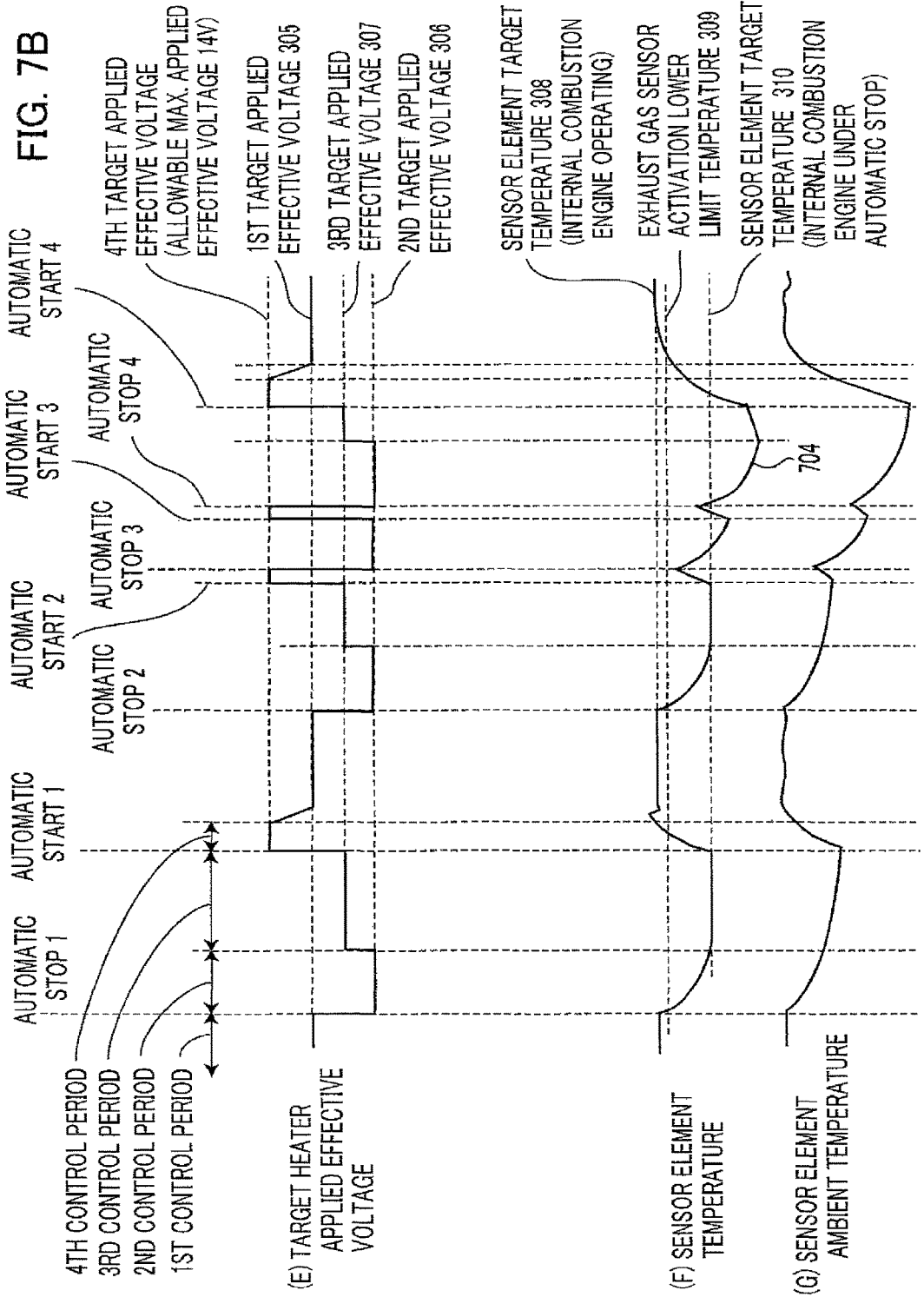

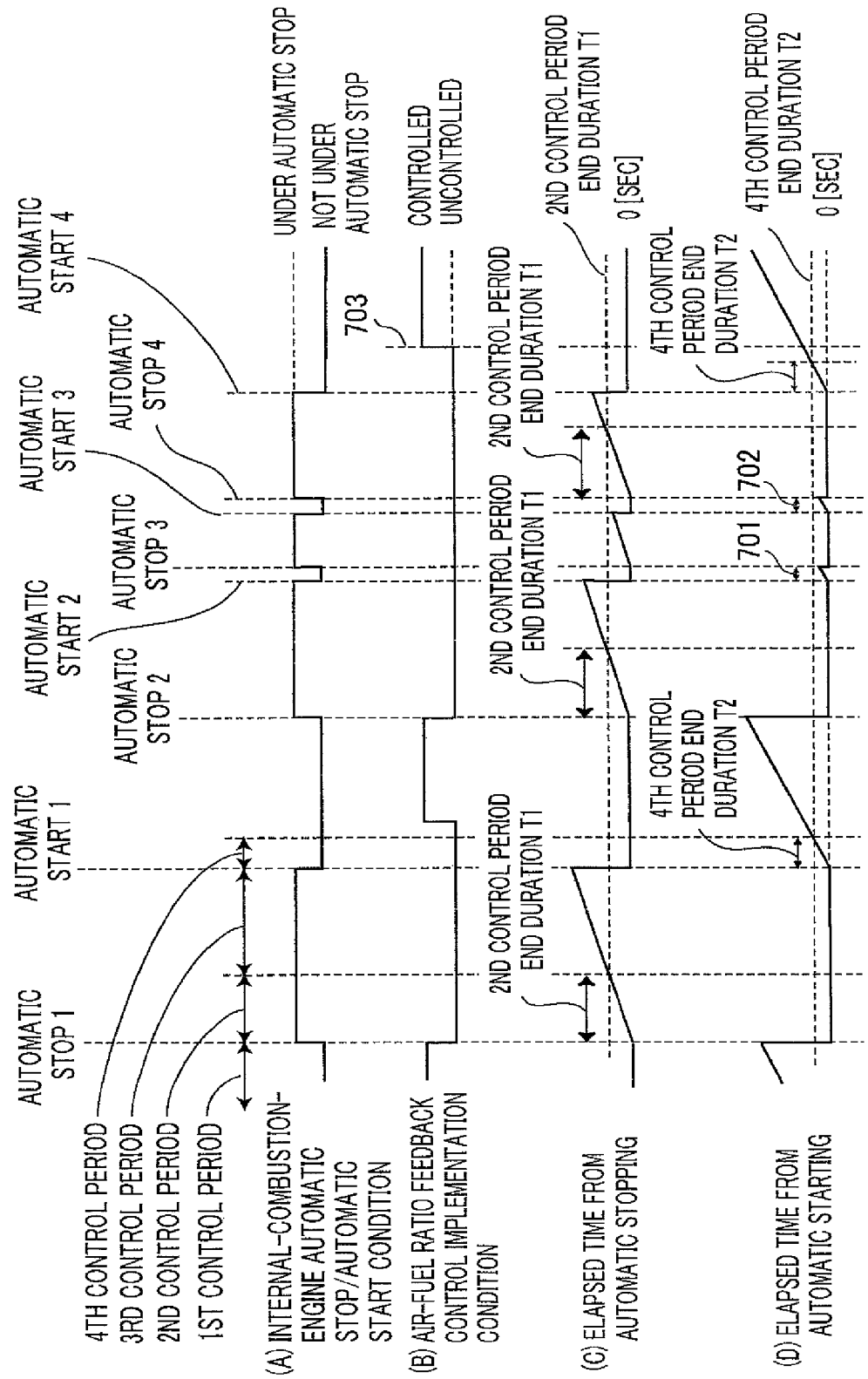

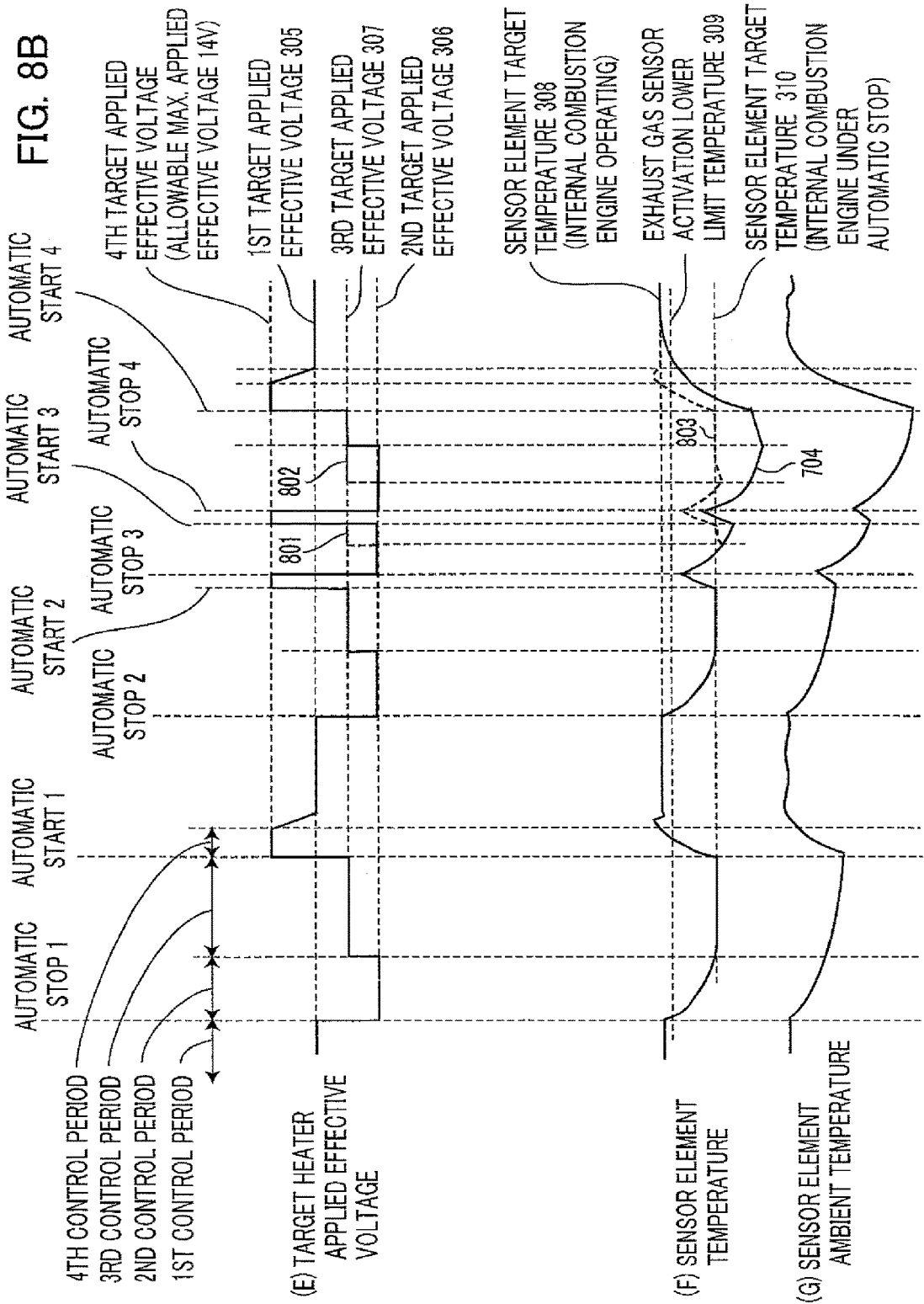

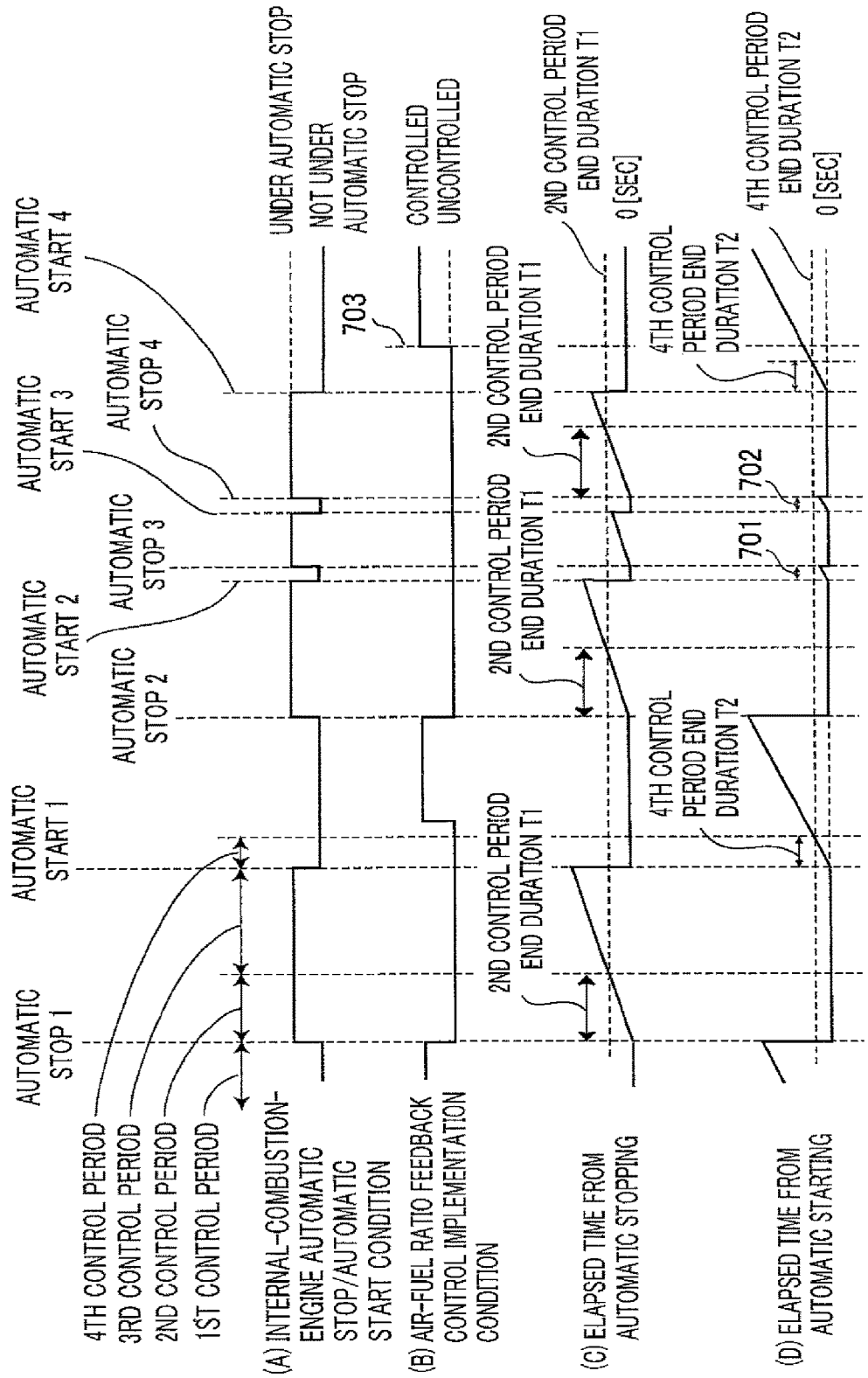

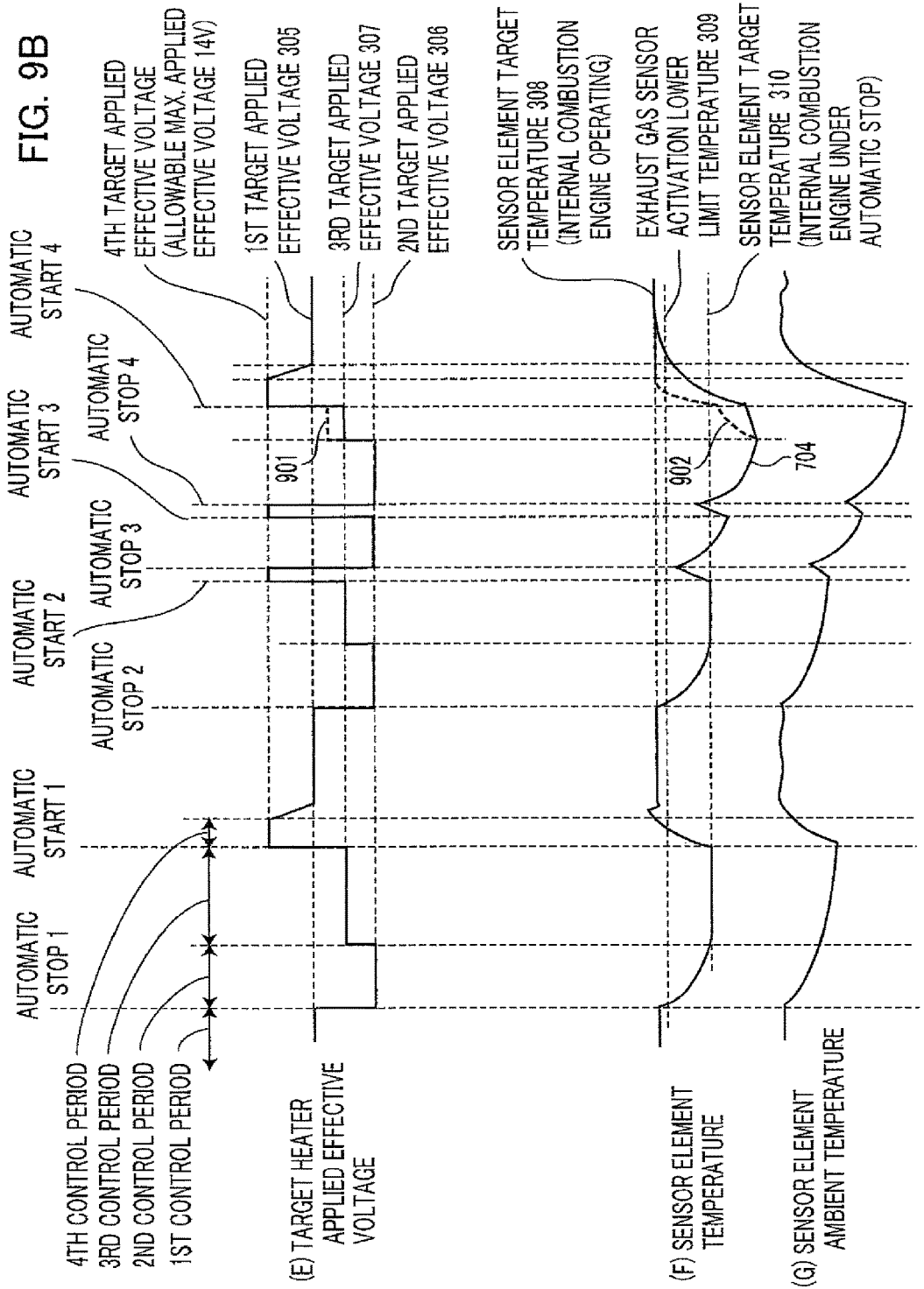

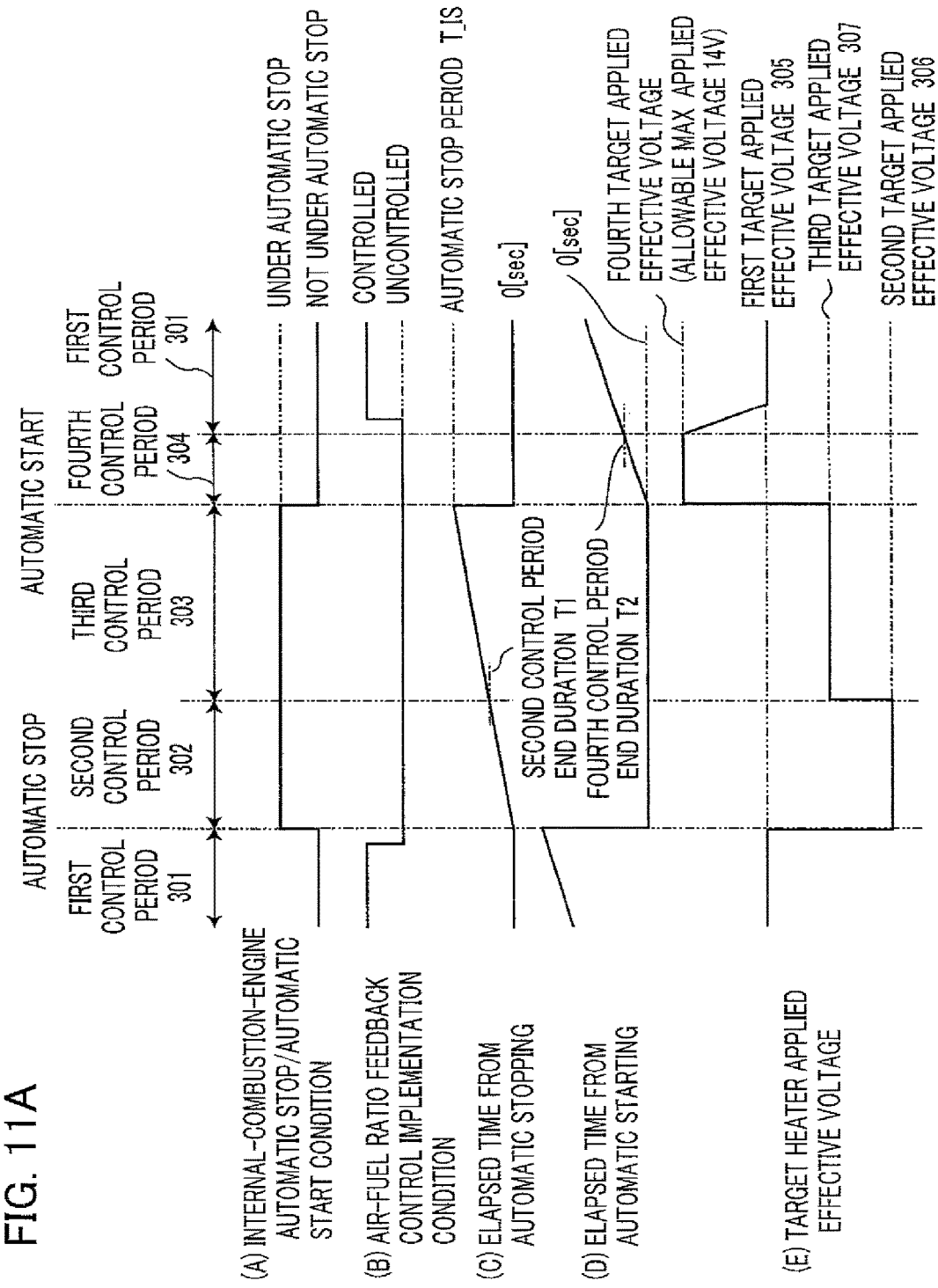

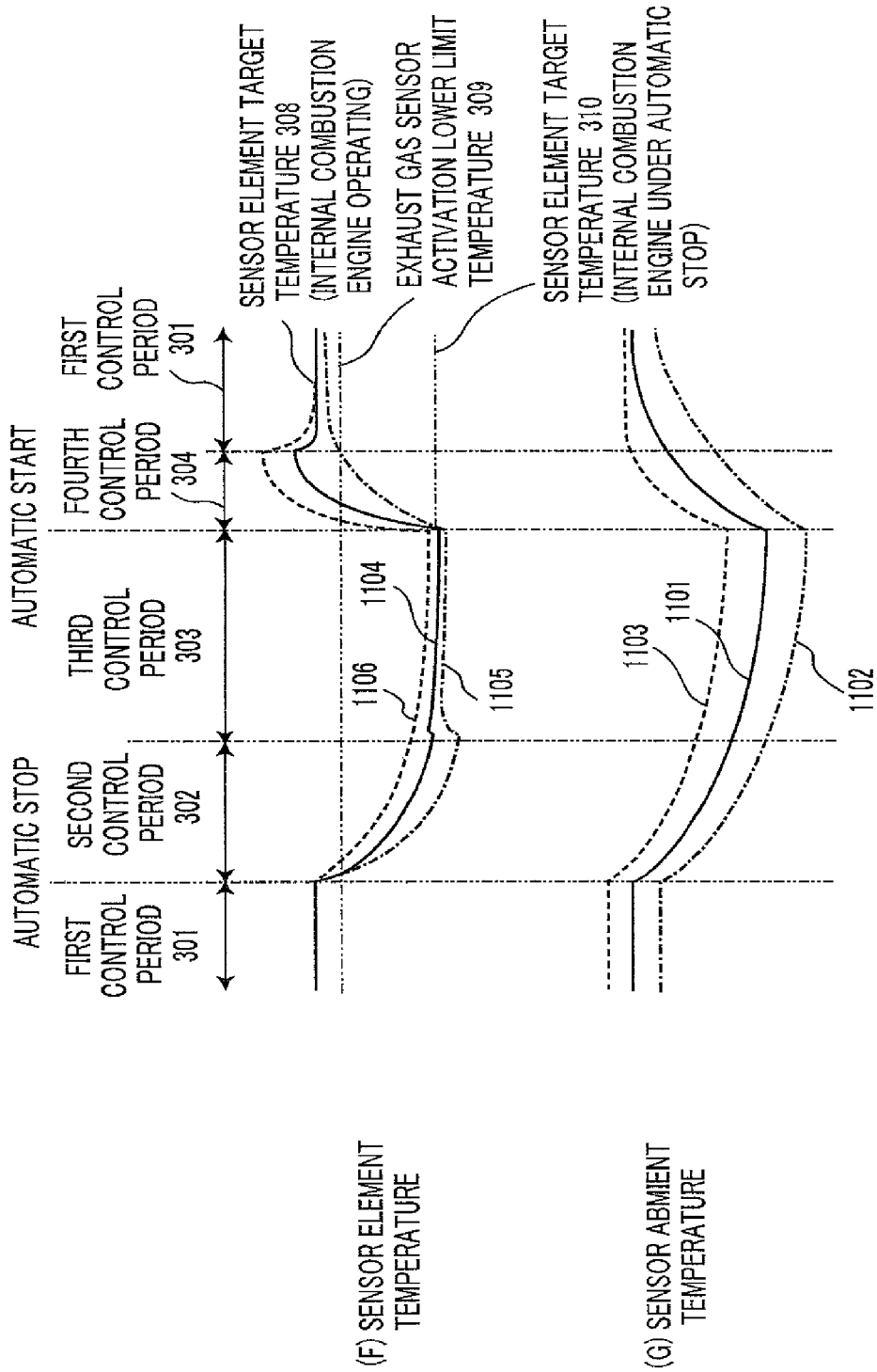

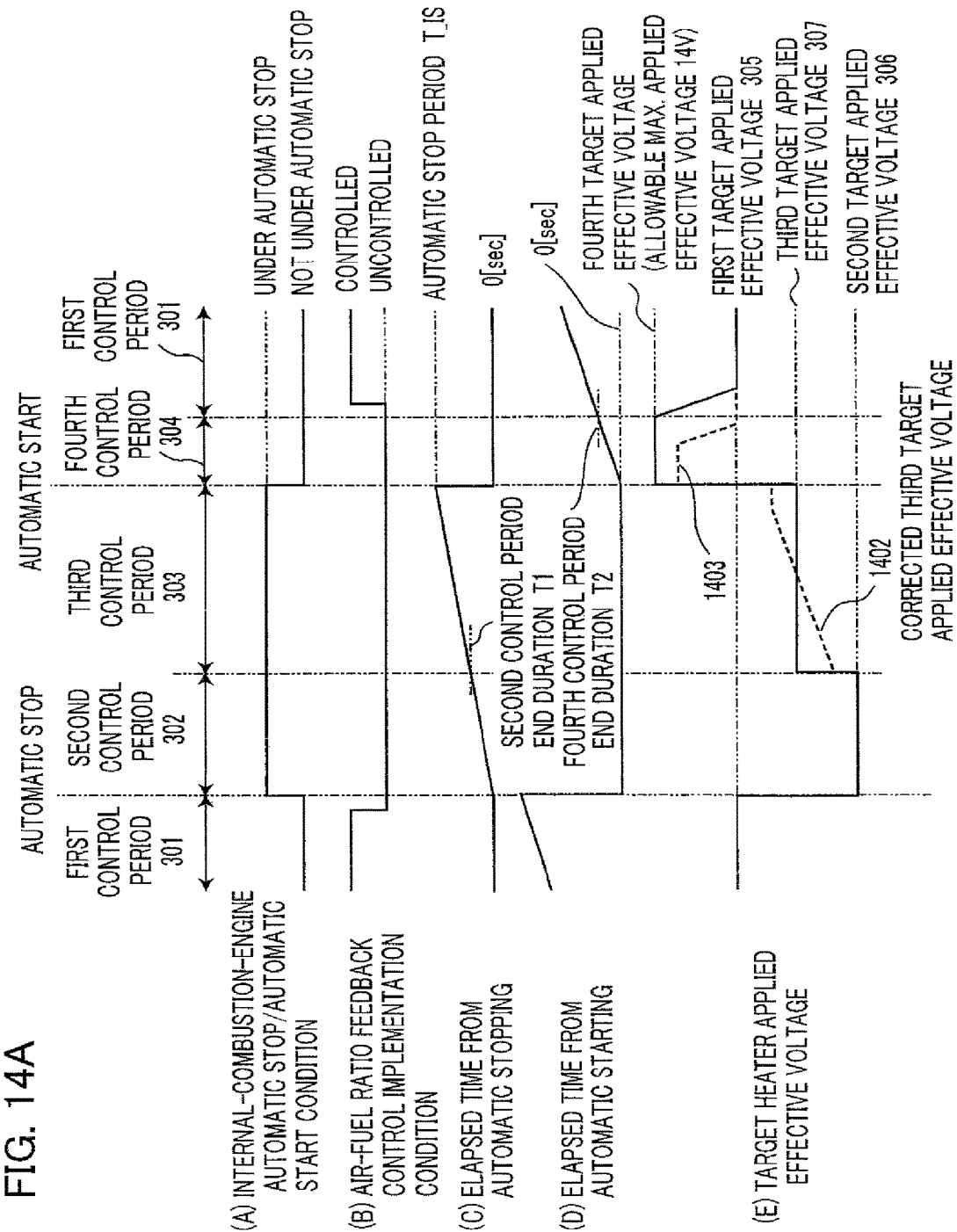

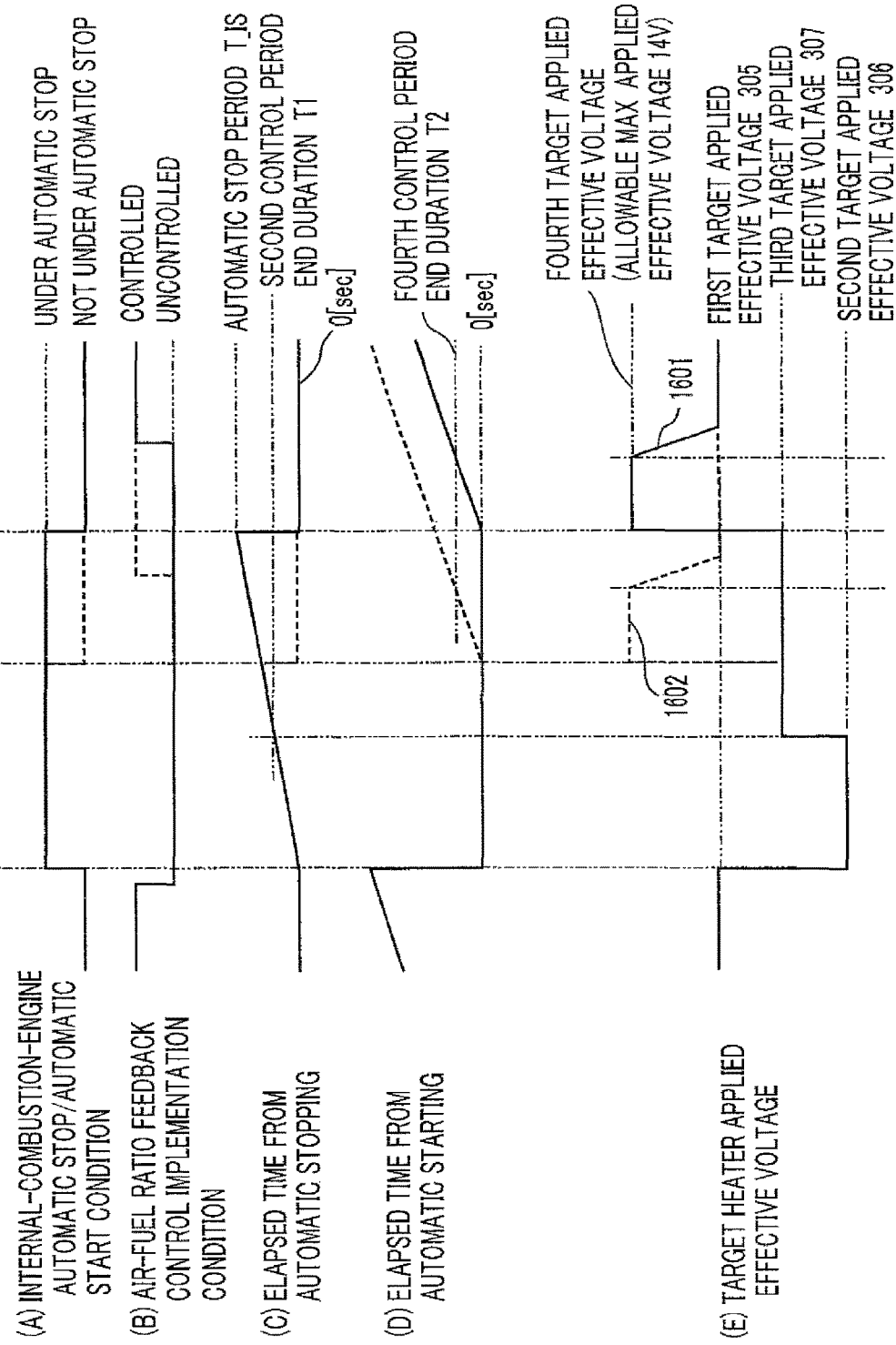

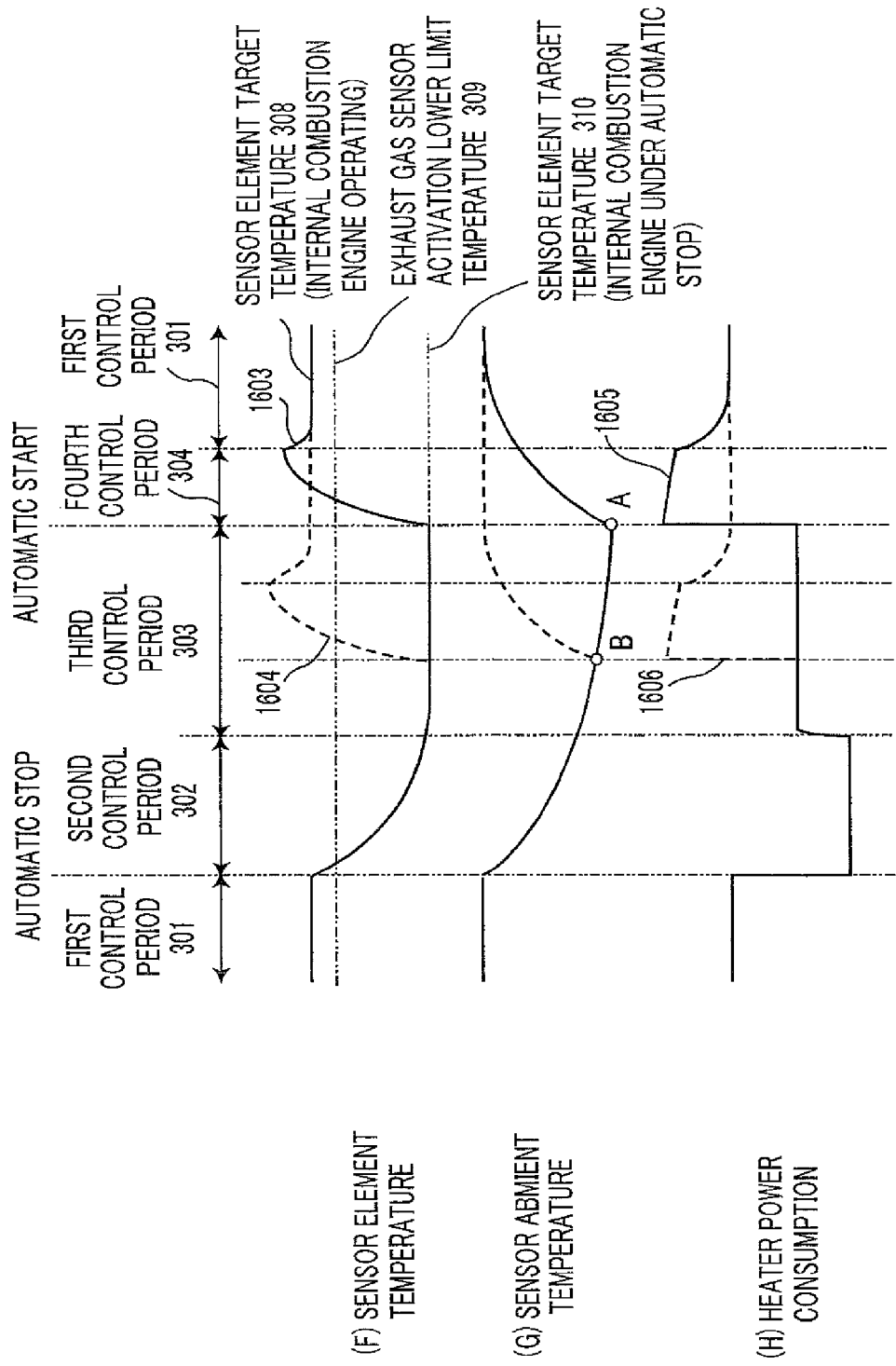

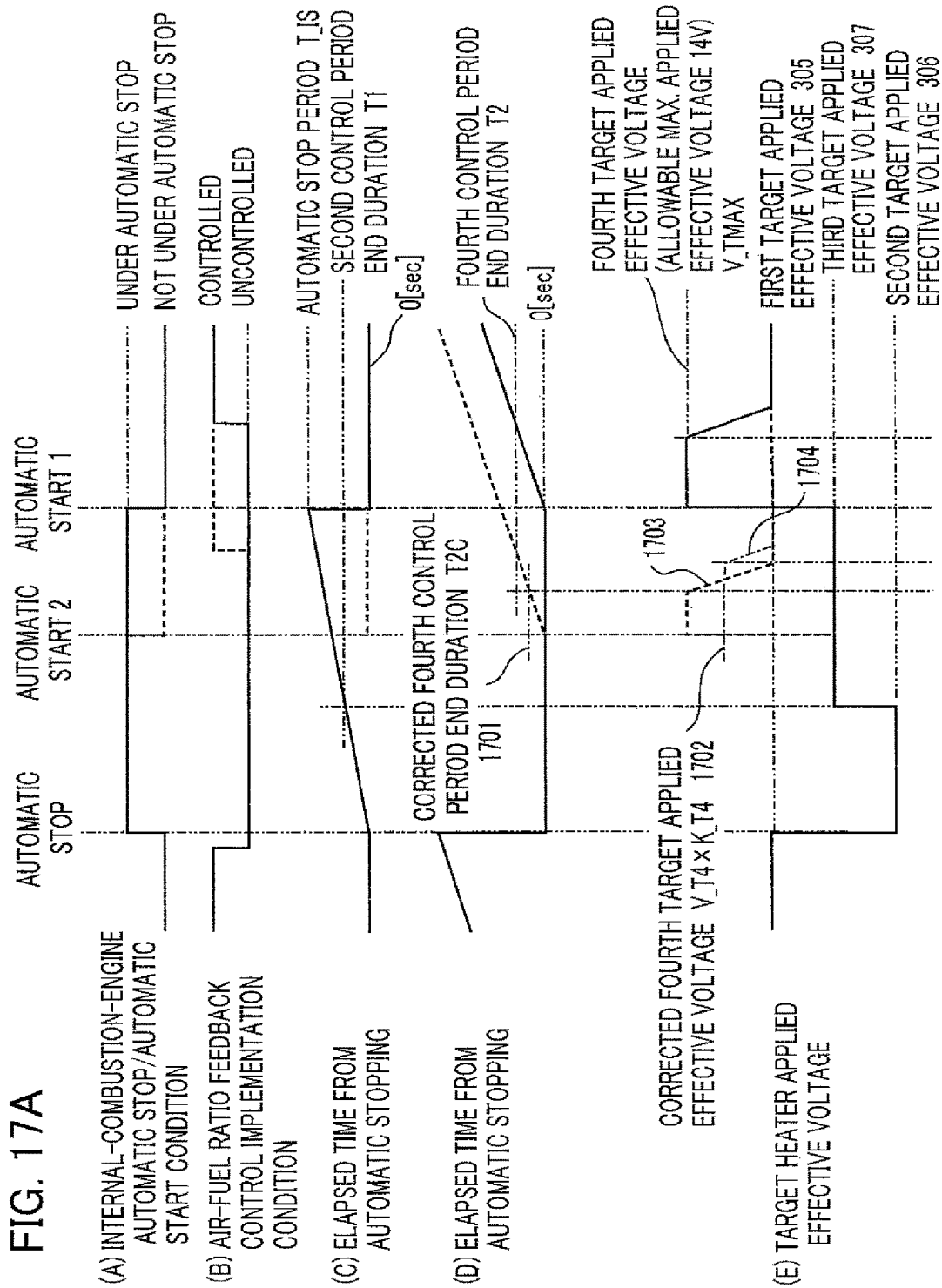

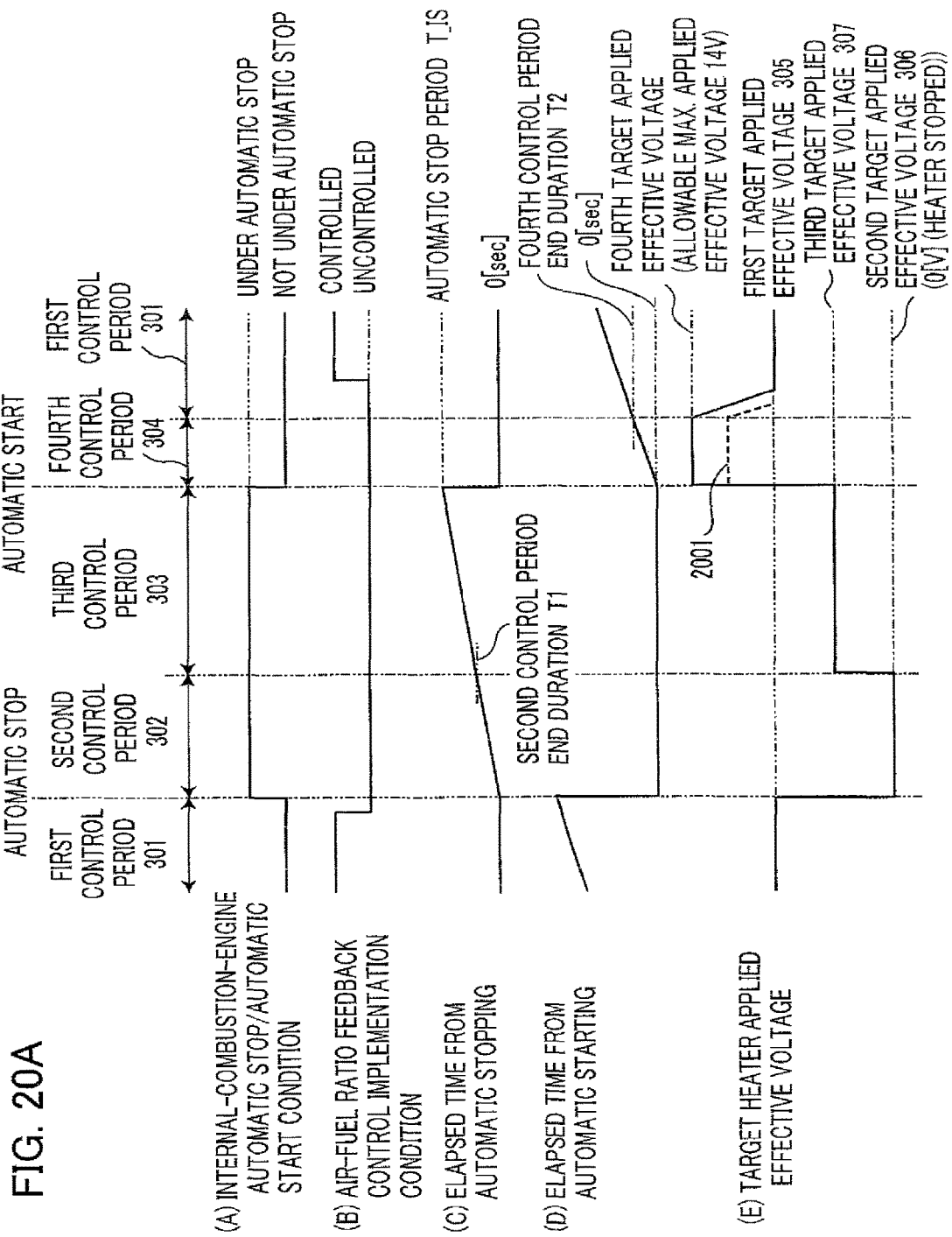

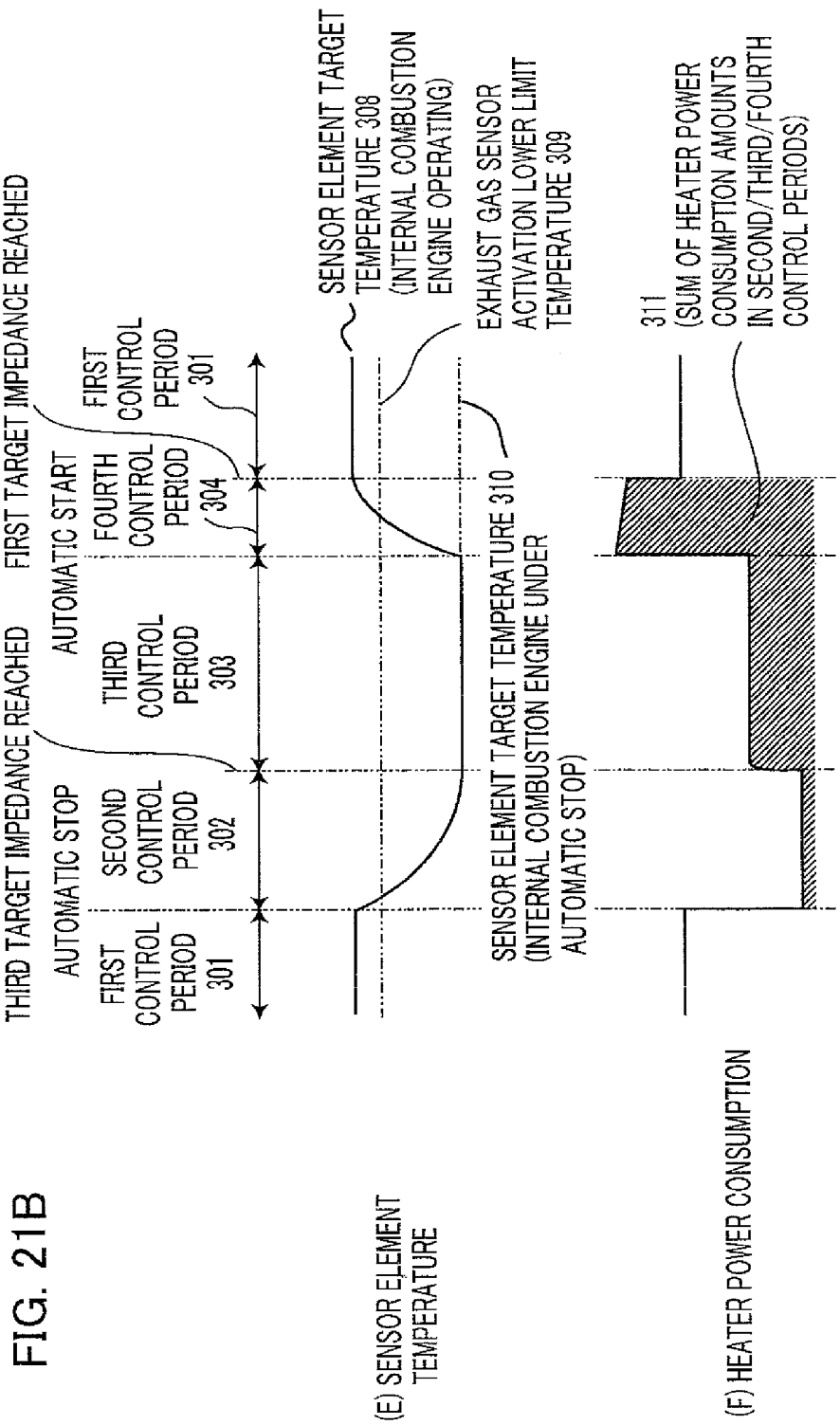

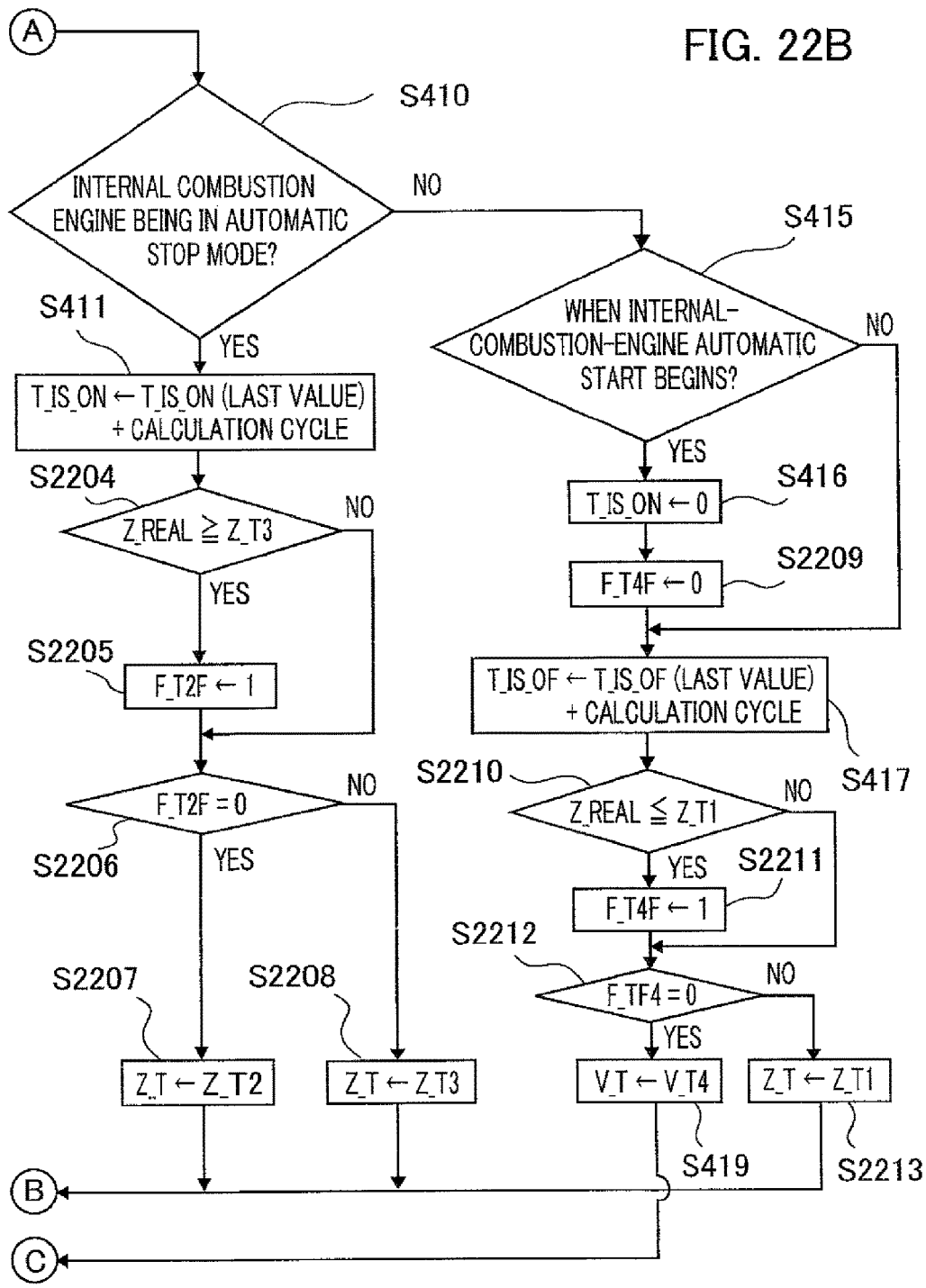

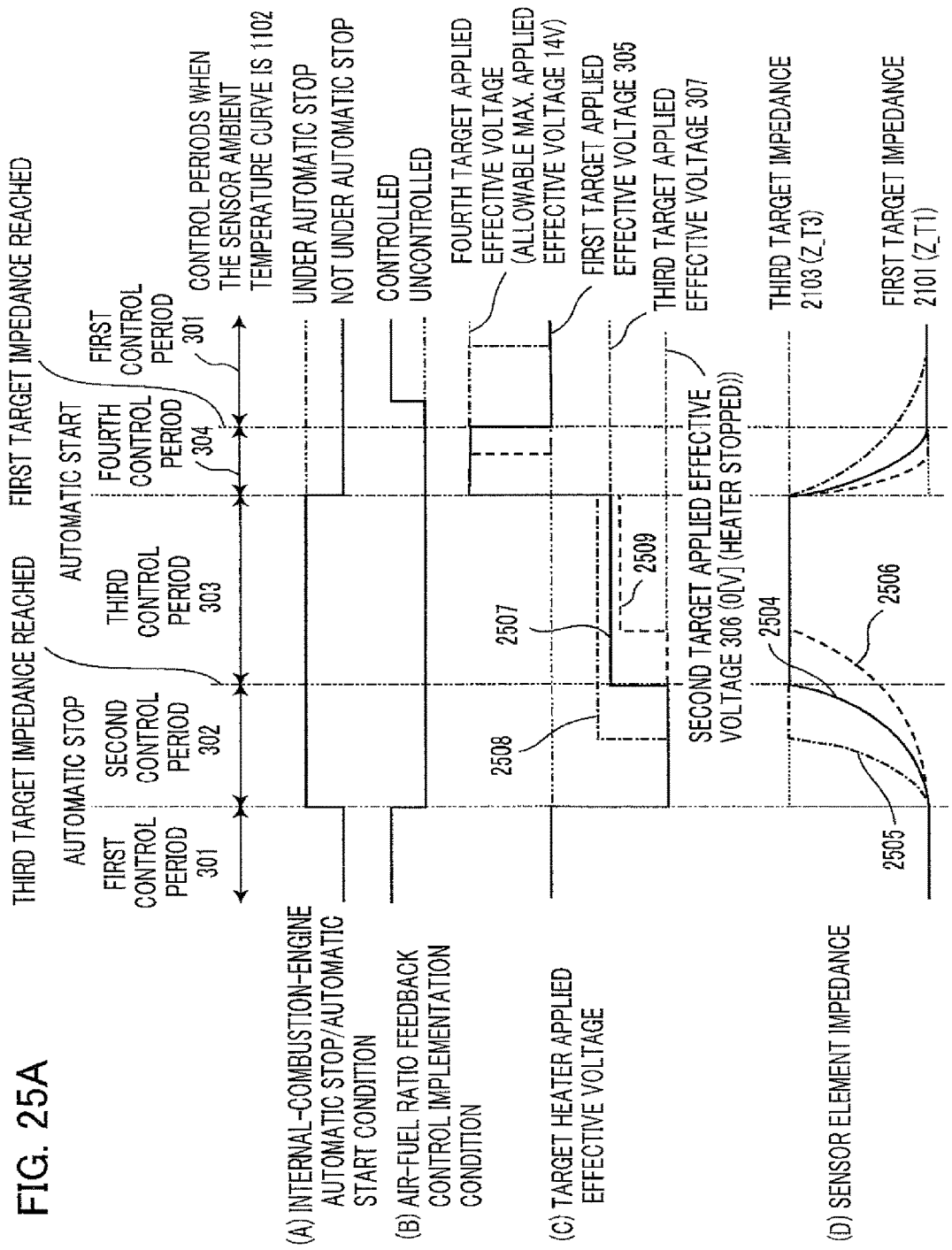

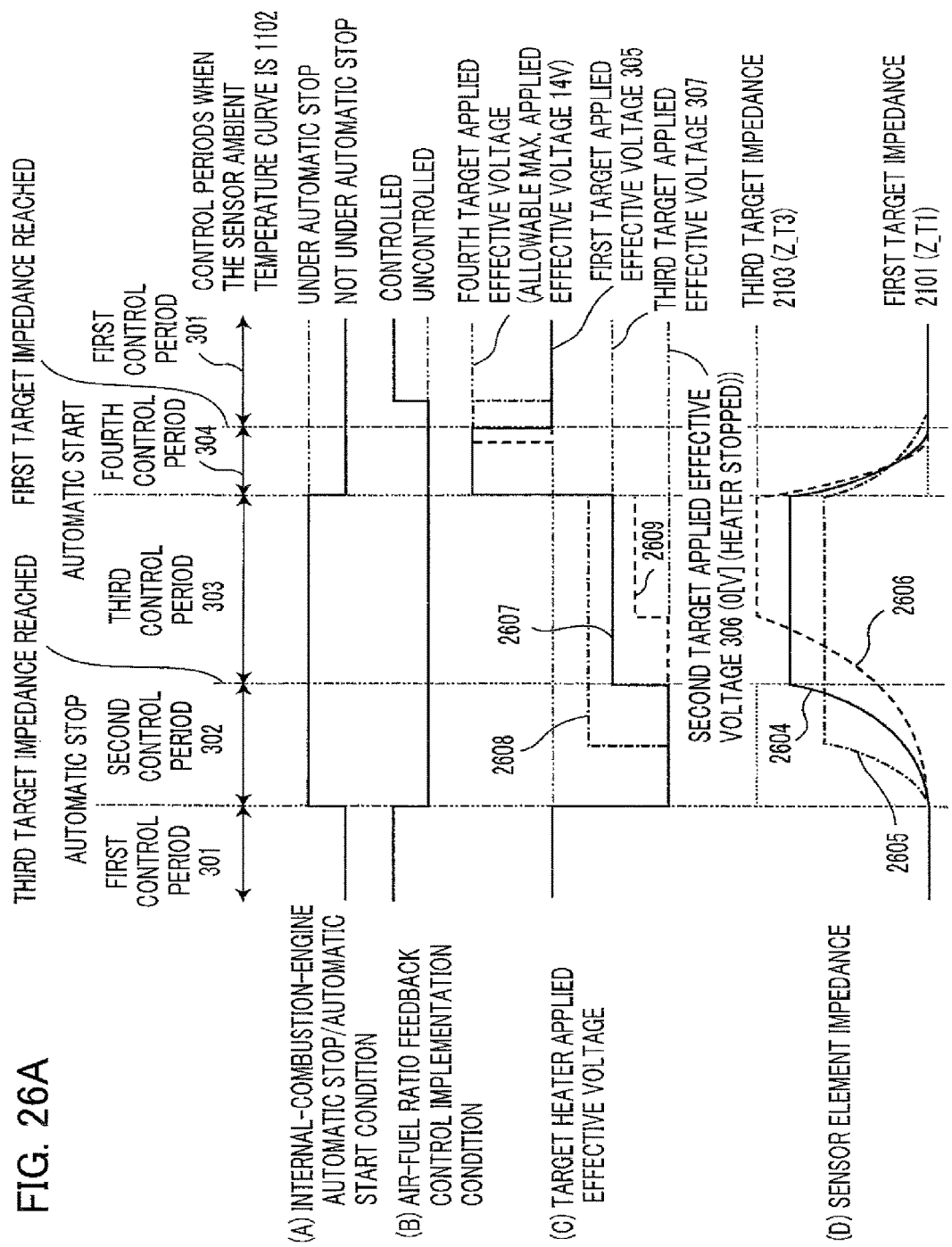

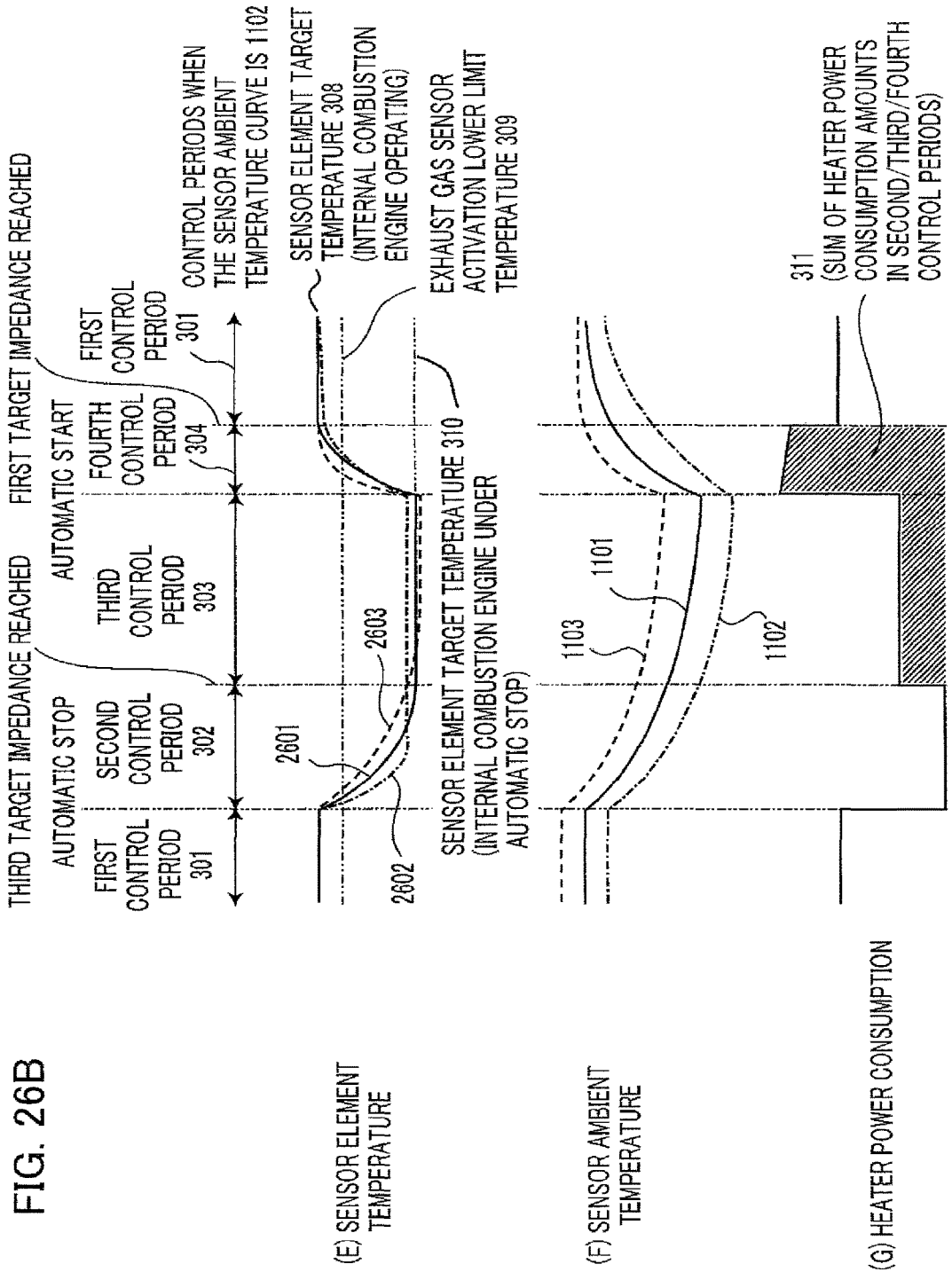

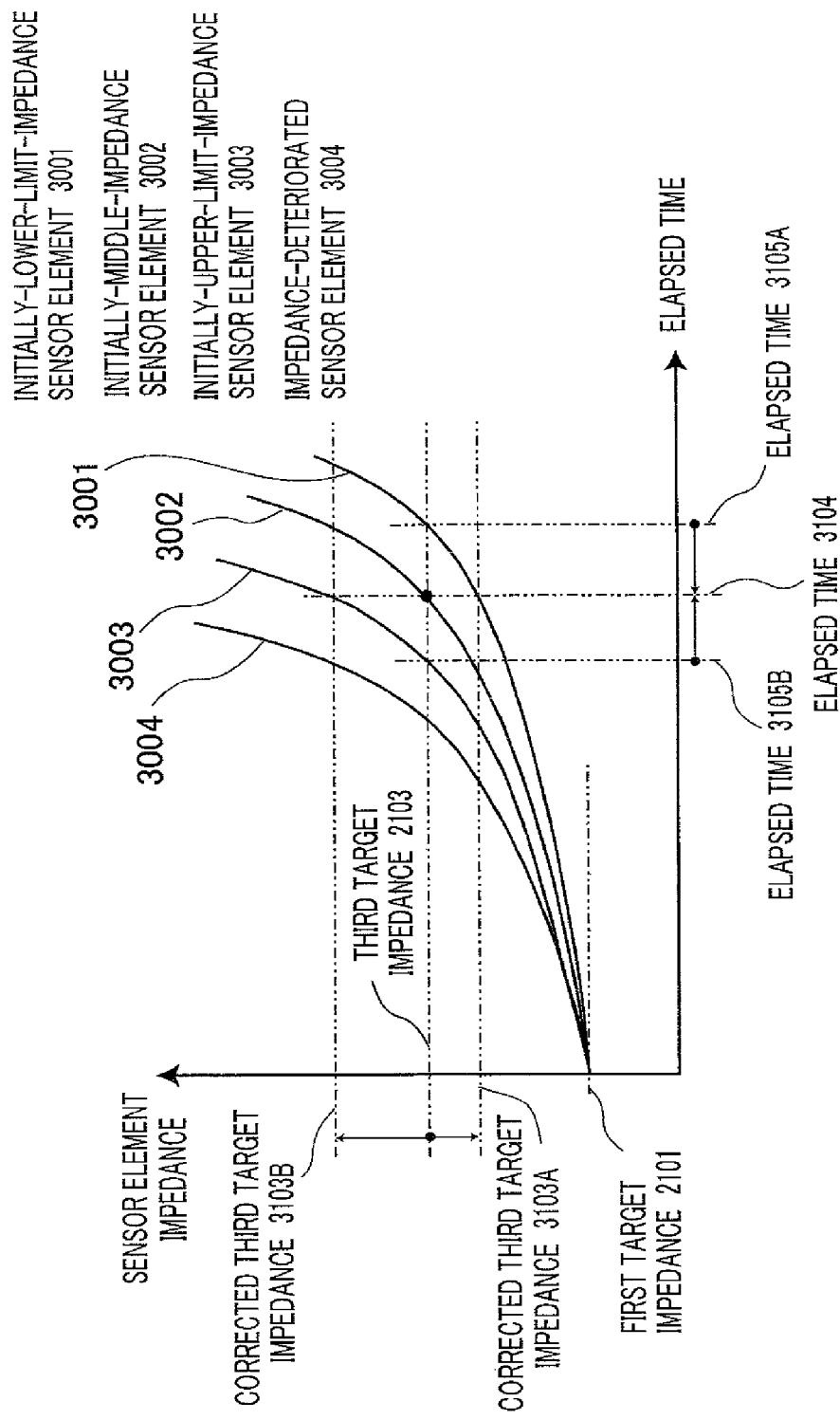

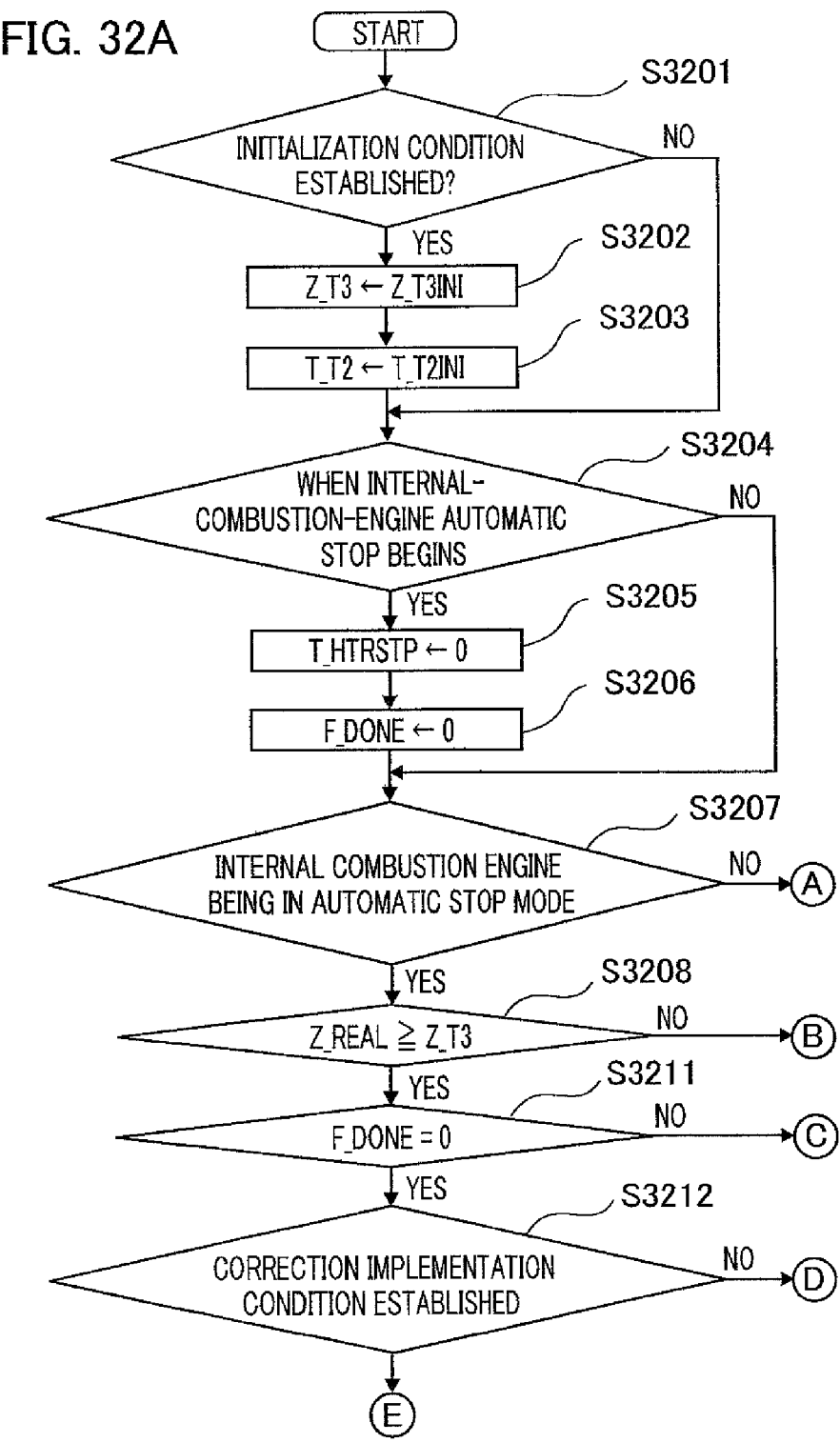

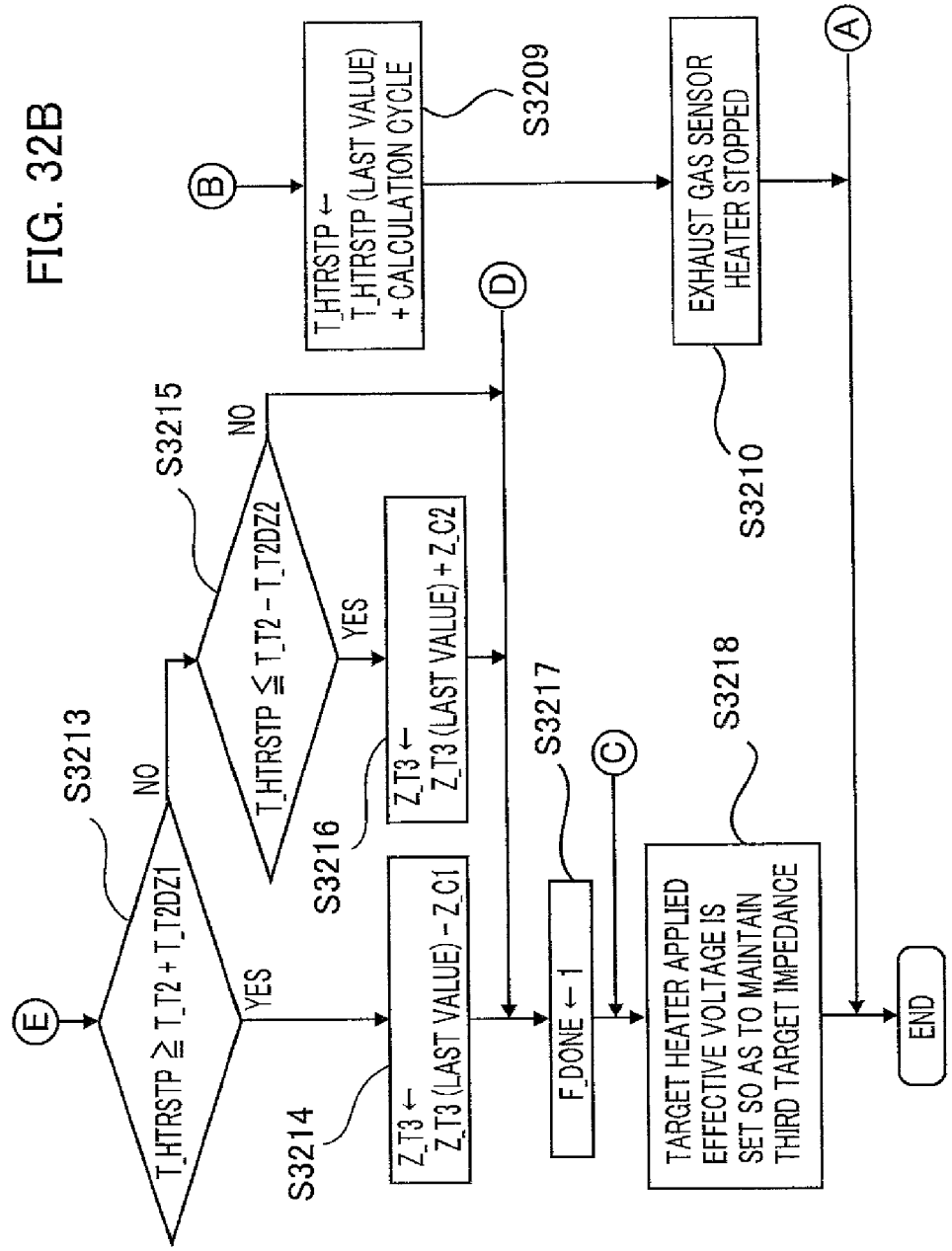

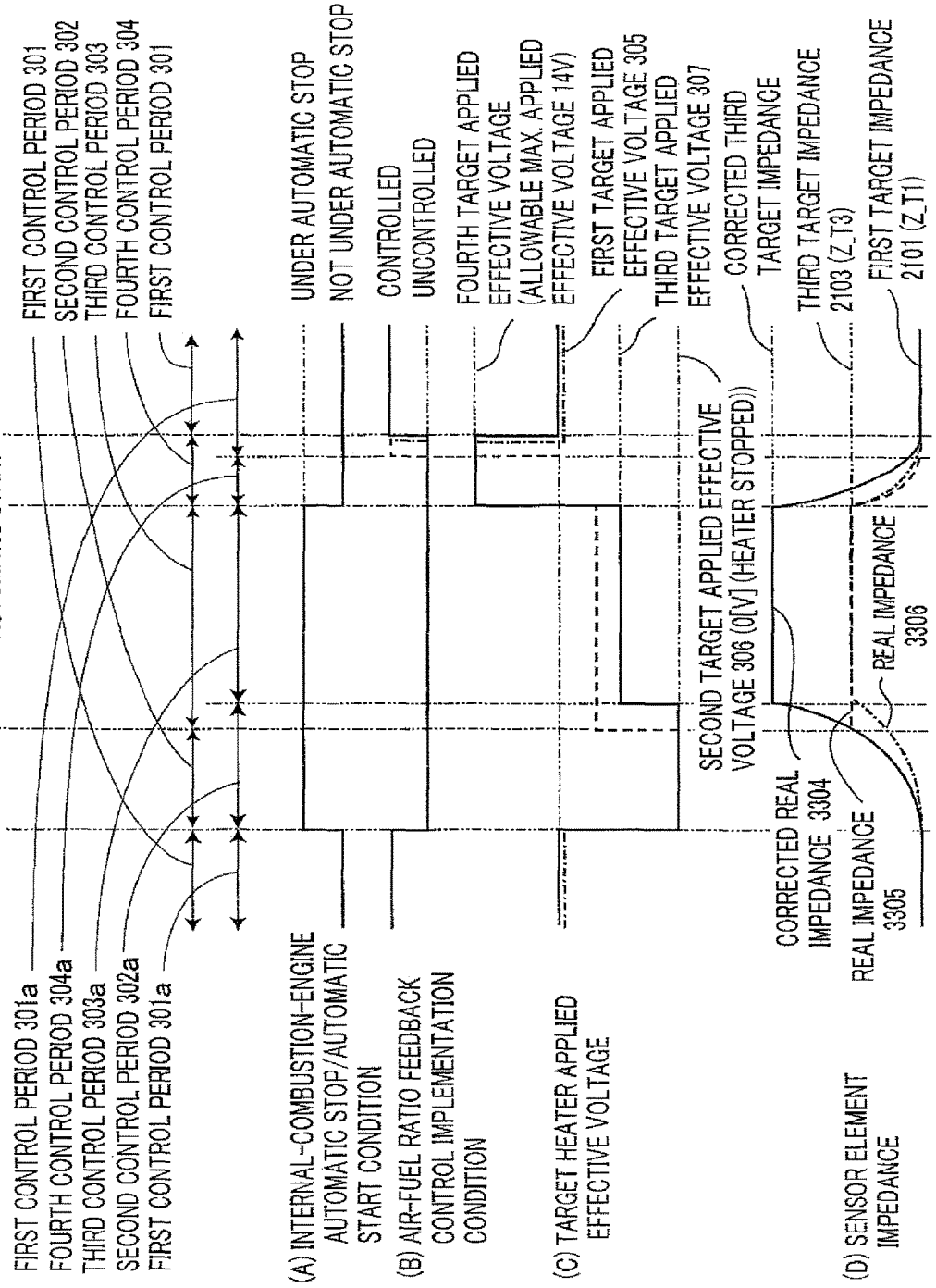

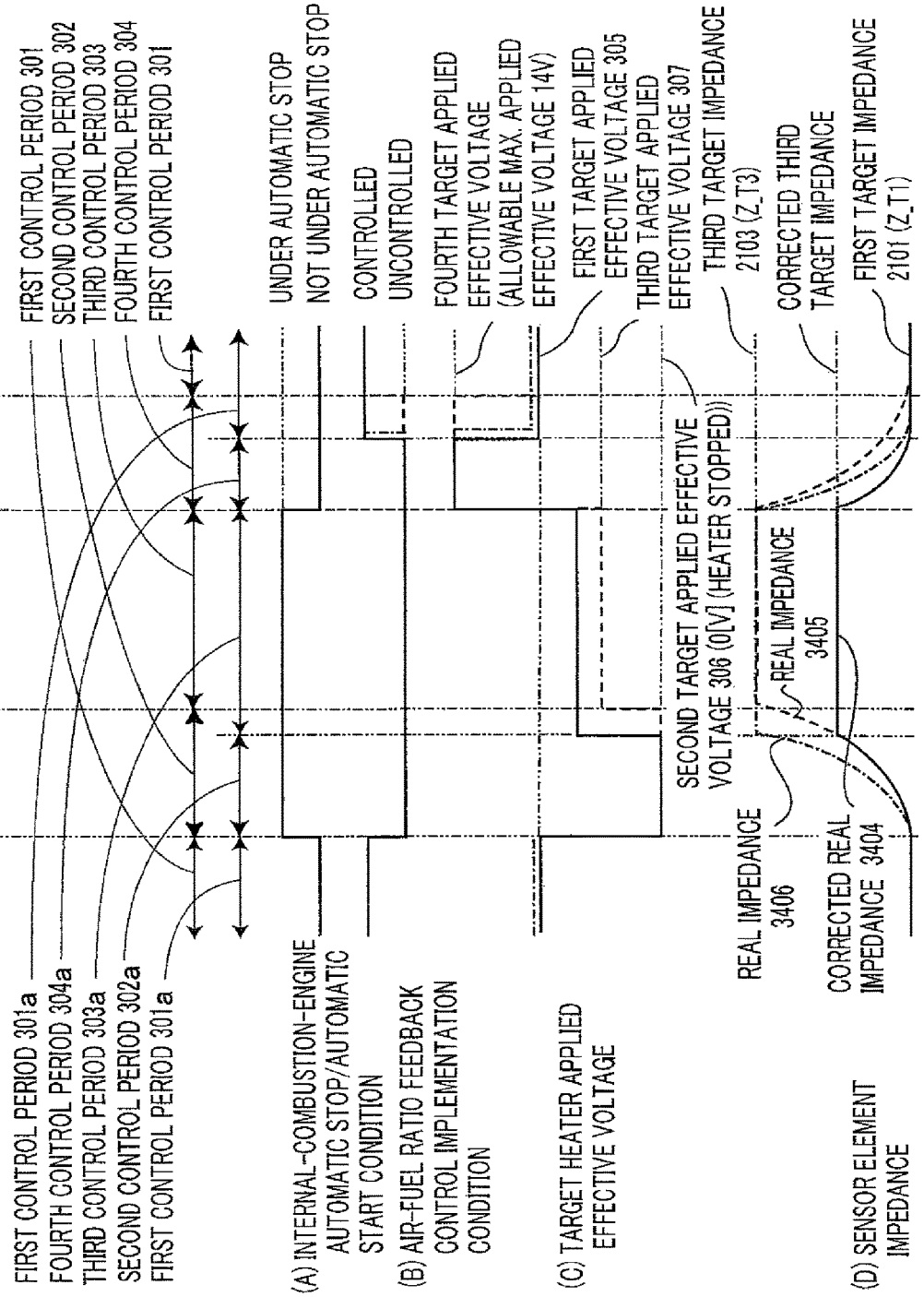

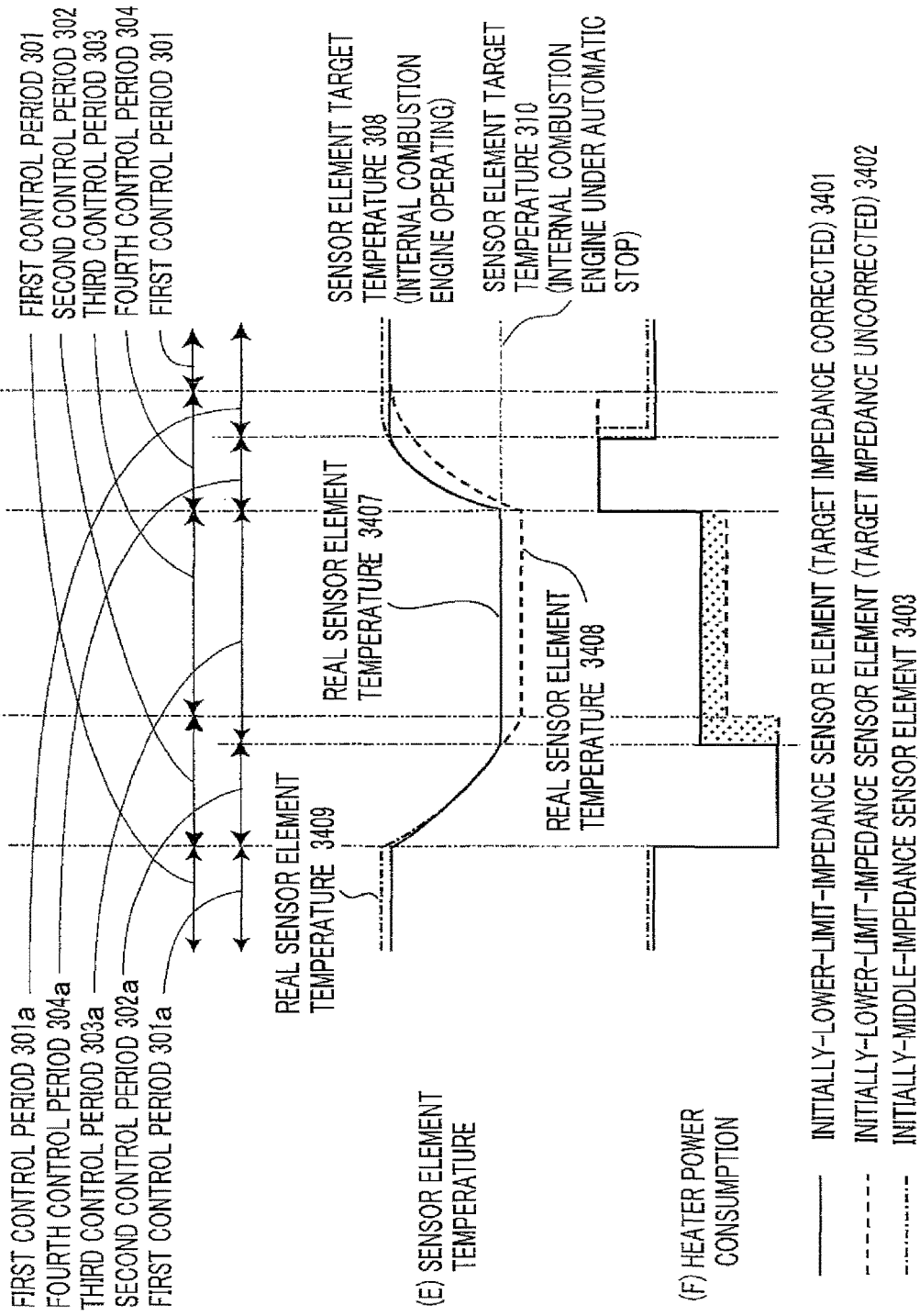

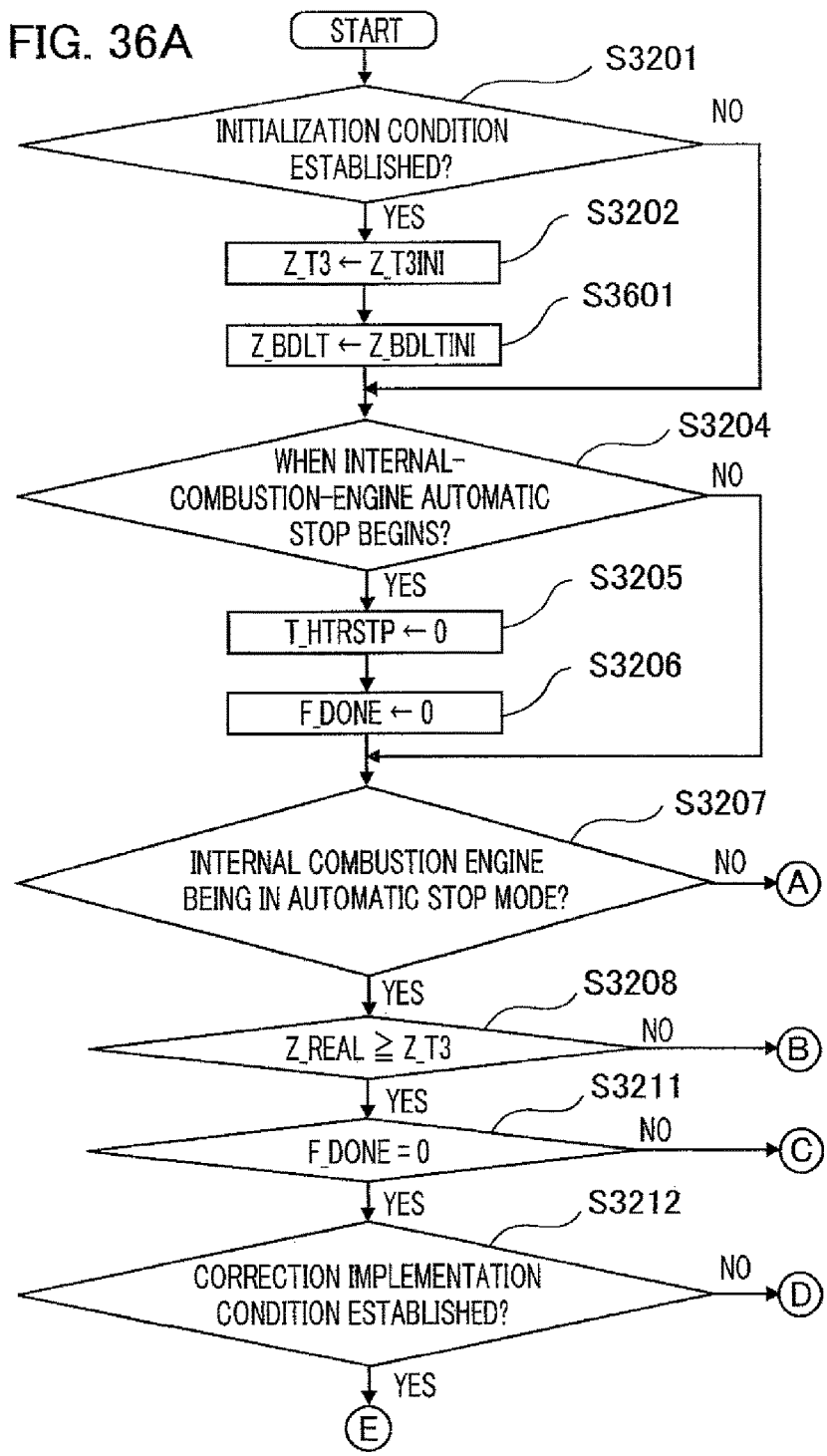

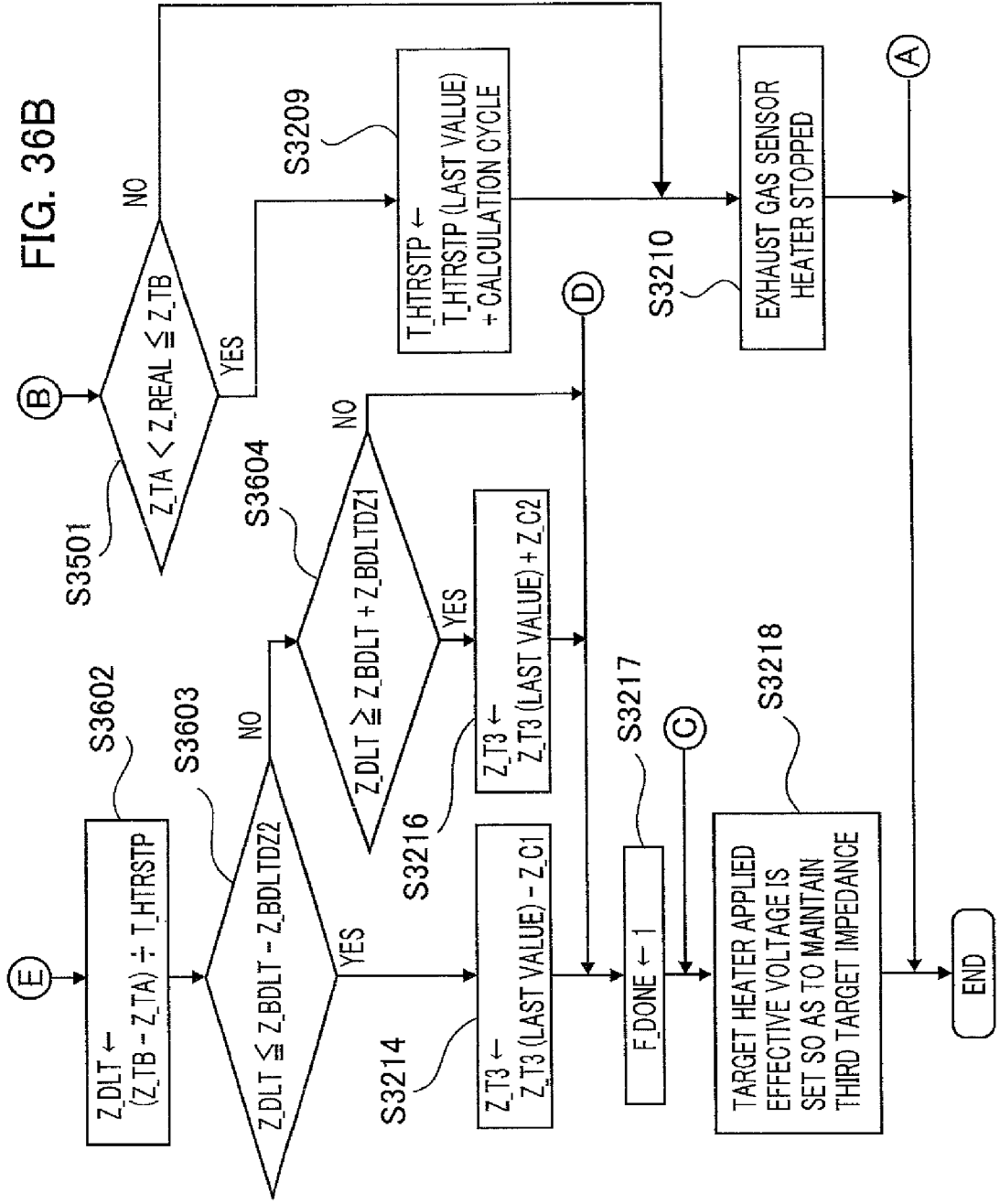

INTERNAL COMBUSTION ENGINE CONTROL APPARATUS

BACKGROUND OF THE INVENTION

Field of the Invention

The present invention relates to an internal combustion engine control apparatus provided with a heater control device for an exhaust gas sensor and more particularly to a heater control device that performs heater control while an internal combustion engine is in the automatic stop mode (idling stop mode).

Description of the Related Art

In order to achieve a low-carbon society, a technology for reducing the carbon dioxide (CO2) footprint has been desired also in the field of a vehicle internal combustion engine; in recent years, there has been actively developed, for example, a technology that automatically stops an internal combustion engine (brings the engine into the idling stop mode) so that the carbon dioxide footprint is reduced, while the vehicle is stopped and the engine is idled.

For example, Japanese Patent Application Laid-Open No. 2001-295678 discloses a technology that reduces the consumption amount of battery power by cutting off the supply of electric power to electric loads that need not to be operated while the internal combustion engine is in the automatic stop mode. In other words, by reducing the amount of power consumption while the internal combustion engine is stopped, there is decreased the necessary amount of generated electric power with which the battery is charged while the internal combustion engine is operated so that the load imposed on the internal combustion engine while the power generator generates electric power is reduced, whereby the amount of fuel consumption is decreased and hence the carbon dioxide footprint can be reduced.

Meanwhile, in the case where by use of an exhaust gas sensor in an internal combustion engine, the air-fuel ratio in an exhaust gas to be exhausted from the internal combustion engine is detected, it is required that the temperature of the sensor element is the activation temperature or higher; thus, in particular, the activation temperature is achieved by providing a heater and heating the sensor element. In this situation, in the case where the supply of electric power to the heater is cut off while the internal combustion engine is in the automatic stop mode, the temperature of the sensor element lowers to the activation temperature or lower; thus, when after the internal combustion engine ends its automatic stopping and then automatically starts, the temperature of the sensor element is increased up to the activation temperature, a long time elapses by the time the air-fuel ratio is detected and air-fuel ratio feedback is performed; therefore, there is posed a problem that the exhaust gas is deteriorated.

In order to cope with this problem, for example, Japanese Patent Application Laid-Open No. H09-88688 discloses a method in which while an internal combustion engine is in the automatic stop mode, the temperature of the sensor element is maintained at the activation temperature, and hence the air-fuel ratio is detected immediately after the internal combustion engine automatically starts and then the air-fuel ratio feedback is started so that the exhaust gas is prevented from being deteriorated.

Moreover, for example, Japanese Patent Application Laid-Open No. 2003-148206 discloses a method in which while the internal combustion engine is in the automatic stop mode, the temperature of the sensor element is maintained at a predetermined residual-heat temperature set to be lower than the activation temperature so that while the heater power consumption at a time when the internal combustion engine is in the automatic stop mode is suppressed, the time for raising the temperature of the sensor element up to the activation temperature after the internal combustion engine automatically starts is shortened, and the air-fuel ratio feedback is started at an earlier stage, whereby the exhaust gas is prevented from being deteriorated.

Still moreover, for example, in Japanese Patent Application Laid-Open No. 2009-156108, the longer is the air-fuel ratio detection undemanded period after the internal combustion engine automatically starts, the lower is set the residual-heat temperature to be maintained while the internal combustion engine is in the automatic stop mode, so that the amount of electric power supplied to the heater while the internal combustion engine is in the automatic stop mode is suppressed and, concurrently, the responsiveness to the air-fuel ratio detection demand to be issued after the internal combustion engine automatically starts is secured.

Furthermore, for example, Japanese Patent Application Laid-Open No. 2010-185345 discloses a heater control method in which an automatic stop period of an internal combustion engine is predicted and, based on the predicted automatic stop period, there is selected, as heater control at a time when the internal combustion engine is in the automatic stop mode, one (that causes a less amount of power consumption) of "the amount of power consumption of heater in the case where the temperature of the sensor element is maintained at a predetermined temperature (e.g., the activation temperature) while the internal combustion engine is in the automatic stop mode" and "the amount of power consumption of heater in the case where the supply of electric power to the heater is interrupted while the internal combustion engine is in the automatic stop mode and, after the internal combustion engine automatically starts, the supply of electric power to the heater is started again in order to raise the temperature of the sensor element to the predetermined temperature" so that the amount of power consumption becomes smaller.

Meanwhile, for the purpose of maintaining the temperature of the sensor element of an internal-combustion-engine exhaust gas sensor at the activation temperature, there is proposed a method in which attention is paid to the relationship between the real temperature and the impedance of the sensor element of the exhaust gas sensor, the real temperature of the sensor element is estimated from the impedance thereof, and then the effective voltage to be applied to the heater is adjusted in such a way that the estimated real temperature of the sensor element becomes a desired activation temperature. However, as time elapses, due to its exposure to the exhaust gas or due to materials adhered to it, the sensor element deteriorates and hence the relationship between the real temperature and the impedance of the sensor element deviates from that of an initially-middle-impedance sensor element 3002, as an impedance-deteriorated sensor element 3004 in FIG. 30(a); thus, there is produced an error in the estimation of the real temperature of the sensor element based on the impedance thereof. As a result, the desired activation temperature cannot be maintained, and the real temperature of the sensor element becomes higher than the desired activation temperature; therefore, there is posed a problem that the amount of power consumption increases or a problem that the sensor element or the heater is overheated.

The variation in the characteristics of the sensor element also makes the relationship between the real temperature and the impedance of the sensor element differ from that of the initially-middle-impedance sensor element 3002, for example, as an initially-lower-limit-impedance sensor element 3001 in FIG. 30(*a*); therefore, because there is produced an error in the estimation of the real temperature of the sensor element based on the impedance thereof, the desired activation temperature cannot be maintained, and the real temperature of the sensor element becomes lower than the desired activation temperature. As a result, the air-fuel ratio control cannot be performed, or the accuracy of the air-fuel ratio control is deteriorated, whereby there is posed a problem that the exhaust gas is deteriorated.

With regard to these problems, for example, Japanese Patent Application Laid-Open No. 2000-65784 discloses a method in which the integrated amount of electric power, supplied to a heater under a predetermine driving mode (at least one of the cold ordinary idling mode of the internal combustion engine, the completely warmed-up ordinary idling mode, and the completely warmed-up ordinary traveling mode) and during a predetermined period, is adopted, as a parameter of the deterioration of the sensor element caused as time elapses, and the impedance of the sensor element is corrected so that the temperature of the sensor element can appropriately be controlled so as to become a control target value and hence overheating of the sensor element or the heater can be prevented.

PRIOR ART REFERENCE

Patent Document

[Patent Document 1] Japanese Patent Application Laid-Open No. 2001-295678
[Patent Document 2] Japanese Patent Application Laid-Open No. H09-88688
[Patent Document 3] Japanese Patent Application Laid-Open No. 2003-148206
[Patent Document 4] Japanese Patent Application Laid-Open No. 2009-156108
[Patent Document 5] Japanese Patent Application Laid-Open No. 2010-185345
[Patent Document 6] Japanese Patent Application Laid-Open No. 2000-65784

However, in the case where the conventional technology disclosed in Patent Document 1 is applied to the heater of the exhaust gas sensor of an internal combustion engine provided with an automatic stop/automatic start apparatus, although by cutting off the supply of electric power to the heater while the internal combustion engine is in the automatic stop mode, the amount of power consumption of the heater can be reduced, the temperature of the sensor element lowers to the activation temperature while the internal combustion engine is in the automatic stop mode. As a result, the time, during which the internal combustion engine ends its automatic stopping and automatically starts, the temperature of the sensor element is raised to the activation temperature, the air-fuel ratio is detected, and then air-fuel ratio feedback is performed, is prolonged; thus, there is posed a problem that the exhaust gas is deteriorated.

In the case of the conventional technology disclosed in Patent Document 2, while an internal combustion engine is in the automatic stop mode, the temperature of the sensor element is maintained at the activation temperature so that the air-fuel ratio is detected immediately after the internal combustion engine automatically starts and then the air-fuel ratio feedback can be started, whereby the exhaust gas is prevented from being deteriorated; however, there is posed a problem that the amount of heater power consumption at a time when the internal combustion engine is in the automatic stop mode cannot be reduced.

In the case of the conventional technology disclosed in Patent Document 3, while the internal combustion engine is in the automatic stop mode, the temperature of the sensor element is maintained at a predetermined residual-heat temperature set to be lower than the activation temperature so that the power consumption of the heater is suppressed while the internal combustion engine is in the automatic stop mode, the time for raising the temperature of the sensor element up to the activation temperature after the internal combustion engine automatically starts is shortened, and the air-fuel ratio feedback is started at an earlier stage, whereby the exhaust gas is suppressed from being deteriorated; however, there is posed the following problem. That is to say, it is not taken into consideration that because after the internal combustion engine starts its automatic stopping, the temperature of the sensor element lowers from the activation temperature to a predetermined residual-heat temperature without electric power being supplied to the heater, the amount of power consumption at a time when the internal combustion engine is in the automatic stop mode can further be reduced by stopping for that period the supply of electric power to the heater.

In the case of the conventional technology disclosed in Patent Document 5, an automatic stop period of an internal combustion engine is predicted and, based on the predicted automatic stop period, there is selected, as heater control at a time when the internal combustion engine is in the automatic stop mode, one (that causes a less amount of power consumption) of "the amount of power consumption of heater in the case where the temperature of the sensor element is maintained at a predetermined temperature (e.g., the activation temperature) while the internal combustion engine is in the automatic stop mode" and "the amount of power consumption of heater in the case where the supply of electric power to the heater is interrupted while the internal combustion engine is in the automatic stop mode and, after the internal combustion engine automatically starts, the supply of electric power to the heater is started again in order to raise the temperature of the sensor element to the predetermined temperature" so that the amount of power consumption is further reduced; however, there is posed the following problem. That is to say, in the case of an internal combustion engine provided with an automatic stop/automatic start apparatus that automatically starts the engine when there exists a driver' intention of starting the vehicle while the internal combustion engine is in the automatic stop mode, it is not preliminarily known when the automatic stop mode is cancelled and the automatic start mode begins; in the case of the technology disclosed in Patent Document 5, because being predicted based on information on the congestion situation of a road, an automatic stop period of an internal combustion engine cannot be predicted, for example, in the area where no information on the congestion situation of a road is provided, or under the condition that the automatic stop/automatic start is performed when the vehicle stops in response to the traffic signal or that the automatic start begins due to a change of the mind of the driver; therefore, there is demonstrated no effect that the amount of power consumption is reduced. Here, the driver' intention of starting the vehicle denotes, for example, stepping on an accelerator pedal or a clutch pedal, release of a brake pedal, or the like.

In the conventional technologies disclosed in Patent Documents 1 through 5, it is not taken into consideration that in the case where the automatic stop/automatic start of an internal combustion continues, i.e., in the case where after the internal combustion engine automatically starts, the automatic stop begins again before the exhaust gas sensor is activated, the gasoline mileage and the exhaust gas are deteriorated because the temperature of the sensor element becomes the same as or lower than a predetermined sensor element target temperature at a time when the internal combustion engine is in the automatic stop mode, the temperature of the sensor element is delayed to reach the activation temperature in response to the demand for detection of the air-fuel ratio after the internal combustion engine automatically starts, and then the timing of starting the air-fuel ratio feedback is delayed.

In the conventional technologies disclosed in Patent Documents 1 through 5, the effect of the ambient temperature of the sensor is not taken into consideration. In other words, it is not taken into consideration that because the ambient temperature of the sensor lowers while the internal combustion engine is in the automatic stop mode, the applied effective voltage for maintaining the temperature of the sensor element at the predetermined sensor element target temperature at a time when the internal combustion engine is in the automatic stop mode differs depending on the ambient temperature of the sensor. Moreover, it is not taken into consideration that the gasoline mileage and the exhaust gas are deteriorated because due to the difference in the ambient temperature of the sensor at a time when the internal combustion engine automatically starts, the rising speed, after the automatic start, of the sensor element temperature differs, and in particular, when the ambient temperature of the sensor is low, the rising speed of the temperature of the sensor element becomes slow, the temperature of the sensor element is delayed to reach the activation temperature in response to the demand for detection of the air-fuel ratio after the internal combustion engine automatically starts, and then the timing of starting the air-fuel ratio feedback is delayed.

In the conventional technologies disclosed in Patent Documents 1 through 5, it is not taken into consideration that in the heater control device, for an exhaust gas sensor, that estimates the temperature of the sensor element of the exhaust gas sensor from the impedance of the sensor element and control the heater in such a way that a target sensor element impedance is obtained, the relationship between the sensor element temperature and the sensor element impedance changes due to variation in the sensor element characteristics or change in the characteristics due to deterioration.

In other words, the estimated sensor element temperature estimated based on a sensor element impedance may differ from the real sensor element temperature; therefore, even when the sensor element impedance is controlled by a heater to be a predetermined target sensor element impedance, the estimated sensor element temperature differs from the real sensor element temperature. In the case the real sensor element temperature is higher than the estimated sensor element temperature, there is posed a problem that the heater power consumption at a time when the internal combustion engine is in the automatic stop mode increases; in the case where the real sensor element temperature is lower than the estimated sensor element temperature, there is posed a problem that the sensor element temperature is delayed to reach the activation temperature in response to the demand for detection of the air-fuel ratio after the internal combustion engine automatically starts and hence the delay of the start of the air-fuel ratio feedback control deteriorates the gasoline mileage and the exhaust gas.

In addition, in the conventional technology disclosed in Patent Documents 6, the sensor element impedance is corrected based on the integrated amount of electric power supplied to the heater while the internal combustion engine is operated, i.e., while the internal combustion engine is in the cold ordinary idling mode, the completely warmed-up ordinary idling mode, the completely warmed-up ordinary traveling mode, or the like. Parameters that provide an effect to the ambient temperature of the sensor element of an exhaust gas sensor include parameters such as the rotation speed and the load of the internal combustion engine, temperatures such as water temperature and intake-air temperature, and vehicle speed; thus, there is posed a problem that due to the respective variations in these parameters, it is difficult to accurately correct the sensor element impedance. Moreover, the problem is not taken into consideration in which in the case where the sensor element characteristics vary, especially, in the case where the real sensor element temperature is lower than the estimated sensor element temperature, the sensor element temperature is delayed to reach the activation temperature in response to the demand for detection of the air-fuel ratio after the internal combustion engine automatically starts and hence the delay of the start of the air-fuel ratio feedback control deteriorates the gasoline mileage and the exhaust gas.

SUMMARY OF THE INVENTION

The present invention has been implemented in order to solve the foregoing problems; the objective thereof is to obtain an internal combustion engine control apparatus provided with an exhaust-gas-sensor heater control device that can reduce the amount of power consumption of a heater while an internal combustion engine is in the automatic stop mode or after the internal combustion engine automatically starts, and that prevents the start of air-fuel ratio feedback control from being delayed after the internal combustion engine automatically starts so that the gasoline mileage and the exhaust gas can be prevented from being deteriorated.

An internal combustion engine control apparatus according to the present invention includes an automatic stop/automatic start device, for an internal combustion engine, that automatically stops the internal combustion engine when a stopping condition for the internal combustion engine is established and automatically starts the internal combustion engine when a starting condition for the internal combustion engine is established; an exhaust gas sensor that is provided in an exhaust path of the internal combustion engine and detects at least one of the air-fuel ratio in an exhaust gas and the rich/lean tendency of the exhaust gas with respect to the theoretical air-fuel ratio; a heater that heats the exhaust gas sensor; and a heater control device that controls an applied effective voltage for the heater in such a way that the applied effective voltage becomes equal to a target heater applied effective voltage. The heater control device is configured in such a way as to include a first control period in which the target heater applied effective voltage is set to a first target applied effective voltage with which a sensor element temperature of the exhaust gas sensor becomes equal to a sensor element target temperature at a time when the internal combustion engine is being operated; a second control period in which after the automatic stop mode of the internal combustion engine has started, the target heater applied effective voltage is set to a second target applied effective voltage that is lower than the first target applied effective voltage; a second control period end determination means that determines, during the second control period, the end of the second control period; and a third control period in which after determination of the end of the second control period, the target heater applied effective voltage is controlled to be a third target applied effective voltage that is higher than the second target applied effective voltage and with which the sensor element temperature of the exhaust gas sensor becomes equal to a sensor element target temperature at a time when the internal combustion engine is in the automatic stop mode.

In an internal combustion engine control apparatus according to the present invention, no electric power is supplied to the heater after the automatic stop mode of the internal combustion engine is started, until the sensor element temperature lowers to a predetermined residual-heat temperature; then, after the sensor element temperature lowers to the predetermined residual-heat temperature, the predetermined residual-heat temperature is maintained until the automatic stop mode of the internal combustion engine ends; thus, the amount of heater power consumption at a time when the internal combustion engine is in the automatic stop mode can be reduced, and the sensor element temperature is prevented from being delayed in reaching the activation temperature in response to an air-fuel ratio detection demand issued after the internal combustion engine has automatically started. As a result, an internal combustion engine control apparatus can be obtained which is equipped with an exhaust-gas-sensor heater control device that prevents the start of air-fuel ratio feedback control from being delayed and can prevent the exhaust gas from being deteriorated.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIGS. 3A and 3B configure a timing chart representing heater control at a time when an internal combustion engine is automatically stopping and at a time after the internal combustion engine has automatically stopped, in Embodiment 1 of the present invention;

FIGS. 5A and 5B configure a timing chart for explaining, in comparison with a conventional technology, the effect that the amount of heater power consumption is reduced, in Embodiment 1 of the present invention;

FIGS. 6A and 6B configure a flowchart representing a method of setting a target heater applied effective voltage, in Embodiment 2 of the present invention;

FIGS. 7A and 7B configure a timing chart for explaining the problem posed when correction according to Embodiment 2 of the present invention is not implemented;

FIGS. 8A and 8B configure a timing chart for explaining the effect demonstrated by performing correction in which a second control period end duration is shorten when the automatic stop/automatic start of an internal combustion engine continues within a predetermined period, in Embodiment 2 of the present invention;

FIGS. 9A and 9B configure a timing chart for explaining the effect demonstrated by performing correction in which a third target applied effective voltage is raised when the automatic stop/automatic start of an internal combustion engine continues within a predetermined period, in Embodiment 2 of the present invention;

FIGS. 11A and 11B configure a timing chart for explaining the problem posed when correction according to Embodiment 3 of the present invention is not implemented;

FIGS. 14A and 14B configure a timing chart for explaining the problem posed when correction according to Embodiment 4 of the present invention is not implemented and the effect demonstrated by performing correction in which the third target applied effective voltage becomes higher as the elapsed time from the start of the automatic stop mode is longer;

FIGS. 16A and 16B configure a timing chart for explaining the problem posed when correction according to Embodiment 5 of the present invention is not implemented;

FIGS. 17A and 17B configure a timing chart for explaining the effect demonstrated by correcting a fourth target applied effective voltage or an voltage application period in which the fourth target applied effective voltage is applied, in Embodiment 5 of the present invention;

FIGS. 20A and 20B configure a timing chart for explaining the effect demonstrated by correcting, in accordance with the sensor ambient temperature, a voltage application period in which the applied effective voltage is applied to a heater in the fourth control period, in Embodiment 6 of the present invention;

FIGS. 21A and 21B configure a timing chart representing heater control at a time when an internal combustion engine is automatically stopping and at a time after the internal combustion engine has automatically stopped, in Embodiment 7 of the present invention;

FIGS. 22A and 22B configure a flowchart representing a method of setting a target heater applied effective voltage, in Embodiment 7 of the present invention;

FIGS. 25A and 25B configure a timing chart for explaining the problem posed when correction according to Embodiment 9 of the present invention is not implemented;

FIGS. 26A and 26B configure a timing chart for explaining the effect demonstrated by performing correction in which the target heater applied effective voltage is made higher as a sensor ambient temperature is lower, and the target heater applied effective voltage is made lower as the sensor ambient temperature is higher, in Embodiment 9 of the present invention;

FIGS. 31A and 31B are a set of graphs for explaining the reason why there is performed correction in which the shorter the heater stopping period is, the higher the third impedance is made, and the longer the heater stopping period is, the lower the third impedance is made, in Embodiment 11 of the present invention;

FIGS. 32A and 32B configure a flowchart representing a method of correcting a third target impedance, in Embodiment 11 of the present invention;

FIGS. 33A and 33B configure a timing chart for explaining the effect that the heater power consumption at a time when an internal combustion engine is in the automatic stop mode is reduced, in Embodiment 11 of the present invention;

FIGS. 34A and 34B configure a timing chart for explaining how the sensor element temperature is prevented from being delayed in reaching the activation temperature in response to an air-fuel ratio detection demand issued after the internal combustion engine has automatically started, in Embodiment 11 of the present invention;

FIGS. 36A and 36B configure a flowchart representing a method of correcting a third target impedance, in Embodiment 13 of the present invention;

DETAILED DESCRIPTION OF THE PREFERRED EMBODIMENTS

Figure 1:
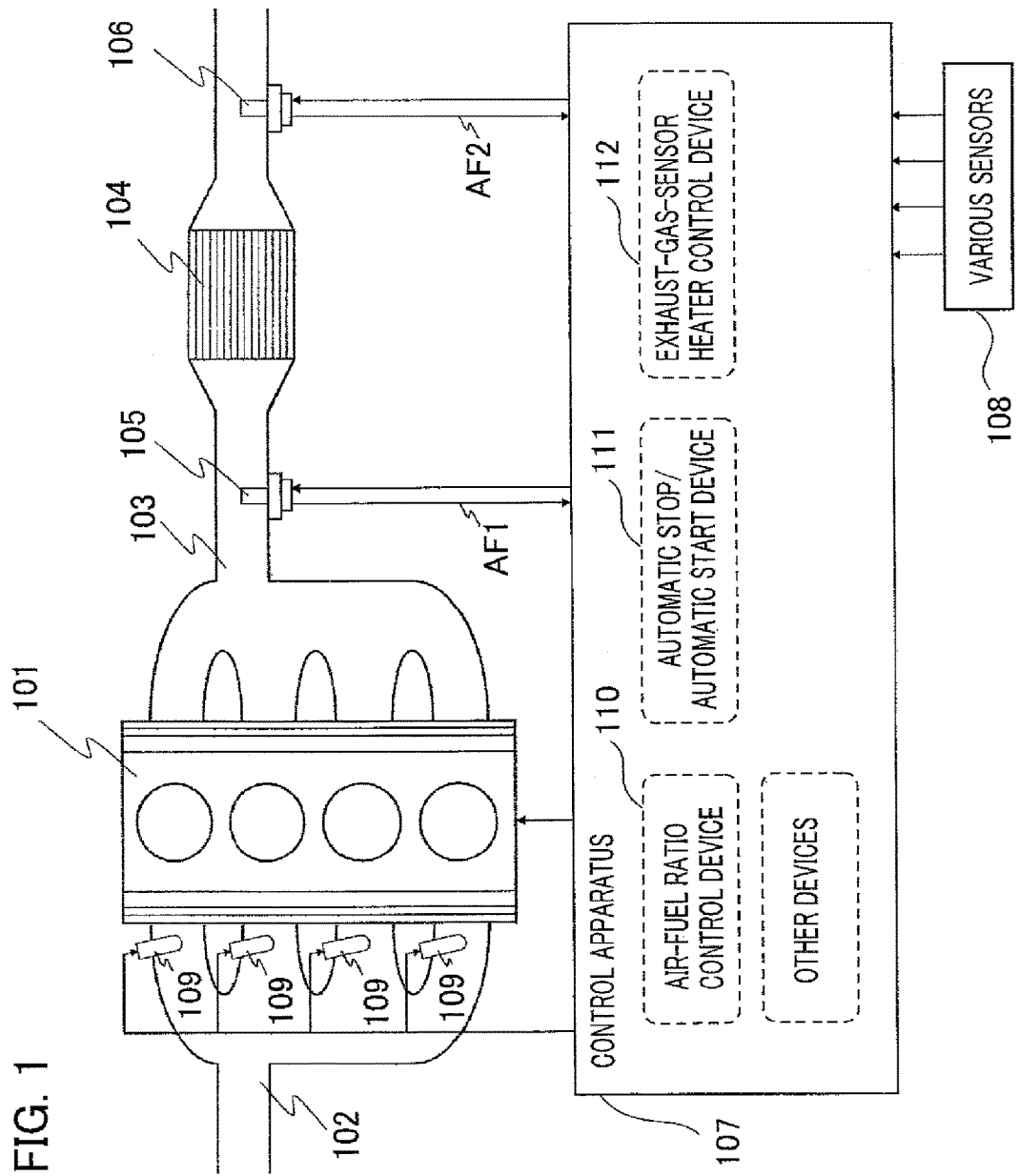
FIG. 1 is a view schematically illustrating the configuration of an internal combustion engine equipped with an exhaust-gas-sensor heater control device according to the present invention.

Hereinafter, embodiments of the present invention will be explained in detail with reference to the drawings. In each of the drawings, the same reference characters denote the same or equivalent constituent elements.

Embodiment 1

FIG. 1 is a configuration diagram schematically illustrating an internal combustion engine equipped with an exhaust-gas-sensor heater control device 112 according to Embodiment 1 of the present invention. In FIG. 1, an internal combustion engine 101 communicates with an air-intake path 102 and an exhaust path 103; a catalyst 104 for removing harmful substances in exhaust gas is provided in the exhaust path 103. An exhaust gas sensor 105, as a first exhaust gas sensor, is provided at the upstream side of the catalyst 104. The exhaust gas sensor 105 detects the oxygen concentration of an exhaust gas at the upstream side of the catalyst 104 and outputs a detection signal AF1 corresponding to a first air-fuel ratio. An exhaust gas sensor 106, as a second exhaust gas sensor, is provided at the downstream side of the catalyst 104. The exhaust gas sensor 106 detects the oxygen concentration of an exhaust gas at the downstream side of the catalyst 104 and outputs a detection signal AF2 corresponding to a second air-fuel ratio.

Various kinds of sensors 108 for detecting the operation state of the internal combustion engine 101 are provided in the internal combustion engine 101; respective detection signals from the various kinds sensors 108 are inputted to an internal combustion engine control apparatus (hereinafter, also referred to simply as a control apparatus) 107.

The control apparatus 107 is configured with a microprocessor, a ROM, a RAM, an I/O interface, and the like; an air-fuel ratio control device 110 of the control apparatus 107 performs air-fuel ratio feedback control, based on the detection signals AF1 and AF2 corresponding to first and second air-fuel ratios, respectively, and the detection signals from the various kinds of sensors 108, and generates drive control signals for injectors 109 provided in the air-intake path 102. The injectors 109 may be mounted in such a way as to directly inject fuel into the respective cylinders of the internal combustion engine 101.

An automatic stop/automatic start device 111 of the control apparatus 107 automatically stops the internal combustion engine 101 when there is established a stopping condition for the internal combustion engine 101 such as when the vehicle has stopped and is idling, and automatically starts the internal combustion engine 101 when there is established a starting condition for the internal combustion engine 101 such as when there exists a driver' intention of starting the vehicle.

In addition, the respective devices of the control apparatus 107 such as the air-fuel ratio control device 110, the automatic stop/automatic start device 111, and the exhaust-gas-sensor heater control device 112 are each formed of a single control device; however, it goes without saying that each of them may be formed of a plurality of control devices.

Here, the air-fuel ratio control device 110 will be explained further in detail. The catalyst 104 is a three-way catalyst for removing HC, CO, and NOx to so as purify the exhaust gas from the internal combustion engine 101; in order to make the catalyst 104 exert its high purification performance in the vicinity of the theoretical air-fuel ratio, the fuel injection amount of the injector 109 is feedback-controlled in such a way that the detection signal AF1 of the exhaust gas sensor 105 situated at the upstream side of the catalyst 104 becomes equal to the theoretical air-fuel ratio. In this regard, however, due to variations, in the injectors 109 mounted in the respective cylinders and the differences in the lengths of the exhaust paths from the respective cylinders to the exhaust gas sensor 105, even when the detection signal AF1 of the exhaust gas sensor 105 is controlled to be the theoretical air-fuel ratio, the air-fuel ratio inside the catalyst 104 may differ from the theoretical air-fuel ratio; moreover, for example, as the exhaust gas sensor 105 is exposed to a high exhaust gas temperature, the output fluctuation of the detection signal AF1 may be caused. In order to correct these discrepancies, the air-fuel ratio control device 110 corrects the error between the theoretical air-fuel ratio and the real air-fuel ratio, by use of the detection signal AF2 of the exhaust gas sensor 106 situated at the downstream side of the catalyst 104, so as to keep the air-fuel ratio at the downstream side of the catalyst equal to the theoretical air-fuel ratio (referred to as "air-fuel ratio feedback control", hereinafter).

Figure 2:
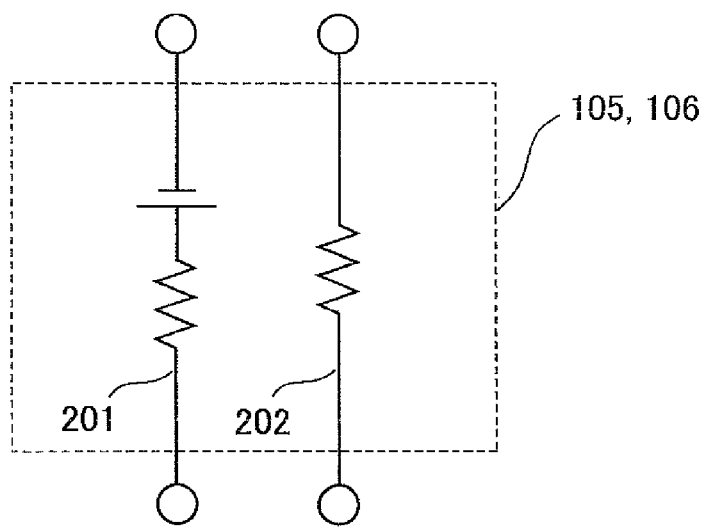
FIG. 2 is a circuit diagram equivalently illustrating the internal structure of the exhaust gas sensor illustrated in FIG. 1.

FIG. 2 is a circuit diagram equivalently illustrating the internal structure of the exhaust gas sensors 105 and 106 illustrated in FIG. 1. As illustrated in FIG. 2, each of the exhaust gas sensors 105 and 106 is provided with a sensor element 201. In addition, a heater 202 is provided in each of the exhaust gas sensors 105 and 106.

The exhaust-gas-sensor heater control device 112 of the control apparatus 107 adjusts the applied effective voltages for the heaters 202 in such a way that the respective sensor element temperatures of the exhaust gas sensors 105 and 106 become a predetermined temperature in accordance with the operation state. For example, while the internal combustion engine 101 is operated, the applied effective voltages for the heaters 202 are adjusted in such a way that the respective sensor element temperatures of the exhaust gas sensors 105 and 106 become a sensor element temperature at which the exhaust gas sensors 105 and 106 are activated; while the internal combustion engine 101 is in the automatic stop mode, the applied effective voltages for the heaters 202 are adjusted in such a way that the respective sensor element temperatures of the exhaust gas sensors 105 and 106 become a predetermined heat-retention temperature. The operation of the heater control device 112 at a time when the internal combustion engine 101 is in the automatic stop mode will be explained in detail below. In addition, instead of adjusting the applied effective voltage for the heater 202, the energization duration for the heater 202 may be adjusted.

Here, with reference to a timing chart in FIGS. 3A and 3B, there will be explained the exhaust-gas-sensor heater control device 112 in an internal combustion engine control apparatus according to Embodiment 1 of the present invention. FIG. 3A(A) represents the automatic stop period and the timing of the automatic stop/automatic start of the internal combustion engine 101, realized by the automatic stop/automatic start device 111 of the control apparatus 107; FIG. 3A(B) represents the starting timing/ending timing of air-fuel ratio feedback control by the air-fuel ratio control device 110 of the control apparatus 107. FIG. 3A(C) represents the elapsed time from the start of the automatic stop mode of the internal combustion engine 101; the elapsed time is reset when the automatic stop/automatic start device 111 automatically starts the internal combustion engine 101. FIG. 3A(D) represents the elapsed time after the internal combustion engine 101 automatically starts; the elapsed time is reset when the automatic stop/automatic start device 111 automatically stops the internal combustion engine 101. The elapsed time from the start of the automatic stop mode and the elapsed time after the internal combustion engine automatically starts are calculated, for example, in the control apparatus 107.

In a first control period 301 in which the internal combustion engine 101 is being operated, as represented in FIGS. 3A(E) and 3B(F), the target heater applied effective voltage is set to a first target applied effective voltage 305 with which the sensor element temperatures of the exhaust gas sensors 105 and 106 become a sensor element target temperature 308 at a time when the internal combustion engine 101 is being operated.

Next, in a second control period 302 in which the internal combustion engine 101 is in the automatic stop mode, as represented in FIGS. 3A(C) and 3A(E), the target heater applied effective voltage is set to a second target applied effective voltage 306, which is lower than the first target applied effective voltage 305, until the elapsed time from the start of the automatic stop mode is expanded as wide as a second control period end duration T1.

Next, in a third control period 303 in which the internal combustion engine 101 is in the automatic stop mode, as represented in FIGS. 3A(E) and 3B(F), after the elapsed time from the start of the automatic stop mode is expanded as wide as the second control period end duration T1, the target heater applied effective voltage is set to a third target applied effective voltage 307 that is higher than the second target applied effective voltage 306 and with which the sensor element temperatures of the exhaust gas sensors 105 and 106 become a sensor element target temperature 310 at a time when the internal combustion engine 101 is in the automatic stop mode.

Next, in a fourth control period 304 which is a period after the internal combustion engine 101 has automatically started, as represented in FIGS. 3A(C) and 3A(E), the target heater applied effective voltage is set to a fourth target applied effective voltage, which is the same as or higher than the first target applied effective voltage 305, until the elapsed time after the internal combustion engine 101 automatically starts is expanded as wide as a fourth control period end duration T2.

Next, after the internal combustion engine 101 has automatically started, the fourth control period end duration T2 is followed by the first control period 301 in which the target heater applied effective voltage is set to the first target applied effective voltage 305 with which the sensor element temperatures of the exhaust gas sensors 105 and 106 become the sensor element target temperature 308 at a time when the internal combustion engine 101 is being operated.

The sensor element target temperature 308 at a time when the internal combustion engine 101 is being operated is, for example, an activation temperature that is the same as or higher than the activation lower limit temperature 309 of the exhaust gas sensors 105 and 106.

The sensor element target temperature 310 at a time when the internal combustion engine 101 is in the automatic stop mode is preliminarily set through a matching test or the like, for example, in such a way that after the internal combustion engine 101 automatically starts, the fourth target applied effective voltage in the fourth control period is applied so that the sensor element temperature of the exhaust gas sensor reaches the sensor element target temperature 308 at a time when the internal combustion engine 101 is being operated, by the time the air-fuel ratio detection demand for the air-fuel ratio feedback control is issued, and in such a way that the sum 311 of the amounts of heater power consumptions in the second control period 302, the third control period 303, and the fourth control period 304 becomes minimum.

The lower is the sensor element target temperature 310 at a time when the internal combustion engine 101 is in the automatic stop mode set in the third control period 303, the larger becomes the temperature width along which the sensor element temperature need to rise within the fourth control period 304; thus, the time in which the sensor element target temperature 308 at a time when the internal combustion engine 101 is being operated becomes longer, and the amount of power consumption during the fourth control period 304 becomes larger; however, the amount of power consumption during the third control period becomes smaller.

In contrast, the higher is the sensor element target temperature 310 at a time when the internal combustion engine 101 is in the automatic stop mode set in the third control period 303, the smaller becomes the temperature width along which the sensor element temperature need to rise within the fourth control period 304; thus, the time in which the sensor element target temperature 308 at a time when the internal combustion engine 101 is being operated becomes short, and the amount of power consumption during the fourth control period 304 becomes small; however, the amount of power consumption during the third control period becomes large.

As the second control period end duration T1, for example, a time is preliminarily set, through a matching test or the like, in which after the internal combustion engine 101 automatically stops under a predetermined environment such as that the sensor ambient temperature of the exhaust gas sensor at a time when the internal combustion engine 101 begins its automatic stop mode is a predetermined temperature, the sensor element temperature of the exhaust gas sensor decreases in the second control period 302 and then, in the third control period 303, reaches the sensor element target temperature 310 at a time when the internal combustion engine 101 is in the automatic stop mode.

As the fourth control period end duration T2, for example, a time is preliminarily set, through a matching test or the like, in which after the internal combustion engine 101 automatically starts under a predetermined environment such as that the sensor ambient temperature of the exhaust gas sensor at a time when the internal combustion engine 101 automatically starts is a predetermined temperature, by applying the fourth target applied effective voltage to the heater 202 in the fourth control period 304, the sensor element temperature of the exhaust gas sensor rises and, in the first control period 301, reaches the sensor element target temperature 308 at a time when the internal combustion engine 101 is being operated.

Through a matching test or the like, the first target applied effective voltage 305 is preliminarily set for each operation region defined by an engine rotation speed and an engine load, for example, in such a way that, in the first control period 301, the sensor element temperature becomes the sensor element target temperature 308 at a time when the internal combustion engine 101 is being operated.

The second target applied effective voltage 306 is set to a sufficiently small value, for example, 0 V (heating is stopped) in order to reduce the amount of power consumption in the second control period 302.

Through a matching test or the like, the third target applied effective voltage 307 is preliminarily set, for example, in such a way that, in the third control period 303, the sensor element temperature becomes the sensor element target temperature 310 at a time when the internal combustion engine 101 is in the automatic stop mode.

As represented in FIG. 3A(E), the fourth target applied effective voltage is set to the allowable maximum applied effective voltage (e.g., 14 V) of the heater 202 so that sensor element temperature of the exhaust gas sensor can rapidly reach the sensor element target temperature 308 at a time when the internal combustion engine 101 is being operated from the sensor element target temperature 310 at a time the internal combustion engine 101 is in the automatic stop mode. Such a system in which the battery, as a power source, is shared by the starting device of the internal combustion engine suffers restriction by a decrease, in the battery voltage, that is caused while the internal combustion engine is started; therefore, the battery voltage value at that moment is the maximum applied effective voltage.

In addition, it may also be allowed that in the case where after the internal combustion engine 101 has automatically started, the fourth control period end duration T2 elapses and a transition from the fourth control period to the first control period takes place, i.e., in the case where the target heater applied effective voltage is switched from the fourth target applied effective voltage to the first target applied effective voltage, there is performed so-called gradual reduction processing such as that as represented in FIG. 3A(E), the target applied effective voltage is gradually changed from the fourth target applied effective voltage to the first target applied effective voltage, so that the sensor element temperature of the exhaust gas sensor approximately at a time when the air-fuel ratio feedback is started is prevented from changing suddenly and is stabilized at the sensor element target temperature 308 at a time when the internal combustion engine 101 is being operated.

Next, with regard to an exhaust-gas-sensor heater control method according to the present invention, i.e., a method of setting the target heater applied effective voltage at a time when the internal combustion engine 101 is in the automatic stop mode or at a time when the internal combustion engine 101 has automatically started, the processing by the control apparatus 107 will be explained with reference to a flowchart in FIGS. 4A and 4B.

Figure 4A:
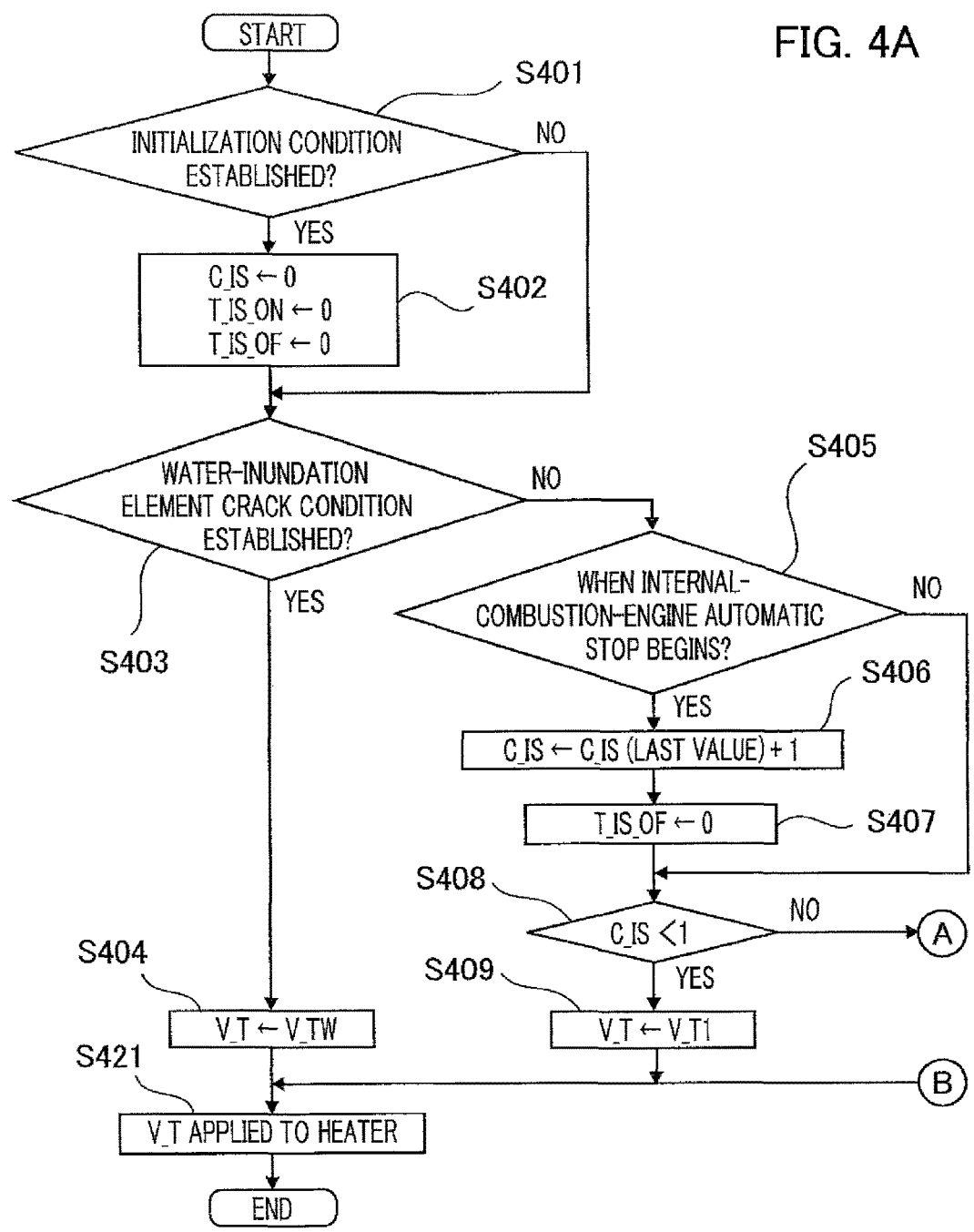
FIGS. 4A and 4B configure a flowchart representing a method of setting a target heater applied effective voltage, in Embodiment 1 of the present invention.
Figure 4B:
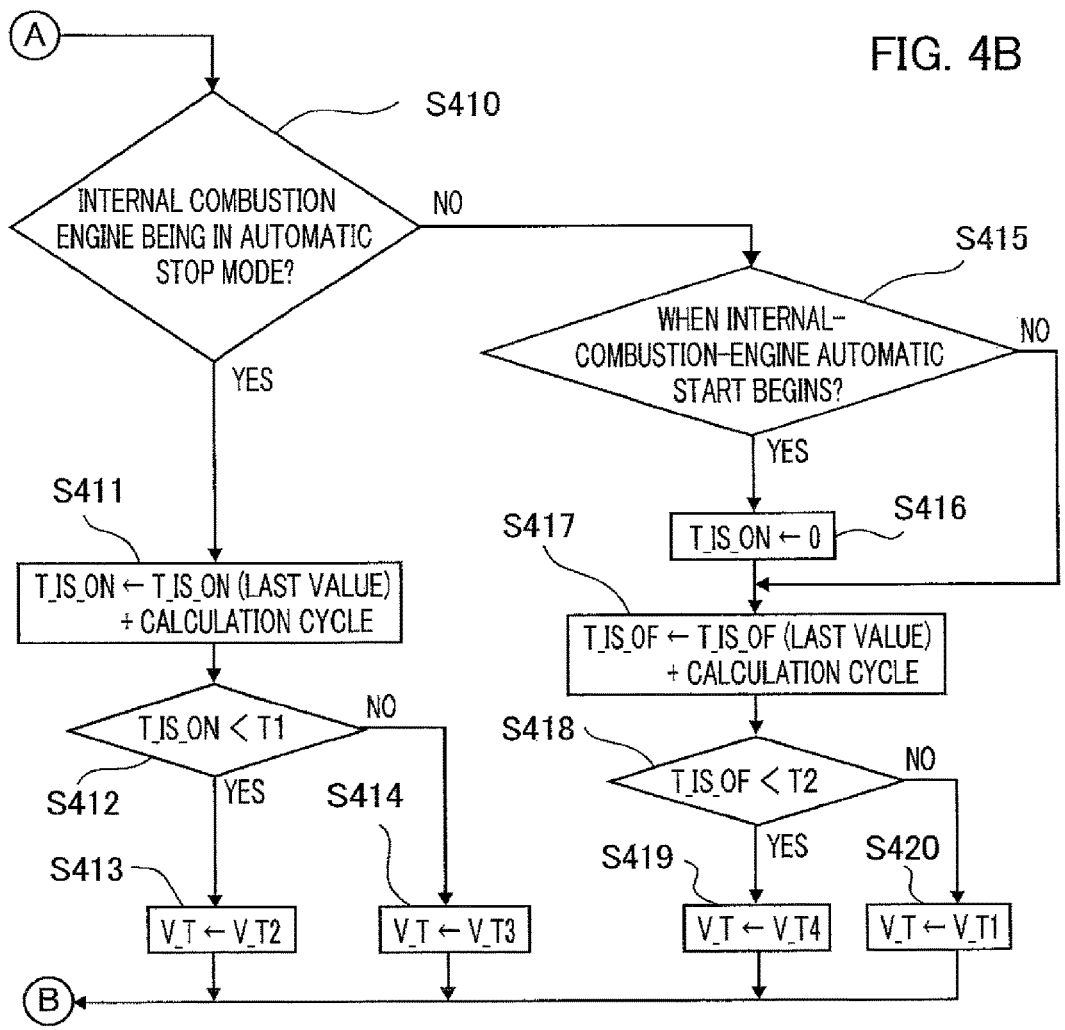

The process from the start to the end of the flowchart represented in FIGS. 4A and 4B is performed every calculation processing cycle of the control apparatus 107. At first, in the step S401, when due to keying-on, an initialization condition for the control apparatus 107 has been established, initialization is performed in the step S402 by storing zeroes in the count C_IS of automatic stop/automatic start events during a period from keying-on to keying-off, the elapsed time T_IS_ON from the start of the automatic stop mode, and the elapsed time T_IS_OF after the internal combustion engine automatically starts.

Next, when in the step S403, a water-inundation element crack condition has been established, a water-inundation target applied effective voltage V_TW is stored in a target heater applied effective voltage V_T in the step S404. The water-inundation element crack condition is a condition indicating the state where the temperatures of the engine and the sensor element have lowered to the condensation point, such as when the internal combustion engine 101 is started or operated at a low temperature and when after the temperatures of the engine and the sensor element have lowered while the internal combustion engine 101 is in the automatic stop mode, the internal combustion engine 101 automatically starts; for example, the water-inundation element crack condition is set based on the water temperature, the elapsed time after the internal combustion engine has started, and the like. In other words, for example, due to contact with unwarmed (under the condensation point) exhaust pipe when the internal combustion engine 101 starts at a lower temperature, steam included in an exhaust gas is condensed into condensation water; when the condensation water scatters, the sensor element of the exhaust gas sensor may be inundated with water. At this moment, because being rapidly heated by a heater so as to be quickly activated, the sensor element of the exhaust gas sensor may undergo an element crack, for example, due to the difference between the respective thermal expansion rates of an inundated portion and a non-inundated portion. Therefore, for example, when the internal combustion engine 101 is started or operated at a low temperature, or when after the temperatures of the engine and the sensor element have lowered while the internal combustion engine 101 is in the automatic stop mode, the internal combustion engine 101 automatically starts, limitation is set to the heating by the heater, and the condition therefor is set. In addition, the water-inundation target applied effective voltage V_TW is set to a target applied effective voltage at which even when being inundated, the sensor element does not undergo any element crack. Alternatively, the water-inundation target applied effective voltage V_TW may be set to 0 V (i.e., heating is stopped) until the internal combustion engine 101 is completely warmed up and hence no condensation water is produced.

In the case where in the step S403, the water-inundation element crack condition has not been established, it is determined in the step S405 whether or not the automatic stop mode of the internal combustion engine 101 is starting. In the case where in the step S405, it is determined that the automatic stop mode of the internal combustion engine 101 is starting, in the step S406, the last value of the count C_IS of automatic stop/automatic start events gains "1" and then is stored in the count C_IS of automatic stop/automatic start events, and in the step S407, "0" is stored in the elapsed time T_IS_OF after the internal combustion engine automatically starts so as to reset T_IS_OF; then, the step S407 is followed by the step S408. In contrast, in the case where it is not determined in the step S405 that the automatic stop mode of the internal combustion engine 101 is starting, the step S405 is followed by the step S408. The timing when the automatic stop mode of the internal combustion engine is starting means the timing when transition from the first control period 301 to the second control period 302 is made in FIGS. 3A and 3B.

Next, in the case where in the step S408, the count C_IS of automatic stop/automatic start events is smaller than "1", i.e., in the case where after keying-on, the automatic stop mode of the internal combustion engine 101 has not been implemented at all, the first target applied effective voltage V_T1 is stored in the target heater applied effective voltage V_T in the step S409. In contrast, in the case where in the step S408, the count C_IS of automatic stop/automatic start events is the same as or larger than "1", i.e., in the case where after keying-on, the automatic stop mode of the internal combustion engine 101 has been implemented at least once, the step S408 is followed by the step S410.

Next, in the case where it is determined in the step S410 that the internal combustion engine 101 is in the automatic stop mode, in the step S411, the last value of the elapsed time T_IS_ON from the start of the automatic stop mode gains the calculation processing cycle and is stored in the elapsed time T_IS_ON; then, the step S410 is followed by the step S412.

Next, in the case where in the step S412, the elapsed time T_IS_ON from the start of the automatic stop mode is smaller than the second control period end duration T1 explained in the foregoing paragraph, the second target applied effective voltage V_T2 is stored in the target heater applied effective voltage V_T in the step S413. In contrast, in the case where in the step S412, the elapsed time T_IS_ON from the start of the automatic stop mode is the same as or larger than the second control period end duration T1, the third target applied effective voltage V_T3 is stored in the target heater applied effective voltage V_T in the step S414.

In the case where it is not determined in the step S410 that the internal combustion engine 101 is in the automatic stop mode, the step S410 is followed by the step S415; in the case where it is determined in the step S415 that the internal combustion engine is automatically starting, "0" is stored in the elapsed time T_IS_ON from the start of the automatic stop mode in the step S416 so as to reset T_IS_ON; then, the step S416 is followed by the step S417. In contrast, in the case where it is not determined in the step S415 that the internal combustion engine is automatically starting, the step S415 is followed by the step S417. In the step S417, the last value of the elapsed time T_IS_OF after the internal combustion engine automatically starts gains the calculation processing cycle and is stored in T_IS_OF; then, the step S417 is followed by the step S418. The timing when the internal combustion engine automatically starts means the timing when transition from the third control period 303 to the fourth control period 304 is made in FIGS. 3A and 3B.

Next, in the case where in the step S418, the elapsed time T_IS_OF after the internal combustion engine automatically starts is shorter than the fourth control period end duration T2 explained in the foregoing paragraph, the fourth target applied effective voltage V_T4 is stored in the target heater applied effective voltage V_T for the heater 202 in the step S419. In contrast, in the case where in the step S418, the elapsed time T_IS_OF after the internal combustion engine automatically starts is the same as or longer than the fourth control period end duration T2, the first target applied effective voltage V_T1 is stored in the target heater applied effective voltage V_T in the step S420.

Next, in the step S421, the applied effective voltage for the heater 202 is controlled so as to be the target heater applied effective voltage V_T; then, the processing represented in FIGS. 4A and 4B is ended.

Here, with reference to FIGS. 5A and 5B, there will be explained, while being compared with a conventional technology, the effect of reducing the amount of heater power consumption, according to Embodiment 1, in a period from a time point when the internal combustion engine is in the automatic stop mode to a time point when the internal combustion engine has automatically started.

At first, for example, as a curve 506 represented in FIG. 5B(F), the conventional technology disclosed in Patent Document is to maintain the temperature of the sensor element of an exhaust gas sensor at the sensor element target temperature 308 even when the internal combustion engine is in the automatic stop mode (referred to as the conventional technology 1, hereinafter). In the case of the conventional technology 1, the amount of heater power consumption in a period from a time point when the internal combustion engine is in the automatic stop mode to a time point when the internal combustion engine has automatically started is given by the equation (1) below, as can be seen from FIG. 5B(G).

$$\text{power consumption A} + \text{power consumption B} + \text{power consumption C} + \text{power consumption D} \quad (1)$$

From FIG. 5B(G), it can be seen that although the amount of power consumption (power consumption B+power consumption C+power consumption D) at a time when the internal combustion engine is in the automatic stop mode is not reduced, there is caused no increase in the amount of heater power consumption for raising the temperature of the sensor element of the exhaust gas sensor after the internal combustion engine has automatically started. Because the sensor element temperature of the exhaust gas sensor is always maintained at the sensor element target temperature 308 at a time when the internal combustion engine is being operated, the exhaust gas sensor can detect the air-fuel ratio immediately after the internal combustion engine automatically starts; therefore, it does not happen that the start of the air-fuel ratio feedback control is suspended until the sensor element temperature of the exhaust gas sensor becomes equal to the sensor element target temperature 308 at a time when the internal combustion engine is being operated.

For example, as a curve 503 represented in FIG. 5A(E), each of the conventional technologies disclosed in Patent Documents 3 and 4 is to always apply, while the internal combustion engine is in the automatic stop mod, a target applied effective voltage for maintain the sensor element temperature of the exhaust gas sensor at the sensor element target temperature 310, at a time when the internal combustion engine is in the automatic stop mode, that is lower than the sensor element target temperature 308 at a time when the internal combustion engine is being operated (hereinafter, referred to as the conventional technology 2). In the case of the conventional technology 2, the amount of heater power consumption in a period from a time point when the internal combustion engine is in the automatic stop mode to a time point when the internal combustion engine has automatically started is given by the equation (2) below, as can be seen from FIG. 5B(G).

$$\text{power consumption A+power consumption C+power consumption D+power consumption E} \quad (2)$$

From FIG. 5B(G), because power consumption B>power consumption E, it can be seen that the amount of heater power consumption in a period from a time point when the internal combustion engine is in the automatic stop mode to a time point when the internal combustion engine has automatically started is reduced in comparison with the technology 1. Because while the internal combustion engine is in the automatic stop mode, the sensor element temperature of the exhaust gas sensor is maintained at the sensor element target temperature 310 at a time when the internal combustion engine is in the automatic stop mode, the timing when after the internal combustion engine has automatically started, the sensor element temperature of the exhaust gas sensor reaches the sensor element target temperature 308 at a time when the internal combustion engine is being operated is not behind the timing when after the internal combustion engine has automatically started, the air-fuel ratio feedback control is started.

For example, as a curve 504 represented in FIG. 5A(E), the conventional technology disclosed in Patent Document 1 is to always maintain the applied effective voltage for the heater of an exhaust gas sensor at 0 V when the internal combustion engine is in the automatic stop mode (referred to as the conventional technology 3, hereinafter). In the case of the conventional technology 3, the amount of heater power consumption in a period from a time point when the internal combustion engine is in the automatic stop mode to a time point when the internal combustion engine has automatically started is given by the equation (3) below, as can be seen from FIG. 5B(G).

$$\text{power consumption A+power consumption E+power consumption F} \quad (3)$$

From FIG. 5B(G), it can be seen that the conventional technology 3 can reduce the amount of power consumption, in comparison with the conventional technology 1 or the conventional technology 2. However, as represented in FIG. 5B(F), the timing when the sensor element temperature of the exhaust gas sensor reaches the sensor element target temperature 308 at a time when the internal combustion engine is being operated is delayed in comparison with the conventional technology 2; thus, because when the automatic stop mode continues for a long time, the sensor element temperature 508 further lowers, the timing when the sensor element temperature of the exhaust gas sensor reaches the sensor element target temperature 308 at a time when the internal combustion engine is being operated is also further delayed, whereby the exhaust gas sensor may not be activated by the time the air-fuel ratio feedback control is started.

In the conventional technologies 1 through 3, the temperature of the sensor element is maintained at a specific target sensor element temperature while the internal combustion engine is in the automatic stop mode, or the target heater applied effective voltage is maintained at a specific applied effective voltage; however, in the method according to Embodiment 1 of the present invention, the target heater applied effective voltage at a time when the internal combustion engine is being operated is changed, as a curve 501 represented in FIG. 5A(E), after the second control period end duration T1 has elapsed. In other words, the target applied effective voltage for the heater at a time when the internal combustion engine is in the automatic stop mode can be set in two steps.

In Embodiment 1, the amount of heater power consumption in a period from a time point when the internal combustion engine is in the automatic stop mode to a time point when the internal combustion engine has automatically started is given by the equation (4) below, as can be seen from FIG. 5B(G).

$$\text{power consumption A+power consumption D+power consumption E} \quad (4)$$

From the equation (4), in comparison with the conventional technology 1, because of the relationship "power consumption B+power consumption C>power consumption E", Embodiment 1 can reduce the amount of heater power consumption in a period from a time point when the internal combustion engine is in the automatic stop mode to a time point when the internal combustion engine has automatically started, by the amount obtained by subtracting the equation (4) from the equation (1) i.e., by power consumption B+power consumption C−power consumption E.

In comparison with the conventional technology 2, Embodiment 1 can reduce the amount of heater power consumption in a period from a time point when the internal combustion engine is in the automatic stop mode to a time point when the internal combustion engine has automatically started, by the amount obtained by subtracting the equation (4) from the equation (2) i.e., by power consumption C.

In comparison with the conventional technology 3, because of the relationship "power consumption D>power consumption F", Embodiment 1 increases the amount of heater power consumption in a period from a time point when the internal combustion engine is in the automatic stop mode to a time point when the internal combustion engine has automatically started, by the amount obtained by subtracting the equation (3) from the equation (4) i.e., by power consumption D–power consumption F. However, as explained in the foregoing paragraphs, the conventional technology 3 has a problem that because when the automatic stop mode continues for a long time, the sensor element temperature 508 further lowers, the timing when the sensor element temperature of the exhaust gas sensor reaches the sensor element target temperature 308 at a time when the internal combustion engine is being operated is delayed, whereby the exhaust gas sensor may not be activated by the time the air-fuel ratio feedback control is started. However, in Embodiment 1, the exhaust gas sensor can be activated by the time the air-fuel ratio feedback control is started.

As described above, an internal combustion engine control apparatus according to Embodiment 1 of the present invention includes an automatic stop/automatic start device, for an internal combustion engine, that automatically stops the internal combustion engine when a stopping condition for the internal combustion engine is established and automatically starts the internal combustion engine when a starting condition for the internal combustion engine is established; an exhaust gas sensor that is provided in the exhaust path of the internal combustion engine and detects at least one of the air-fuel ratio in an exhaust gas and the tendency of rich/lean based on the theoretical air-fuel ratio of the exhaust gas; a heater that heats the exhaust gas sensor; and a heater control device that controls an applied effective voltage for the heater in such a way that the applied effective voltage becomes equal to a target heater applied effective voltage. The heater control device is configured in such a way as to include a first control period in which the target heater applied effective voltage is set to a first target applied effective voltage with which the temperature of a sensor element of the exhaust gas sensor becomes equal to a sensor element target temperature at a time when the internal combustion engine is being operated; a second control period in which after the automatic stop mode of the internal combustion engine has started, the target heater applied effective voltage is set to a second target applied effective voltage that is lower than the first target applied effective voltage; a second control period end determination means that determines, during the second control period, the end of the second control period; and a third control period in which after determination of the end of the second control period, the target heater applied effective voltage is controlled to a third target applied effective voltage that is higher than the second target applied effective voltage and with which the temperature of a sensor element of the exhaust gas sensor becomes equal to a sensor element target temperature at a time when the internal combustion engine is in the automatic stop mode.

Moreover, the internal combustion engine control apparatus according to Embodiment 1 of the present invention includes a fuel injection amount correction means that corrects the amount of fuel injection into the internal combustion engine, in accordance with a detection value of the exhaust gas sensor. The heater control device includes a fourth control period in which after the internal combustion engine has automatically started, the target heater applied effective voltage is set to a fourth target applied effective voltage, which is the same as or higher than the first target applied effective voltage, until the sensor element temperature becomes equal to the sensor element target temperature at a time when the internal combustion engine is being operated; and the fourth control period is set in such a way that after the internal combustion engine has automatically started, it ends by the time the fuel injection amount correction means starts its operation and in such a way that the sum of the heater power consumption amounts in the second control period, the third control period, and the fourth control period becomes minimum.

Still moreover, the heater control device according to Embodiment 1 of the present invention includes an automatic stop mode elapsed time measurement means that measures an elapsed time from the start of the automatic stop mode of the internal combustion engine; and the second control period end determination means determines that the second control period has ended, when the elapsed time from the start of the automatic stop mode, measured by the automatic stop mode elapsed time measurement means, expands as wide as a second control period end duration.

Furthermore, the second control period end duration is set to a period from a time point when the automatic stop mode of the internal combustion engine starts to a time point when the sensor element temperature of the exhaust gas sensor reaches the sensor element target temperature at a time when the internal combustion engine is in the automatic stop mode.

Accordingly, the internal combustion engine control apparatus according to Embodiment 1 of the present invention can reduce, in comparison with conventional technologies, the amount of heater power consumption in a period from a time point when the internal combustion engine is in the automatic stop mode to a time point when the internal combustion engine has automatically started. In addition, because the exhaust gas sensor can be activated before the air-fuel ratio feedback control is started, the exhaust gas is not deteriorated.

Embodiment 2

Next, there will be explained an exhaust-gas-sensor heater control device in an internal combustion engine control apparatus according to Embodiment 2 of the present invention. In Embodiment 2, in contrast to Embodiment 1, there will be described a correction method in the case where the automatic stop/automatic start of the internal combustion engine 101 continues.

Embodiment 2 differs from Embodiment 1 in the following points. That is to say, FIGS. 6A and 6B configure a flowchart for explaining characteristic control in Embodiment 2; in FIGS. 6A and 6B, the steps S602 through S608 are added and the steps S601, 609, and 5610 are changed, in contrast to FIGS. 4A and 4B of Embodiment 1.

The difference between FIGS. 6A and 6B and FIGS. 4A and 4B will be explained below.

Figure 6A:
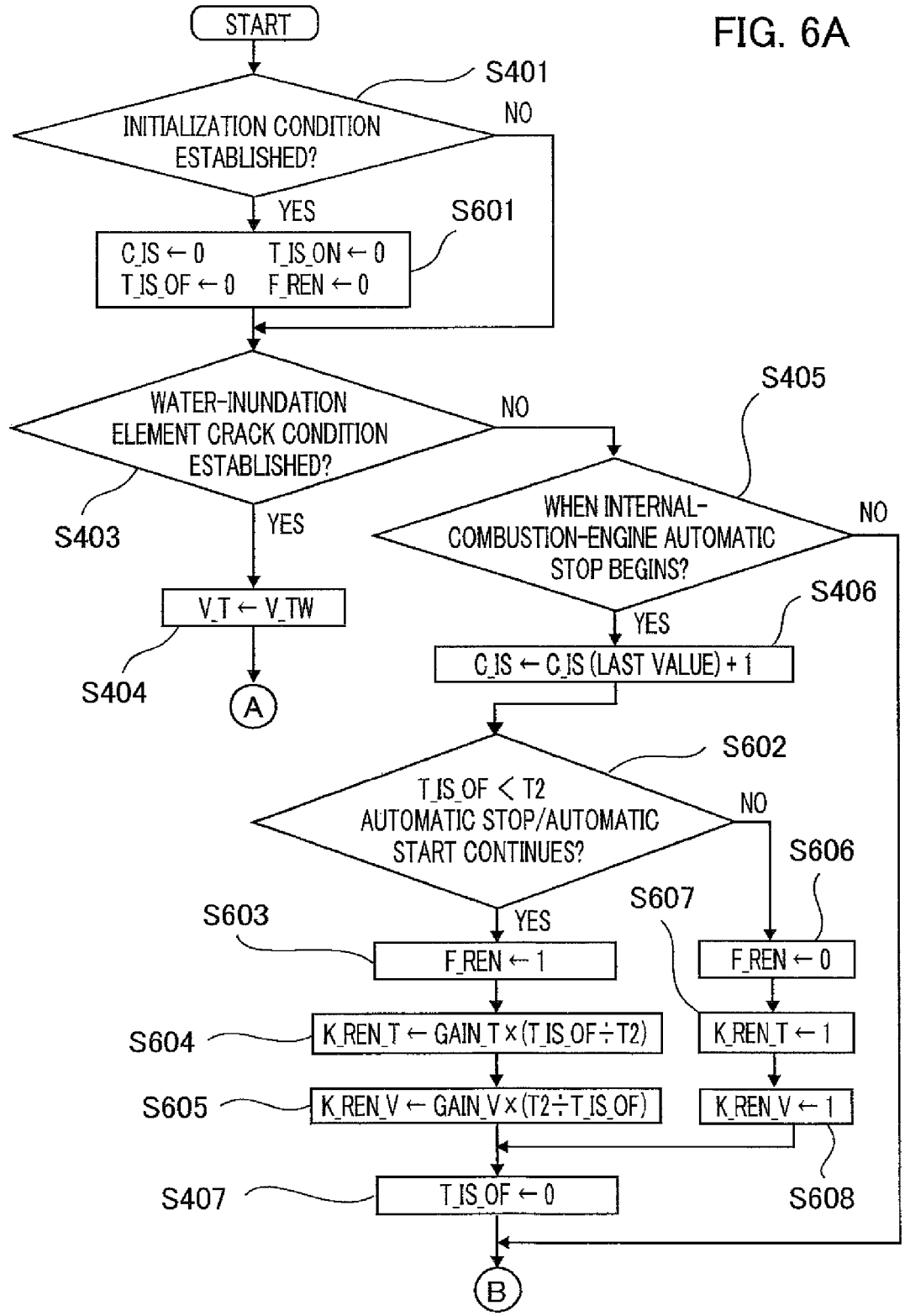

In FIG. 6A, at first, in the step S401, when due to keying-on, an initialization condition for the control apparatus 107 has been established, initialization is performed in the step S601 by storing zeroes in the count C_IS of automatic stop/automatic start events during a period from keying-on to keying-off, the elapsed time T_IS_ON from the start of the automatic stop mode, the elapsed time T_IS_OF after the internal combustion engine automatically starts, and an automatic stop/automatic start continuity flag F_REN that indicates that the automatic stop/automatic start is continuing.

Next, in the case where in the step S403, the water-inundation element crack condition has not been established, it is determined in the step S405 whether or not the automatic stop mode of the internal combustion engine 101 is starting. In the case where in the step S405, it is determined that the automatic stop mode of the internal combustion engine 101 is starting, in the step S406, the last value of the count C_IS of automatic stop/automatic start events gains "1" and then is stored in the count C_IS of automatic stop/automatic start events; then, the step S406 is followed by the step S602.

In the case where in the step S602, it is determined that the automatic stop/automatic start of the internal combustion engine 101 is continuing, i.e., in the case where before the fourth control period after the last automatic start ends, the next automatic stop mode is started (the elapsed time after the internal combustion engine automatically starts is shorter than the fourth control period end duration T2), "1" is stored in the automatic stop/automatic start continuity flag F_REN; then, in the step S604, in accordance with the equation (5) below, there is calculated a correction value K_REN_T for correcting the second control period end duration T1, by which the timing of transition from the second control period 302 to the third control period 303 is determined, in such a way that the shorter is the elapsed time after the internal combustion engine automatically starts, the shorter becomes the second control period end duration T1.

$$K\_REN\_T = GAIN\_T \times (T\_IS\_OF \div T2) \quad (5)$$

Next, in the step S605, in accordance with the equation (6) below, there is calculated a correction K_REN_T for correcting the third target applied effective voltage in such a way that the shorter is the elapsed time after the internal combustion engine automatically starts, the higher becomes the third target applied effective voltage.

$$K\_REN\_V = GAIN\_V \times (T2 \div T\_IS\_OF) \quad (6)$$

In contrast, in the case where it is determined in the step S602 that the automatic stop/automatic start of the internal combustion engine 101 is not continuing, "0" is stored in the automatic stop/automatic start continuity flag F_REN in the step S606; in the step S607, "1" is stored in the correction value K_REN_T; then, in the step S608, "1" is stored in the correction K_REN_T. As a result, the correction to be performed in the case where the automatic stop/automatic start is continuing is nullified.

Next, in the step S407, "0" is stored in the elapsed time T_IS_OF after the internal combustion engine automatically starts, so that the elapsed time T_IS_OF is reset; then, the step S407 is followed by the step S408. In contrast, in the case where it is not determined in the step S405 that the automatic stop mode of the internal combustion engine 101 is starting, the step S405 is followed by the step S408.

In the process from the step S408 to the step S411, the same processing as in FIGS. 4A and 4B is performed; in the case where in the step S609, the elapsed time T_IS_ON from the start of the automatic stop mode is smaller than a value obtained by multiplying the second control period end duration T1 by the correction value K_REN_T, the second target applied effective voltage V_T2 is stored in the target heater applied effective voltage V_T for the heater 202 in the step S413. In contrast, in the case where in the step S609, the elapsed time T_IS_ON from the start of the automatic stop mode is the same as or larger than a value obtained by multiplying the second control period end duration T1 by the correction value K_REN_T, a value obtained by multiplying the third target applied effective voltage V_T3 by the correction K_REN_T is stored in the target heater applied effective voltage V_T in the step S610.

In addition, in and after the step S415, the same processing as in FIGS. 4A and 4B is performed.

Here, with reference to FIGS. 7A/7B through 9A/9B, there will be explained a problem to be solved by Embodiment 2 and the effect of Embodiment 2 in the case where the automatic stop/automatic start of the internal combustion engine 101 continues.

At first, with reference to FIGS. 7A and 7B, there will be explained the problem posed in the case where the correction according to Embodiment 2 is not performed. In FIGS. 7A and 7B, there is represented a state in which each of the elapsed times 701 and 702 after the internal combustion engine automatically starts is shorter than the fourth control period end duration T2, i.e., there is represented a state in which before the fourth control period after the last automatic start of the internal combustion engine 101 ends, the next automatic stop mode is started and the automatic stop/automatic start of the internal combustion engine 101 is continuing. In this situation, in the case where the correction of the second control period end duration T1 or the correction of the third target applied effective voltage according to Embodiment 2 is not performed, the next automatic stop mode of the internal combustion engine 101 is started before during the fourth control period, the sensor element temperature rises up to the sensor element target temperature 308 at a time when the internal combustion engine is being operated, and then in the second control period, heating is stopped; therefore, as a sensor element temperature 704 represented in FIG. 7B(F), the sensor element temperature becomes the same as or lower than the sensor element target temperature 310 at a time when the internal combustion engine is in the automatic stop mode. As a result, because the sensor element temperature 704 cannot reach the sensor element target temperature 308 at a time when the internal combustion engine is being operated, by the timing 703 of starting the air-fuel ratio feedback control after the timing of automatic start 4 in FIGS. 7A and 7B, the start of the air-fuel ratio feedback control is delayed and hence the exhaust gas is deteriorated in the delay duration. Or, in the case where the air-fuel ratio feedback control is performed without changing the timing thereof, an inaccurate detection signal is utilized before the sensor element is sufficiently activated; thus, eventually, the exhaust gas is deteriorated.

Next, with reference to FIGS. 8A and 8B, there will be explained an effect of performing correction in which the second control period end duration T1 is shorten when the automatic stop/automatic start of the internal combustion engine 101 continues within a predetermined period. In other words, in FIGS. 8A and 8B, in the case where each of the elapsed times 701 and 702 after the internal combustion engine automatically starts is shorter than the fourth control period end duration T2, i.e., in the case where it is determined that before the fourth control period after the last automatic start of the internal combustion engine 101 ends, the next automatic stop mode is started and the automatic stop/automatic start of the internal combustion engine 101 is continuing, the shorter the period from the last automatic start to the present automatic stop is, the shorter the second control period end duration T1 is made, so that as represented by curves 801 and 802, the third target applied effective voltage for maintaining the sensor element target temperature 310 at a time when the internal combustion engine is in the automatic stop mode can more early be applied than when no correction is performed; therefore, as the sensor element temperature represented by a curve 803, the sensor element temperature is prevented from becoming lower than the sensor element target temperature 310 at a time when the internal combustion engine is in the automatic stop mode. As a result, the sensor element temperature 803 can reach the sensor element target temperature 308 at a time when the internal combustion engine is being operated, by the timing 703 of starting the air-fuel ratio feedback control after the timing of automatic start 4; thus, the exhaust gas is not deteriorated even in the case where the automatic stop/automatic start of the internal combustion engine 101 is continuing.

Next, with reference to FIGS. 9A and 9B, there will be explained an effect of performing correction in which the third target applied effective voltage is raised when the automatic stop/automatic start of the internal combustion engine 101 continues within a predetermined period. In other words, in FIGS. 9A and 9B, in the case where each of the elapsed times 701 and 702 after the internal combustion engine automatically starts is shorter than the fourth control period end duration T2, i.e., in the case where it is determined that before the fourth control period after the last automatic start of the internal combustion engine 101 ends, the next automatic stop mode is started and the automatic stop/automatic start of the internal combustion engine 101 is continuing, the shorter the period from the last automatic start to the present automatic stop is, the higher the third target applied effective voltage is made, as represented by a curve 901, so that as the sensor element temperature represented by a curve 902, the sensor element temperature can be raised within the third control period. As a result, the sensor element temperature 902 can reach the sensor element target temperature 308 at a time when the internal combustion engine is being operated, by the timing 703 of starting the air-fuel ratio feedback control after the timing of automatic start 4; thus, the exhaust gas is not deteriorated even in the case where the automatic stop/automatic start of the internal combustion engine 101 is continuing.

In FIGS. 8A/8B and 9A/9B of Embodiment 2, there have been separately explained the case where when the automatic stop/automatic start of the internal combustion engine continues, correction of shortening the second control period end duration T1 is performed and the case where the automatic stop/automatic start of the internal combustion engine continues, correction of raising the third target applied effective voltage is performed; however, the correction of shortening the second control period end duration T1 and the correction of raising the third target applied effective voltage may concurrently be performed.

In Embodiment 2, there has been explained that the state where the automatic stop/automatic start continues is the state in which the elapsed time after the internal combustion engine automatically starts is shorter than the fourth control period end duration T2, i.e., the state in which before the fourth control period after the last automatic start of the internal combustion engine ends, the next automatic stop mode is started. The state where the automatic stop/automatic start continues is a state where after the internal combustion engine has started, the automatic stop mode of the internal combustion engine is started again before the exhaust gas sensor is activated; however, the state may be determined through another method, for example, based on whether or not a predetermined number or more of automatic stop/automatic start events occur within a predetermined period (e.g., within 10 minutes).

As described above, in contrast to the invention according to Embodiment 1, an exhaust-gas-sensor heater control device according to Embodiment 2 of the present invention is provided with an automatic stop/automatic start continuity determination means that determines whether or not the automatic stop/automatic start of the internal combustion engine continues; in the case where the automatic stop/automatic start continuity determination means determines that the automatic stop/automatic start is continuing, correction of shortening the second control period end duration is performed.

Moreover, in contrast to the invention according to Embodiment 1, an exhaust-gas-sensor heater control device according to Embodiment 2 of the present invention is provided with an automatic stop/automatic start continuity determination means that determines whether or not the automatic stop/automatic start of the internal combustion engine continues; in the case where the automatic stop/automatic start continuity determination means determines that the automatic stop/automatic start is continuing, correction of raising the third target applied effective voltage is performed.

Still moreover, in Embodiment 2 of the present invention, the state where the automatic stop/automatic start continues is a state where after the internal combustion engine has started, the automatic stop mode of the internal combustion engine is started again before the exhaust gas sensor is activated.

As described above, in comparison with the invention according to Embodiment 1, when the automatic stop/automatic start of the internal combustion engine continues, correction of shortening the second control period end duration is performed or correction of raising the third target applied effective voltage is performed in Embodiment 2 of the present invention; thus, the exhaust gas can be prevented from deteriorating.

Embodiment 3

Next, there will be explained an exhaust-gas-sensor heater control device in an internal combustion engine control apparatus according to Embodiment 3 of the present invention. In contrast to Embodiment 1, in Embodiment 3, there is described a case where the ambient temperature of the exhaust gas sensor is different from a reference temperature, i.e., a case where the ambient temperature of the exhaust gas sensor varies.

Embodiment 3 differs from Embodiment 1 in the following points. That is to say, FIGS. 10A and 10B configure a flowchart for explaining characteristic control in Embodiment 3; in FIGS. 10A and 10B, the steps S1001 through S1005 are added and the step S1006 is changed, in contrast to FIGS. 4A and 4B of Embodiment 1.

Figure 10A:
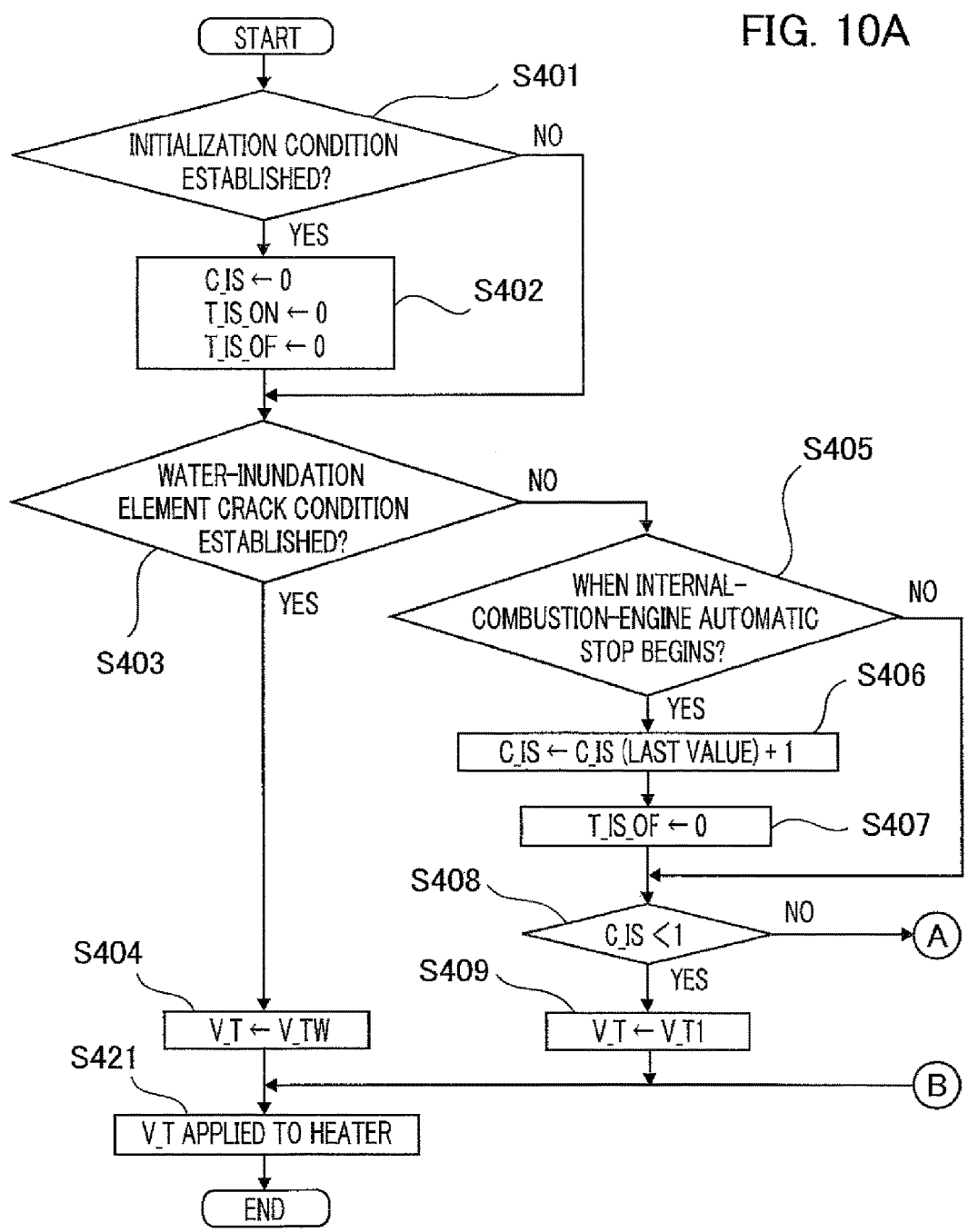
FIGS. 10A and 10B configure a flowchart representing a method of setting a target heater applied effective voltage, in Embodiment 3 of the present invention.

The difference between FIGS. 4A/4B and FIGS. 10A/10B will be explained below.

Figure 10B:
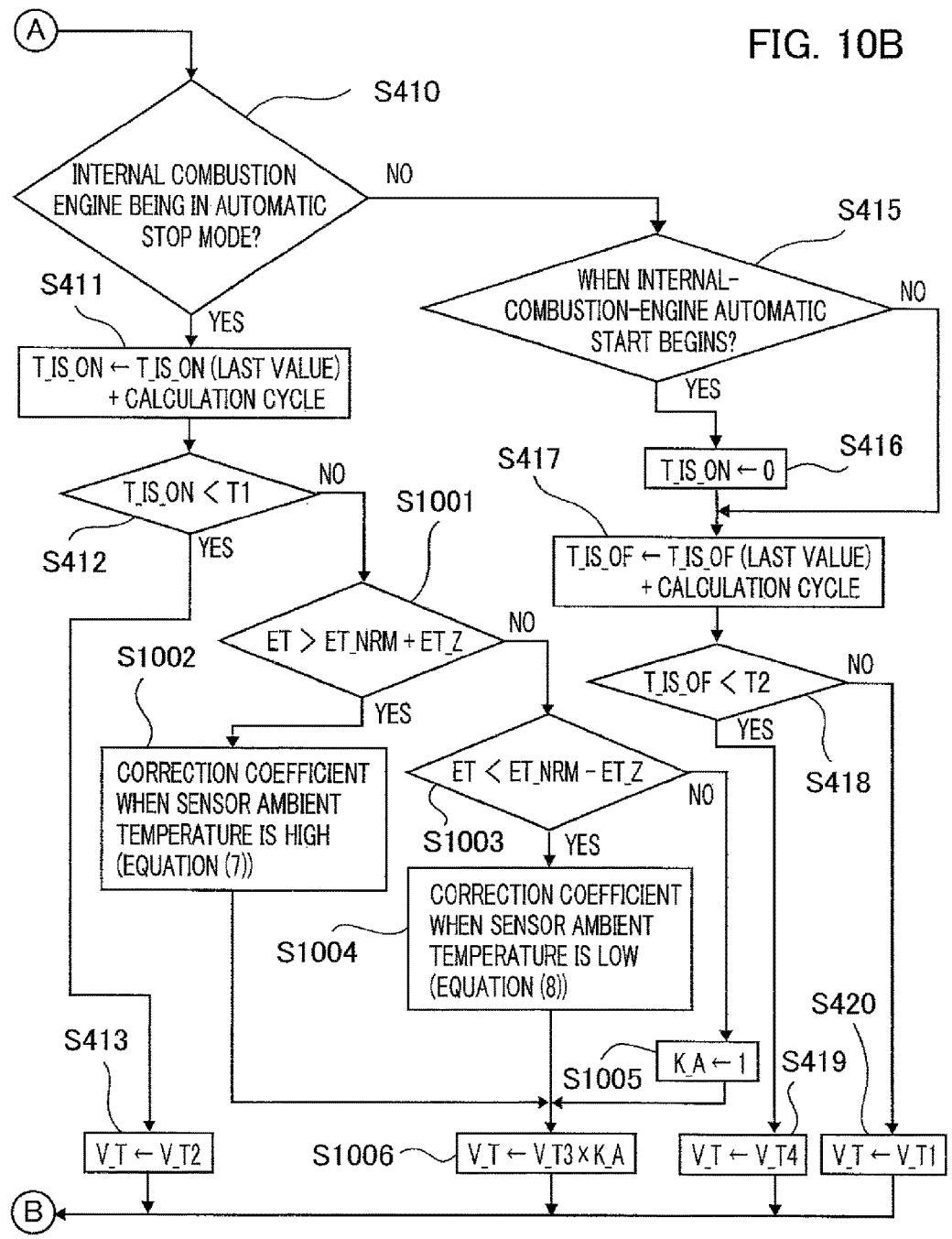

In FIG. 10B, in the case where in the step S412, the elapsed time T_IS_ON from the start of the automatic stop mode is the same as or longer than the second control period end duration T1, i.e., in the case where the present time point is in the third control period, the step 412 is followed by the step S1001, where it is determined whether or not an ambient temperature ET of the exhaust gas sensor is higher than a value obtained by adding an allowable variation amount ET_Z to an reference value ET_NRM for the ambient temperature of the exhaust gas sensor. In the case where it is determined in the step S1001 that the ambient temperature ET of the exhaust gas sensor is higher than the value obtained by adding the allowable variation amount ET_Z to the reference value ET_NRM for the ambient temperature of the exhaust gas sensor, a correction coefficient K_A is calculated in the step S1002, for example, through the equation (7) below, in such a way that the higher the sensor ambient temperature is, the smaller the correction coefficient K_A becomes; then, the step S1002 is followed by the step S1006.

$$K\_A = ET\_G1 \times (1-(ET-(ET\_NRM+ET\_Z))+ET\_NRM) \qquad (7)$$

where ET_G1 is a gain at a time when the ambient temperature ET of the exhaust gas sensor is higher than the reference value ET_NRM.

In contrast, in the case where it is determined in the step S1001 that the ambient temperature ET of the exhaust gas sensor is not higher than the value obtained by adding the allowable variation amount ET_Z to the reference value ET_NRM for the ambient temperature of the exhaust gas sensor, it is determined in the step S1003 whether or not the ambient temperature ET of the exhaust gas sensor is lower than a value obtained by subtracting the allowable variation amount ET_Z from the reference value ET_NRM for the ambient temperature of the exhaust gas sensor. In the case where it is determined in the step S1003 that the ambient temperature ET of the exhaust gas sensor is lower than a value obtained by subtracting the allowable variation amount ET_Z from the reference value ET_NRM for the ambient temperature of the exhaust gas sensor, the correction coefficient K_A is calculated in the step S1004, for example, through the equation (8) below, in such a way that the lower the sensor ambient temperature is, the larger the correction coefficient K_A becomes; then, the step S1004 is followed by the step S1006.

$$K\_A = ET\_G2 \times (1-(ET-(ET\_NRM+ET\_Z))+ET\_NRM) \quad (8)$$

where ET_G2 is a gain at a time when the ambient temperature ET of the exhaust gas sensor is lower than the reference value ET_NRM.

In contrast, in the case where it is determined in the step S1003 that the ambient temperature ET of the exhaust gas sensor is not lower than the value obtained by subtracting the allowable variation amount ET_Z from the reference value ET_NRM for the ambient temperature of the exhaust gas sensor, "1" is stored in the correction coefficient K_A in the step S1005 so that correction at a time when the ambient temperature of the exhaust gas sensor varies is nullified; then, the step S1005 is followed by the step S1006. After the calculation of the correction coefficient K_A is completed, the third target applied effective voltage is multiplied by the correction coefficient K_A in the step S1006.

The ambient temperature ET of the exhaust gas sensor is a factor that has an effect on the rise/fall in the sensor element temperature and is estimated based on one, two or more, or all of the operation state of the internal combustion engine 101 such as the engine rotation speed or the load, the temperature of an exhaust gas exhausted from the internal combustion engine 101, the wall surface temperature of an exhaust pipe in the vicinity of the mounting position of the exhaust gas sensor, the temperature of the catalyst 104, and the temperature of the outer air. For example, in the case where the temperature of an exhaust gas in the vicinity of the exhaust gas sensor is measured by the various kinds of sensors 108, the temperature of the exhaust gas may be utilized as the sensor ambient temperature ET. Moreover, for example, in the case where the temperature of the outer air is measured by the various kinds of sensors 108, the ambient temperature ET of the exhaust gas sensor may be estimated in the following manner: the exhaust gas sensor ambient temperature ET0 at a time when the internal combustion engine is in the automatic stop mode is estimated based on the operation state (such as the engine rotation speed, the engine load, or the like) at a time immediately before the start of the automatic stop mode; the elapsed time T_IS_ON from the start of the automatic stop mode and a temperature fall coefficient corresponding to the temperature of the outer air are preliminarily mapping-set through matching; then, the exhaust gas sensor ambient temperature ET0 at a time when the internal combustion engine is in the automatic stop mode is multiplied by the mapped temperature fall coefficient.

The reference value ET_NRM is a sensor ambient temperature, for example, when the second control period end duration T1 is set through a matching test, as described in the foregoing paragraph; the reference value ET_NRM is a reference value at a time before the sensor ambient temperature varies due to the effect of the temperature of an exhaust gas exhausted from the internal combustion engine 101, the wall surface temperature of an exhaust pipe in the vicinity of the mounting position of the exhaust gas sensor, the temperature of the catalyst 104, the temperature of the outer air, or the like.

The allowable variation amount ET_Z is an amount that has a small effect on the sensor element temperature and hence is allowable even when the sensor ambient temperature ET is different from the reference value ET_NRM; the allowable variation amount ET_Z is an amount that is defined by the difference from the reference value and is preliminarily set through matching or the like.

Embodiment 3 is configured in such a way that the correction value K_A is calculated by utilizing the latest ambient temperature of the exhaust gas sensor for each calculation; however, the correction value K_A may be calculated by storing, in the RAM of the control apparatus 107, the ambient temperature ET of the exhaust gas sensor at a time when transition from the second control period 302 to the third control period 303 is made and utilizing it until the third control period 303 ends. Alternatively, the correction value K_A may be calculated by storing, in the RAM of the control apparatus 107, the ambient temperature ET of the exhaust gas sensor at a time when transition from the first control period 301 to the second control period 302 is made, i.e., the ambient temperature ET of the exhaust gas sensor at a time when the automatic stop mode of the internal combustion engine 101 is started and utilizing it during the third control period 303.

Embodiment 3 is configured in such a way that in the step S1006, the third target applied effective voltage is multiplied by the correction coefficient K_A in accordance with the difference between the sensor ambient temperature ET and the reference value ET_NRM±allowable variation amount ET_Z; however, even when the correction coefficient is added to or subtracted from the third target applied effective voltage in accordance with the difference between the sensor ambient temperature ET and the reference value ET_NRM±allowable variation amount ET_Z, the same effect can be demonstrated.

Here, with reference to FIGS. 11A/11B through 12A/12B, there will be explained a problem to be solved by Embodiment 3 and the effect of Embodiment 3 in the case where the ambient temperature of the exhaust gas sensor is different from the reference temperature, i.e., in the case where the ambient temperature of the exhaust gas sensor varies.

At first, with reference to FIGS. 11A and 11B, there will be explained the problem posed in the case where the correction according to Embodiment 3 is not performed, i.e., in the case where there is not performed correction in which the lower the sensor ambient temperature is, the higher the third target applied effective voltage is made, and the higher the sensor ambient temperature is, the lower the third target applied effective voltage is made. In FIG. 11B(G), the sensor ambient temperature at a time immediately before the second control period 302, i.e., at a time immediately before the automatic stop mode of the internal combustion engine 101 is started depends on the operation state at a time immediately before the automatic stop mode, the temperature of an exhaust gas exhausted from the internal combustion engine 101, the wall surface temperature of an exhaust pipe in the vicinity of the mounting position of the exhaust gas sensor, the temperature of the catalyst 104, the temperature of the outer air, and the like; for example, in the case where immediately before the automatic stop mode, the vehicle is being idled and the temperature of the outer air is low, because of the low exhaust gas temperature, the automatic stop mode is started when the sensor ambient temperature is also low, and the sensor and its vicinity are cooled from the outside by the low outer air temperature through the exhaust pipe and the like; thus, the sensor ambient temperature becomes lower than a behavior 1101, which is a reference, of the reference value, as represented by a curve 1102. In contrast, for example, in the case where immediately before the automatic stop mode, the internal combustion engine has been being operated with a large load in such a manner that the exhaust gas temperature becomes high, because of the high exhaust gas temperature, the automatic stop mode is started when the sensor ambient temperature is also high; thus, the sensor ambient temperature becomes higher than the behavior 1101, which is a reference, of the reference value, as represented by a curve 1103.

In this situation, in the case where correction according to Embodiment 3 is not performed, the sensor element temperature is affected by the sensor ambient temperature; thus, as represented in FIG. 11B(F), in the case where as the curve 1102, the sensor ambient temperature is low, the sensor element temperature becomes low, as represented by a curve 1105, and in the case where as the curve 1103, the sensor ambient temperature is high, the sensor element temperature becomes high, as represented by a curve 1105. The foregoing effect of the sensor ambient temperature poses a problem in the fourth control period 304 after the internal combustion engine has automatically started. In other words, the heat-up speed of the sensor element varies depending on the sensor ambient temperature; in particular, in the case where as represented by the curve 1102, the sensor ambient temperature is low, the heat-up speed of the sensor element temperature becomes low; thus, the temperature of the sensor element of the exhaust gas sensor may not reach the sensor element target temperature 308 at a time when the internal combustion engine is being operated, by the time the air-fuel ratio feedback control is started.

Next, with reference to FIGS. 12A and 12B, there will be explained the effect in the case where the correction according to Embodiment 3 is performed. At first, in the case where as represented by the curve 1102, the sensor ambient temperature is lower than the reference sensor ambient temperature 1101, the target applied effective voltage for the heater is set, as a curve 1202 in FIG. 2A(E), to be higher than a reference target applied effective voltage 1201, in accordance with the difference between the sensor ambient temperature ET and the reference value ET_NRM−allowable variation amount ET_Z. Accordingly, in the case where as a curve 1204 in FIG. 12B(F), the sensor element temperature during the third control period becomes higher than a reference sensor element temperature 1104 with which the temperature of the sensor element is maintained at the sensor element target temperature 310 when the internal combustion engine is in the automatic stop mode; therefore, the sensor element temperature 1204 during the fourth control period becomes close to the behavior of the reference sensor element temperature 1104 during the fourth control period. Therefore, the sensor element temperature can reach the sensor element target temperature 308 at a time when the internal combustion engine is being operated, by the time the air-fuel ratio feedback control is started.

Figure 12A:
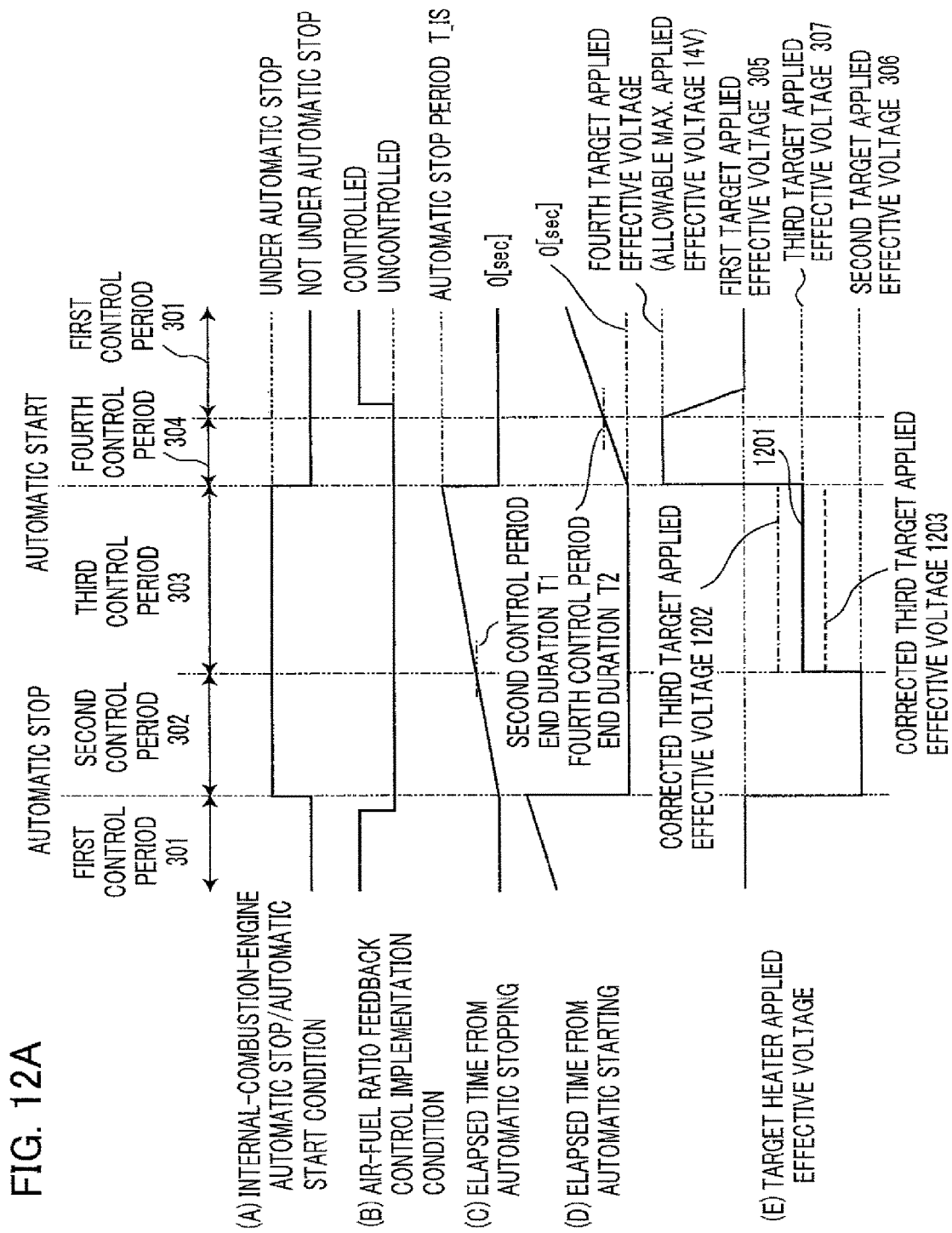
FIGS. 12A and 12B configure a timing chart for explaining the effect demonstrated by performing correction in which the target heater applied effective voltage is made higher as a sensor ambient temperature is lower, and the target heater applied effective voltage is made lower as the sensor ambient temperature is higher, in Embodiment 3 of the present invention.
Figure 12B:
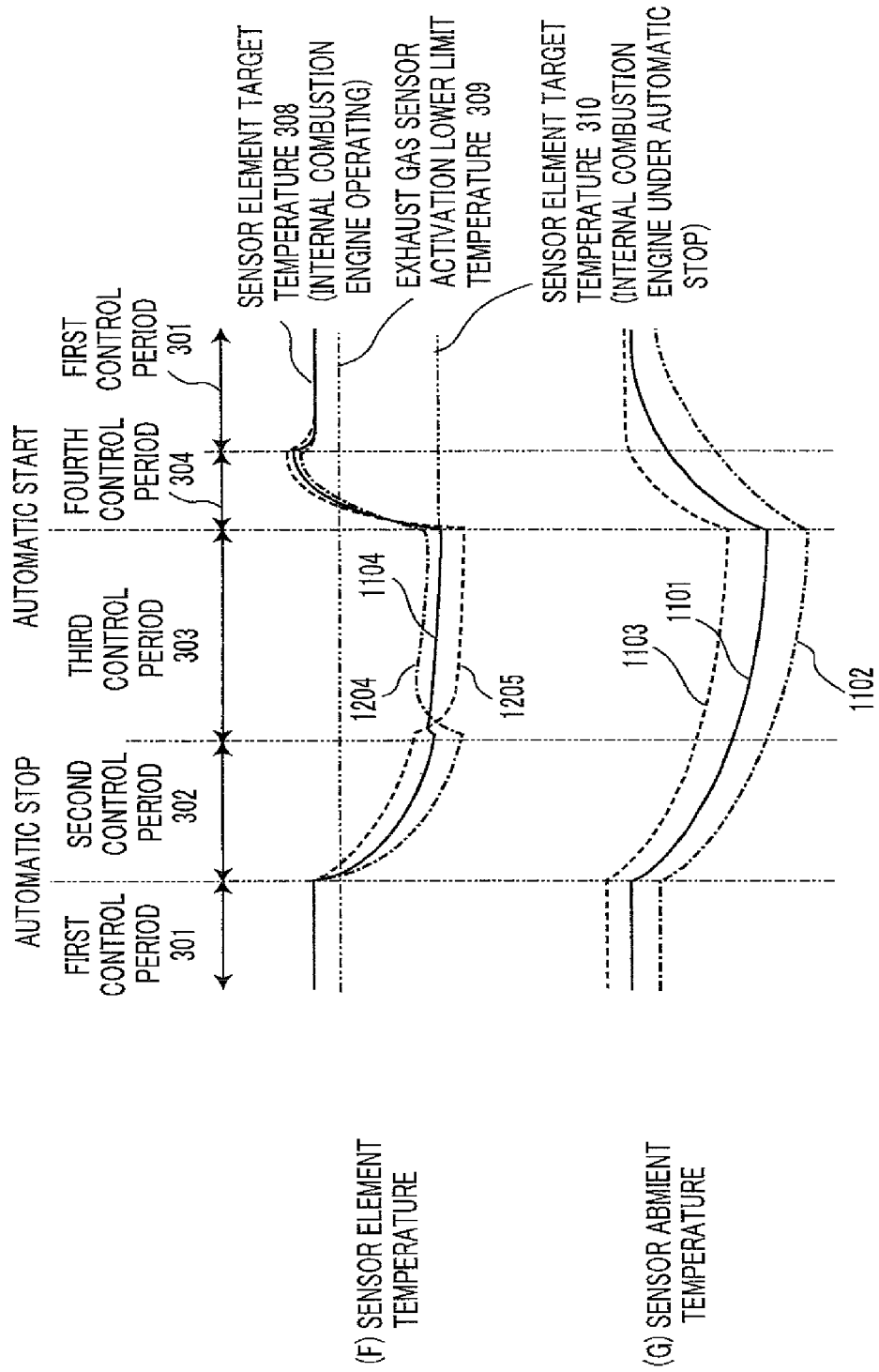

Next, in the case where as represented by the curve 1103, the sensor ambient temperature is higher than the reference sensor ambient temperature 1101, the target applied effective voltage for the heater is set, as a curve 1203 in FIG. 12A(E), to be lower than the reference target applied effective voltage 1201, in accordance with the difference between the sensor ambient temperature ET and the reference value ET_NRM+allowable variation amount ET_Z. Accordingly, as a curve 1205 in FIG. 12B(F), the sensor element temperature during the third control period becomes lower than a reference sensor element temperature 1104 with which the temperature of the sensor element is maintained at the sensor element target temperature 310 when the internal combustion engine is in the automatic stop mode; therefore, the sensor element temperature 1205 during the fourth control period becomes close to the behavior of the reference sensor element temperature 1104 during the fourth control period. Accordingly, there can be demonstrated an effect that the amount of power consumption is reduced by lowering the third target applied effective voltage in the third control period, and the sensor element temperature can reach the sensor element target temperature 308 at a time when the internal combustion engine is being operated, by the time the air-fuel ratio feedback control is started.

As described above, in contrast to the invention according to Embodiment 1, an exhaust-gas-sensor heater control device according to Embodiment 3 of the present invention is provided with a sensor ambient temperature estimation means that estimates the ambient temperature of the exhaust gas sensor; the third target applied effective voltage is corrected in accordance with a sensor ambient temperature estimated by the sensor ambient temperature estimation means.

By configuring, as Embodiment 3, the exhaust-gas-sensor heater control device, in contrast to the invention according to Embodiment 1, in the case where the ambient temperature of the exhaust gas sensor is different from a reference temperature, i.e., in the case where the ambient temperature of the exhaust gas sensor varies, there is performed correction in which the lower than the reference value the sensor ambient temperature is, the higher the third target applied effective voltage is made, and the higher than the reference value the sensor ambient temperature is, the lower the third target applied effective voltage is made. As a result, in the case where the sensor ambient temperature is lower than the reference value, the exhaust gas sensor can be activated before the air-fuel ratio feedback control is started, whereby the exhaust gas is prevented from being deteriorated; in the case where the sensor ambient temperature is higher than the reference value, the exhaust gas sensor can be activated before the air-fuel ratio feedback control is started, whereby the exhaust gas is prevented from being deteriorated, and in addition to that, the amount of heater power consumption can be reduced during the third control period.

Embodiment 4

Next, there will be explained an exhaust-gas-sensor heater control device according to Embodiment 4 of the present invention. In Embodiment 4, there will be described a method of further reducing the amount of power consumption in comparison with Embodiment 1.

Embodiment 4 differs from Embodiment 1 in the following points. That is to say, FIGS. 13A and 13B configure a flowchart for explaining characteristic control in Embodiment 4; in FIGS. 13A and 13B, the step S1301 is added and the step S1302 is changed, in contrast to FIGS. 4A and 4B of Embodiment 1.

Figure 13A:
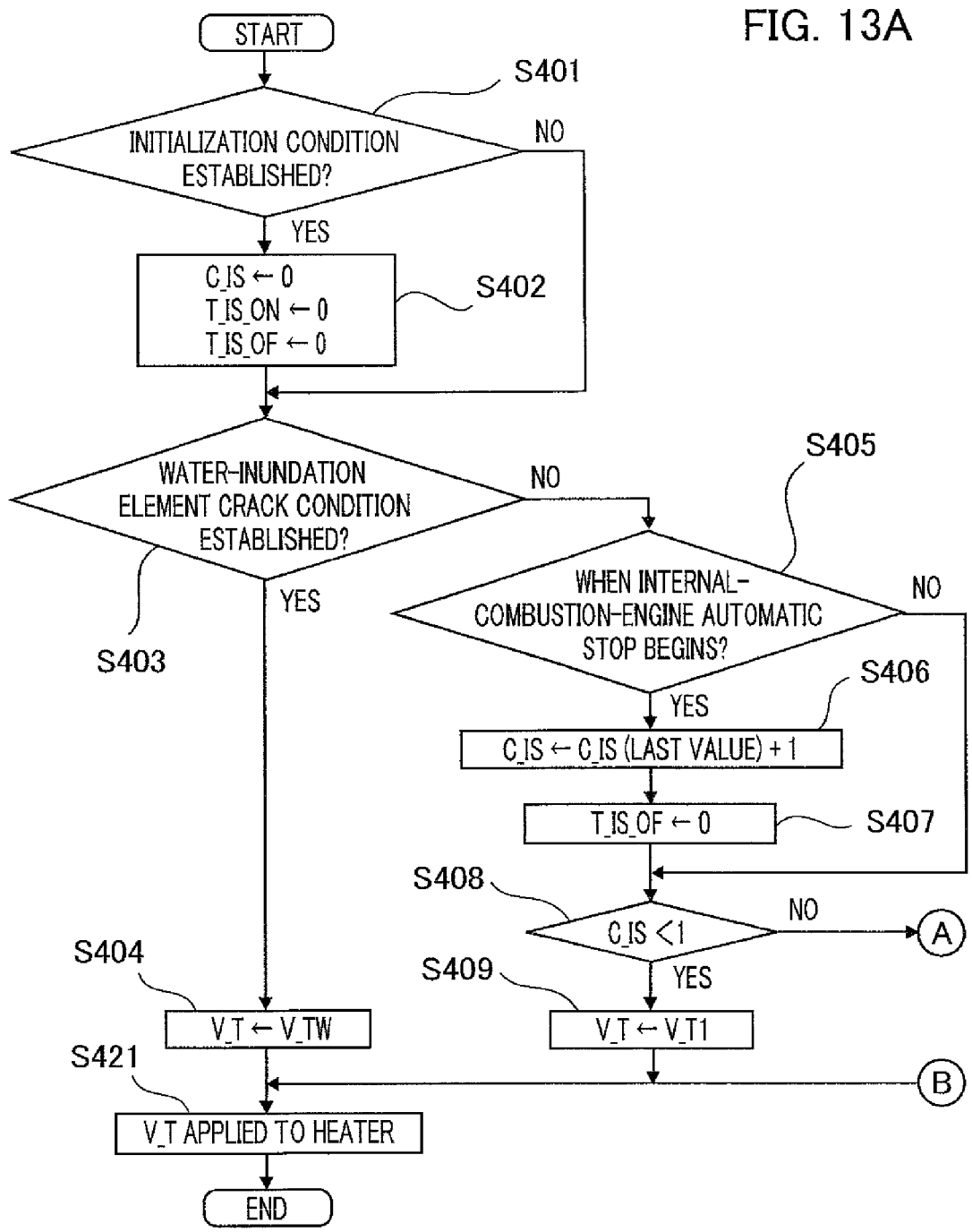
FIGS. 13A and 13B configure a flowchart representing a method of setting a target heater applied effective voltage, in Embodiment 4 of the present invention.

The difference between FIGS. 4A/4B and FIGS. 13A/13B will be explained below.

Figure 13B:
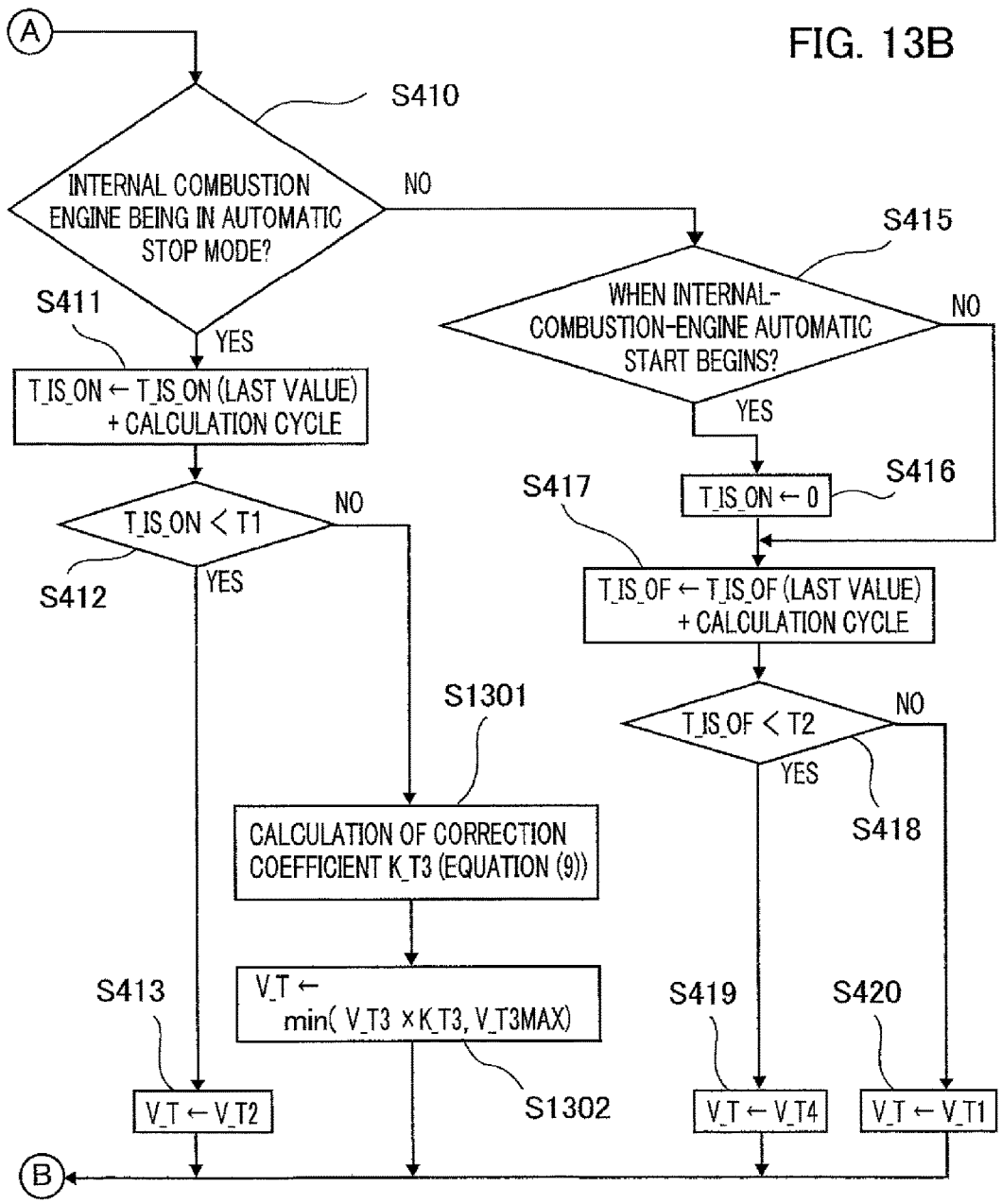

In FIG. 13B, in the case where in the step S412, the elapsed time T_IS_ON from the start of the automatic stop mode is the same as or longer than the second control period end duration T1, i.e., in the case where the present time point is in the third control period, the step 412 is followed by the step S1301, where there is calculated a correction coefficient K_T3 that is given by the equation (9) below and becomes larger as the elapsed time from the start of the automatic stop mode becomes longer; then the step S1301 is followed by the step S1302.

$$K\_T3 = IST\_G \times (T\_IS\_ON - T1) \div (T\_IS\_ON\_MAX - T1) + IST\_OFST \quad (9)$$

In the step S1302, a value obtained by multiplying the third target applied effective voltage V_T3 by the correction coefficient K_T3 is compared with an upper limit value V_T3MAX of the third target applied effective voltage; then, the smaller one is stored in the target heater applied effective voltage V_T.

A maximum automatic stop period T_IS_ON_MAX is a maximum period, of the automatic stop period, that is preliminarily set, for example, in order that before while an internal combustion engine is in the automatic stop mode, power consumption by an electric load and the like lowers the charging voltage across the battery and hence the internal combustion engine becomes not capable of automatically starting, i.e., before the battery runs out of charge, the internal combustion engine is made to automatically start so that the battery is charged by an electric power generator driven by the internal combustion engine; when the automatic stop mode continues for the maximum period or longer, the internal combustion engine automatically start even when the driver' intention of starting the vehicle is not expressed.

A gain IST_G, for example, makes an adjustment on how much the third target applied effective voltage V_T3 is corrected for an elapsed time from the start of the automatic stop mode.

An offset amount IST_OFST is set to be, for example, between 0 and 1, and there is performed an adjustment on how much the third target applied effective voltage V_T3 is offset.

The upper limit value V_T3MAX of the third target applied effective voltage is set to be, for example, a value the same as or lower than a target applied effective voltage with which while the internal combustion engine is in the automatic stop mode, heating by the heater maintains the sensor element temperature at the sensor element target temperature 308 at a time when the internal combustion engine is being operated.

In addition, the value obtained by multiplying the third target applied effective voltage V_T3 by the correction coefficient K_T3 is compared with the upper limit value V_T3MAX of the third target applied effective voltage, and then the smaller one is stored in the target heater applied effective voltage V_T, so that an upper limit is provided; however, there may be allowed a method in which instead of performing comparison with the upper limit value V_T3MAX and selecting the smaller one, limitation is made by the target heater applied effective voltage V_T (=V_T3× K_T3) at a time when a predetermined time has elapsed from the beginning of the third control period.

Here, with reference to a timing chart in FIGS. 14A and 14B, the problem to be solved by Embodiment 4 and the effect of Embodiment 4 will be explained.

At first, there will be explained the problem posed in the case where the correction according to Embodiment 4 is not performed. In the case of an automatic stop/automatic start device that automatically starts an internal combustion engine when after the start of the automatic stop mode of the internal combustion engine, the driver' intention of starting the vehicle is expressed (e.g., stepping on the accelerator pedal or the clutch pedal, release of the brake pedal, or the like), the control apparatus 107 does not preliminarily know when the automatic stop mode is cancelled and the internal combustion engine automatically starts. Accordingly, in Embodiment 1, the third target applied effective voltage is set, as a fixed value, in such a manner as described in the foregoing paragraph, so that even when the internal combustion engine automatically starts at an arbitrary timing, the sensor element temperature can reach the sensor element target temperature 308 at a time when the internal combustion engine is being operated, by the time the air-fuel ratio feedback control is started. However, as represented by a sensor ambient temperature 1401 in FIG. 14B(G), the sensor ambient temperature in the former part of the third control period is higher than that in the latter part thereof. Therefore, in the case where the internal combustion engine automatically starts in the former part of the third control period, there is shortened the period in which after the internal combustion engine automatically starts, the temperature of the sensor element of the exhaust gas sensor reaches the sensor element target temperature 308 at a time when the internal combustion engine is being operated, in comparison with a case where the internal combustion engine automatically starts in the latter part of the third control period. Therefore, by performing correction of making the third target applied effective voltage during the former part of the third control period lower than the third target applied effective voltage during the latter part of the third control period, the amount of power consumption can further be reduced.

Next, there will be explained the effect in the case where the correction according to Embodiment 4 is performed. That is to say, as represented by a curve 1402 in FIG. 14A(E), there is performed correction in which the target applied effective voltage during the former part of the third control period is made lower than that during the latter part of the third control period, so that as represented by a curve 1404 in FIG. 14B(H), the amount of power consumption in the former part thereof can be reduced; thus, when the internal combustion engine automatically starts in the former part of the third control period, the amount of power consumption can be reduced, in comparison with Embodiment 1.

Figure 14B:
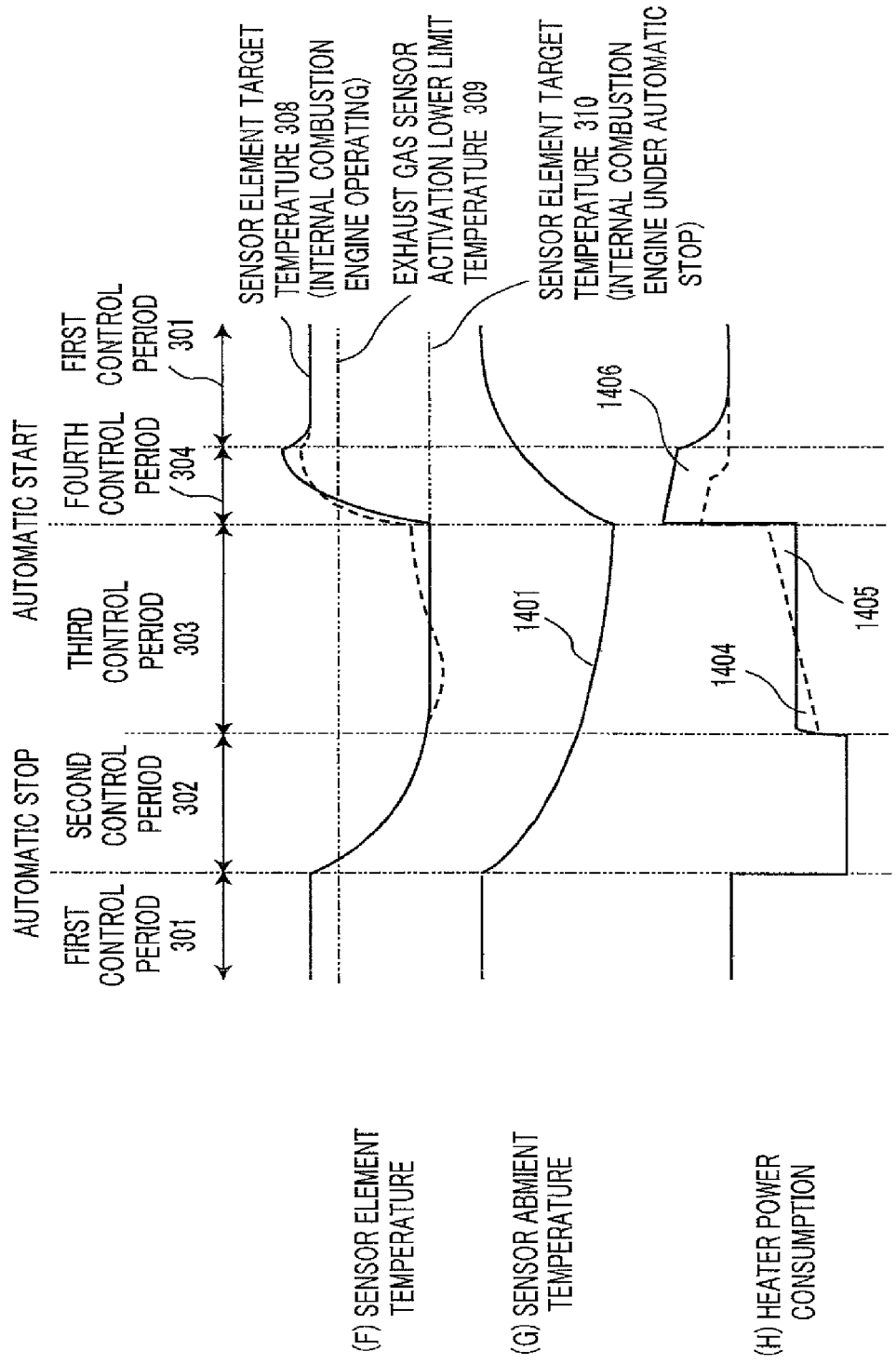

As represented by the curve 1402 in FIG. 14A(E), there is performed correction in which the target applied effective voltage during the latter part of the third control period is made higher than the third target applied effective voltage 307, so that as represented by a curve 1403 in FIG. 14A(E), the target applied effective voltage for raising the sensor element temperature during the fourth control period can be lowered; therefore, the amount of power consumption can be reduced, as represented by a curve 1406 in FIG. 14B(H).

In this situation, there exists an increase in the amount of power consumption represented by a curve 1405 in FIG. 14B(H); however, the gain IST_G and the offset amount IST_OFST in the equation (9) are preliminarily set in such a way that the difference between the respective amounts of power consumption represented by the curves 1405 and 1406 becomes small.

In other words, as the elapsed time from the start of the automatic stop mode becomes longer with respect to the maximum automatic stop period T_IS_ON_MAX, i.e., as the elapsed time from the start of the automatic stop mode becomes closer to the maximum automatic stop period T_IS_ON_MAX, the probability of the automatic starting becomes higher; thus, by preliminarily raising the residual-heat temperature at a time when the internal combustion engine is in the automatic stop mode, the power consumption for raising the temperature at a time after the automatic starting can be suppressed.

As described above, in contrast to the invention according to Embodiment 1, an exhaust-gas-sensor heater control device according to Embodiment 4 of the present invention is configured in such a way that the third target applied effective voltage is corrected to become higher as the elapsed time from the start of the automatic stop mode, measured by the automatic stop mode elapsed time measurement means, becomes longer.

Therefore, in contrast to the invention according to Embodiment 1, by configuring an exhaust-gas-sensor heater control device according to Embodiment 4, i.e., by performing correction in which the third target applied effective voltage is made higher as the elapsed time from the start of the automatic stop mode, measured by the automatic stop mode elapsed time measurement means, is longer, the amount of power consumption can further be reduced in comparison with Embodiment 1.

Embodiment 5

Next, there will be explained an exhaust-gas-sensor heater control device according to Embodiment 5 of the present invention. In Embodiment 5, there will be described a method of further reducing the amount of power consumption in comparison with Embodiment 1.

Embodiment 5 differs from Embodiment 1 in the following points. That is to say, FIGS. 15A and 15B configure a flowchart for explaining characteristic control in Embodiment 5; in FIGS. 15A and 15B, the steps S1501 through S1506 are added and the steps S1507 and S1508 are changed, in contrast to FIGS. 4A and 4B of Embodiment 1.

Figure 15A:
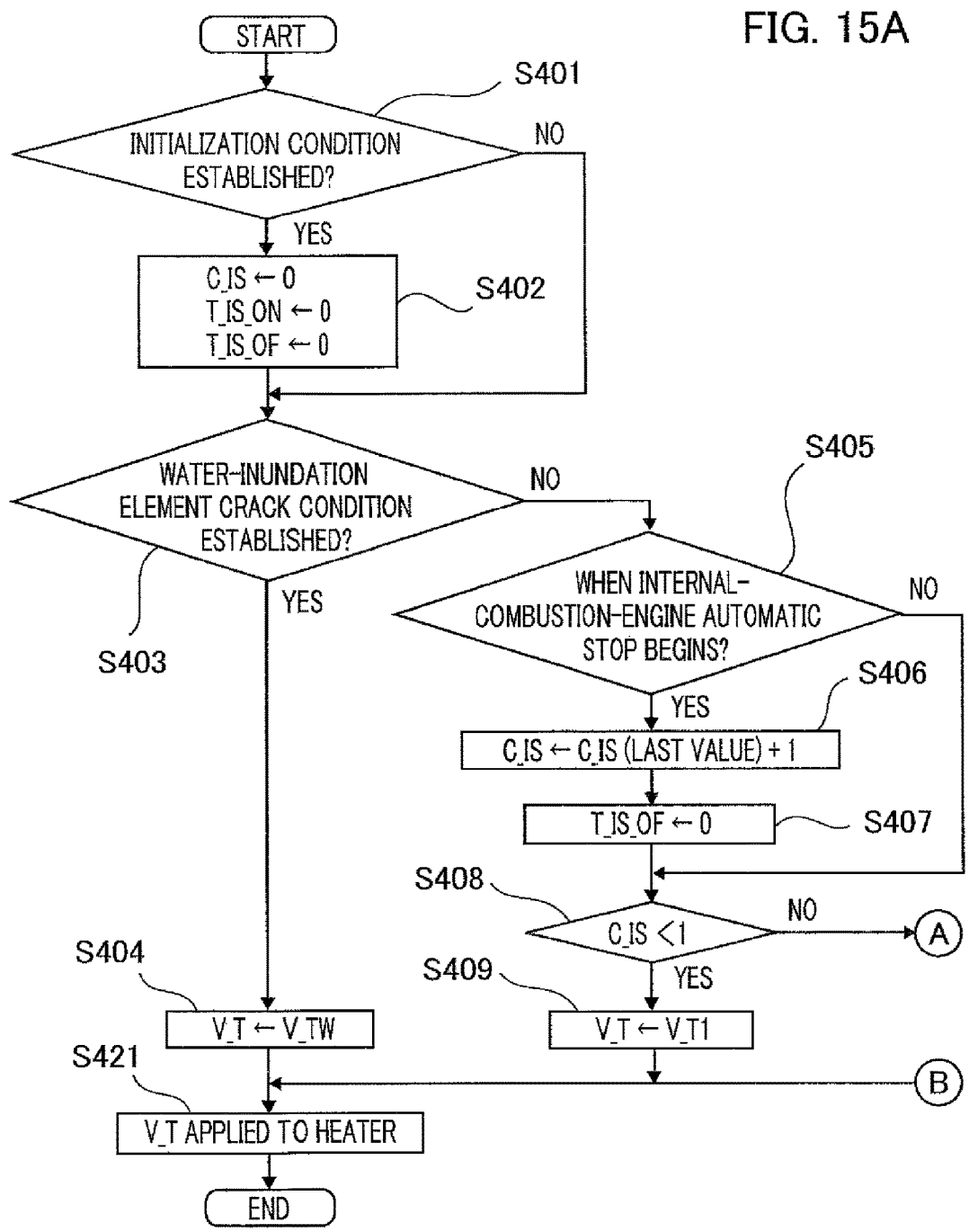
FIGS. 15A and 15B configure a flowchart representing a method of setting a target heater applied effective voltage, in Embodiment 5 of the present invention.

The difference between FIGS. 4A/4B and FIGS. 15A/15B will be explained below.

Figure 15B:
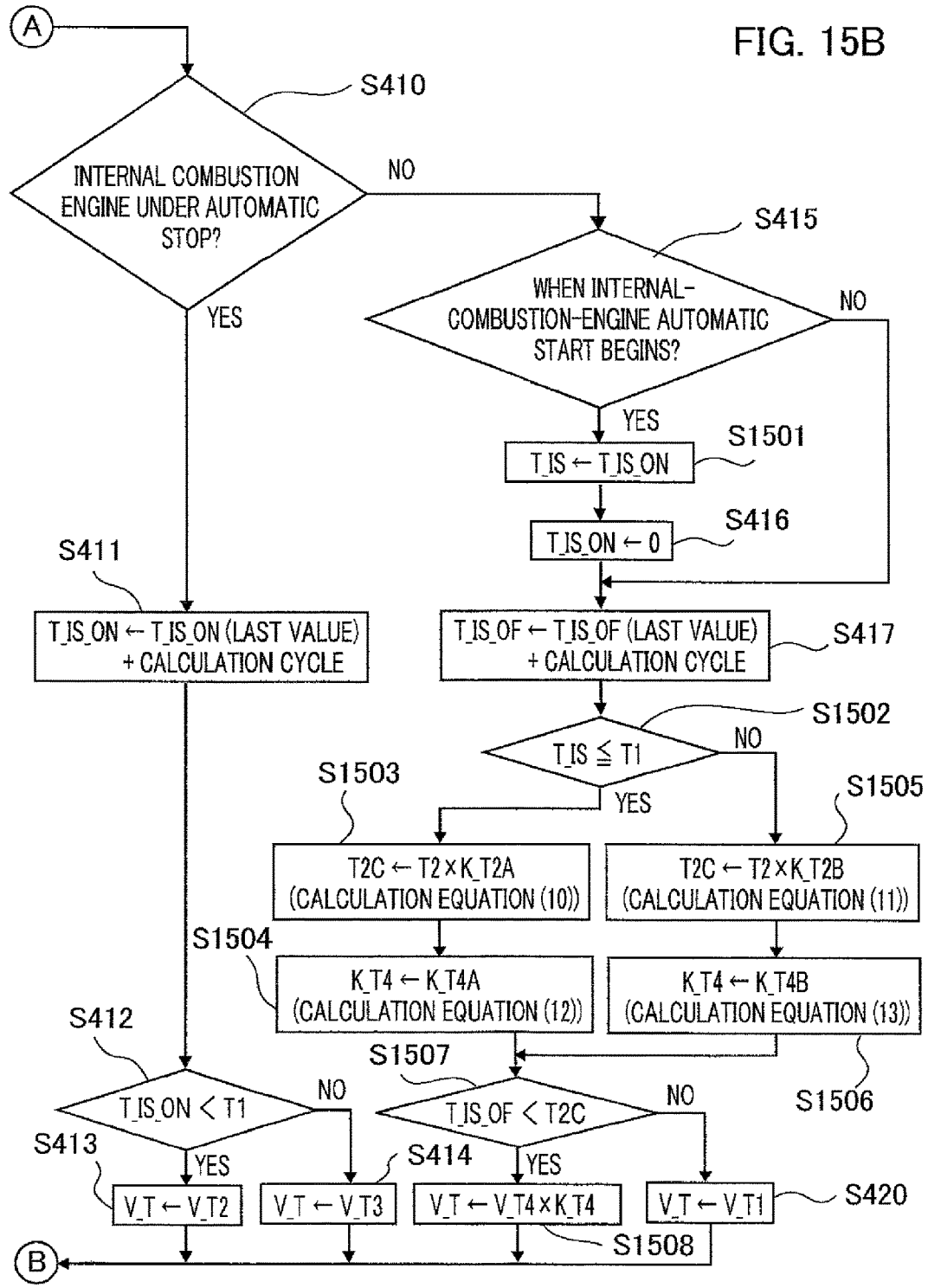

In FIG. 15B, in the case where it is determined in the step S415 that the internal combustion engine is automatically starting, the present elapsed time T_IS_ON from the start of the automatic stop mode, as the automatic stop period from the start of the automatic stop mode of the internal combustion engine to the end of the automatic stop mode, is stored in the automatic stop period T_IS in the step S1501; then, "0" is stored in the elapsed time T_IS_ON from the start of the automatic stop mode so that the elapsed time T_IS_ON is reset; then, the step S416 is followed by the step S417. In contrast, in the case where it is not determined in the step S415 that the internal combustion engine is automatically starting, the step S415 is followed by the step S417. In the step S417, the last value of the elapsed time T_IS_OF after the internal combustion engine automatically starts gains the calculation processing cycle and is stored in T_IS_OF; then, the step S417 is followed by the step S1502.

Next, in the case where in the step S1502, the automatic stop period T_IS is the same as or shorter than the second control period end duration T1, i.e., in the case where the internal combustion engine automatically starts during the second control period, a value obtained by multiplying the fourth control period end duration T2 by a correction value K_T2A is stored, in the step S1503, in a corrected fourth control period end duration T2C; then, in the step S1504, a correction value K_T4A at a time when the internal combustion engine automatically starts during the second control period is stored in a correction value K_T4 for correcting the fourth target applied effective voltage V_T4. In contrast, in the case where in the step S1502, the automatic stop period T_IS is longer than the second control period end duration T1, i.e., in the case where the internal combustion engine automatically starts during the third control period, a value obtained by multiplying the fourth control period end duration T2 by a correction value K_T2B is stored, in the step S1505, in the corrected fourth control period end duration T2C; then, in the step S1506, the correction value K_T4B at a time when the internal combustion engine automatically starts during the third control period is stored in the correction value K_T4 for correcting the fourth target applied effective voltage V_T4.

The correction values K_T2A, K_T2B, K_T4A, and K_T4B are calculated, for example, in accordance with the equations (10) through (13) below.

$$K\_T2A = T2A\_G \times T\_IS \div T1 + T2A\_OFST \tag{10}$$

$$K\_T2B = T2B\_G \times (T\_IS - T1) \div (T\_IS\_ON\_MAX - T1) + T2B\_OFST \tag{11}$$

$$K\_T4A = T4A\_G \times T\_IS \div T1 + T4A\_OFST \tag{12}$$

$$K\_T4B = T4B\_G \times (T\_IS - T1) \div (T\_IS\_ON\_MAX - T1) + T4B\_OFST \tag{13}$$

T2A_G, T2B_G, T4A_G, and T4B_G are gains, and T2A_OFST, T2B_OFST, T4A_OFST, and T4B_OFST are offsets; thus, each of the correction values K_T2A, K_T2B, K_T4A, and K_T4B is a linear function of the automatic stop period T_IS.

In other words, the correction values K_T2A, K_T2B, K_T4A, and K_T4B are calculated in such a manner as to become smaller as the automatic stop period T_IS is shorter; thus, as the automatic stop period T_IS is shorter, the applied effective voltage to be applied to the heater during the fourth control period becomes lower, and hence the voltage application period becomes shorter.

Next, in the case where in the step S1507, the elapsed time T_IS_OF after the internal combustion engine automatically starts is shorter than the corrected fourth control period end duration T2C corrected in the step S1503 or S1505, a value obtained by multiplying the fourth target applied effective voltage V_T4 by the correction value K_T4 is stored, in the step S1508, in the target heater applied effective voltage V_T. In contrast, in the case where in the step S1507, the elapsed time T_IS_OF after the internal combustion engine automatically starts is the same as or longer than the corrected fourth control period end duration T2C, the first target applied effective voltage V_T1 is stored in the target heater applied effective voltage V_T in the step S420.

In addition, there has been described a method in which each of the correction values K_T2A, K_T2B, K_T4A, and K_T4B is set as a linear function of the automatic stop period T_IS; however, the correction values may be set based on a table related to the automatic stop period T_IS.

Here, with reference to FIGS. 16A/16B and 17A/17B, the problem to be solved by Embodiment 5 and the effect of Embodiment 5 will be explained.

At first, with reference to FIGS. 16A and 16B, there will be explained the problem posed in the case where the correction according to Embodiment 5 is not performed. In FIG. 16A(A), assuming that a case where the internal combustion engine automatically starts at the timing of automatic start 1 is the reference case, there will be explained a case where the internal combustion engine automatically starts at the timing of automatic start 2. In Embodiment 1, the heater applied effective voltage for raising the sensor element temperature during the fourth control period 304 is set through the method described in the foregoing paragraph in such a way that the sensor element temperature reaches the sensor element target temperature 310 at a time when the internal combustion engine is in the automatic stop mode, by the time the air-fuel ratio feedback control is started. In other words, the heater applied effective voltage is set in such a way that even in the case where the internal combustion engine automatically starts after the maximum automatic stop period T_IS_ON_MAX in which the sensor ambient temperature becomes lowest, i.e., even in the case where the heat-up speed becomes lowest, the sensor element temperature reaches the sensor element target temperature 310 at a time when the internal combustion engine is in the automatic stop mode, by the time the air-fuel ratio feedback control is started. Accordingly, as represented in FIG. 16A(E), an applied effective voltage 1602 at a time when the internal combustion engine automatically starts at the timing of automatic start 2, at which the automatic stop period becomes shorter than when the internal combustion engine automatically starts at the timing of automatic start 1, becomes equal to an applied effective voltage 1601 at a time when the internal combustion engine automatically starts at the timing of automatic start 1. However, as represented in FIG. 16B(G), the sensor ambient temperature B at a time when the internal combustion engine automatically starts at the timing of automatic start 2 is higher than the sensor ambient temperature A at a time when the internal combustion engine automatically starts at the timing of automatic start 1; therefore, as represented in FIG. 16B(F), a sensor element temperature 1604 is higher than a sensor element temperature 1603. In this situation, as represented in FIG. 16B(H), heater power consumptions 1605 and 1606 are equal to each other; thus, when the heater applied effective voltage at a time the internal combustion engine automatically starts at the timing of automatic start 2 is lowered so as to make the sensor element temperature as high as the sensor element temperature 1603, the amount of heater power consumption can be reduced.

Figure 17B:
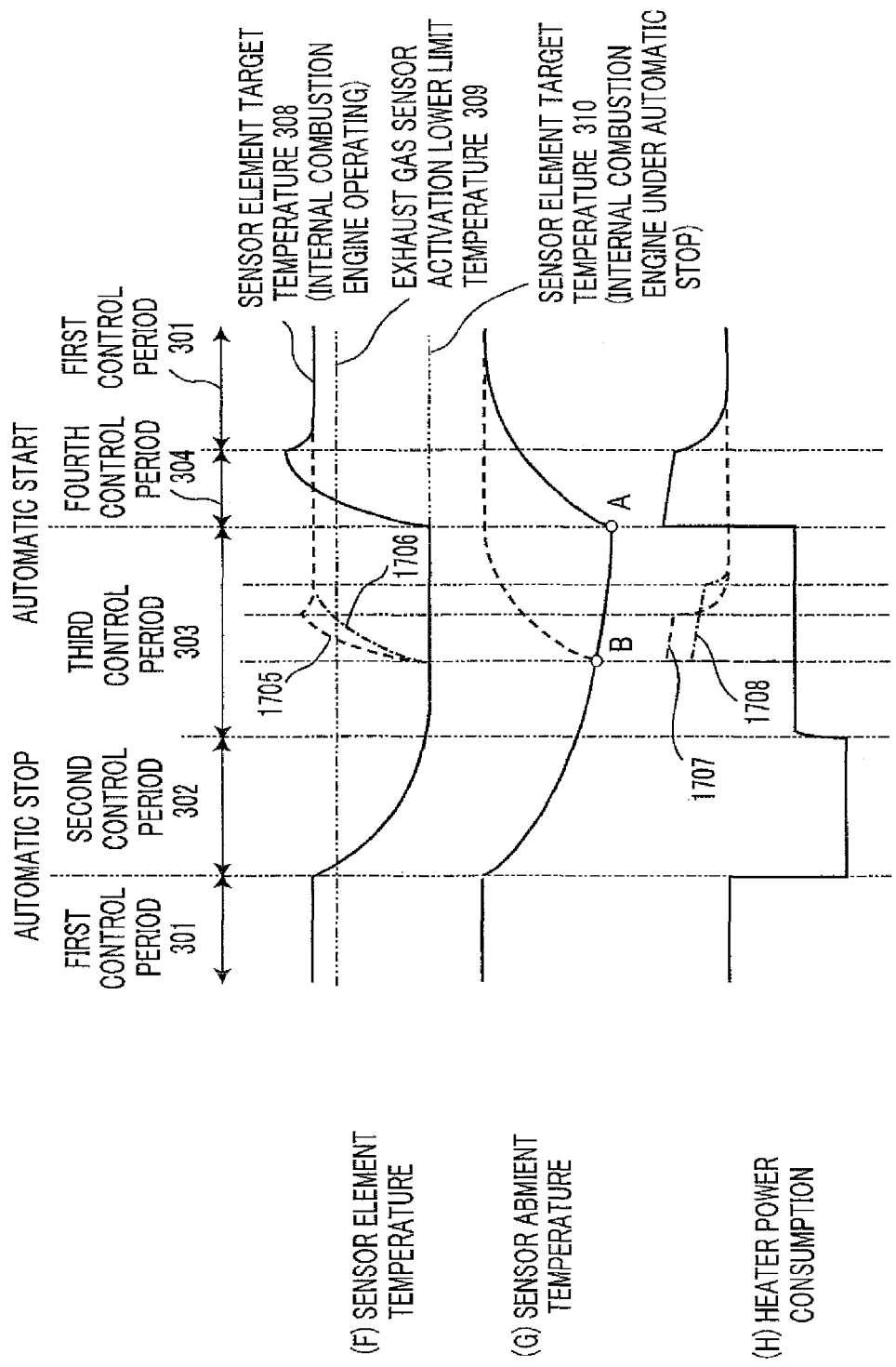

Next, with reference to FIGS. 17A and 17B, there will be explained the effect in the case where the correction according to Embodiment 5 is performed. At first, there will be explained the effect in the case where according to Embodiment 5, the voltage application period for the heater during the fourth control period is corrected in accordance with the automatic stop period T_IS. The corrected fourth control period end duration T2C (1701) in FIG. 17A(D) is set to be shorter as the automatic stop period of the internal combustion engine becomes shorter, with respect to the fourth control period end duration T2 explained in the foregoing paragraph. In other words, as represented in FIG. 17B(G), in the case where the automatic stop period is short, the sensor ambient temperature B at a time when the internal combustion engine automatically starts at the timing of automatic start 2 is higher than the sensor ambient temperature A at a time when the internal combustion engine automatically starts at the timing of automatic start 1; therefore, even in the case where in comparison with the internal combustion engine automatically starts at the timing of automatic start 1, the time in which the fourth target applied effective voltage (the allowable maximum applied effective voltage 14 V) is applied is short, the sensor element temperature can reach the sensor element target temperature 308 at a time the internal combustion engine is being operated, as represented by a curve 1705 in FIG. 17B(F), by the time the air-fuel ratio feedback control is started, and as represented in FIG. 17B(H), heater power consumption 1707 can be reduced in comparison with the heater power consumption 1606, represented in FIG. 16B(H), at a time when no correction is performed. In other words, the power consumption of the heater can be reduced.

Next, there will be explained the effect in the case where according to Embodiment 5, the applied effective voltage applied to the heater during the fourth control period is corrected in accordance with the automatic stop period T_IS. A corrected fourth target applied effective voltage V_T4× K_T4 (1702) in FIG. 17A(E) is set to be lower as the automatic stop period of the internal combustion engine becomes shorter, with respect to the fourth target applied effective voltage V_T4. In other words, as represented in FIG. 17B(G), in the case where the automatic stop period is short, the sensor ambient temperature B at a time when the internal combustion engine automatically starts at the timing of automatic start 2 is higher than the sensor ambient temperature A at a time when the internal combustion engine automatically starts at the timing of automatic start 1; therefore, even in the case where in comparison with the case in which the internal combustion engine automatically starts at the timing of automatic start 1, the fourth target applied effective voltage is low, the sensor element temperature can reach the sensor element target temperature 308 at a time the internal combustion engine is being operated, as represented by a curve 1706 in FIG. 17B(F), by the time the air-fuel ratio feedback control is started, and as represented in FIG. 17B(H), heater power consumption 1708 can be reduced in comparison with the heater power consumption 1606, represented in FIG. 16B(H), at a time when no correction is performed. In other words, the power consumption of the heater can be reduced.

In FIGS. 17A and 17B of Embodiment 5, there have been separately explained the case where the fourth control period end duration T2 is corrected to become shorter as the automatic stop period of the internal combustion engine is shorter and the case where the fourth target applied effective voltage V_T4 is corrected to become lower as the automatic stop period of the internal combustion engine is shorter; however, the correction of shortening the fourth control period end duration T2 and the correction of lowering the fourth target applied effective voltage V_T4 may concurrently be performed.

As described above, in contrast to the invention according to Embodiment 1, an exhaust-gas-sensor heater control device according to Embodiment 5 of the present invention is provided with an automatic stop period measurement means that measures the automatic stop period from a start of the automatic stop mode to an end of the automatic stop mode; and a fourth control period in which after the internal combustion engine has automatically started, the target heater applied effective voltage is set to the fourth target applied effective voltage, which is the same as or higher than the first target applied effective voltage, until the sensor element temperature becomes equal to the sensor element target temperature at a time when the internal combustion engine is being operated. The exhaust-gas-sensor heater control device according to Embodiment 5 of the present invention is configured in such a way that one or both of the fourth target applied effective voltage and the voltage application period in which the fourth target applied effective voltage is applied are corrected in accordance with the automatic stop period measured by the automatic stop period measurement means.

Therefore, in contrast to the invention according to Embodiment 1, by configuring, according to Embodiment 5, an exhaust-gas-sensor heater control device, i.e., by performing correction in which the fourth control period end duration T2 is made shorter or the fourth target applied effective voltage V_T4 is made lower, as the automatic stop period of the internal combustion engine is shorter, the amount of power consumption can further be reduced in comparison with Embodiment 1.

Embodiment 6

Next, there will be explained an exhaust-gas-sensor heater control device according to Embodiment 6 of the present invention. In contrast to Embodiment 1, in Embodiment 6, there is described a case where the ambient temperature of the exhaust gas sensor is different from a reference temperature, i.e., a case where the ambient temperature of the exhaust gas sensor varies; in Embodiment 6, there is utilized a method different from the method according to Embodiment 3.

Embodiment 6 differs from Embodiment 1 in the following points. That is to say, FIGS. 18A, 18B, and 18C configure a flowchart for explaining characteristic control in Embodiment 6; in FIGS. 18B and 18C, the steps S1801 through S1810 are added and the steps S1811 and S1812 are changed, in contrast to FIGS. 4A and 4B of Embodiment 1.

The difference between FIGS. 4A/4B and FIGS. 18A/18B/18C will be explained below.

Figure 18A:
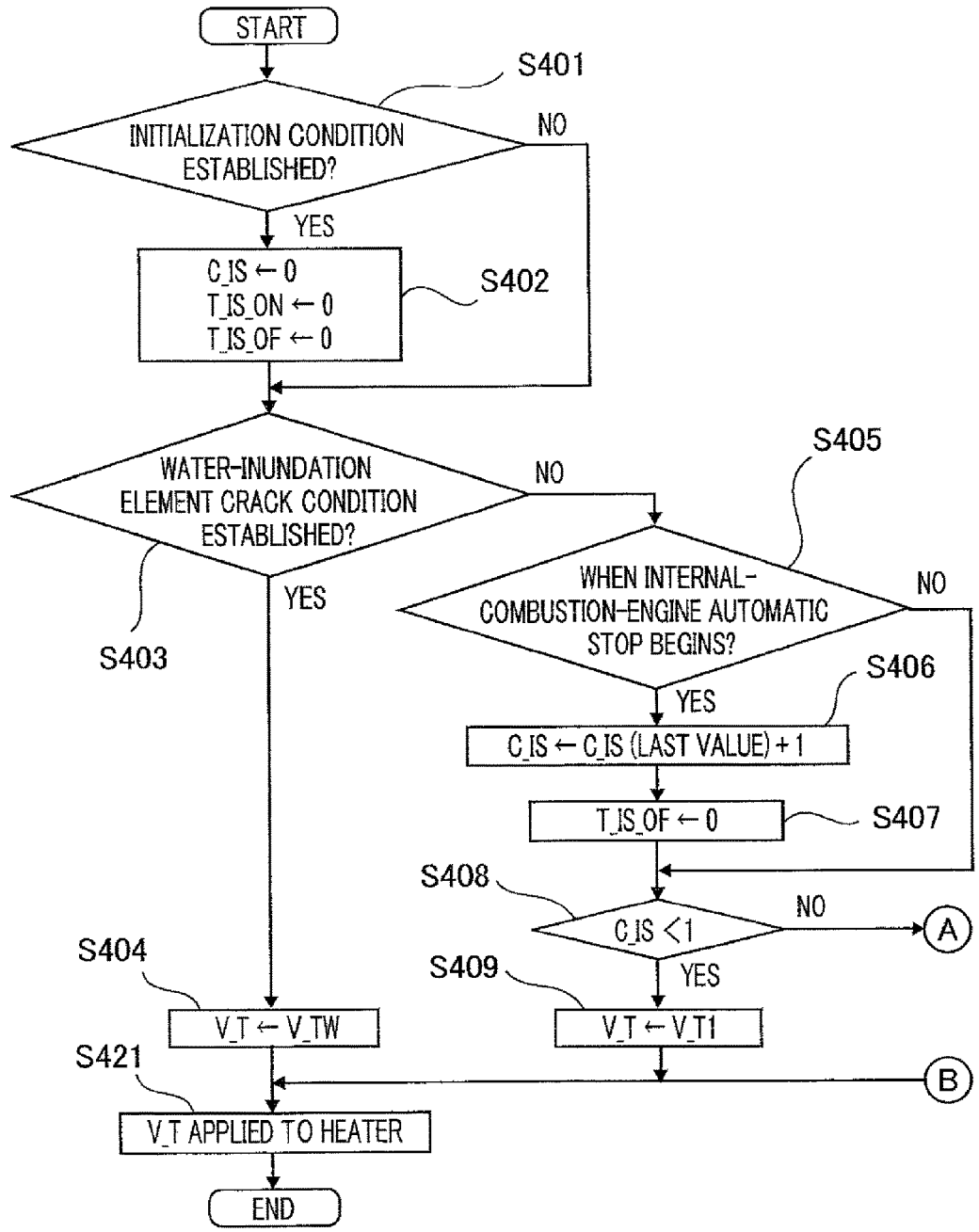
FIGS. 18A, 18B, and 18C configure a flowchart representing a method of setting a target heater applied effective voltage, in Embodiment 6 of the present invention.
Figure 18B:
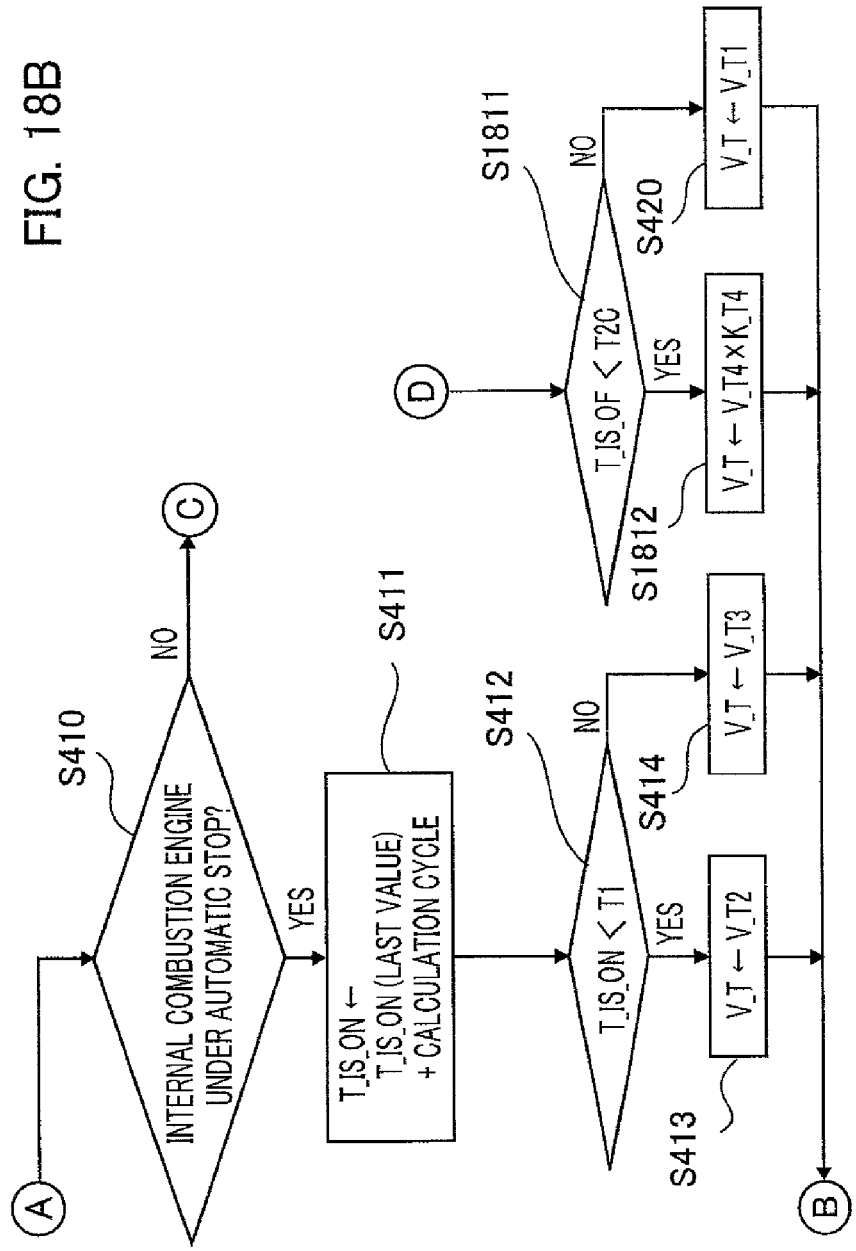
Figure 18C:
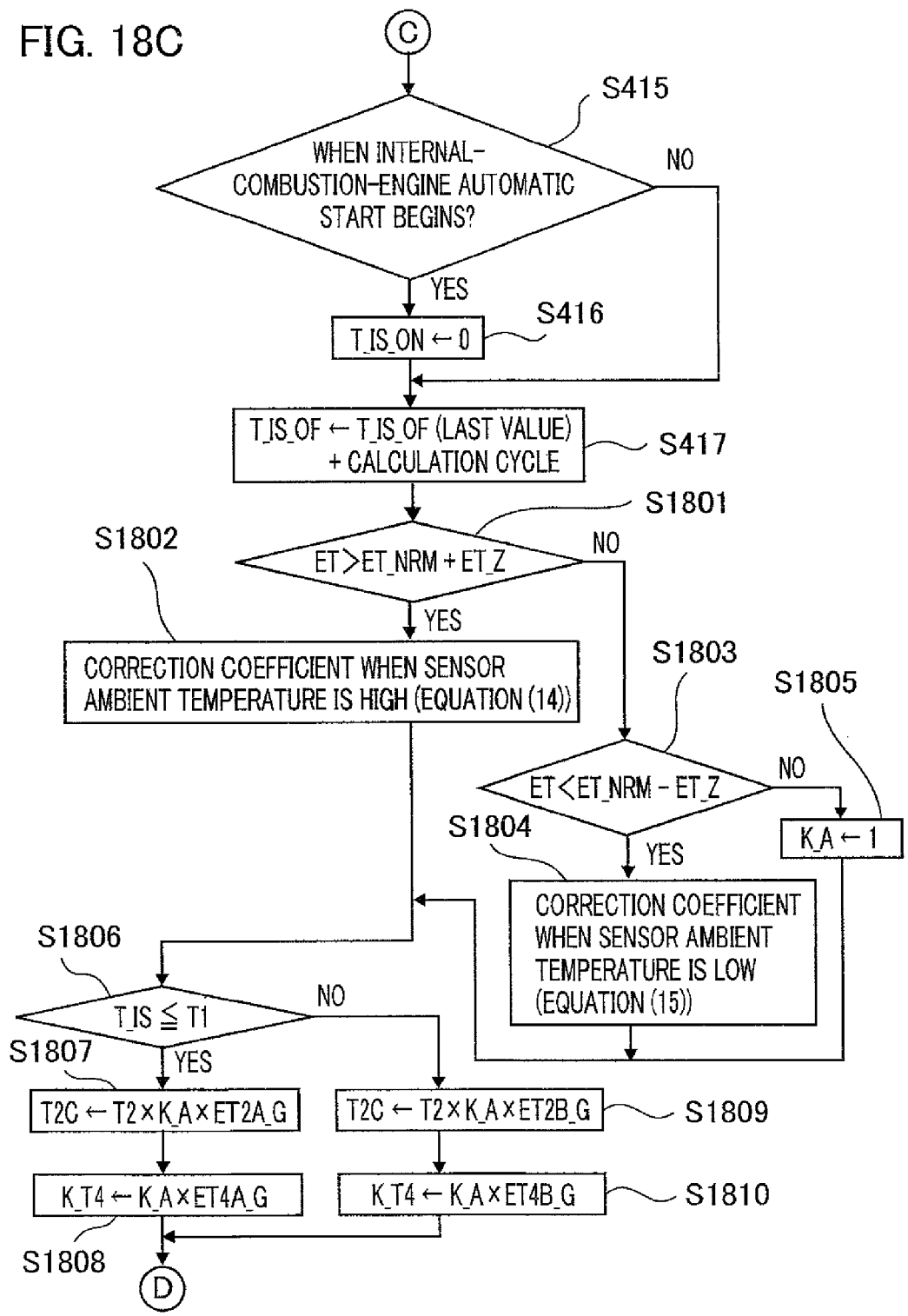

In FIGS. 18A, 18B, and 18C, the process in the steps S401 through S415 is the same as that in FIGS. 4A and 4B. Next, the process from the steps S1801 through S1805 is the same as the process from the steps S1001 through S1005 in FIG. 10B. That is to say, in FIG. 18C, at first, it is determined in the step S1801 whether or not the ambient temperature ET of the exhaust gas sensor is higher than a value obtained by adding the allowable variation amount ET_Z to the reference value ET_NRM for the ambient temperature of the exhaust gas sensor. In the case where it is determined in the step S1801 that the ambient temperature ET of the exhaust gas sensor is higher than the value obtained by adding the allowable variation amount ET_Z to the reference value ET_NRM for the ambient temperature of the exhaust gas sensor, the correction coefficient K_A is calculated in the step S1802, for example, through the equation (14) below, in such a way that the higher the sensor ambient temperature is, the smaller the correction coefficient K_A becomes; then, the step S1802 is followed by the step S1806.

$$K\_A = ET\_G1 \times (1-(ET-(ET\_NRM+ET\_Z)) \div ET\_NRM) \quad (14)$$

where ET_G1 is a gain at a time when the ambient temperature ET of the exhaust gas sensor is higher than the reference value ET_NRM.

In contrast, in the case where it is determined in the step S1801 that the ambient temperature ET of the exhaust gas sensor is not higher than the value obtained by adding the allowable variation amount ET_Z to the reference value ET_NRM for the ambient temperature of the exhaust gas sensor, it is determined in the step S1803 whether or not the ambient temperature ET of the exhaust gas sensor is lower than a value obtained by subtracting the allowable variation amount ET_Z from the reference value ET_NRM for the ambient temperature of the exhaust gas sensor. In the case where it is determined in the step S1803 that the ambient temperature ET of the exhaust gas sensor is lower than a value obtained by subtracting the allowable variation amount ET_Z from the reference value ET_NRM for the ambient temperature of the exhaust gas sensor, the correction coefficient K_A is calculated in the step S1804, for example, through the equation (15) below, in such a way that the lower the sensor ambient temperature is, the larger the correction coefficient K_A becomes; then, the step S1804 is followed by the step S1806.

$$K\_A = ET\_G2 \times (1-(ET-(ET\_NRM+ET\_Z)) \div ET\_NRM) \quad (15)$$

where ET_G2 is a gain at a time when the ambient temperature ET of the exhaust gas sensor is lower than the reference value ET_NRM.

In contrast, in the case where it is determined in the step S1803 that the ambient temperature ET of the exhaust gas sensor is not lower than the value obtained by subtracting the allowable variation amount ET_Z from the reference value ET_NRM for the ambient temperature of the exhaust gas sensor, "1" is stored in the correction coefficient K_A in the step S1805 so that correction at a time when the ambient temperature of the exhaust gas sensor varies is nullified; then, the step S1805 is followed by the step S1806.

The reference value ET_NRM and the allowable variation amount ET_Z are the same as those in the foregoing paragraphs, respectively.

Next, the process from the steps S1806 through S1812 is the same as the process from the steps S1502 through S1508 in FIG. 15B. In other words, in FIG. 18C, in the case where in the step S1806, the automatic stop period T_IS is the same as or shorter than the second control period end duration T1, i.e., in the case where the internal combustion engine automatically starts during the second control period, a value obtained by multiplying the fourth control period end duration T2 by a value obtained by multiplying the correction coefficient K_A by a gain ET2A_G is stored, in the step S1807, in the corrected fourth control period end duration T2C; then, in the step S1808, a value obtained by multiplying the correction coefficient K_A by a gain ET4A_G at a time when the internal combustion engine automatically starts during the second control period is stored in the correction value K_T4 for correcting the fourth target applied effective voltage V_T4.

In contrast, in the case where in the step S1806, the automatic stop period T_IS is longer than the second control period end duration T1, i.e., in the case where the internal combustion engine automatically starts during the third control period, a value obtained by multiplying the fourth control period end duration T2 by a value obtained by multiplying the correction coefficient K_A by a gain ET2B_G is stored, in the step S1809, in the corrected fourth control period end duration T2C; then, in the step S1810, a value obtained by multiplying the correction coefficient K_A by a gain ET4B_G at a time when the internal combustion engine automatically starts during the third control period is stored in the correction value K_T4 for correcting the fourth target applied effective voltage V_T4.

That is to say, the lower the sensor ambient temperature is, the larger the correction coefficient K_A becomes, and the higher the sensor ambient temperature is, the smaller the correction coefficient K_A becomes; therefore, as the sensor ambient temperature is lower, the applied effective voltage to be applied to the heater during the fourth control period becomes higher and the voltage application period is corrected by a longer period, and as the sensor ambient temperature is higher, the applied effective voltage to be applied to the heater during the fourth control period becomes lower and the voltage application period is corrected by a shorter period.

Next, in the case where in the step S1811, the elapsed time T_IS_OF after the internal combustion engine automatically starts is shorter than the corrected fourth control period end duration T2C corrected in the step S1807 or S1809, a value obtained by multiplying the fourth target applied effective voltage V_T4 by the correction value K_T4 is stored, in the step S1812, in the target heater applied effective voltage V_T. In contrast, in the case where in the step S1811, the elapsed time T_IS_OF after the internal combustion engine automatically starts is the same as or longer than the corrected fourth control period end duration T2C, the first target applied effective voltage V_T1 is stored in the target heater applied effective voltage V_T in the step S420.

Here, with reference to FIGS. 19A/19B through 20A/20B, there will be explained a problem to be solved by Embodiment 6 and the effect of Embodiment 6 in the case where the ambient temperature of the exhaust gas sensor is different from the reference temperature, i.e., in the case where the ambient temperature of the exhaust gas sensor varies. In addition, the problem posed in the case where the correction according to Embodiment 6 is not performed is the same as that in the paragraphs in which FIGS. 11A and 11B of Embodiment 3 are explained.

Next, there will be explained the effect in the case where the correction according to Embodiment 6 is performed. At first, with reference to FIGS. 19A and 19B, there will be explained the effect in the case where the voltage application period for the heater during the fourth control period is corrected in accordance with the sensor ambient temperature.

Figure 19A:
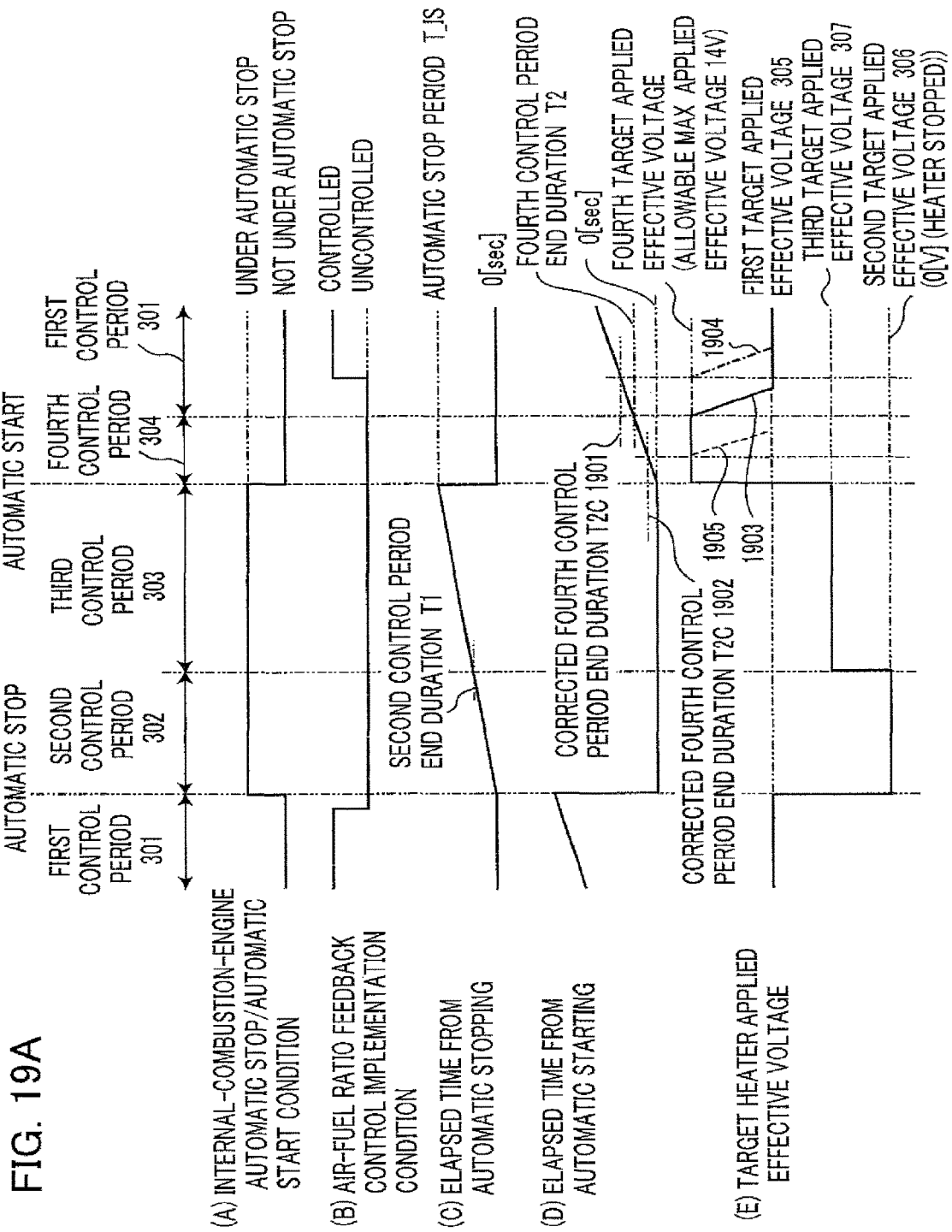
FIGS. 19A and 19B configure a timing chart for explaining the effect demonstrated by correcting a voltage application period in which the applied effective voltage is applied to a heater in the fourth control period, in Embodiment 6 of the present invention.
Figure 19B:
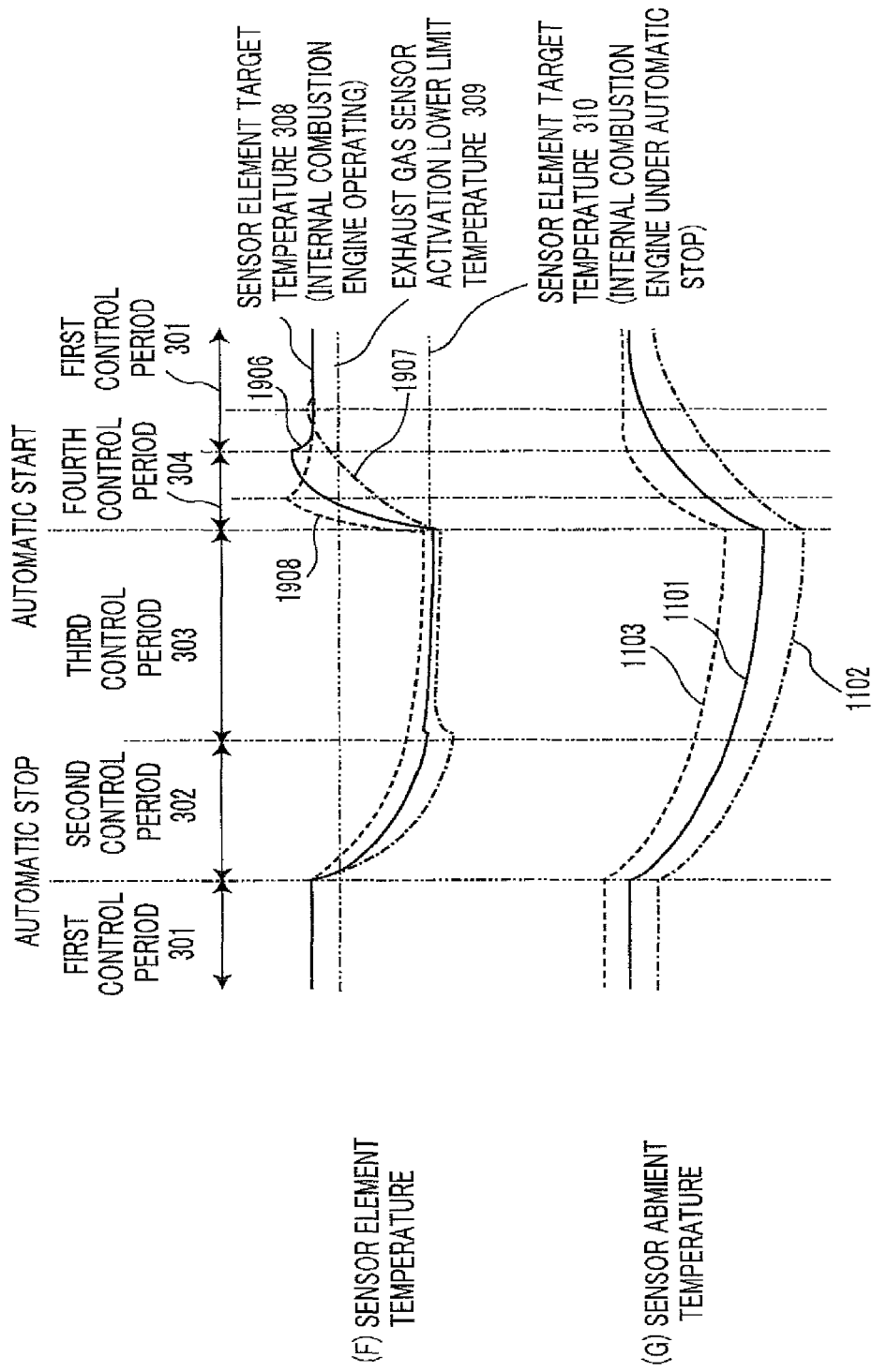

At first, in the case where as represented by the curve 1102, the sensor ambient temperature is lower than the reference sensor ambient temperature 1101, the corrected fourth control period end duration T2C becomes longer than the fourth control period end duration T2, as represented by a curve 1901 in FIG. 19A(D), in accordance with the difference between the sensor ambient temperature ET and the reference value ET_NRM−allowable variation amount ET_Z. Therefore, as represented by a curve 1904 in FIG. 19A(E), the voltage application period of the fourth target applied effective voltage (allowable maximum applied effective voltage 14 V) is set to be longer than the reference voltage application period represented by a curve 1903. As a result, as represented in FIG. 19B(F), a sensor element temperature 1907 can reach the sensor element target temperature 308 at a time when the internal combustion engine is being operated, by the time the air-fuel ratio feedback control is started.

Next, in the case where as represented by the curve 1103, the sensor ambient temperature is higher than the reference sensor ambient temperature 1101, the corrected fourth control period end duration T2C becomes shorter than the fourth control period end duration T2, as represented by a curve 1902 in FIG. 19A(D), in accordance with the difference between the sensor ambient temperature ET and the reference value ET_NRM+allowable variation amount ET_Z. Therefore, as represented by a curve 1905 in FIG. 19A(E), the voltage application period of the fourth target applied effective voltage (allowable maximum applied effective voltage 14 V) is set to be shorter than the reference voltage application period represented by the curve 1903. As a result, as represented in FIG. 19B(F), the exhaust gas sensor is prevented from failing due to an excessive rise in the sensor element temperature 1908, and in accordance with the shortened voltage application period of the fourth target applied effective voltage, the amount of power consumption can be reduced. Moreover, the sensor element temperature can reach the sensor element target temperature 308 at a time when the internal combustion engine is being operated, by the time the air-fuel ratio feedback control is started.

Next, with reference to FIGS. 20A and 20B, there will be explained the effect in the case where the applied effective voltage to be applied to the heater during the fourth control period is corrected in accordance with the sensor ambient temperature.

At first, in the case where as represented by the curve 1102, the sensor ambient temperature is lower than the reference sensor ambient temperature 1101, the target heater applied effective voltage during the fourth control period is set to be higher than the fourth target applied effective voltage, in accordance with the difference between the sensor ambient temperature ET and the reference value ET_NRM−allowable variation amount ET_Z; however, in the case where the fourth target applied effective voltage is set to the allowable maximum applied effective voltage 14 V, the applied effective voltage cannot be raised any more. Accordingly, in this case, no effect can be expected from the method in which in accordance with the sensor ambient temperature, the applied effective voltage to be applied to the heater during the fourth control period is corrected; thus, it is desirable that the method represented in FIGS. 19A and 19B is utilized.

Figure 20B:
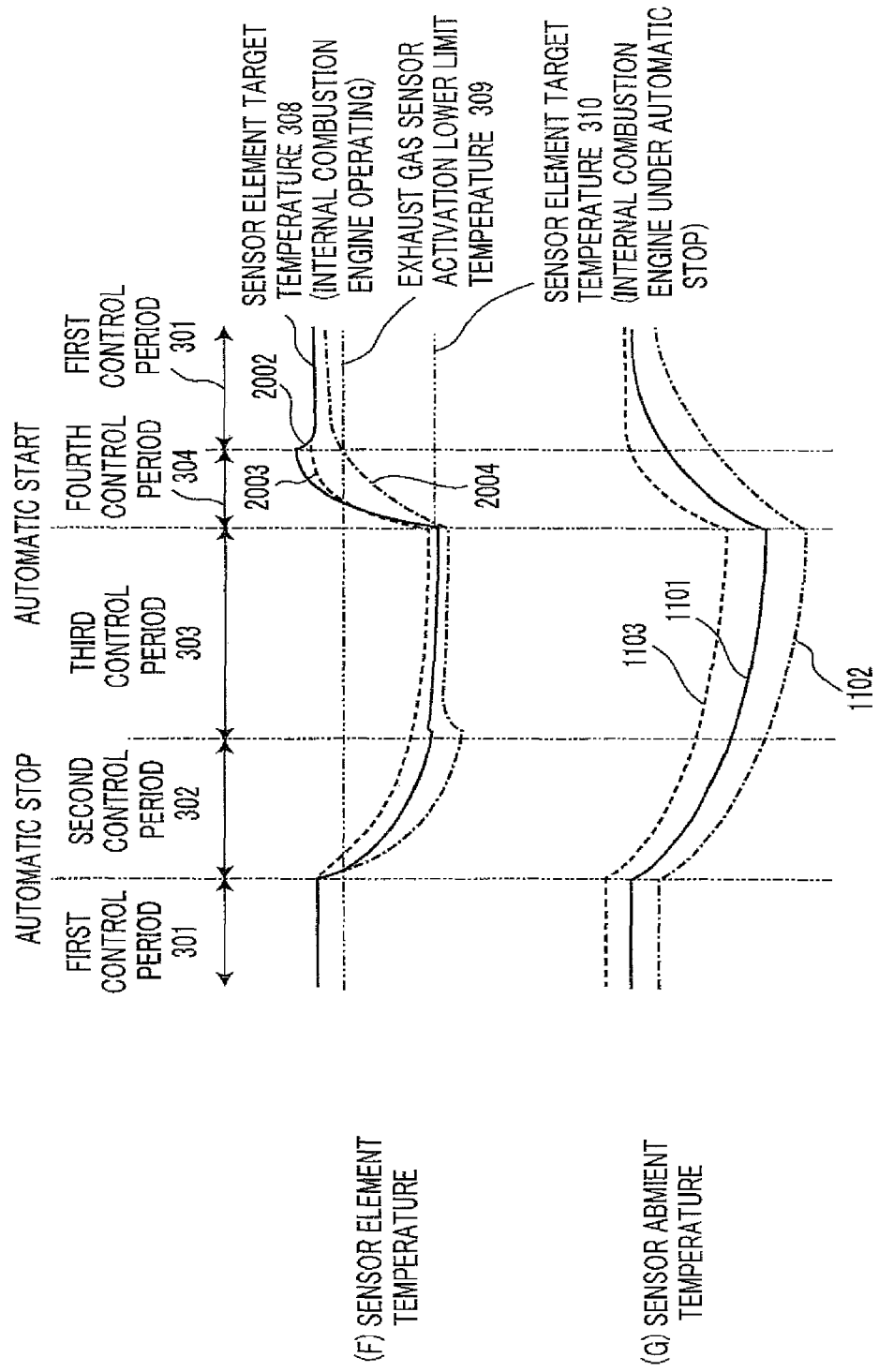

In contrast, in the case where as represented by the curve 1103, the sensor ambient temperature is higher than the reference sensor ambient temperature 1101, the target heater applied effective voltage during the fourth control period is set, as a curve 2001 in FIG. 20A(E), to be lower than the fourth target applied effective voltage, in accordance with the difference between the sensor ambient temperature ET and the reference value ET_NRM+allowable variation amount ET_Z. As a result, as represented in FIG. 20B(F), a sensor element temperature 2002 during the fourth control period becomes close to the behavior of a reference sensor element temperature 2003 during the fourth control period. Accordingly, the exhaust gas sensor is prevented from failing due to an excessive rise in the sensor element temperature 2002, and the amount of power consumption can be reduced in accordance with the applied effective voltage, during the fourth control period, that is lowered than the fourth target applied effective voltage. Moreover, the sensor element temperature can reach the sensor element target temperature 308 at a time when the internal combustion engine is being operated, by the time the air-fuel ratio feedback control is started.

As described above, in contrast to the invention according to Embodiment 1, an exhaust-gas-sensor heater control device according to Embodiment 6 of the present invention is provided with a sensor ambient temperature estimation means that estimates the ambient temperature of the exhaust gas sensor; and a fourth control period in which after the internal combustion engine has automatically started, the target heater applied effective voltage is set to the fourth target applied effective voltage, which is the same as or higher than the first target applied effective voltage, until the sensor element temperature becomes equal to the sensor element target temperature at a time when the internal combustion engine is being operated. The exhaust-gas-sensor heater control device according to Embodiment 6 of the present invention is configured in such a way that one or both of the fourth target applied effective voltage and the voltage application period in which the fourth target applied effective voltage is applied are corrected based on the sensor ambient temperature estimated by the sensor ambient temperature estimation means.

Accordingly, by configuring, as Embodiment 6, the exhaust-gas-sensor heater control device, in contrast to the invention according to Embodiment 1, in the case where the ambient temperature of the exhaust gas sensor is different from a reference temperature, i.e., in the case where the ambient temperature of the exhaust gas sensor varies, there is performed correction in which the lower than the reference value the sensor ambient temperature is, the longer the fourth control period end duration T2 is made. As a result, the exhaust gas sensor can be activated by the time the air-fuel ratio feedback control is started, and by performing the correction in which the higher the sensor ambient temperature is, the shorter the fourth control period end duration T2 is made or the lower the fourth target applied effective voltage is made, the exhaust gas sensor is prevented from failing due to an excessive rise in the sensor element temperature, and the amount of heater power consumption can be reduced.

Embodiment 7

Next, there will be explained an exhaust-gas-sensor heater control device according to Embodiment 7 of the present invention. In contrast to Embodiment 1, the first target applied effective voltage, the second target applied effective voltage, and the third target applied effective voltage are set, in Embodiment 7, based on the sensor element impedance of an exhaust gas sensor. That is to say, when the exhaust-gas-sensor heater control device 112 is provided with an impedance measurement means that measures the sensor element impedance related to the sensor element temperature, the sensor element impedance is measured by the impedance measurement means, and there is set a target heater applied effective voltage with which the sensor element impedance becomes equal to the target sensor element impedance.

Figure 30A:
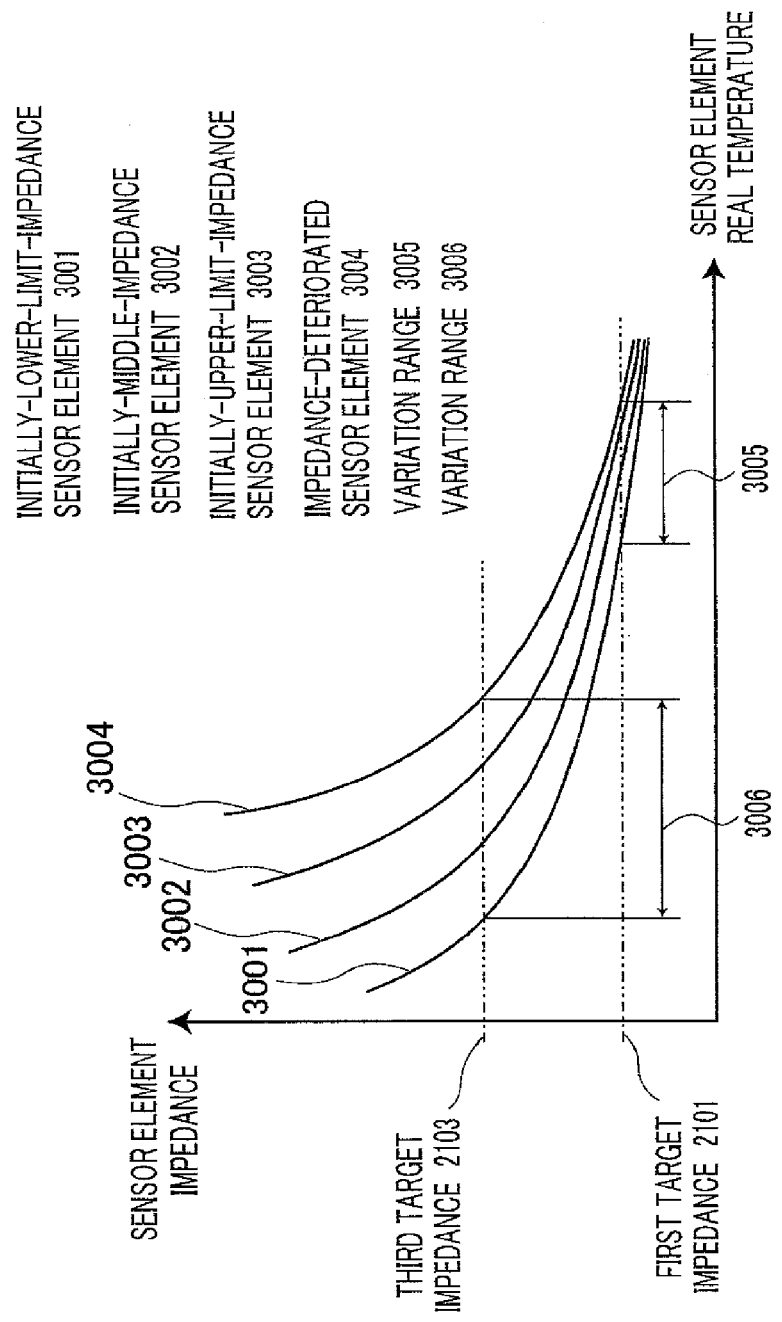
FIGS. 30A, 30B, and 30C are a set of graphs for explaining the relationship among the sensor element temperature, the sensor element impedance, and the elapsed time after the internal combustion engine has automatically stopped and the heater applied effective voltage is set to "0" V (the heater is stopped)

There exists such a correlation, for example, as represented by a curve 3002 in FIG. 30A, between the sensor element temperature and the sensor element impedance; the higher the sensor element temperature becomes, the smaller the sensor element impedance becomes.

The method of adjusting the applied effective voltage for the heater in such a way that the sensor element impedance becomes equal to the target sensor element impedance includes, for example, a so-called PID control in which feedback control is performed by adjusting the proportional gain, the integration gain, and the differential gain for the difference between a measured sensor element impedance and the target sensor element impedance, the integration thereof, and the differentiation thereof, respectively.

Figure 21A:
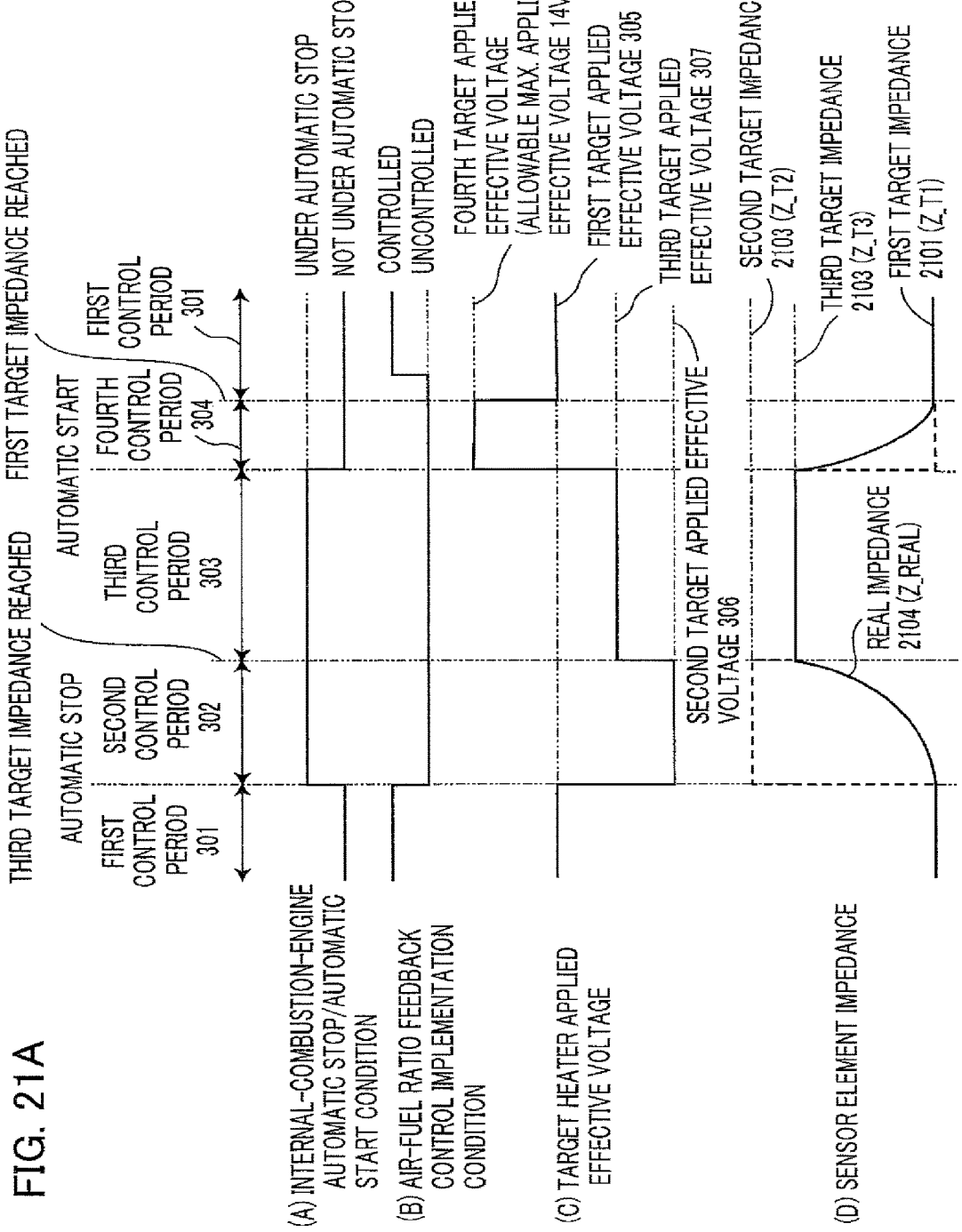

Here, with reference to a timing chart in FIGS. 21A and 21B, there will be explained the exhaust-gas-sensor heater control device 112 according to Embodiment 7 of the present invention. FIG. 21A(A) represents the automatic stop period and the timing of the automatic stop/automatic start of the internal combustion engine 101, realized by the automatic stop/automatic start device 111 of the control apparatus 107; FIG. 21A(B) represents the starting timing/ending timing of air-fuel ratio feedback control by the air-fuel ratio control device 110 of the control apparatus 107.

In the first control period 301 in which the internal combustion engine 101 is being operated, there is set a target heater applied effective voltage with which as represented in FIG. 21A(D), a real impedance 2104 (Z_REAL) measured by the impedance measurement means that measures the sensor element impedance of the exhaust gas sensor becomes equal to a first target impedance 2101 (Z_T1) related to the sensor element target temperature 308 (e.g., the sensor element temperature of the exhaust gas sensor at which the exhaust gas sensor is activated) at a time when the internal combustion engine is being operated.

Next, in the second control period 302, which is a period after the internal combustion engine 101 has automatically stopped, there is set a target heater applied effective voltage with which as represented in FIG. 21A(D), the real impedance becomes equal to a second target sensor element impedance 2102 (Z_T2) that is the same as or larger than the first target impedance, so that the power consumption during this period is reduced. During the second control period, the sensor element impedance, which changes concurrently with the fall in the sensor element temperature and is related to the sensor element temperature, rises as represented in FIG. 21A(D).

Next, as represented in FIG. 21A(D), in a period from a time point when the real impedance 2104 (Z_REAL) reaches a third target impedance 2103 (Z_T3) to a time point when the internal combustion engine 101 automatically starts, there is set a target heater applied effective voltage with which the real impedance 2104 (Z_REAL) becomes equal to the third target impedance 2103 (Z_T3).

The third target sensor element impedance Z_T3 is set to a target impedance related to the sensor element target temperature 310 at a time when the internal combustion engine is in the automatic stop mode, through the method described in the foregoing paragraph.

Next, in the fourth control period 304 which is a period after the internal combustion engine 101 has automatically started, as represented in FIG. 21A(C), the target heater applied effective voltage is set to a fourth target applied effective voltage (e.g., the allowable maximum applied effective voltage 14 V) until the real impedance 2104 (Z_REAL) reaches the first target impedance 2101 (Z_T1), as represented in FIG. 21A(D), so that the real impedance 2104 (Z_REAL) rapidly reaches the first target impedance 2101 (Z_T1). Such a system in which the battery, as a power source, is shared by the starting device of the internal combustion engine suffers restriction by a decrease, in the battery voltage, that is caused while the internal combustion engine is started; therefore, the battery voltage value at that moment is the maximum applied effective voltage.

Next, in the first control period 301 that follows the period in which the real impedance 2104 (Z_REAL) reaches the first target impedance 2101 (Z_T1), there is set a target heater applied effective voltage with which the real impedance 2104 (Z_REAL) becomes equal to the first target impedance 2101 (Z_T1).

Next, with reference to a flowchart in FIGS. 22A and 22B, there will be explained processing in the control apparatus 107, with regard to characteristic control in Embodiment 7 of the present invention, i.e., a method of setting the target heater applied effective voltage at a time when the internal combustion engine 101 is in the automatic stop mode or at a time when the internal combustion engine 101 has automatically started.

At first, in the step S401, when due to keying-on, an initialization condition for the control apparatus 107 has been established, initialization is performed in the step S402 by storing "0" in the count C_IS of automatic stop/automatic start events during a period from keying-on to keying-off, the elapsed time T_IS_ON from the start of the automatic stop mode, and the elapsed time T_IS_OF after the internal combustion engine automatically starts.

Next, when in the step S403, a water-inundation element crack condition has been established, a water-inundation target sensor element impedance Z_TW is stored in a target sensor element impedance Z_T of the exhaust gas sensor in the step S2201; then, the step S2201 is followed by the step S2214. The water-inundation target sensor element impedance Z_TW is set to a sensor element impedance related to a residual-heat temperature of the sensor element at which even when being inundated, the sensor element does not undergo any element crack.

In the case where in the step S403, the water-inundation element crack condition has not been established, it is determined in the step S405 whether or not the automatic stop mode of the internal combustion engine 101 is starting. In the case where in the step S405, it is determined that the automatic stop mode of the internal combustion engine 101 is starting, in the step S406, the last value of the count C_IS of automatic stop/automatic start events gains "1" and then is stored in the count C_IS of automatic stop/automatic start events, and in the step S407, "0" is stored in the elapsed time T_IS_OF after the internal combustion engine automatically starts so as to reset T_IS_OF, and in the step S2202, is stored in a second control period end flag F_T2F indicating that the second control period has ended, so that F_T2F is reset; then, the step S2202 is followed by the step S408. In contrast, in the case where it is not determined in the step S405 that the automatic stop mode of the internal combustion engine 101 is starting, the step S405 is followed by the step S408. The timing when the automatic stop mode of the internal combustion engine is starting means the timing when transition from the first control period 301 to the second control period 302 is made in FIGS. 21A and 21B.

Next, in the case where in the step S408, the count C_IS of automatic stop/automatic start events is smaller than "1", i.e., in the case where after keying-on, the automatic stop mode of the internal combustion engine 101 has not been implemented at all, the first target sensor element impedance Z_T1 is stored in the target sensor element impedance Z_T of the exhaust gas sensor in the step S2203; then, the step S2203 is followed by the step S2214. The first target sensor element impedance Z_T1 is set to a sensor element impedance related to the sensor element target temperature 308 (e.g., a sensor element temperature of the exhaust gas sensor at which the exhaust gas sensor is activated) at a time when the internal combustion engine is being operated. In contrast, in the case where in the step S408, the count C_IS of automatic stop/automatic start events is the same as or larger than "1", i.e., in the case where after keying-on, the automatic stop mode of the internal combustion engine 101 has been implemented at least once, the step S408 is followed by the step S410.

Next, in the case where it is determined in the step S410 that the internal combustion engine 101 is in the automatic stop mode, the last value of the elapsed time T_IS_ON from the start of the automatic stop mode gains the calculation processing cycle and is stored in the elapsed time T_IS_ON in the step S411; then, the step S411 is followed by the step S2204.

Next, in the case where in the step S2204, the real impedance Z_REAL measured by the impedance measurement means is the same as or larger than the third target sensor element impedance Z_T3, "1" is stored, in the step S2205, in the second control period end flag F_T2F indicating that the second control period has ended; then, the step S2205 is followed by the step S2206. In contrast, in the case where in the step S2204, the real impedance Z_REAL measured by the impedance measurement means is smaller than the third target sensor element impedance Z_T3, the step S2204 is followed by the step S2206.

Next, when in the step S2206, the second control period end flag F_T2F indicating that the second control period has ended is "0", the second target sensor element impedance Z_T2 is stored in the target sensor element impedance Z_T of the exhaust gas sensor in the step S2207; then, the step S2207 is followed by the step S2214. In contrast, when in the step S2206, the second control period end flag F_T2F indicating that the second control period has ended is not "0", the third target sensor element impedance Z_T3 is stored in the target sensor element impedance Z_T of the exhaust gas sensor in the step S2208; then, the step S2208 is followed by the step S2214. The second target sensor element impedance Z_T2 is set to a target impedance that is the same as or larger than the first target impedance, in order to reduce the power consumption during this period. The third target sensor element impedance Z_T3 is set to a target impedance related to the sensor element target temperature 310 at a time when the internal combustion engine is in the automatic stop mode, through the method described in the foregoing paragraph.

In the case where it is not determined in the step S410 that the internal combustion engine 101 is in the automatic stop mode, the step S410 is followed by the step S415; in the case where it is determined in the step S415 that the internal combustion engine is automatically starting, "0" is stored in the elapsed time T_IS_ON from the start of the automatic stop mode in the step S416 so as to reset T_IS_ON; in the step S2209, "0" is stored in a fourth control period end flag F_T4 indicating that the fourth control period has ended, so that F_T4F is reset; then, the step S2209 is followed by the step S417. In contrast, in the case where it is not determined in the step S415 that the internal combustion engine is automatically starting, the step S415 is followed by the step S417. In the step S417, the last value of the elapsed time T_IS_OF after the internal combustion engine automatically starts gains the calculation processing cycle and is stored in T_IS_OF; then, the step S417 is followed by the step S418. The timing when the internal combustion engine automatically starts means the timing when transition from the third control period 303 to the fourth control period 304 is made in FIGS. 21A and 21B.

Next, in the case where in the step S2210, the real impedance Z_REAL measured by the impedance measurement means is the same as or smaller than the first target sensor element impedance Z_T1, "1" is stored, in the step S2211, in the fourth control period end flag F_T4 indicating that the fourth control period has ended; then, the step S2211 is followed by the step S2212. In contrast, in the case where in the step S2210, the real impedance Z_REAL measured by the impedance measurement means is larger than the first target sensor element impedance Z_T1, the step S2210 is followed by the step S2212.

Next, when in the step S2212, the fourth control period end flag F_T4 indicating that the fourth control period has ended is "0", the fourth target applied effective voltage V_T4 (e.g., the allowable maximum applied effective voltage 14 V) is stored in the target heater applied effective voltage V_T for the heater 202 in the step S419; then, the step S419 is followed by the step S421. In contrast, when in the step S2212, the fourth control period end flag F_T4 indicating that the fourth control period has ended is not "0", the first target sensor element impedance Z_T1 is stored in the target sensor element impedance Z_T of the exhaust gas sensor in the step S2213; then, the step S2213 is followed by the step S2214.

Next, in the step S2214, there is set the target heater applied effective voltage for the exhaust gas sensor, at which the real sensor element impedance becomes equal to the target sensor element impedance Z_T of the exhaust gas sensor.

Figure 22A:
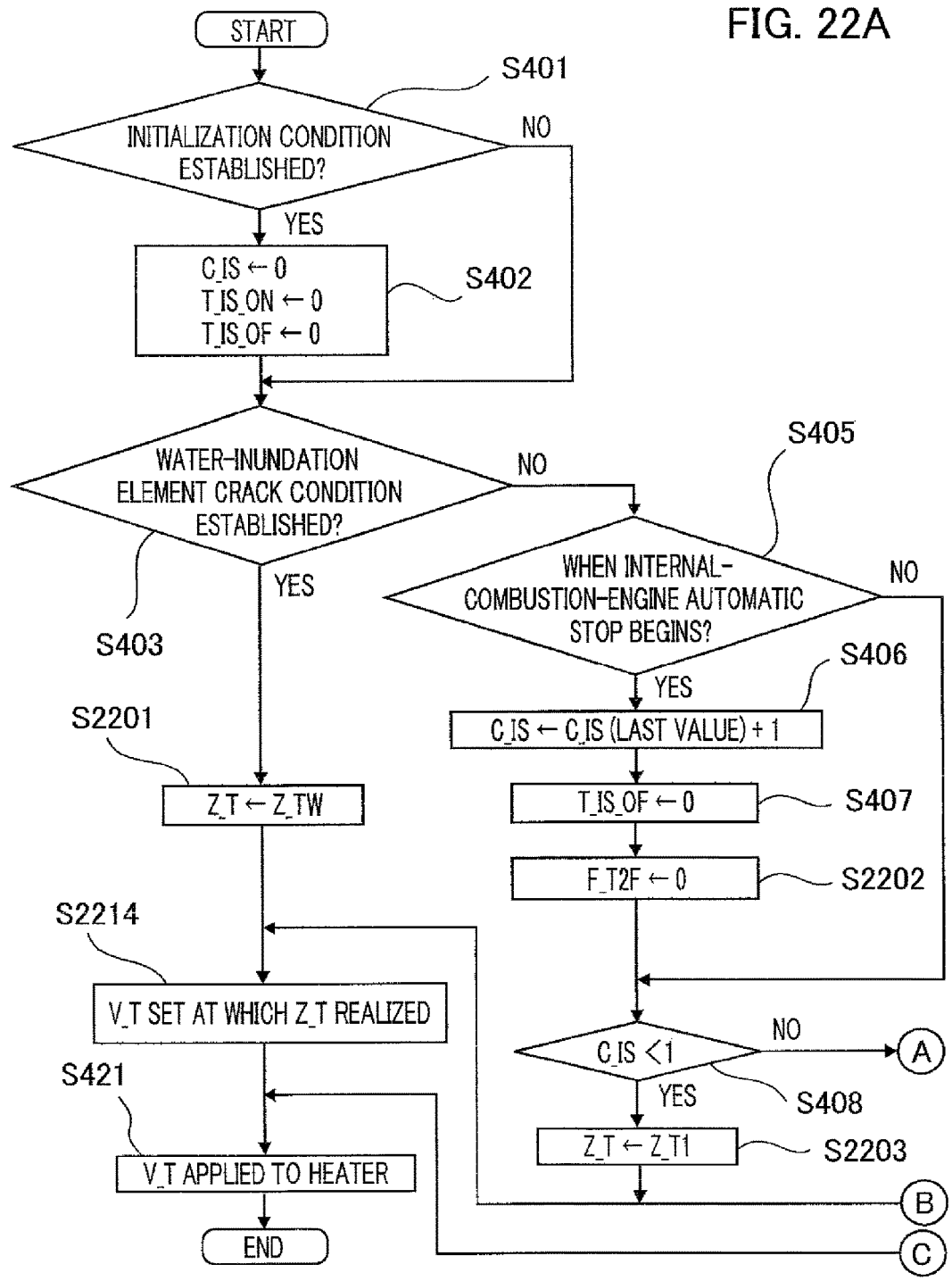

Next, in the step S421, the applied effective voltage for the heater 202 is controlled so as to be the target heater applied effective voltage V_T; then, the processing represented in FIGS. 22A and 22B is ended.

As described above, in contrast to the invention according to Embodiment 1, an exhaust-gas-sensor heater control device according to Embodiment 7 of the present invention is provided with an impedance measurement means that measures the sensor element impedance of the exhaust gas sensor; and an applied effective voltage setting means that sets an applied effective voltage for the heater in such a way that the sensor element impedance measured by the impedance measurement means becomes equal to a target impedance. The exhaust-gas-sensor heater control device according to Embodiment 7 is configured in such a way as described below. In the first control period, the applied effective voltage setting means sets the first target applied effective voltage in such a manner that the sensor element impedance becomes equal to the first target impedance related to the sensor element target temperature at a time when the internal combustion engine is being operated; in the second control period after the start of the automatic stop mode of the internal combustion engine, the applied effective voltage setting means sets the second target applied effective voltage in such a manner that the sensor element impedance becomes equal to the second target impedance that is larger than the first target impedance; in the third control period after the second control period end determination means determines that the second control period has ended, the applied effective voltage setting means sets the third target applied effective voltage in such a manner that the sensor element impedance becomes equal to the third target impedance that is smaller than the second target impedance and is related to the sensor element target temperature at a time when the internal combustion engine is in the automatic stop mode.

Moreover, in the second control period after the start of the automatic stop mode of the internal combustion engine, the second control period end determination means determines that the second control period has ended, when the sensor element impedance reaches the third target impedance.

Still moreover, an exhaust-gas-sensor heater control device according to Embodiment 7 of the present invention is provided with a fuel injection amount correction means that corrects the amount of fuel injection into the internal combustion engine, in accordance with a detection value of the exhaust gas sensor; and a fourth control period in which after the internal combustion engine has automatically started, the target heater applied effective voltage is set to the fourth target applied effective voltage, which is the same as or higher than the first target applied effective voltage, until the sensor element temperature becomes equal to the sensor element target temperature at a time when the internal combustion engine is being operated. The fourth control period is set in such a way as to end by the time the fuel injection amount correction means starts its operation after the internal combustion engine has automatically started and in such a way that the sum of the heater power consumption amounts in the second control period, the third control period, and the fourth control period becomes minimum.

By being configured in such a manner as described in Embodiment 7, as is the case with Embodiment 1, an exhaust-gas-sensor heater control device can reduce the amount of heater power consumption in a period from a time point when the internal combustion engine is in the automatic stop mode to a time point when the internal combustion engine has automatically started, in comparison with conventional technologies. In addition, because the exhaust gas sensor can be activated before the air-fuel ratio feedback control is started, the exhaust gas is not deteriorated.

Moreover, Embodiment 7 can determine the first, second, and third target applied effective voltages in such a way that the sensor element impedance measured by the impedance measurement means becomes equal to a target impedance related to the sensor element temperature; therefore, in comparison with the case where the first, second, and third target applied effective voltages are preliminarily determined through a matching test or the like, the activation temperature of the exhaust gas sensor and the heat-retention temperature at a time when the internal combustion engine is in the automatic stop mode can accurately be maintained without being affected by the ambient environment of the exhaust gas sensor, and the amount of power consumption can be reduced.

Embodiment 8

Next, there will be explained an exhaust-gas-sensor heater control device according to Embodiment 8 of the present invention. In contrast to Embodiment 7, in Embodiment 8, the second target applied effective voltage is not set based on the sensor element impedance of the exhaust gas sensor but is set to "0", i.e., heating is stopped.

Embodiment 8 differs from Embodiment 7 in the following points. That is to say, FIGS. 23A and 23B configure a flowchart for explaining characteristic control in Embodiment 8; the step S2301 in FIG. 23B is different from the step S2202 in FIG. 22B of Embodiment 7.

The difference between FIGS. 22A/22B and FIGS. 23A/23B will be explained below.

Figure 23A:
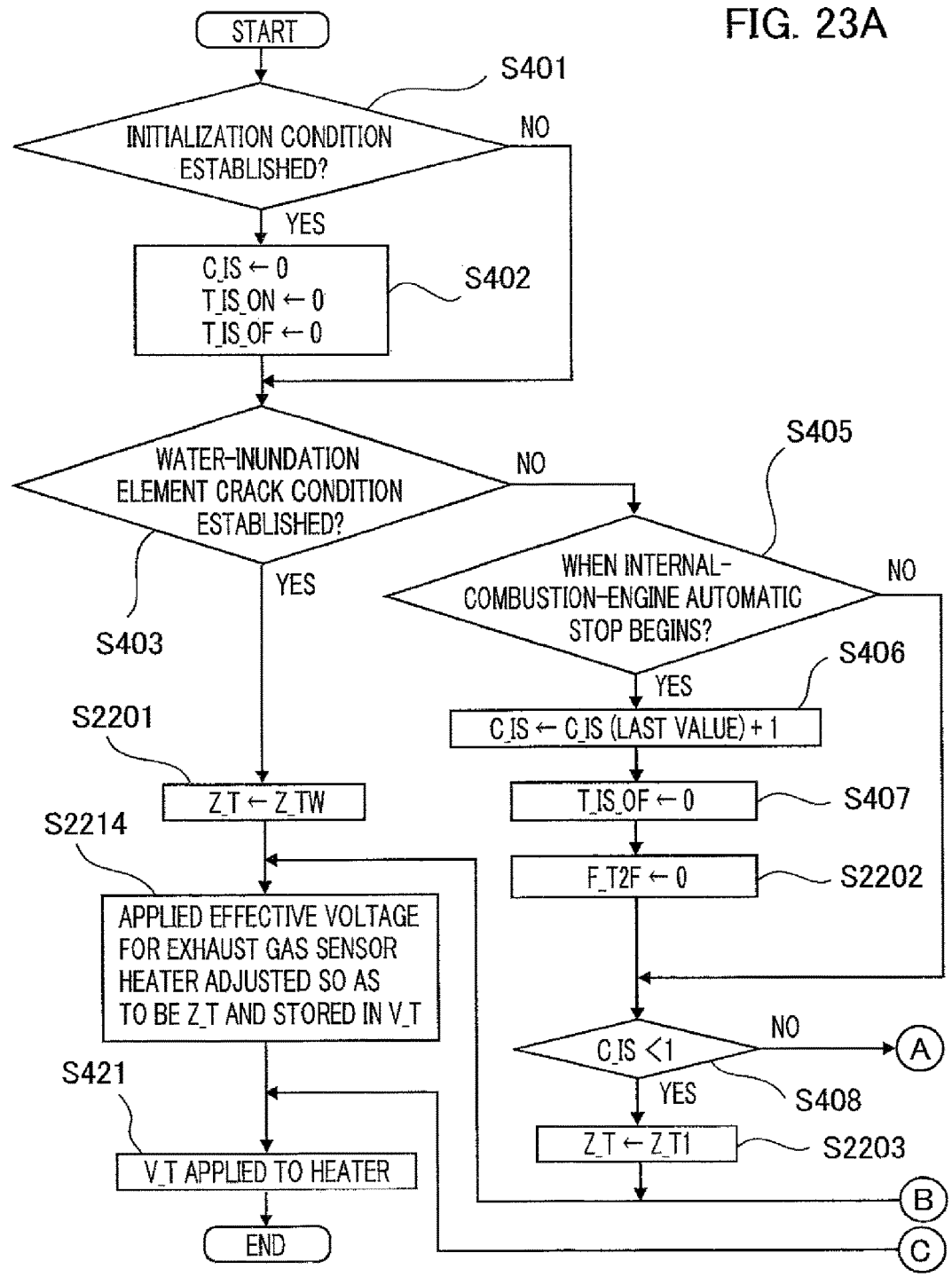
FIGS. 23A and 23B configure a flowchart representing a method of setting a target heater applied effective voltage, in Embodiment 8 of the present invention.
Figure 23B:
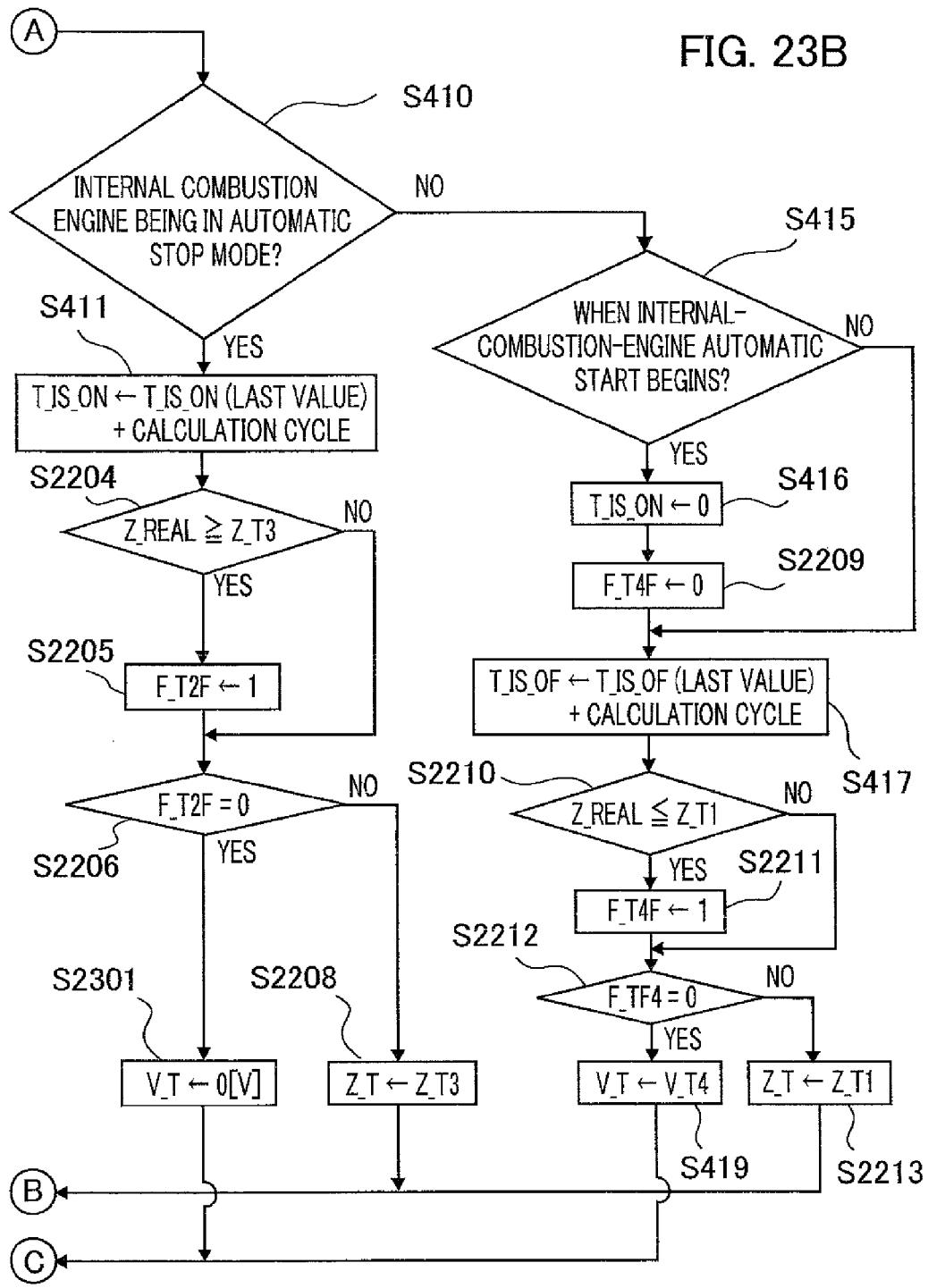

In FIGS. 23A and 23B, when in the step S2206, the second control period end flag F_T2F indicating that the second control period has ended is "0", "0", as the second target applied effective voltage, is stored in the target heater applied effective voltage V_T for the heater 202 in the step S2301; then, the step S2301 is followed by the step S421. In contrast, when in the step S2206, the second control period end flag F_T2F indicating that the second control period has ended is not "0", the third target sensor element impedance Z_T3 is stored in the target sensor element impedance Z_T of the exhaust gas sensor in the step S2208; then, the step S2208 is followed by the step S2214. The flows at the upstream side and the downstream side of the process in the steps S2206, S2301, and S2208 are the same as those in FIGS. 22A and 22B of Embodiment 7.

As described above, in contrast to the invention according to Embodiment 1, an exhaust-gas-sensor heater control device according to Embodiment 8 of the present invention is provided with an impedance measurement means that measures the sensor element impedance of the exhaust gas sensor; and an applied effective voltage setting means that sets an applied effective voltage for the heater in such a way that the sensor element impedance measured by the impedance measurement means becomes equal to a target impedance. The exhaust-gas-sensor heater control device according to Embodiment 8 is configured in such a way as described below. In the first control period, the applied effective voltage setting means sets the first target applied effective voltage in such a manner that the sensor element impedance becomes equal to the first target impedance related to the sensor element target temperature at a time when the internal combustion engine is being operated; in the second control period after the automatic stop mode of the internal combustion engine has started, the applied effective voltage setting means sets the second target applied effective voltage that is lower than the first target applied effective voltage or 0 V (i.e., the heater is stopped); after, in the second control period, the sensor element impedance reaches the third target impedance related to the sensor element target temperature at a time when the internal combustion engine is in the automatic stop mode, the applied effective voltage setting means sets the third target applied effective voltage in such a manner that the third target impedance is maintained in the third control period.

Accordingly, by configuring an exhaust-gas-sensor heater control device in such a manner as described in Embodiment 8, the amount of power consumption during the second control period can be reduced to zero; thus, in comparison with the invention according to Embodiment 7, the amount of power consumption can further be reduced.

Embodiment 9

Next, there will be explained an exhaust-gas-sensor heater control device according to Embodiment 9 of the present invention. In contrast to Embodiment 8, in Embodiment 9, there is described a case where the ambient temperature of the exhaust gas sensor is different from a reference temperature, i.e., a case where the ambient temperature of the exhaust gas sensor varies; the configuration of Embodiment 9 is different from that of Embodiment 3 in providing an impedance measurement means.

Embodiment 9 differs from Embodiment 8 in the following points. That is to say, FIGS. 24A, 24B, and 24C configure a flowchart for explaining characteristic control in Embodiment 9; in FIGS. 24A and 24B, the steps S2401 through S2406 are added and the step S2407 is changed, in contrast to FIGS. 23A and 23B of Embodiment 8.

The difference between FIGS. 24A/24B/24C and FIGS. 23A/23B will be explained below.

Figure 24A:
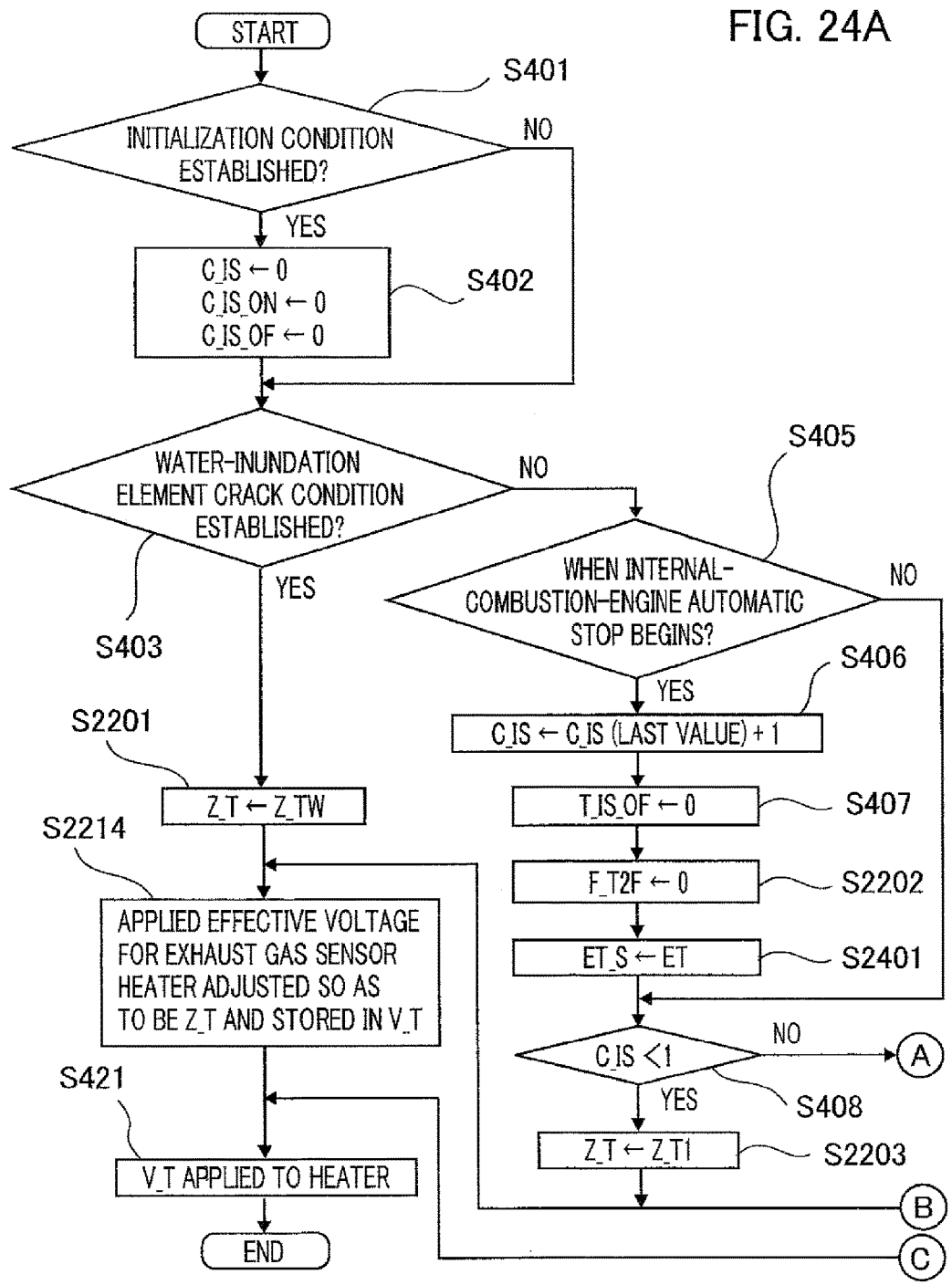
FIGS. 24A, 24B, and 24C configure a flowchart representing a method of setting a target heater applied effective voltage, in Embodiment 9 of the present invention.
Figure 24B:
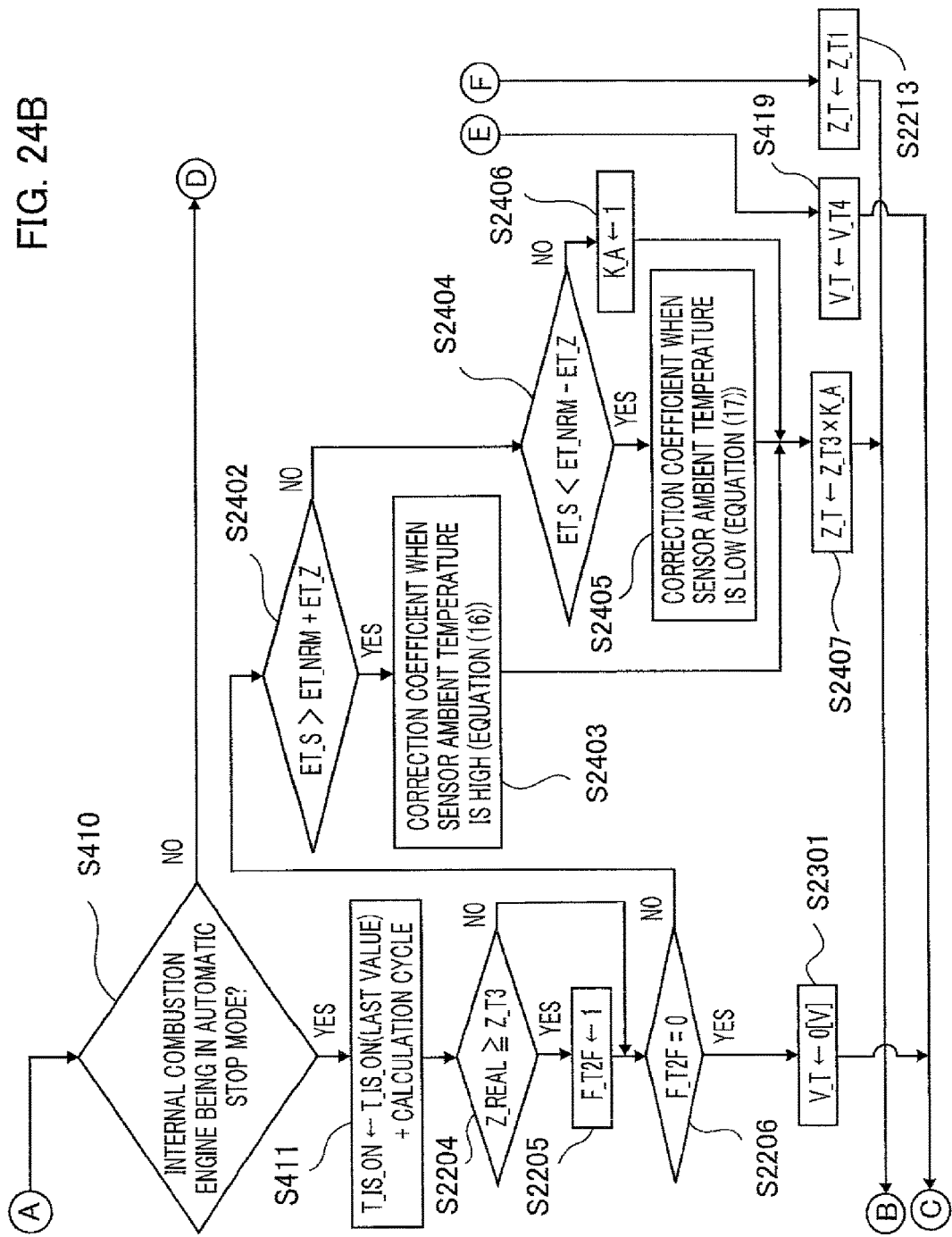
Figure 24C:
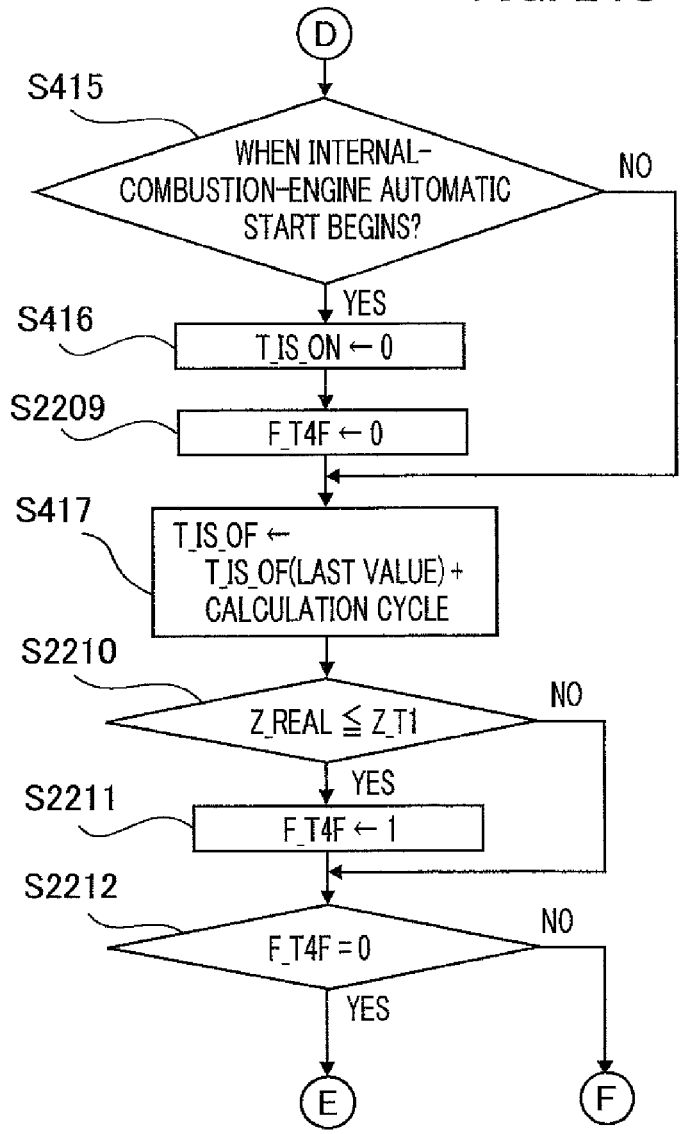

In FIG. 24A, in the case where in the step S405, it is determined that the automatic stop mode of the internal combustion engine 101 is starting, in the step S406, the last value of the count C_IS of automatic stop/automatic start events gains "1" and then is stored in the count C_IS of automatic stop/automatic start events; in the step S407, "0" is stored in the elapsed time T_IS_OF after the internal combustion engine automatically starts, so that T_IS_OF is reset; in the step S2202, "0" is stored in the second control period end flag F_T2F indicating that the second control period has ended, so that F_T2F is reset; in the step S2401, the ambient temperature ET of the exhaust gas sensor at a time the automatic stop mode of the internal combustion engine is starting is stored in an automatic stop staring timing sensor ambient temperature ET_S; then, the step s2401 is followed by the step S408. In contrast, in the case where it is not determined in the step S405 that the automatic stop mode of the internal combustion engine 101 is starting, the step S405 is followed by the step S408.

In the process from the step S408 to the step S2205, the same processing as in FIGS. 23A and 23B is performed; in the case where in the step S2206, the second control period end flag F_T2F indicating that the second control period has ended is "0", "0", as the second target applied effective voltage, is stored in the target heater applied effective voltage V_T for the heater 202 in the step S2301; then, the step S2301 is followed by the step S421. In contrast, in the case where in the step S2206, the second control period end flag F_T2F indicating that the second control period has ended is not "0", the step S2206 is followed by the step S2402, where it is determined whether or not the automatic stop staring timing sensor ambient temperature ET_S is larger than a value obtained by adding the allowable variation amount ET_Z to the reference value ET_NRM for the ambient temperature of the exhaust gas sensor. In the case where it is determined in the step S2402 that the automatic stop staring timing sensor ambient temperature ET_S is larger than a value obtained by adding the allowable variation amount ET_Z to the reference value ET_NRM for the ambient temperature of the exhaust gas sensor, the correction coefficient K_A is calculated in the step S2403, for example, through the equation (16) below, in such a way that the higher the sensor ambient temperature is, the larger the correction coefficient K_A becomes; then, the step S2403 is followed by the step S2407.

$$K\_A = ET\_G1 \times (1+(ET\_S-(ET\_NRM+ET\_Z)) \div ET\_NRM) \quad (16)$$

where ET_G1 is a gain at a time when the automatic stop staring timing sensor ambient temperature ET_S is higher than the reference value ET_NRM.

In contrast, in the case where it is determined in the step S2402 that the automatic stop staring timing sensor ambient temperature ET_S is not larger than a value obtained by adding the allowable variation amount ET_Z to the reference value ET_NRM for the ambient temperature of the exhaust gas sensor, it is determined in the step S2404 whether or not the automatic stop staring timing sensor ambient temperature ET_S is lower than a value obtained by subtracting the allowable variation amount ET_Z from the reference value ET_NRM for the ambient temperature of the exhaust gas sensor. In the case where it is determined in the step S2404 that the automatic stop staring timing sensor ambient temperature ET_S is lower than a value obtained by subtracting the allowable variation amount ET_Z from the reference value ET_NRM for the ambient temperature of the exhaust gas sensor, the correction coefficient K_A is calculated in the step S2405, for example, through the equation (17) below, in such a way that the lower the sensor ambient temperature is, the smaller the correction coefficient K_A becomes; then, the step S2405 is followed by the step S2407.

$$K\_A = ET\_G2 \times (1+(ET\_S-(ET\_NRM+ET\_Z)) \div ET\_NRM) \quad (17)$$

where ET_G2 is a gain at a time when the automatic stop staring timing sensor ambient temperature ET_S is lower than the reference value ET_NRM.

In contrast, in the case where it is determined in the step S2404 that the automatic stop staring timing sensor ambient temperature ET_S is not lower than a value obtained by subtracting the allowable variation amount ET_Z from the reference value ET_NRM for the ambient temperature of the exhaust gas sensor, "1" is stored in the correction coefficient K_A in the step S2406 so that correction at a time when the ambient temperature of the exhaust gas sensor varies is nullified; then, the step S2406 is followed by the step S2407. After the calculation of the correction coefficient K_A is completed, the third target impedance is multiplied by the correction coefficient K_A in the step S2407.

The reference value ET_NRM means a reference value, for the ambient temperature of the exhaust gas sensor, that is preliminarily defined under a predetermined environment, i.e., a reference value at a time before the sensor ambient temperature varies. The predetermined environment means, for example, a state where the temperature of an exhaust gas exhausted from the internal combustion engine 101, the wall surface temperature of an exhaust pipe in the vicinity of the mounting position of the exhaust gas sensor, the temperature of the catalyst 104, the temperature of the outer air, and the like are respective predetermined temperatures.

The allowable variation amount ET_Z is an amount that has a small effect on the sensor element temperature and hence is allowable even when the sensor ambient temperature ET is different from the reference value ET_NRM; the allowable variation amount ET_Z is an amount that is defined by the difference from the reference value and is preliminarily set through matching or the like.

Embodiment 9 is configured in such a way that in the step S2407, the third target impedance is multiplied by the correction coefficient K_A in accordance with the difference between the automatic stop staring timing sensor ambient temperature ET_S and the reference value ET_NRM±allowable variation amount ET_Z; however, even when the correction coefficient is added to or subtracted from the third target impedance in accordance with the difference between the automatic stop staring timing sensor ambient temperature ET_S and the reference value ET_NRM±allowable variation amount ET_Z.

Here, with reference to FIGS. 25A/25B through 26A/26B, there will be explained a problem to be solved by Embodiment 9 and the effect of Embodiment 9 in the case where the ambient temperature of the exhaust gas sensor is different from the reference temperature, i.e., in the case where the ambient temperature of the exhaust gas sensor varies.

Figure 25B:
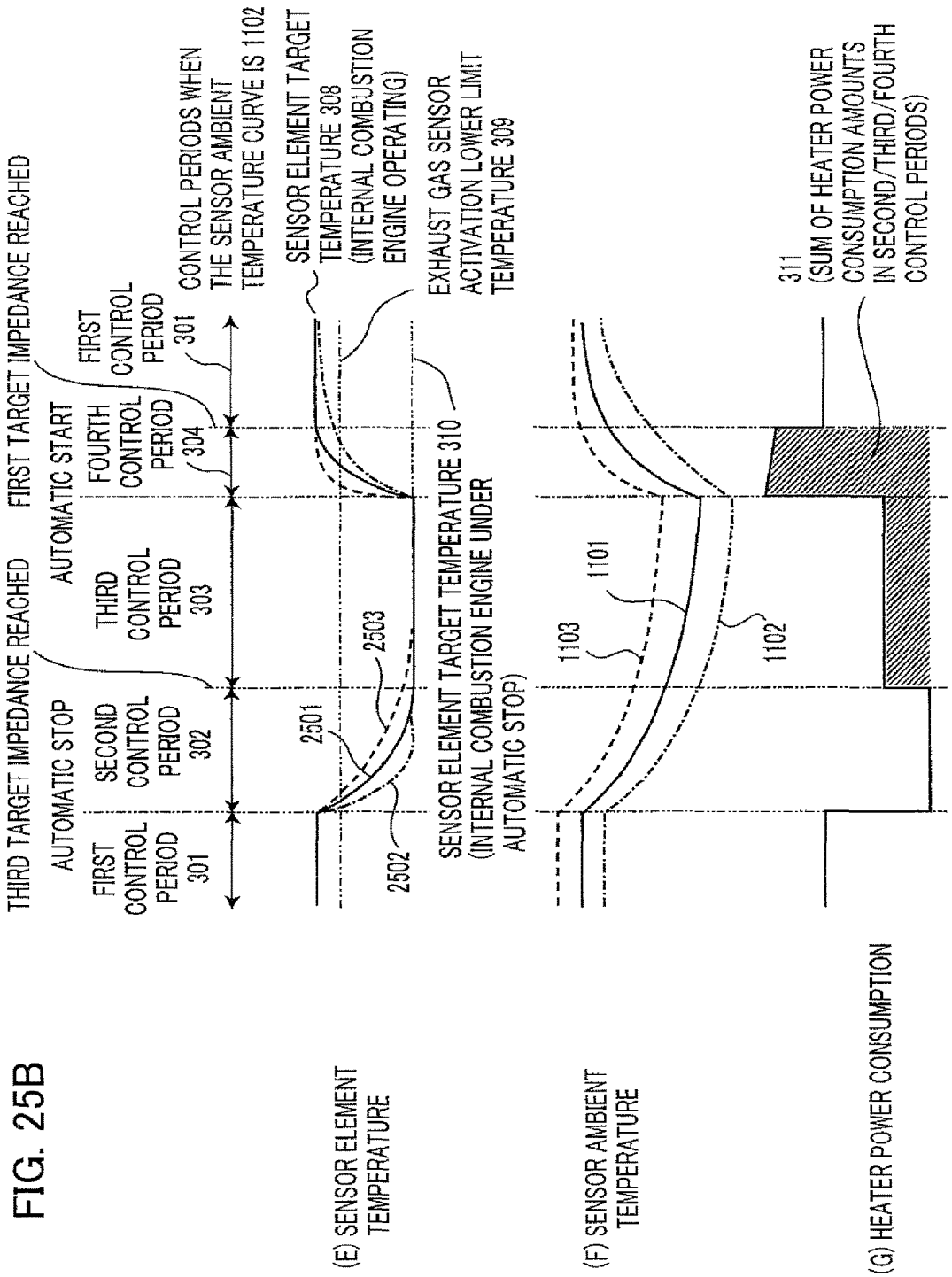

At first, with reference to FIGS. 25A and 25B, there will be explained the problem posed in the case where the correction according to Embodiment 9 is not performed, i.e., in the case where there is not performed correction in which the lower the sensor ambient temperature is, the lower the third target impedance is made, and the higher the sensor ambient temperature is, the higher the third target impedance is made. In FIG. 25B(F), the sensor ambient temperature at a time immediately before the second control period 302, i.e., at a time immediately before the automatic stop mode of the internal combustion engine 101 is started depends on the operation state at a time immediately before the automatic stop mode, the temperature of an exhaust gas exhausted from the internal combustion engine 101, the wall surface temperature of an exhaust pipe in the vicinity of the mounting position of the exhaust gas sensor, the temperature of the catalyst 104, the temperature of the outer air, and the like; for example, in the case where immediately before the automatic stop mode, the vehicle is being idled and the temperature of the outer air is low, because of the low exhaust gas temperature, the automatic stop mode is started when the sensor ambient temperature is also low, and the sensor and its vicinity are cooled from the outside by the low outer air temperature through the exhaust pipe and the like; thus, the sensor ambient temperature becomes lower than a behavior 1101, which is a reference, of the reference value, as represented by a curve 1102. In contrast, for example, in the case where immediately before the automatic stop mode, the internal combustion engine has been being operated with a large load in such a manner that the exhaust gas temperature becomes high, because of the high exhaust gas temperature, the automatic stop mode is started when the sensor ambient temperature is also high; thus, the sensor ambient temperature becomes higher than the behavior 1101, which is a reference, of the reference value, as represented by a curve 1103.

In this situation, in the case where correction according to Embodiment 9 is not performed, the sensor element temperature is affected by the sensor ambient temperature; thus, as represented in FIG. 25B(E), in the case where as the curve 1102, the sensor ambient temperature is low, the sensor element temperature becomes low, as represented by a curve 2502, and in the case where as the curve 1103, the sensor ambient temperature is high, the sensor element temperature becomes high, as represented by a curve 2503. The foregoing effect of the sensor ambient temperature poses problems in the second control period 302 after the internal combustion engine has automatically stopped and in the fourth control period 304 after the internal combustion engine automatically started. That is to say, because in the second control period 302, the second target applied effective voltage is fixed to 0 V so that the sensor element temperature is lowered, the falling speed of the sensor element temperature varies depending on the difference in the sensor ambient temperature; because in the second control period 304, the target applied effective voltage is fixed to the allowable maximum applied effective voltage 14 V so that the sensor element temperature is raised, the rising speed of the sensor element temperature varies depending on the difference in the sensor ambient temperature.

In particular, in the case of the curve 1102, because as represented by the curve 2502 in FIG. 25B(E), the falling speed of the sensor element temperature is raised in the second control period, the time of transition from the second control period to the third control period is shortened; thus, the third control period becomes longer, whereby the amount of power consumption during the third control period becomes larger. In addition, because the sensor ambient temperature is low, the target applied effective voltage for maintaining the third target impedance, i.e., for maintaining the sensor element temperature at the sensor element target temperature 310 at a time when the internal combustion engine is in the automatic stop mode becomes higher, whereby the amount of power consumption during the third control period becomes larger. In contrast, because in the fourth control period, the rising speed of the sensor element temperature becomes slower, the fourth control period becomes longer, whereby the amount of power consumption during the fourth control period becomes larger. In addition, because the fourth control period becomes longer, the sensor element temperature of the exhaust gas sensor may not reach the sensor element target temperature 308 at a time when the internal combustion engine is being operated, by the time the air-fuel ratio feedback control is started.

Next, with reference to FIGS. 26A and 26B, there will be explained the effect in the case where the correction according to Embodiment 9 is performed. At first, in the case where as represented by the curve 1102, the sensor ambient temperature is lower than the reference sensor ambient temperature 1101, the third target impedance Z_T3 is corrected, as a curve 2605 in FIG. 26A(D), to be lower than a reference target applied effective voltage 2604, in accordance with the difference between the sensor ambient temperature ET_S at a time when the automatic stop mode is starting and the reference value ET_NRM−allowable variation amount ET_Z. Accordingly, as a curve 2602 in FIG. 26B(E), the sensor element temperature during the third control period becomes higher than a reference sensor element temperature 2601 with which the temperature of the sensor element is maintained at the sensor element target temperature 310 when the internal combustion engine is in the automatic stop mode; therefore, the sensor element temperature 2602 during the fourth control period becomes close to the behavior of the reference sensor element temperature 2601 during the fourth control period. Therefore, the sensor element temperature can reach the sensor element target temperature 308 at a time when the internal combustion engine is being operated, by the time the air-fuel ratio feedback control is started.

Next, in the case where as represented by the curve 1103, the sensor ambient temperature is higher than the reference sensor ambient temperature 1101, the third target impedance Z_T3 is corrected, as a curve 2606 in FIG. 26A(D), to be higher than a reference target applied effective voltage 2606, in accordance with the difference between the sensor ambient temperature ET_S at a time when the automatic stop mode is starting and the reference value ET_NRM+allowable variation amount ET_Z. Accordingly, as a curve 2603 in FIG. 26B(E), the sensor element temperature during the third control period becomes lower than the reference sensor element temperature 2601 with which the temperature of the sensor element is maintained at the sensor element target temperature 310 when the internal combustion engine is in the automatic stop mode; therefore, the sensor element temperature 2603 during the fourth control period becomes close to the behavior of the reference sensor element temperature 2601 during the fourth control period. Accordingly, the third control period can be shortened, and there can be demonstrated an effect that the amount of power consumption is reduced by lowering the third target applied effective voltage in the third control period.

As described above, in contrast to the invention according to Embodiment 8, an exhaust-gas-sensor heater control device according to Embodiment 9 of the present invention is configured in such a way as to be provided with a sensor ambient temperature estimation means that estimates the ambient temperature of the exhaust gas sensor and in such a way that the third target impedance is corrected in accordance with a sensor ambient temperature estimated by the sensor ambient temperature estimation means.

By configuring, as Embodiment 9, the exhaust-gas-sensor heater control device, in contrast to the invention according to Embodiment 8, in the case where the ambient temperature of the exhaust gas sensor is different from a reference temperature, i.e., in the case where the ambient temperature of the exhaust gas sensor varies, there is performed correction in which the lower the sensor ambient temperature is, the lower the third target impedance is made, and the higher the sensor ambient temperature is, the higher the third target impedance is made. As a result, the exhaust gas sensor can be activated before the air-fuel ratio feedback control is started, whereby the exhaust gas is prevented from being deteriorated, and in addition to that, the amount of heater power consumption can be reduced.

Embodiment 10

Next, there will be explained an exhaust-gas-sensor heater control device according to Embodiment 10 of the present invention. In Embodiment 10, there will be described a method of further reducing the amount of power consumption in comparison with Embodiment 8.

Embodiment 10 differs from Embodiment 8 in the following points. That is to say, FIGS. 27A and 27B configure a flowchart for explaining characteristic control in Embodiment 10; in FIGS. 27A and 27B, the steps S2702 and S2703 are added and the steps S2701 and S2704 are changed, in contrast to FIGS. 23A and 23B of Embodiment 8.

The difference between FIGS. 27A/27B and FIGS. 23A/23B will be explained below.

Figure 27A:
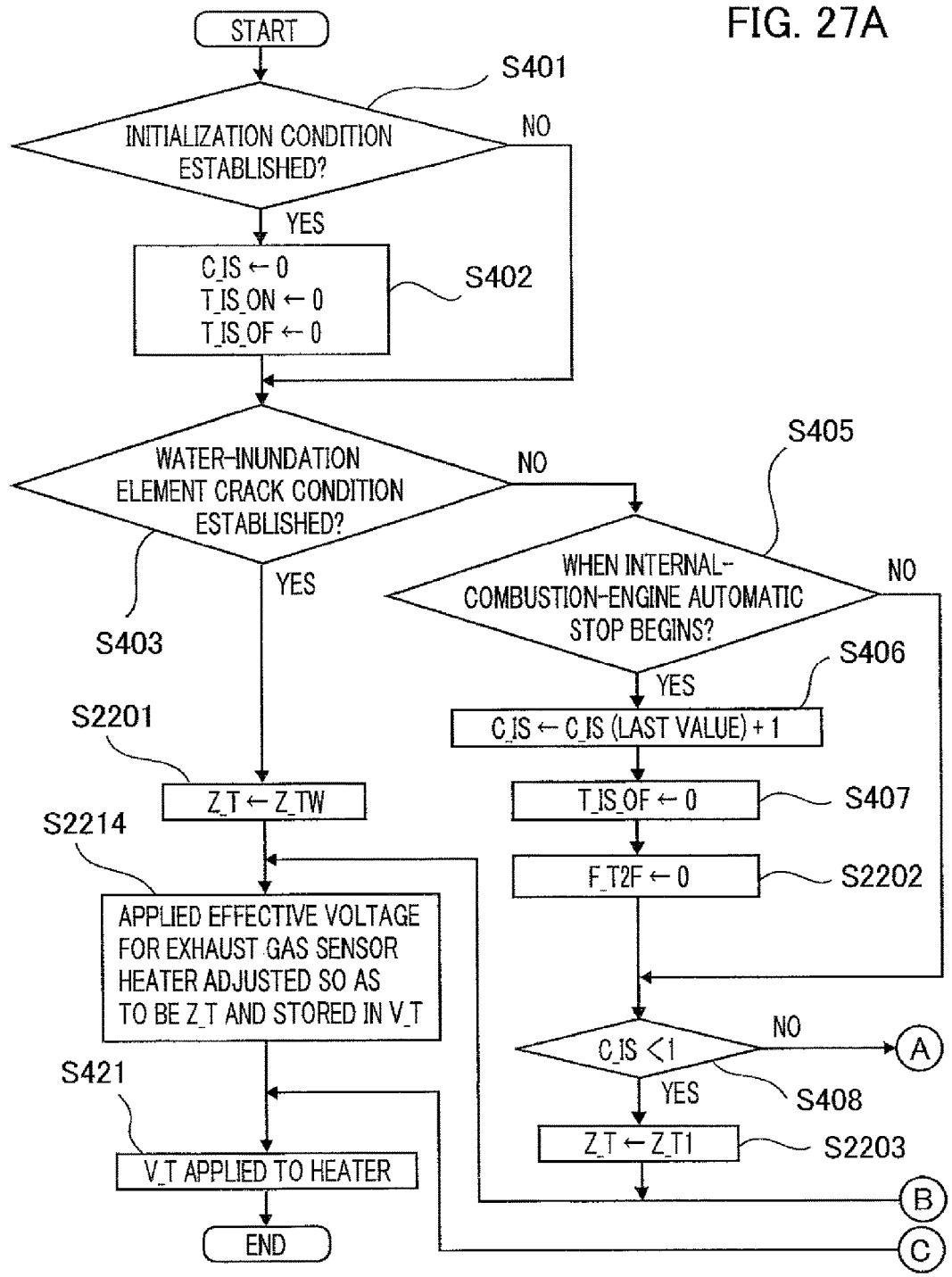
FIGS. 27A and 27B configure a flowchart representing a method of setting a target heater applied effective voltage, in Embodiment 10 of the present invention.
Figure 27B:
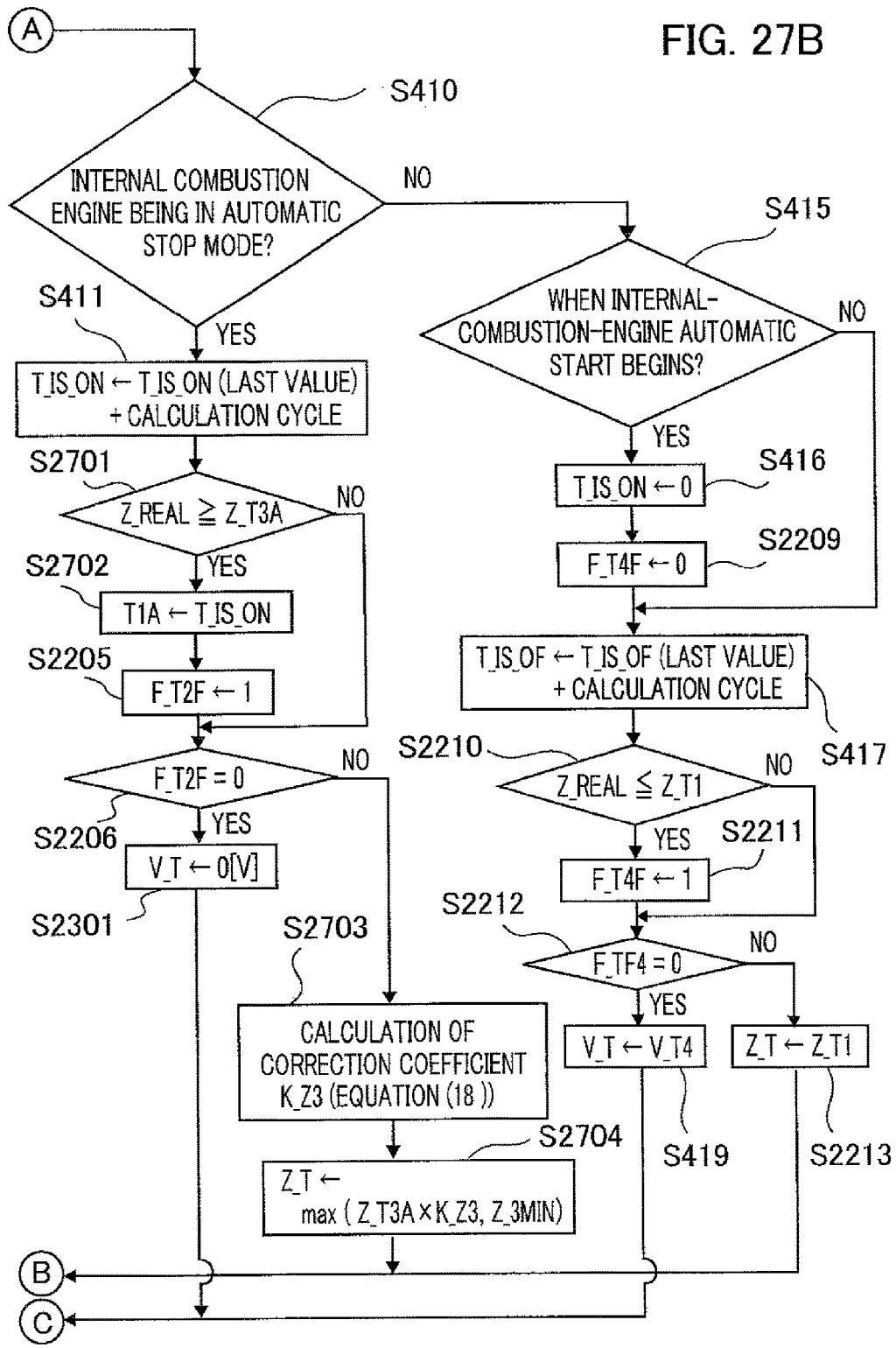

In FIGS. 27A and 27B, in the case where it is determined in the step S410 that the internal combustion engine 101 is in the automatic stop mode, the last value of the elapsed time T_IS_ON from the start of the automatic stop mode gains the calculation processing cycle and is stored in the elapsed time T_IS_ON in the step S411; then, the step S411 is followed by the step S2701.

Next, in the case where in the step S2701, the real impedance Z_REAL measured by the impedance measurement means is the same as or larger than a third target sensor element impedance Z_T3A, the elapsed time T_IS_ON from the start of the automatic stop mode is stored, in the step S2702, in an elapsed time T1A during the second control period; then, in the step S2205, "1" is stored in the second control period end flag F_T2F indicating that the second control period has ended, and then, the step S2205 is followed by the step S2206. In contrast, in the case where in the step S2701, the real impedance Z_REAL measured by the impedance measurement means is smaller than the third target sensor element impedance Z_T3A, the step S2701 is followed by the step S2206.

Next, in the case where in the step S2206, the second control period end flag F_T2F indicating that the second control period has ended is "0", "0", as the second target applied effective voltage, is stored in the target heater applied effective voltage V_T for the heater 202 in the step S2301; then, the step S2301 is followed by the step S421. In contrast, when in the step S2206, the second control period end flag F_T2F indicating that the second control period has ended is not "0", i.e., when the present time point is in the third control period, the step S2206 is followed by the step S2703, where there is calculated a correction coefficient K_T3 that is given by the equation (18) below and becomes smaller as the elapsed time from the start of the automatic stop mode becomes longer; then, the step S2703 is followed by the step S2704.

$$K\_Z3 = ISZ\_G \times (T\_IS\_ON - T1A) \div (T\_IS\_ON\_MAX - T1A) + ISZ\_OFST \quad (18)$$

In the step S2704, a value obtained by multiplying the third target sensor element impedance Z_T3A by the correction coefficient K_Z3 and a lower limit value Z_T3MIN of the third target sensor element impedance Z_T3 are compared with each other, and the larger one is stored in the target sensor element impedance Z_T of the exhaust gas sensor; then, the step S2704 is followed by the step S2214.

The gain ISZ_G is set to be a negative value so that the correction coefficient K_Z3 given by the equation (18) becomes smaller as the elapsed time from the start of the automatic stop mode of the internal combustion engine is longer. In addition, an offset amount IST_OFST is set to be between −1 and 0, and there is performed an adjustment on how much the third target sensor element impedance Z_T3A is offset.

The lower limit value Z_T3MIN of the third target sensor element impedance Z_T3 is set to be, for example, a value the same as or larger than the first target impedance (Z_T1), which is a sensor element impedance corresponding to a temperature at which the sensor element of the exhaust gas sensor is activated.

A value obtained by multiplying the third target sensor element impedance Z_T3A by the correction coefficient K_Z3 and a lower limit value Z_T3MIN of the third target sensor element impedance Z_T3 are compared with each other, and the larger one is stored in the target sensor element impedance Z_T of the exhaust gas sensor, so that a lower limit clip is provided; however, there may be allowed a method in which instead of performing comparison with the lower limit value V_T3MIN and selecting the larger one, clipping is made by the target sensor element impedance Z_T(=Z_T3A×K_Z3) at a time when a predetermined time has elapsed from the beginning of the third control period.

In the case where it is not determined in the step S410 that the internal combustion engine 101 is in the automatic stop mode, the step S410 is followed by the step S415; in and after the step S415, the same processing as in FIGS. 23A and 23B of Embodiment 8 is performed.

Here, with reference to a timing chart in FIGS. 28A and 28B, the problem to be solved by Embodiment 10 and the effect of Embodiment 10 will be explained.

At first, there will be explained the problem posed in the case where the correction according to Embodiment 10 is not performed.

In the case of an automatic stop/automatic start device that automatically starts an internal combustion engine when after the start of the automatic stop mode of the internal combustion engine, the driver' intention of starting the vehicle is expressed (e.g., stepping on the accelerator pedal or the clutch pedal, release of the brake pedal, or the like), the control apparatus 107 does not preliminarily know when the automatic stop mode is cancelled and the internal combustion engine automatically starts. Accordingly, in Embodiment 8, the third target applied effective voltage is set, as a fixed value, to be a target impedance related to the sensor element target temperature 310 at a time when the internal combustion engine is in the automatic stop mode, in such a manner as described in the foregoing paragraph, so that even when the internal combustion engine automatically starts at an arbitrary timing, the sensor element temperature can reach the sensor element target temperature 308 at a time when the internal combustion engine is being operated, by the time the air-fuel ratio feedback control is started. However, as represented by a sensor ambient temperature 2807 in FIG. 28B(F), the sensor ambient temperature in the former part of the third control period is higher than that in the latter part thereof. Therefore, in the case where the internal combustion engine automatically starts in the former part of the third control period, there is shortened the period in which after the internal combustion engine automatically starts, the temperature of the sensor element of the exhaust gas sensor reaches the sensor element target temperature 308 at a time when the internal combustion engine is being operated, in comparison with a case where the internal combustion engine automatically starts in the latter part of the third control period. Therefore, by performing correction of making the third target impedance during the former part of the third control period higher than the third target impedance during the latter part of the third control period, the amount of power consumption can further be reduced.

Figure 28A:
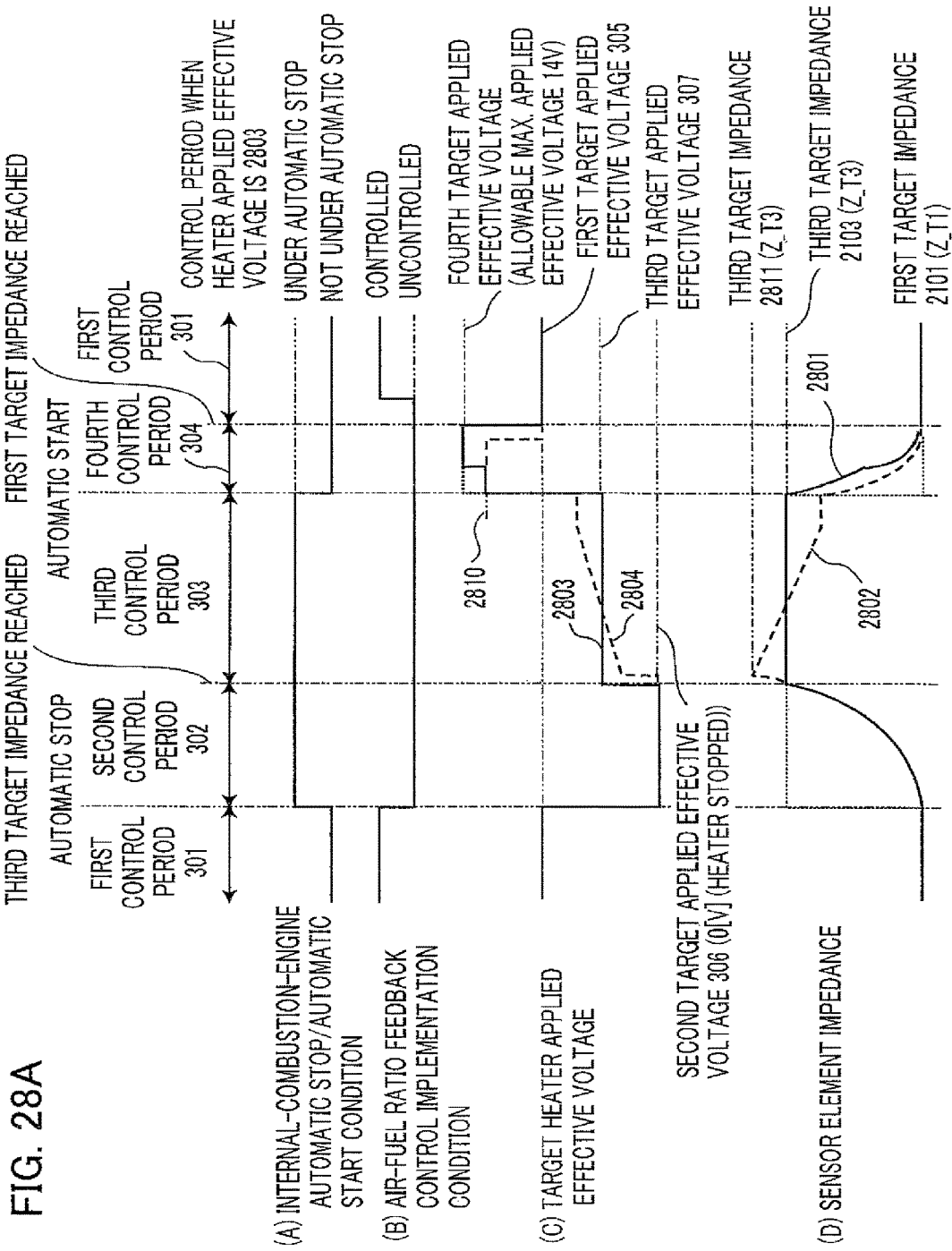
FIGS. 28A and 28B configure a timing chart for explaining the problem posed when correction according to Embodiment 10 of the present invention is not implemented and the effect demonstrated by performing correction in which the third target impedance becomes lower as the elapsed time from the start of the automatic stop mode is longer.

In such a system in which the battery, as a power source, is shared by the starting device of the internal combustion engine, the starting device requires electric power while the internal combustion is started, whereby the battery voltage lowers while the internal combustion engine is starting; therefore, as represented by a curve 2810 in FIG. 28A(C), the allowable maximum applied effective voltage (14 V) cannot be applied to the heater during the fourth control period immediately after the internal combustion engine has started. Accordingly, as represented by a curve 2805 in FIG. 2805, the heat-up speed of the sensor element temperature during the fourth control period immediately after the internal combustion engine has automatically started is lowered, whereby the sensor element temperature may not reach the sensor element target temperature 308 at a time when the internal combustion engine is being operated, by the time the air-fuel ratio feedback control is started. In the case where the third target impedance is set in such a way that the sensor element temperature reaches the sensor element target temperature 308 at a time when the internal combustion engine is being operated, by the time the air-fuel ratio feedback control is started, the third target impedance is set to be a small value, i.e., the sensor element target temperature at a time when the internal combustion engine is in the automatic stop mode is set to be a high value, in comparison with a case where the allowable maximum applied effective voltage (14 V) is applied constantly during the fourth control period; thus, the amount of power consumption increases.

Next, there will be explained the effect in the case where the correction according to Embodiment 10 is performed. That is to say, as represented by a curve 2802 in FIG. 28A(D), there is performed correction in which the target impedance during the former part of the third control period is made higher than that during the latter part of the third control period, so that as represented by a curve 2807 in FIG. 28B(G), the amount of power consumption in the former part thereof can be reduced; thus, when the internal combustion engine automatically starts in the former part of the third control period, the amount of power consumption can be reduced, in comparison with Embodiment 8.

Figure 28B:
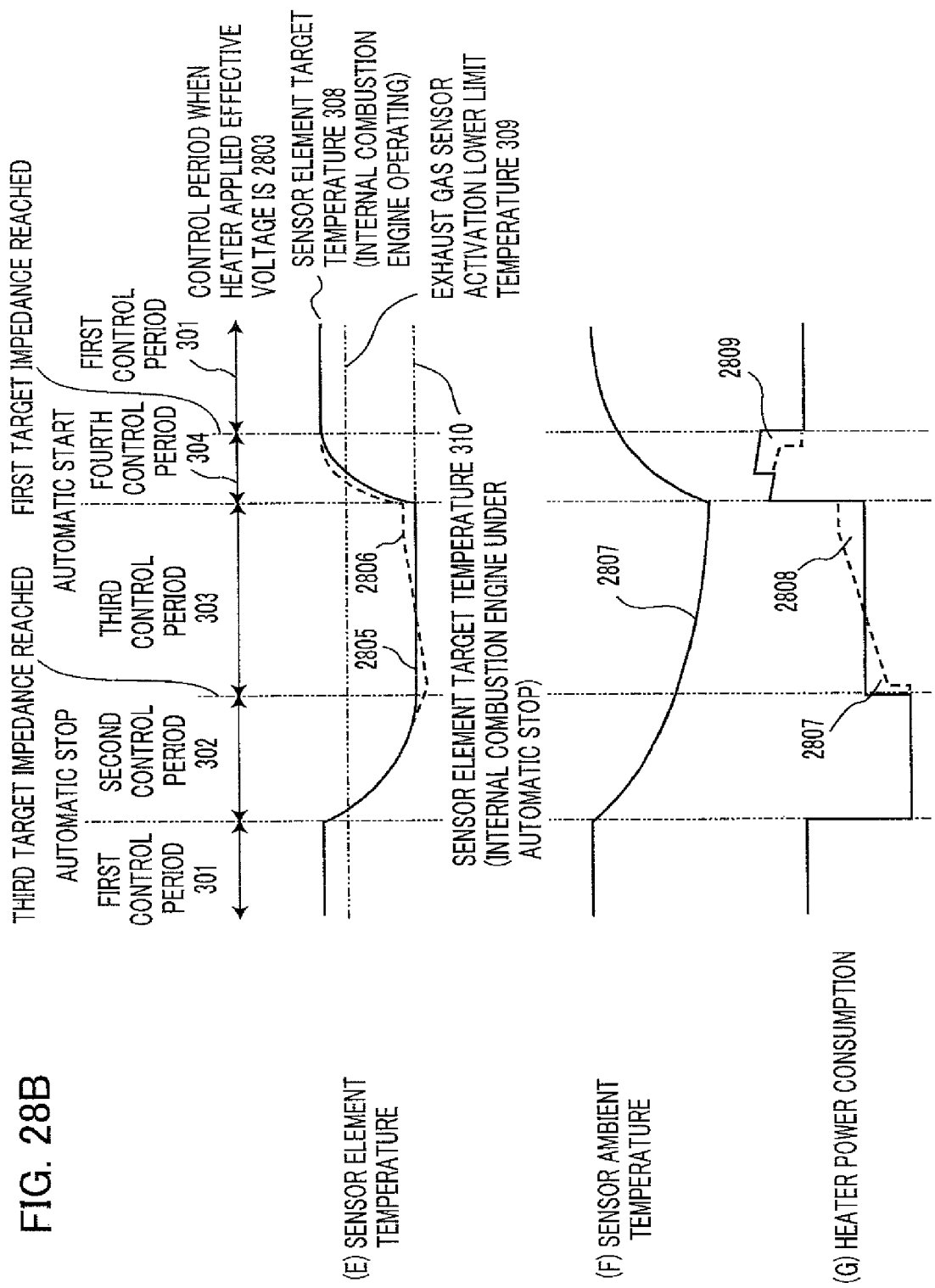

As represented by the curve 2802 in FIG. 28A(D), there is performed correction in which the target impedance during the latter part of the third control period is made lower than the third target impedance 2103, so that as represented by a curve 2804 in FIG. 28A(C), the target applied effective voltage for raising the sensor element temperature during the fourth control period can be lowered; therefore, the amount of power consumption can be reduced, as represented by a curve 2809 in FIG. 28B(G), and when being started, the internal combustion engine does not undergo the effect of a drop in the battery voltage.

In this situation, as represented by a curve 2808 in FIG. 28B(G), the amount of power consumption increase in the latter part of the third control period; however, the gain ISZ_G and the offset amount ISZ_OFST in the equation (18) are preliminarily set in such a way that the difference between the respective amounts of power consumption represented by the curves 2808 and 2809 becomes small.

In other words, as the elapsed time from the start of the automatic stop mode becomes longer with respect to the maximum automatic stop period T_IS_ON_MAX, i.e., as the elapsed time from the start of the automatic stop mode becomes closer to the maximum automatic stop period T_IS_ON_MAX, the probability of the automatic starting becomes higher; thus, by preliminarily raising the residual-heat temperature at a time when the internal combustion engine is in the automatic stop mode, the power consumption for raising the temperature at a time after the automatic starting can be suppressed. Moreover, even in the case where during the fourth control period immediately after the automatic start, the applied effective voltage is the same as or lower than the allowable maximum applied effective voltage (14 V), the sensor element temperature can be raised by the time the air-fuel ratio feedback control is started; therefore, when being started, the internal combustion engine does not undergo the effect of a drop in the battery voltage.

As described above, in contrast to the invention according to Embodiment 8, an exhaust-gas-sensor heater control device according to Embodiment 10 of the present invention is configured in such a way that the third target impedance is corrected to become lower as the elapsed time from the start of the automatic stop mode, measured by the automatic stop mode elapsed time measurement means, becomes longer.

Accordingly, in comparison with Embodiment 8, Embodiment 10 can further reduce power consumption and can raise the sensor element temperature by the time the air-fuel ratio feedback control is started, without being affected by a drop in the battery voltage at a time when the internal combustion engine is starting.

Embodiment 11

Next, there will be explained an exhaust-gas-sensor heater control device according to Embodiment 11 of the present invention. In contrast to each of Embodiments 7 through 10, even in the case where the relationship between the sensor element temperature and the sensor element impedance changes due to a change in characteristics caused by variation or deterioration in the characteristics of the sensor element, Embodiment 11 reduces the heater power consumption at a time when the internal combustion engine is in the automatic stop mode, prevents the sensor element temperature from being delayed in reaching the activation temperature in response to an air-fuel ratio detection demand at a time after the internal combustion engine has automatically started, and can prevent the starting timing of the air-fuel ratio feedback control from being delayed, so that the gasoline mileage and the exhaust gas are prevented from being deteriorated.

Figure 29A:
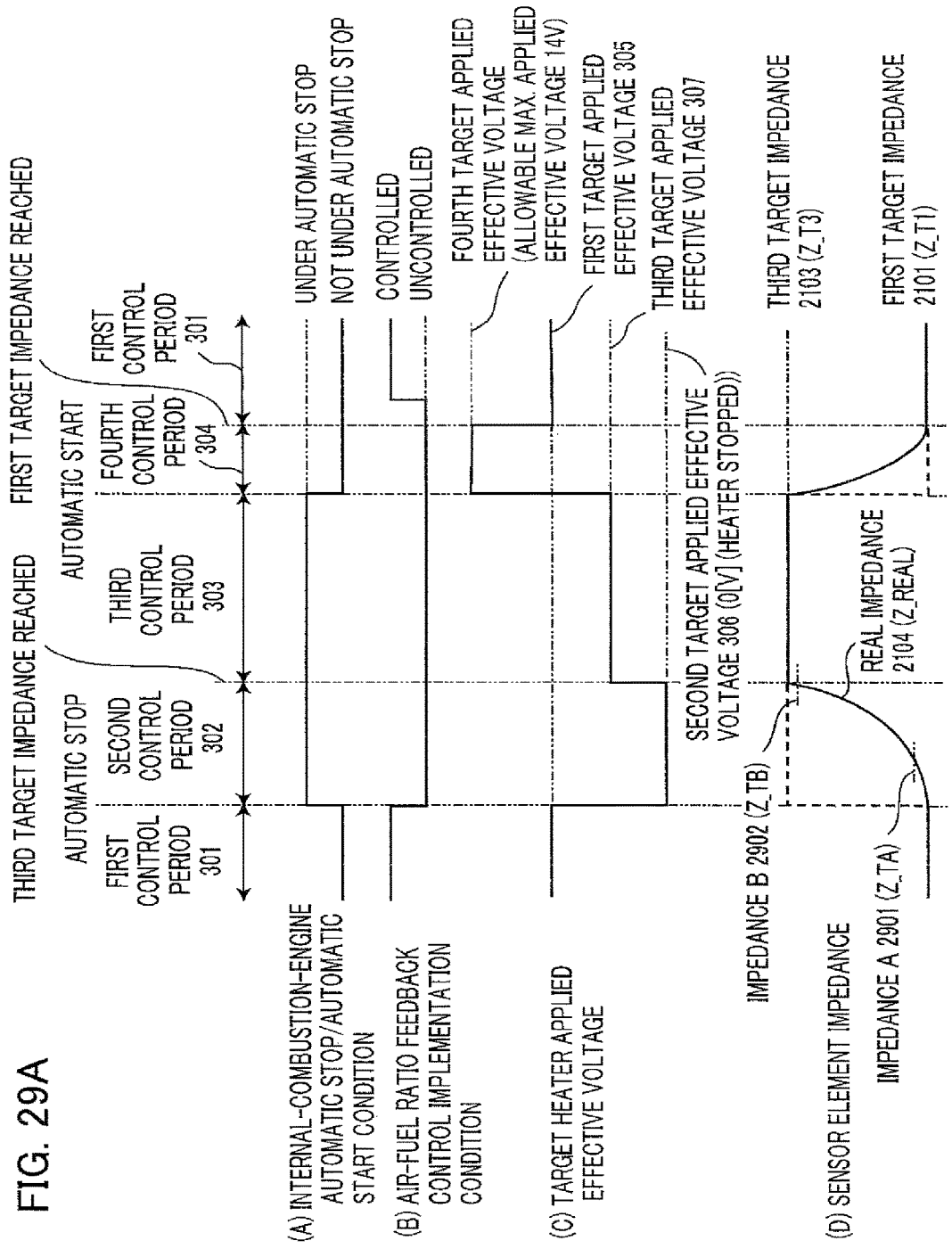
FIGS. 29A and 29B configure a timing chart representing heater control at a time when an internal combustion engine is in the automatic stop mode, in Embodiment 11 of the present invention.

At first, with reference to a timing chart in FIGS. 29A and 29B, there will be explained the exhaust-gas-sensor heater control device 112 according to Embodiment 11 of the present invention. FIG. 29A(A) represents the automatic stop period and the timing of the automatic stop/automatic start of the internal combustion engine 101, realized by the automatic stop/automatic start device 111 of the control apparatus 107; FIG. 29A(B) represents the starting timing/ ending timing of air-fuel ratio feedback control by the air-fuel ratio control device 110 of the control apparatus 107.

Next, in the first control period 301 in which the internal combustion engine 101 is being operated, a target heater applied effective voltage is set in such a way that as represented in FIG. 29A(D), a real impedance 2104 (Z_REAL) measured by the impedance measurement means that measures the sensor element impedance of the exhaust gas sensor becomes equal to a first target impedance 2101 (Z_T1) related to the sensor element target temperature 308 (e.g., the sensor element temperature of the exhaust gas sensor at which the exhaust gas sensor is activated) at a time when the internal combustion engine is being operated.

Next, in the second control period 302 after the internal combustion engine 101 has automatically stopped, as represented in FIG. 29A(C), the applied effective voltage for the heater is set to 0 V (heating is stopped), so that the sensor element temperature is lowered and the real impedance 2104 (Z_REAL) reaches the third target impedance 2103 (Z_T3) related to the sensor element target temperature 310 at a time when the internal combustion engine 101 is in the automatic stop mode.

In addition, the heater stopping period during the second control period 302 may be a period in which the operation amount of the real impedance 2104 (Z_REAL), controlled by the feedback control method (e.g., PID control method) with respect to the third target impedance 2103 (Z_T3), is limited to the lower limit value 0 V of the applied effective voltage for the heater.

Next, as represented in FIG. 29A(D), in a period from a time point when the real impedance 2104 (Z_REAL) reaches a third target impedance 2103 (Z_T3) to a time point when the internal combustion engine 101 automatically starts, there is set a target heater applied effective voltage with which the real impedance 2104 (Z_REAL) becomes equal to the third target impedance 2103 (Z_T3).

Next, in the fourth control period 304 which is a period after the internal combustion engine 101 has automatically started, as represented in FIG. 29A(C), the target heater applied effective voltage is set to a fourth target applied effective voltage (e.g., the allowable maximum applied effective voltage 14 V) until the real impedance 2104 (Z_REAL) reaches the first target impedance 2101 (Z_T1), as represented in FIG. 29A(D), so that the real impedance 2104 (Z_REAL) rapidly reaches the first target impedance 2101 (Z_T1). Such a system in which the battery, as a power source, is shared by the starting device of the internal combustion engine suffers restriction by a decrease, in the battery voltage, that is caused while the internal combustion engine is started; therefore, the battery voltage value at that moment is the maximum applied effective voltage.

Next, in the first control period 301 that follows the period in which the real impedance 2104 (Z_REAL) reaches the first target impedance 2101 (Z_T1), there is set a target heater applied effective voltage with which the real impedance 2104 (Z_REAL) becomes equal to the first target impedance 2101 (Z_T1).

In this situation, the first target impedance 2101 (Z_T1) is set to an impedance corresponding to the sensor element target temperature 308 at a time when the internal combustion engine 101 is being operated.

Figure 29B:
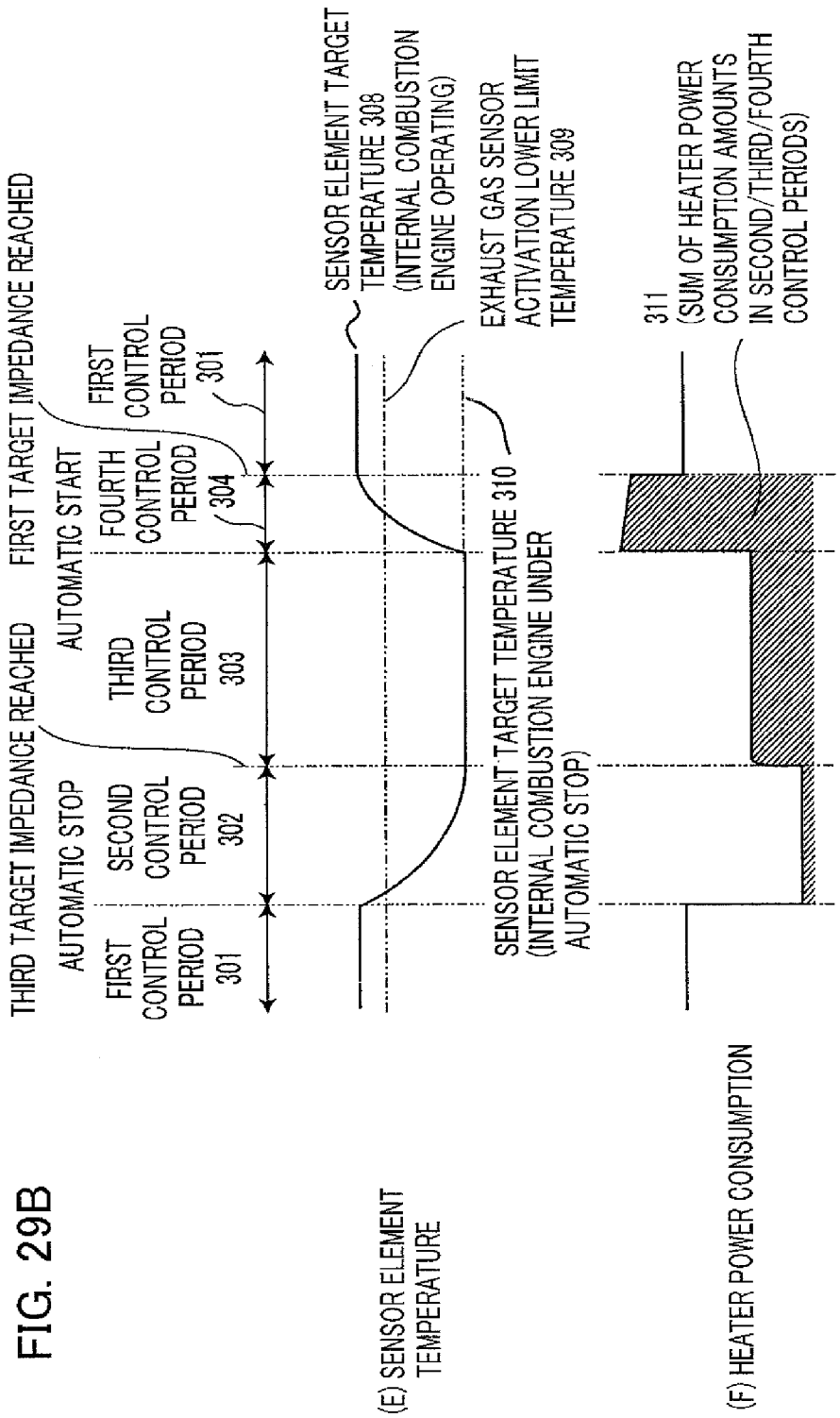

The third target impedance 2103 (Z_T3) is preliminarily set, through a matching test or the like, to an impedance corresponding to the sensor element target temperature 310 at a time when the internal combustion engine 101 is in the automatic stop mode, for example, in such a way that after the internal combustion engine 101 automatically starts, the fourth target applied effective voltage in the fourth control period is applied so that the sensor element temperature reaches the first target impedance 2101 (Z_T1), by the time the air-fuel ratio detection demand for the air-fuel ratio feedback control is issued, and in such a way that the sum 311 (refer to FIG. 29B(F)) of the amounts of heater power consumptions in the second control period 302, the third control period 303, and the fourth control period 304 becomes minimum.

The lower is the sensor element target temperature 310 at a time when the internal combustion engine 101 is in the automatic stop mode set in the third control period 303, the larger becomes the temperature width along which the sensor element temperature need to rise within the fourth control period 304; thus, the time in which the sensor element target temperature 308 at a time when the internal combustion engine 101 is being operated becomes longer, and the amount of power consumption during the fourth control period 304 becomes large; however, the amount of power consumption during the third control period becomes smaller.

In contrast, the higher is the sensor element target temperature 310 at a time when the internal combustion engine 101 is in the automatic stop mode set in the third control period 303, the smaller becomes the temperature width along which the sensor element temperature need to rise within the fourth control period 304; thus, the time in which the sensor element target temperature 308 at a time when the internal combustion engine 101 is being operated becomes shorter, and the amount of power consumption during the fourth control period 304 becomes smaller; however, the amount of power consumption during the third control period becomes larger.

Next, FIG. 30A is a characteristic graph of the sensor element impedance vs. the sensor element temperature.

As represented in FIG. 30A, due to variation or deterioration in the sensor element impedance, the real temperature of the sensor element varies even at the same impedance. In other words, even when the sensor element impedance coincides with the first target impedance 2102, the real temperature of the sensor element varies within a variation range 3005, and even when the sensor element impedance coincides with the third target impedance 2103, the real temperature of the sensor element varies within a variation range 3006. For example, it can be seen that the real temperature of an initially-lower-limit-impedance sensor element 3001 is lower than that of an impedance-deteriorated sensor element 3004.

Figure 30B:
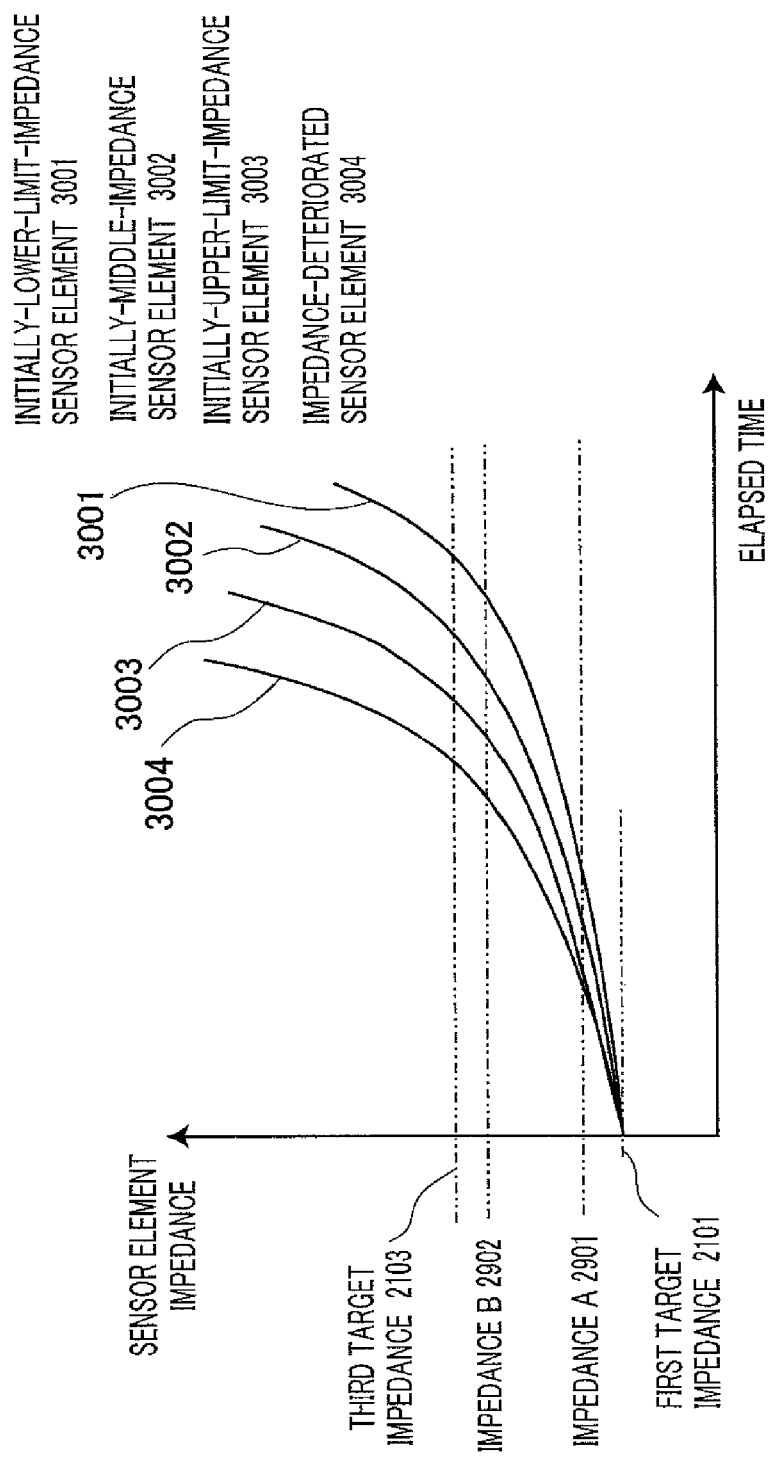
Figure 30C:
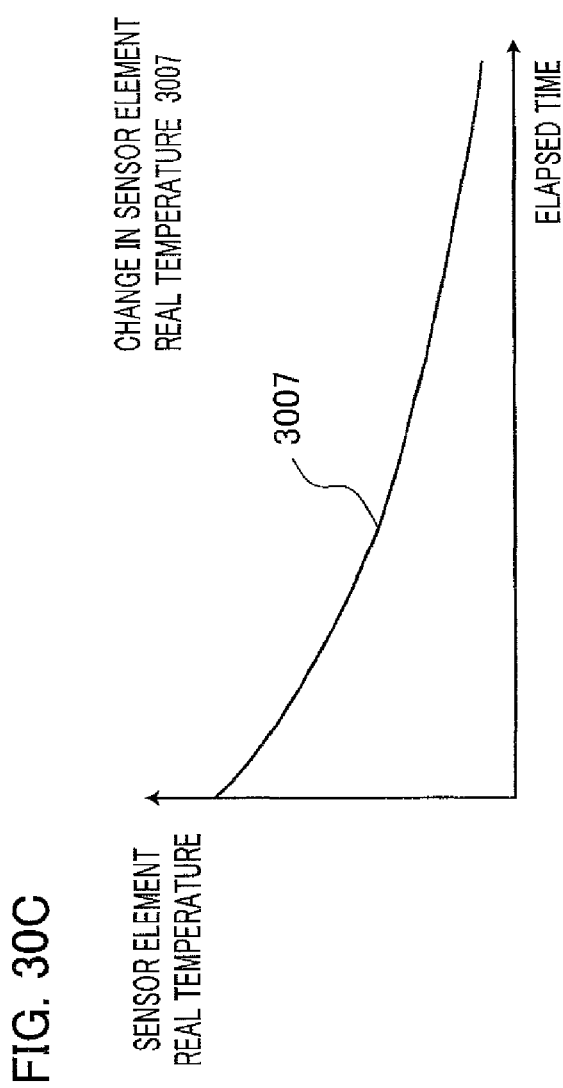

FIG. 30B is a graph representing the rise in the sensor element impedance vs. the elapsed time after the heater applied effective voltage is set to 0 V (heater is stopped) when in the second control period 302 in FIGS. 29A and 29B, the sensor element impedance is controlled to be the first target impedance 2101 (Z_T1). FIG. 30C is a graph representing the real temperature of the sensor element vs. the elapsed time in FIG. 30B.

As represented by a sensor-element real temperate change 3007 in FIG. 30C, the respective changes in the real temperatures of the initially-lower-limit-impedance sensor element 3001, the initially-middle-impedance sensor element 3002, an initially-upper-limit-impedance sensor element 3003, and the impedance-deteriorated sensor element 3004 are the same (or in comparison with change in the impedance characteristics due to variation or deterioration in the characteristics of the sensor element, the differences among the real temperatures of the sensor elements are sufficiently small); however, due to the characteristic change, as represented in FIG. 30A, caused by variation or deterioration in the characteristics of the sensor elements, the time in which the sensor element impedance reaches the third target impedance 2103 (Z_T3) varies as represented in FIG. 30B. In other words, it can be seen from FIG. 30B that in the case of the initially-lower-limit-impedance sensor element 3001, the time in which the sensor element temperature is raised from the first target impedance 2101 (Z_T1) to the third target impedance 2103 (Z_T3) is longer, and in the case of the impedance-deteriorated sensor element 3004, the foregoing time is shorter.

Figure 31A:
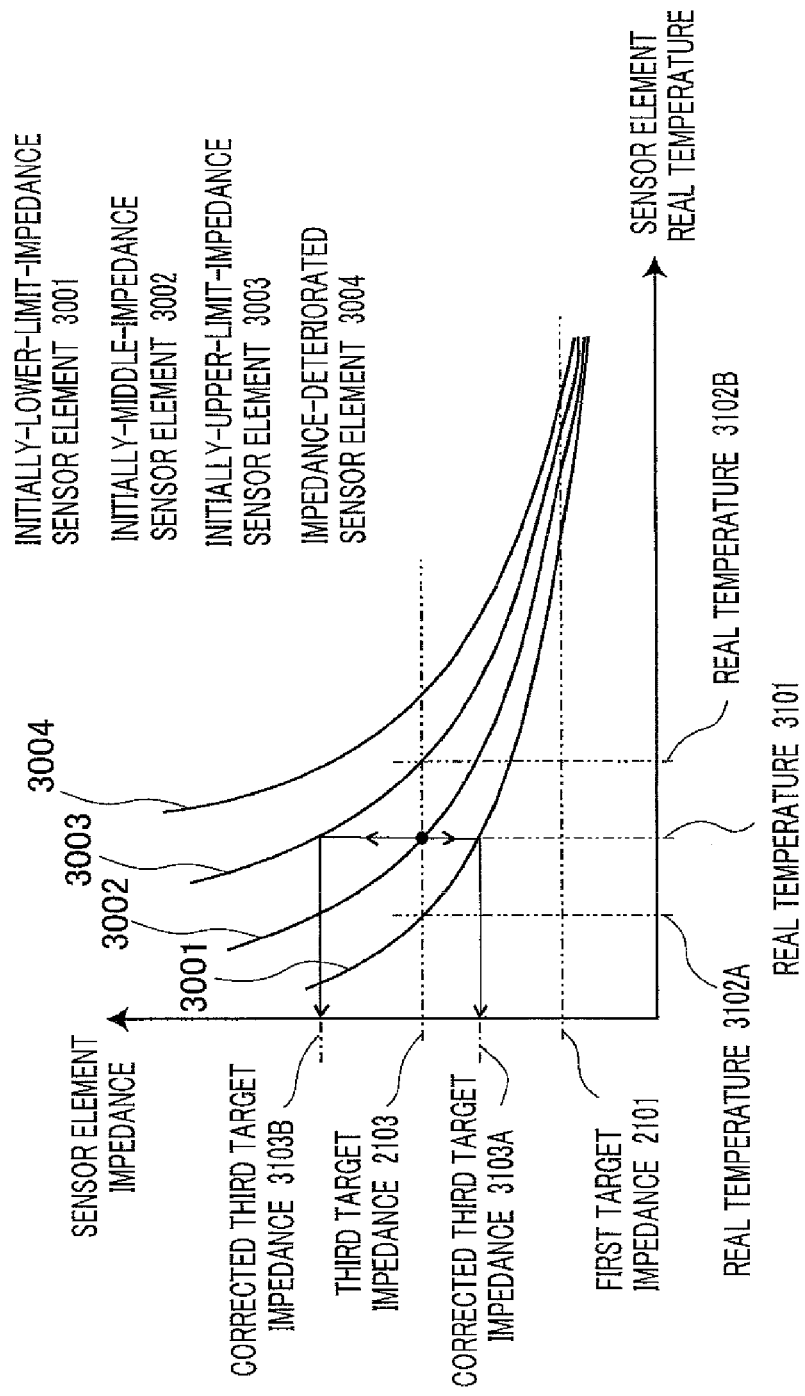

FIGS. 31A and 31B are to explain, with reference to the same characteristic graphs as those in FIGS. 30A and 30B, the reason why there is performed correction in which the shorter the heater stopping period is, the higher the third impedance is made, and the longer the heater stopping period is, the lower the third impedance is made, which is the feature of Embodiment 11 of the present invention. In FIG. 31A, in the case of the initially-middle-impedance sensor element 3002, the applied effective voltage for the heater is adjusted in such a way that the sensor element impedance measured by the exhaust-gas-sensor heater control device 112 becomes equal to the third target impedance 2103, so that the sensor element temperature is controlled to be a real temperature 3101 while the internal combustion engine is in the automatic stop mode.

However, for example, in the case of the initially-lower-limit-impedance sensor element 3001, when the applied effective voltage for the heater is adjusted in such a way that the sensor element impedance becomes equal to the third target impedance 2103, the real temperature of the sensor element becomes a real temperature 3102A. Thus, the applied effective voltage for the heater is adjusted in such a way that the sensor element impedance becomes equal to a third target impedance 3103A so that even in the case of the initially-lower-limit-impedance sensor element 3001, the real temperature of the sensor element is controlled to be the real temperature 3101.

For example, in the case of the initially-upper-limit-impedance sensor element 3003, when the applied effective voltage for the heater is adjusted in such a way that the sensor element impedance becomes equal to the third target impedance 2103, the real temperature of the sensor element becomes a real temperature 3102B. Thus, the applied effective voltage for the heater is adjusted in such a way that the sensor element impedance becomes equal to a third target impedance 3103B so that even in the case of the initially-upper-limit-impedance sensor element 3003, the real temperature of the sensor element is controlled to be the real temperature 3101.

In this situation, the corrected third target impedances 3103A and 3103B can be determined from the relationship between the elapsed time and the sensor element impedance during the second control period represented in FIGS. 29A and 29B. In other words, as represented in FIG. 31B, in the case of the initially-lower-limit-impedance sensor element 3001, the third target impedance is lowered in such a way that the elapsed time 3105A becomes equal to the elapsed time 3104. That is to say, correction may be performed in such a way that the longer is the heater stopping period with respect to the elapsed time 3104 in the case of the initially-middle-impedance sensor element 3002, the lower is made the third target impedance 2103. In the case of the initially-upper-limit-impedance sensor element 3003, the third target impedance is raised in such a way that the elapsed time 3105B becomes equal to the elapsed time 3104. That is to say, correction may be performed in such a way that the shorter is the heater stopping period with respect to the elapsed time 3104 in the case of the initially-middle-impedance sensor element, the higher is made the third target impedance 2103.

Next, characteristic control in the present invention will be explained with reference to the flowchart in FIGS. 32A and 32B. The process from the start to the end of the flowchart represented in FIGS. 32A and 32B is performed every calculation processing cycle of the control apparatus 107. At first, in the step S3201, when due to keying-on, the initialization condition for the control apparatus 107 has been established, an initial value (Z_T3INI) of the third target impedance 2103 (Z_T3) is stored, in the step S3202, in the third target impedance 2103 (Z_T3) in FIG. 29A(D); then, in the step S3203, an initial value (T_T2INI) of the heater stopping period (T_T2) is stored in the heater stopping period (T_T2), during the second control period in FIGS. 29A and 29B, in which the applied effective voltage for the heater is 0 V (heating is stopped).

Through a matching test or the like, the initial value (Z_T3INI) of the third target impedance 2103 is preliminarily set by use of the method described in the foregoing paragraph; the initial value (T_T2INI) of the heater stopping period is set to a time in which the sensor element impedance of the initially-middle-impedance sensor element 3002 in FIGS. 31A and 31B reaches the third target impedance 2103 (Z_T3). The set values are stored in the ROM of the control apparatus 107 and are utilized in the steps s3202 and S3203.

Next, in the case where in the step S3204, it is determined that the automatic stop/automatic start device 111 is starting the automatic stop mode of the internal combustion engine 101, "0" is stored, in the step S3205, in the elapsed time T_HTRSTP after the internal combustion engine has automatically stopped, and in the step S3206, "0" is stored in a flag F_DONE that indicates that the third target impedance 2103 (Z_T3) has been corrected while the internal combustion engine 101 is in the present automatic stop mode.

Next, in the case where in the step S3207, it is determined that the automatic stop/automatic start device 111 is holding the automatic stop mode of the internal combustion engine 101, the following processing is performed. That is to say, in the case where in the step S3208, the real impedance 2104 (Z_REAL) is smaller than the third target impedance 2103 (Z_T3), the calculation cycle is added, in the step S3209, to the last value of the elapsed time T_HTRSTP from the start of the automatic stop mode; then, heating for the exhaust gas sensor is stopped.

In contrast, in the case where in the step S3208, the real impedance 2104 (Z_REAL) is the same as or larger than the third target impedance 2103 (Z_T3) and the flag F_DONE is "0" in the step S3211, i.e., in the case where the third target impedance 2103 (Z_T3) has not been corrected during the time of the present automatic stop mode, it is determined in the step S3212 whether or not the correction implementation condition for the third target impedance 2103 (Z_T3) has been established.

In order to perform the correction in Embodiment 11 of the present invention, the ambient environment of the exhaust gas sensor need to be under a certain condition. Specifically, when the intake air temperature, the outer air temperature, the state of the load of the internal combustion engine which is automatically stopping, and the like are within a predetermined condition range, correction of the third target impedance 2103 (Z_T3) is allowed.

Next, in the step S3213, the elapsed time T_HTRSTP from the start of the automatic stop mode is the same as or larger than a value obtained by adding a dead band T_T2DZ1 corresponding to the upper dead band amount of the heater stopping period (T_T2) to the heater stopping period (T_T2), a value obtained by subtracting a subtraction correction amount Z_C1 from the last value of the third target impedance 2103 (Z_T3), as the corrected third target impedance 2103 (Z_T3), is stored, in the step S3214, in the third target impedance 2103 (Z_T3), and in the step S3217, "1" is stored in the flag F_DONE; then, in the step S3218, the exhaust-gas-sensor heater control device 112 sets the applied effective voltage for the heater in such a way that the real impedance 2104 (Z_REAL) is maintained at the third target impedance 2103 (Z_T3).

In the step S3215, the elapsed time T_HTRSTP from the start of the automatic stop mode is the same as or smaller than the value obtained by subtracting a dead band T_T2DZ21 corresponding to the lower dead band of the heater stopping period (T_T2) from the heater stopping period (T_T2), a value obtained by adding an addition correction amount Z_C2 from the last value of the third target impedance 2103 (Z_T3), as the corrected third target impedance 2103 (Z_T3), is stored, in the step S3216, in the third target impedance 2103 (Z_T3), and in the step S3217, "1" is stored in the flag F_DONE; then, in the step S3218, the exhaust-gas-sensor heater control device 112 sets the applied effective voltage for the heater in such a way that the real impedance 2104 (Z_REAL) is maintained at the third target impedance 2103 (Z_T3).

In the case where the elapsed time T_HTRSTP from the start of the automatic stop mode is within a dead band, i.e., the relationship T_T2−T_T2DZ2<T_HTRSTP<T_T2+T_T2DZ1 is satisfied, "1" is stored in the flag F_DONE in the step S3217; then, in the step S3218, the exhaust-gas-sensor heater control device 112 sets the applied effective voltage for the heater in such a way that the real impedance 2104 (Z_REAL) is maintained at the third target impedance 2103 (Z_T3).

In contrast, in the case where in the step S3211, F_DONE is not "0", i.e., in the case where the third target impedance 2103 (Z_T3) has been corrected while the internal combustion engine is in the present automatic stop mode, the exhaust-gas-sensor heater control device 112 sets, in the step S3218, the applied effective voltage for the heater in such a way that the real impedance 2104 (Z_REAL) is maintained at the third target impedance 2103 (Z_T3).

In addition, in Embodiment 11, the addition correction amount Z_C1 and the subtraction correction amount Z_C2 are made to be values that are preliminarily set through a matching test or the like.

Here, with reference to FIGS. 33A and 33B, there will be explained the effect of Embodiment 11 with which heater power consumption at a time when the internal combustion engine is in the automatic stop mode is reduced, taking, as an example, a case where the real sensor element temperature is higher than the estimated sensor element temperature estimated from the sensor element impedance, i.e., a case where the characteristics of a sensor element have deteriorated from that of initially-middle-impedance sensor element 3002 to that of impedance-deteriorated sensor element 3004.

Figure 33B:
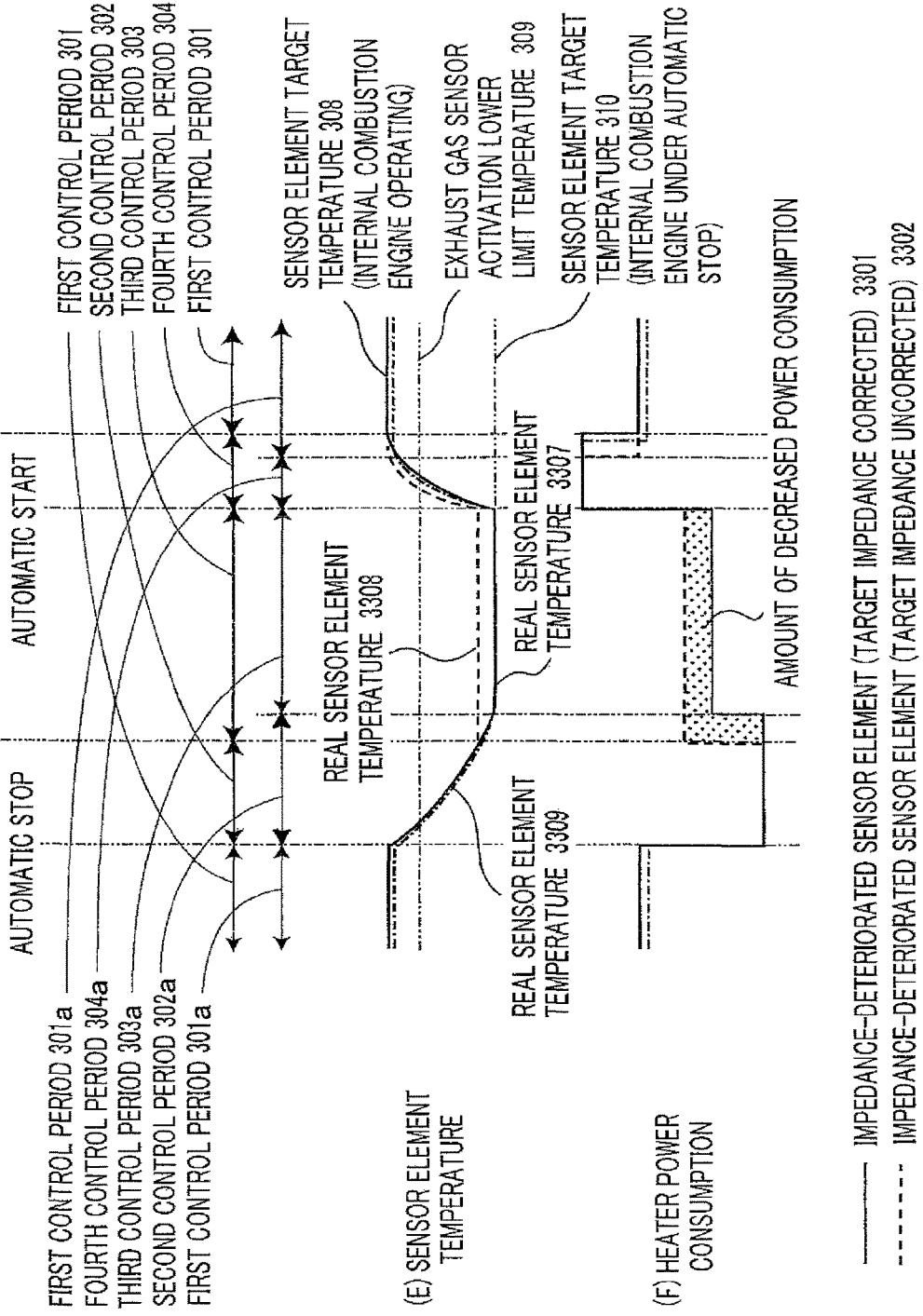

At first, in the case where correction of the third target impedance 2103 (Z_T3) according to Embodiment 11 is not performed, the real impedance 3305 of an impedance-deteriorated sensor element (the target impedance has not been corrected) 3302 in a period, after the internal combustion engine has automatically stopped, that is from a time point when the sensor element impedance reaches the third target impedance to a time point when the internal combustion engine automatically starts, i.e., in the third control period 303 and the real impedance 3306 of an initially-middle-impedance sensor element 3303 in the third control period 303a are adjusted to be equal to each other by the heater control device 112, as represented in FIG. 33A(D); however, as represented in FIG. 33B(E), the real sensor element temperature 3308 of the impedance-deteriorated sensor element (the target impedance has not been corrected) 3302 in the third control period 303 is set to be higher than the real sensor element temperature 3309 of the initially-middle-impedance sensor element 3303 in the third control period 303a. Accordingly, the applied effective voltage for the heater is adjusted by the heater control device 112 in such a way that the high real sensor element temperature 3308 is maintained; thus, as represented in FIG. 33B(F), the heater power consumption in the case of the impedance-deteriorated sensor element (the target impedance has not been corrected) 3302 is larger than that in the case of the initially-middle-impedance sensor element 3303. Therefore, by lowering the sensor element temperature of the impedance-deteriorated sensor element (the target impedance has not been corrected) 3302 to a sensor element temperature that is approximately the same as that of the initially-middle-impedance sensor element 3303, the power consumption can be reduced.

Thus, correction of the third target impedance 2103 (Z_T3) according to Embodiment 11 is performed. That is to say, each time the internal combustion engine automatically stops, there is performed correction in which the shorter the second control period 302 is, the higher the third target impedance is made, so that the second control period 302 and the third control period 303 for the impedance-deteriorated sensor element (the target impedance has not been corrected) 3302 eventually become the second control period 302a and the third control period 303a, respectively; thus, as represented in FIG. 33A(D), the real impedance 3305 of the impedance-deteriorated sensor element (the target impedance has not been corrected) 3302 becomes similar to the real impedance 3304 of the impedance-deteriorated sensor element (the target impedance has been corrected) 3301; thus, as represented in FIG. 33B(E), the real sensor element temperature 3307 of the impedance-deteriorated sensor element (the target impedance has been corrected) 3301 in the third control period 303a becomes equal to the real sensor element temperature 3309 of the initially-middle-impedance sensor element 3303 in the third control period 303a. As a result, as represented in FIG. 33B(F), the impedance-deteriorated sensor element (the target impedance has been corrected) 3301 can reduce the amount of heater power consumption at a time when the internal combustion engine is in the automatic stop mode by the power consumption reduction amount 3310; thus, the power consumption can be made to correspond to that in the case of the initially-middle-impedance sensor element 3303.

Next, with reference to FIGS. 34A and 34B, there is explained the effect of Embodiment 11 with which the sensor element temperature is prevented from being delayed in reaching the activation temperature in response to an air-fuel ratio detection demand issued after the internal combustion engine has automatically started and the gasoline mileage and the exhaust gas are prevented from being deteriorated, without the timing of starting the air-fuel ratio feedback control being delayed, taking, as an example, a case where the real sensor element temperature is lower than the estimated sensor element temperature estimated from the sensor element impedance, i.e., a case where due to a variation in characteristics of a sensor element, the characteristics of the sensor element is that of the initially-lower-limit-impedance sensor element 3001 with respect to that of the initially-middle-impedance sensor element 3002.

At first, in the case where correction of the third target impedance 2103 (Z_T3) according to Embodiment 11 is not performed, the real impedance 3405 of an initially-lower-limit-impedance sensor element (the target impedance has not been corrected) 3402 in a period, after the internal combustion engine has automatically stopped, that is from a time point when the sensor element impedance reaches the third target impedance to a time point when the internal combustion engine automatically starts, i.e., in the third control period 303 and the real impedance 3406 of an initially-middle-impedance sensor element 3403 in the third control period 303a are adjusted to be equal to each other by the heater control device 112, as represented in FIG. 34A (D); however, as represented in FIG. 34B(E), the real sensor element temperature 3408 of the initially-lower-limit-impedance sensor element (the target impedance has not been corrected) 3402 in the third control period 303 is set to be lower than the real sensor element temperature 3409 of the initially-middle-impedance sensor element 3403 in the third control period 303a. Accordingly, even in the case where after the internal combustion engine has automatically started, the real temperature is raised by applying the allowable maximum applied effective voltage, the real sensor element temperature 3408 of the initially-lower-limit-impedance sensor element (the target impedance has not been corrected) 3402 rises slower than the real sensor element temperature 3409 of the initially-middle-impedance sensor element 3403, and the real impedance value corresponds to the real sensor element temperature; therefore, the real impedance 3405 of the initially-lower-limit-impedance sensor element (the target impedance has not been corrected) 3402 is delayed in reaching the first target impedance 2101 (Z_T1) in comparison with the real impedance 3406 of the initially-middle-impedance sensor element 3403.

As one of the conditions for performing air-fuel ratio feedback control, it is required that the sensor element temperature has been estimated from the real impedance and it has been determined, from the estimated sensor element temperature, that the sensor is activated; however, as represented in FIG. 34A(D), in comparison with the initially-middle-impedance sensor element 3403, establishment of the air-fuel ratio feedback control implementation condition for the initially-lower-limit-impedance sensor element (the target impedance has not been corrected) 3402 is delayed after the internal combustion engine has automatically started; as a result, the gasoline mileage and the exhaust gas are deteriorated during the delay time. Therefore, by raising the sensor element temperature of the initially-lower-limit-impedance sensor element (the target impedance has not been corrected) 3402 to a sensor element temperature that is approximately the same as that of the initially-middle-impedance sensor element 3403, the gasoline mileage and the exhaust gas can be prevented from being deteriorated due to the delay of establishment of the air-fuel ratio feedback control implementation condition.

Thus, correction of the third target impedance 2103 (Z_T3) according to Embodiment 11 is performed. That is to say, when there is performed correction in which the longer the second control period 302 is, the lower the third target impedance is made, the correction is performed each time the internal combustion engine automatically stops, so that the second control period 302 and the third control period 303 for the initially-lower-limit-impedance sensor element (the target impedance has not been corrected) 3402 eventually become the second control period 302a and the third control period 303a, respectively; thus, as represented in FIG. 34A(D), the real impedance 3405 of the initially-lower-limit-impedance sensor element (the target impedance has not been corrected) 3402 becomes similar to the real impedance 3404 of the initially-lower-limit-impedance sensor element (the target impedance has been corrected) 3401; thus, as represented in FIG. 34B(E), the real sensor element temperature 3407 of the initially-lower-limit-impedance sensor element (the target impedance has been corrected) 3401 in the third control period 303a becomes equal to the real sensor element temperature 3409 of the initially-middle-impedance sensor element 3403 in the third control period 303a. As a result, as represented in FIG. 34A(B), the initially-lower-limit-impedance sensor element (the target impedance has been corrected) 3401 prevents the sensor element temperature from being delayed in reaching the activation temperature in response to an air-fuel ratio detection demand issued after the internal combustion engine automatically starts; therefore, the starting timing of the air-fuel ratio feedback control is not delayed, so that gasoline mileage and the exhaust gas can be prevented from being deteriorated.

The increase in heater power consumption, caused by that the real sensor element temperature at a time when the internal combustion engine is in the automatic stop mode is high, and the deterioration in the gasoline mileage and in the exhaust gas, caused by that the real sensor element temperature at a time when the internal combustion engine is in the automatic stop mode is low, during a period by which the starting timing of the air-fuel ratio feedback control performed after the internal combustion engine automatically starts are in a so-called trade-off relationship; as described in the foregoing paragraph, there are preliminarily confirmed the heater power consumption at a time when the internal combustion engine is in the automatic stop mode and the sensor element temperature, at a time the internal combustion engine is in the automatic stop mode, at which deterioration in the gasoline mileage and the exhaust gas at a time after the internal combustion engine automatically starts can be suppressed, and the third target impedance is corrected according to Embodiment 11 in such a way that the real sensor element temperature at a time when the internal combustion engine is in the automatic stop mode becomes equal to the confirmed sensor element temperature. As a result, even in the case were due to variation in the sensor element characteristics and characteristic change caused by deterioration, the relationship between the sensor element temperature and the sensor element impedance changes, there can be maintained the preliminarily confirmed heater power consumption at a time when the internal combustion engine is in the automatic stop mode and the performance with which deterioration in the gasoline mileage and the exhaust gas at a time after the internal combustion engine automatically starts can be suppressed.

As described above, in contrast to the invention according to each of Embodiments 7 through 10, an exhaust-gas-sensor heater control device according to Embodiment 11 of the present invention is provided with a reference second control period, which is the reference period for the second control period; the exhaust-gas-sensor heater control device is configured in such a way that there is performed correction in which the shorter than the reference second control period is the second control period, the higher is the third target impedance, and the longer than the reference second control period is the second control period, the lower is the third target impedance.

Accordingly, even in the case were due to variation in the sensor element characteristics and characteristic change caused by deterioration, the relationship between the sensor element temperature and the sensor element impedance changes, by keeping at a target temperature the real sensor element temperature at a time when the internal combustion engine is in the automatic stop mode, the heater power consumption at a time when the internal combustion engine is in the automatic stop mode can further be reduced, in the case where the real sensor element temperature is higher than the estimated sensor element temperature, and the sensor element temperature can be prevented from being delayed in reaching the activation temperature in response to an air-fuel ratio detection demand issued after the internal combustion engine automatically starts, in the case where the real sensor element temperature is lower than the estimated sensor element temperature; as a result, the starting timing of the air-fuel ratio feedback control is not delayed, so that gasoline mileage and the exhaust gas can be prevented from being deteriorated.

Moreover, by correcting the third target impedance in the heater stopping period during the automatic stop mode of the internal combustion engine, the ambient environment of the exhaust gas sensor such as the ambient temperature of the exhaust gas sensor is prevented from largely varying each time correction is performed, whereby more accurate correction can be performed.

Furthermore, because the third target impedance can be corrected each time the internal combustion engine automatically stops, the correction is frequently performed in comparison with a case where the same correction is performed at a time when the internal combustion engine is stopped by keying-off or the like; therefore, more accurate correction can be performed.

Embodiment 12

Next, there will be explained an exhaust-gas-sensor heater control device according to Embodiment 12 of the present invention. In comparison with Embodiment 11, the third target impedance can more accurately be corrected in Embodiment 12.

Embodiment 12 differs from Embodiment 11 in the following points. That is to say, FIGS. 35A and 35B configure a flowchart for explaining characteristic control in Embodiment 12; in FIG. 35B, the step S3501 is added, in comparison with FIG. 32B of Embodiment 11.

The difference between FIGS. 32A/32B and FIGS. 35A/35B will be explained below.

Figure 35A:
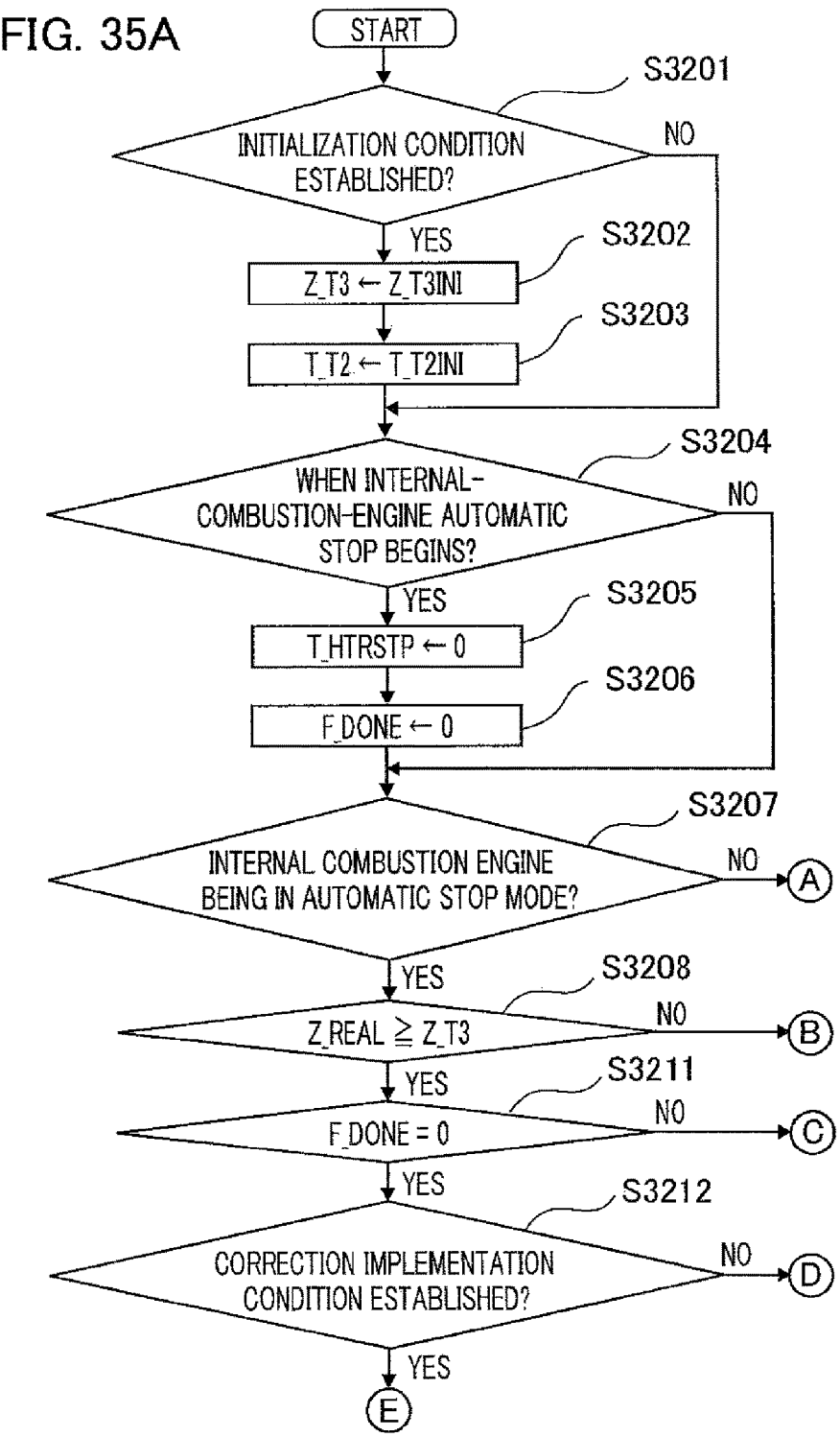
FIGS. 35A and 35B configure a flowchart representing a method of correcting a third target impedance, in Embodiment 12 of the present invention.
Figure 35B:
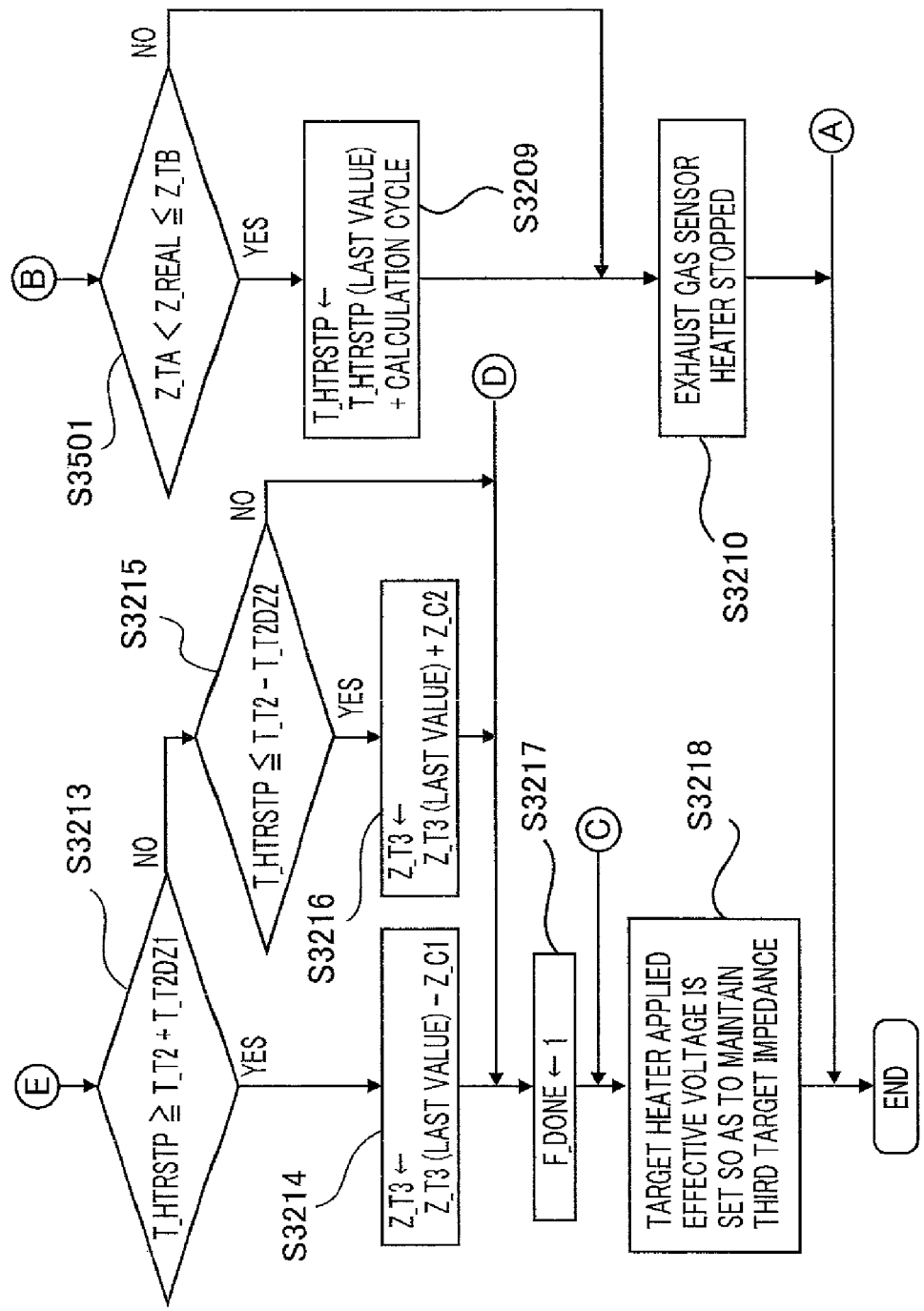

In FIGS. 35A and 35B, in the case where in the step S3208, it is determined that the real impedance 2104 (Z_REAL) is smaller than the third target impedance 2103 (Z_T3), and in the step S3501, the real impedance 2104 (Z_REAL) is larger than an impedance A2901 (Z_TA), which is a first passing point before the third target impedance 2103 (Z_T3), and the same as or smaller than an impedance B2902 (Z_TB), which is a second passing point before the third target impedance 2103 (Z_T3), the calculation cycle is added to the last value of the elapsed time T_HTRSTP after the internal combustion engine has automatically stopped; then, in the step S3210, heating for the exhaust gas sensor is stopped.

In contrast, in the case where in the step S3501, the real impedance 2104 (Z_REAL) is the same as or smaller than the impedance A2901 (Z_TA), which is the first passing point before the third target impedance 2103 (Z_T3), or larger than the impedance B2902 (Z_TB), which is the second passing point before the third target impedance 2103 (Z_T3), no processing is performed in the step s3209; then, in the step S3210, heating for the exhaust gas sensor is stopped.

The impedance A2901 (Z_TA), which is the first passing point before the third target impedance 2103 (Z_T3), is set in the exhaust gas sensor heater stopping period after the internal combustion engine 101 has been automatically stopped by the automatic stop/automatic start device 111 of the control apparatus 107, i.e., during the second control period 302 in FIGS. 29A and 29B, and is preliminarily set through a matching test or the like in such a way that there is eliminated a part (a section A), immediately after the heating has been stopped, in which the real impedance 2104 (Z_REAL) rises slowly. The impedance B2902 (Z_TB), which is the second passing point before the third target impedance 2103 (Z_T3), is preliminarily set, through a matching test or the like, to an impedance that is immediately after the impedance A2901 (Z_TA), which is the first passing point, and immediately before the third target impedance 2103 (Z_T3). Setting in this manner makes it possible to perform the correction by use of a part in which the real impedance 2104 (Z_REAL) changes largely; thus, the correction can more accurately be performed.

The initial value T_T2INI of the heater stopping period in Embodiment 12 is set to a time in which the sensor element impedance of the initially-middle-impedance sensor element 3002 in FIGS. 31A and 31B moves from the impedance A2901 (Z_TA), which is the first passing point, to the impedance B2902 (Z_TB), which is the second passing point. The set values are stored in the ROM of the control apparatus 107 and are utilized in the step S3203.

In addition, even when the impedance B2902 (Z_TB) in Embodiment 12 is set to be equal to the third target impedance 2103 (Z_T3), the effect of Embodiment 12 can be demonstrated.

As described above, in contrast to the invention according to Embodiment 11, the exhaust-gas-sensor heater control device according to Embodiment 12 of the present invention is configured in such a way as to be provided with an elapsed time calculation means that measures the elapsed time in which the sensor element impedance rises during the second control period and moves from an impedance A, which is the first passing point before the third target impedance, to an impedance B, which is the second passing point before the third target impedance, and a reference elapsed time, which is the reference value of an elapsed time measured by the elapsed time calculation means, and in such a way that there is performed correction in which the shorter than the reference elapsed time is an elapsed time measured by the elapsed time calculation means, the higher is the third target impedance, and the longer than the reference elapsed time is the elapsed time measured by the elapsed time calculation means, the lower is the third target impedance; therefore, in addition to the effect of Embodiment 11, by utilizing an elapsed time of a part, of the heater stopping period, in which the sensor element impedance changes largely, the third target impedance can be corrected; thus, the correction can more accurately be performed.

Embodiment 13

Next, there will be explained an exhaust-gas-sensor heater control device according to Embodiment 13 of the present invention. Embodiment 13 differs from Embodiment 12 in the following points. That is to say, FIGS. 36A and 36B configure a flowchart for explaining characteristic control in Embodiment 13; in FIGS. 36A and 36B, the step S3602 is added and the steps S3601, 3603, and S3604 are changed, in contrast to FIGS. 35A and 35B of Embodiment 12.

The difference between FIGS. 35A/35B and FIGS. 36A/36B will be explained below.

In FIGS. 36A and 36B, in the case where in the step S3212, the correction implementation condition for the third target impedance 2103 (Z_T3) has been established, the impedance changing amount per predetermined time Z_DLT is calculated through the equation (19) below and is stored in Z_DLT in the step S3602.

$$(Z\_TB - Z\_TA) \div T\_HTRSTP = Z\_DLT \quad (19)$$

Next, in the step S3603, the impedance changing amount per predetermined time Z_DLT is the same as or smaller than a value obtained by subtracting a dead band Z_BDLTDZ2 corresponding to the lower dead band amount of the reference changing amount Z_BDLT from the reference changing amount Z_BDLT, a value obtained by subtracting the subtraction correction amount Z_C1 from the last value of the third target impedance 2103 (Z_T3), as the corrected third target impedance 2103 (Z_T3), is stored, in the step S3214, in the third target impedance 2103 (Z_T3), and "1" is stored in the flag F_DONE in the step S3217; then, in the step S3218, the applied effective voltage for the heater is set in such a way that the real impedance 2104 (Z_REAL) is maintained at the third target impedance 2103 (Z_T3).

Next, in the step S3604, the impedance changing amount per predetermined time Z_DLT is the same as or larger than a value obtained by adding a dead band Z_BDLTDZ1 corresponding to the upper dead band amount of the reference changing amount Z_BDLT to the reference changing amount Z_BDLT, a value obtained by adding the subtraction correction amount Z_C2 to the last value of the third target impedance 2103 (Z_T3), as the corrected third target impedance 2103 (Z_T3), is stored, in the step S3216, in the third target impedance 2103 (Z_T3), and "1" is stored in the flag F_DONE in the step S3217; then, in the step S3218, the applied effective voltage for the heater is set in such a way that the real impedance 2104 (Z_REAL) is maintained at the third target impedance 2103 (Z_T3).

In the case where the impedance changing amount per predetermined time Z_DLT is within the dead band, i.e., the relationship "Z_BDLT−Z_BDLTDZ2<Z_DLT<Z_BDLT+Z_BDLTDZ1" is established, "1" is stored in the flag F_DONE in the step S3217; then, in the step S3218, the applied effective voltage for the heater is set in such a way that the real impedance 2104 (Z_REAL) is maintained at the third target impedance 2103 (Z_T3).

In the step S3601, a reference changing amount initial value Z_BDLTINI is stored in the reference changing amount Z_BDLT. The reference changing amount initial value Z_BDLTINI is a value, in the case of the initially-middle-impedance sensor element 3002 in FIGS. 31A and 31B, obtained by dividing the difference between the impedance A2901 (Z_TA), which is a first passing point, and the impedance B2902 (Z_TB), which is a second passing point, by the time in which the sensor element impedance moves from the impedance A2901 (Z_TA), which is the first passing point, to the impedance B2902 (Z_TB), which is the second passing point. The reference changing amount initial value Z_BDLTINI is stored in the ROM of the control apparatus 107 and is utilized in the foregoing step S3601.

As described above, in contrast to the invention according to Embodiment 12, Embodiment 12 of the present invention is configured in such a way that there is performed correction in which the larger than the reference value of the impedance changing amount from the impedance A to the impedance B per predetermined time is the impedance changing amount from the impedance A to the impedance B per predetermined time, the higher becomes the third target impedance, and the smaller than the reference value of the impedance changing amount from the impedance A to the impedance B per predetermined time is the impedance changing amount from the impedance A to the impedance B per predetermined time, the lower becomes the third target impedance.

Accordingly, by utilizing the impedance changing amount per predetermined time in a part, of the heater stopping period which is the second control period, in which the sensor element impedance changes largely, the third target impedance can be corrected; thus, the correction can more accurately be performed.

Embodiment 14

Next, there will be explained an exhaust-gas-sensor heater control device according to Embodiment 14 of the present invention. Embodiment 4 differs from Embodiment 11 in the following points. That is to say, FIGS. 37A, 37B, and 37C configure a flowchart for explaining characteristic control in Embodiment 14; in FIGS. 37A, 37B, and 37C, the steps S3701 through S3713 are added, in comparison with FIGS. 32A and 32B of Embodiment 11.

The difference between FIGS. 37A/37B/37C and FIGS. 32A/32B will be explained below.

Figure 37A:
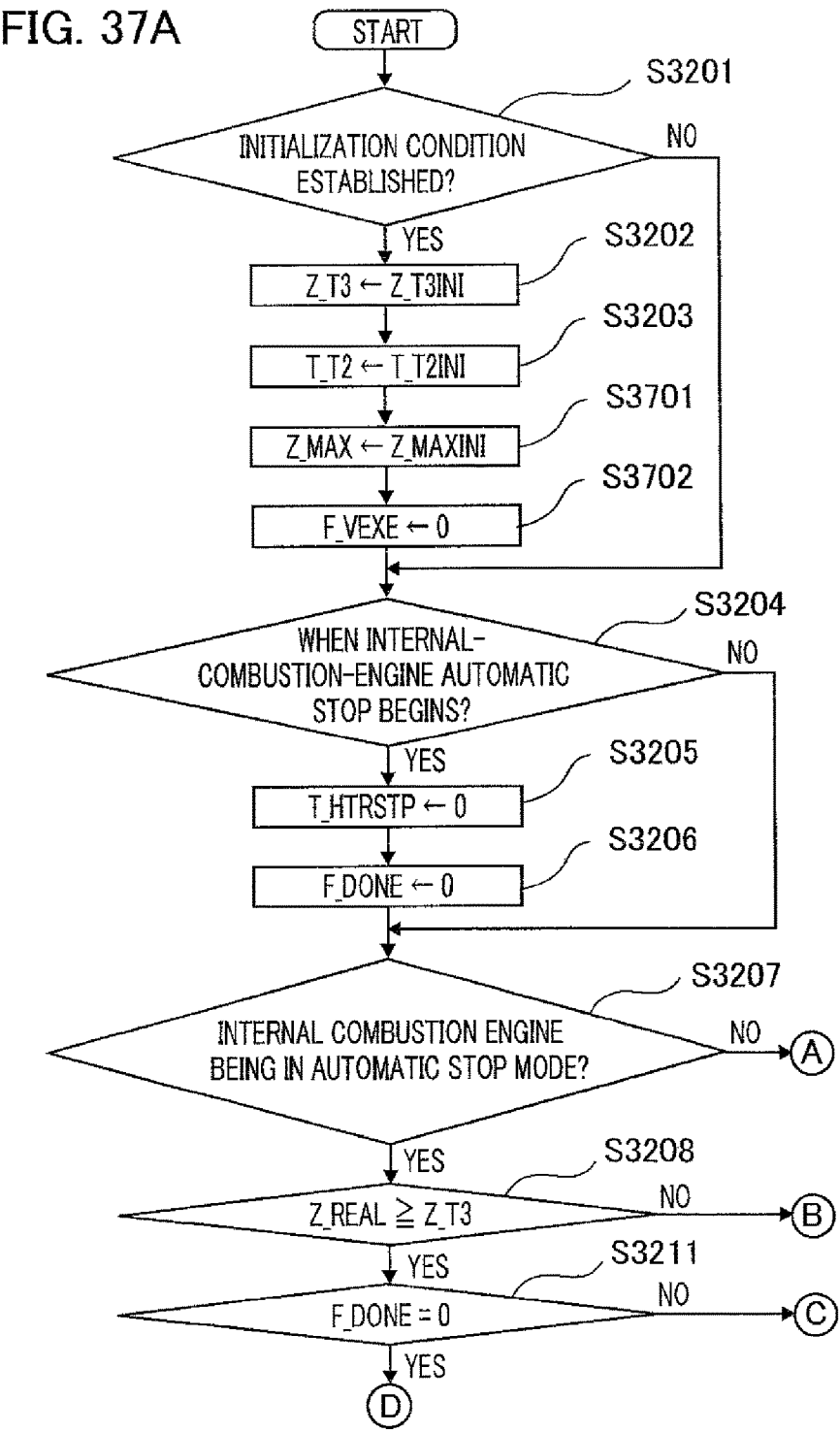
FIGS. 37A, 37B, and 37C configure a flowchart representing a method of controlling the heater of an exhaust gas sensor, in Embodiment 14 of the present invention.
Figure 37B:
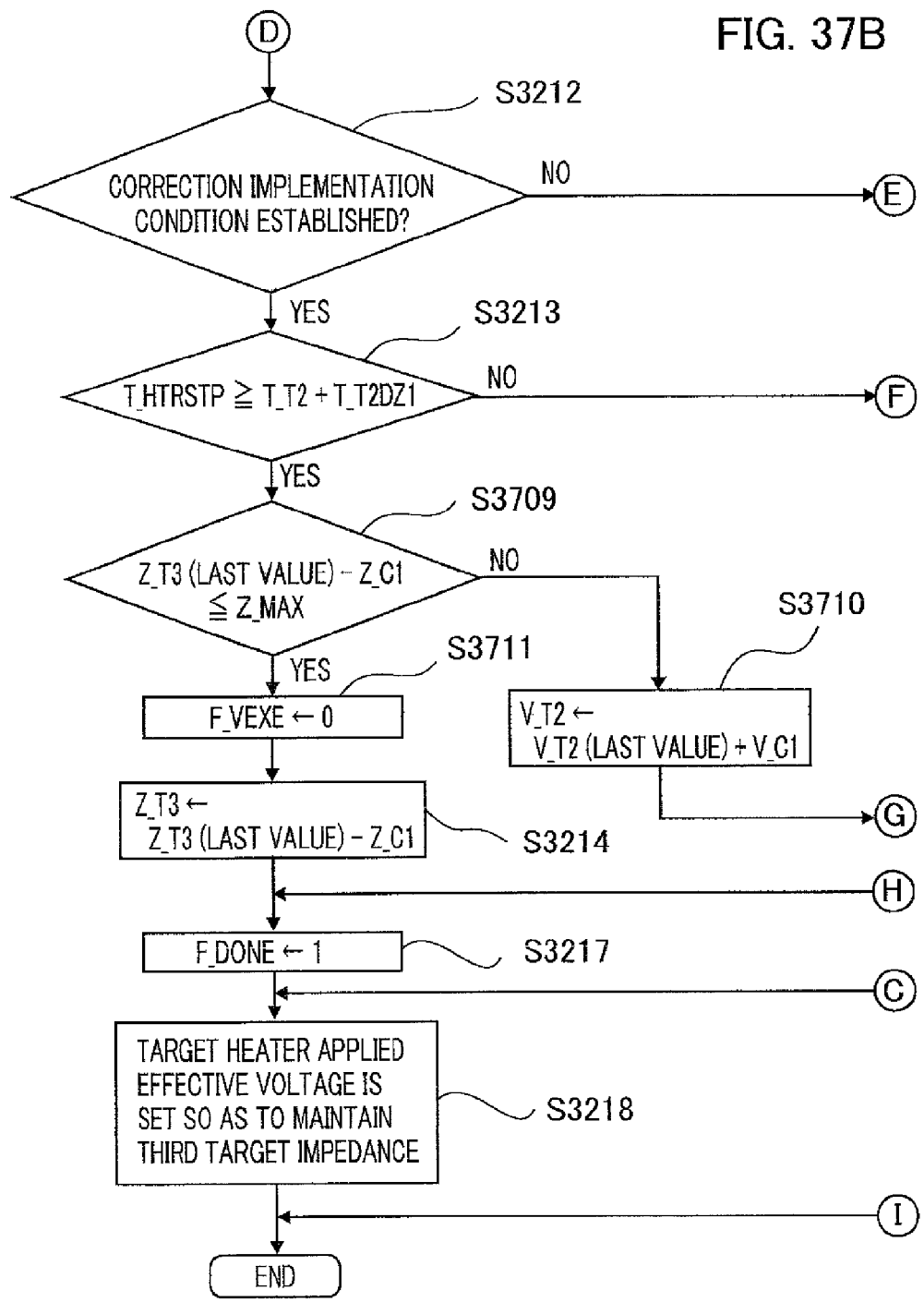
Figure 37C:
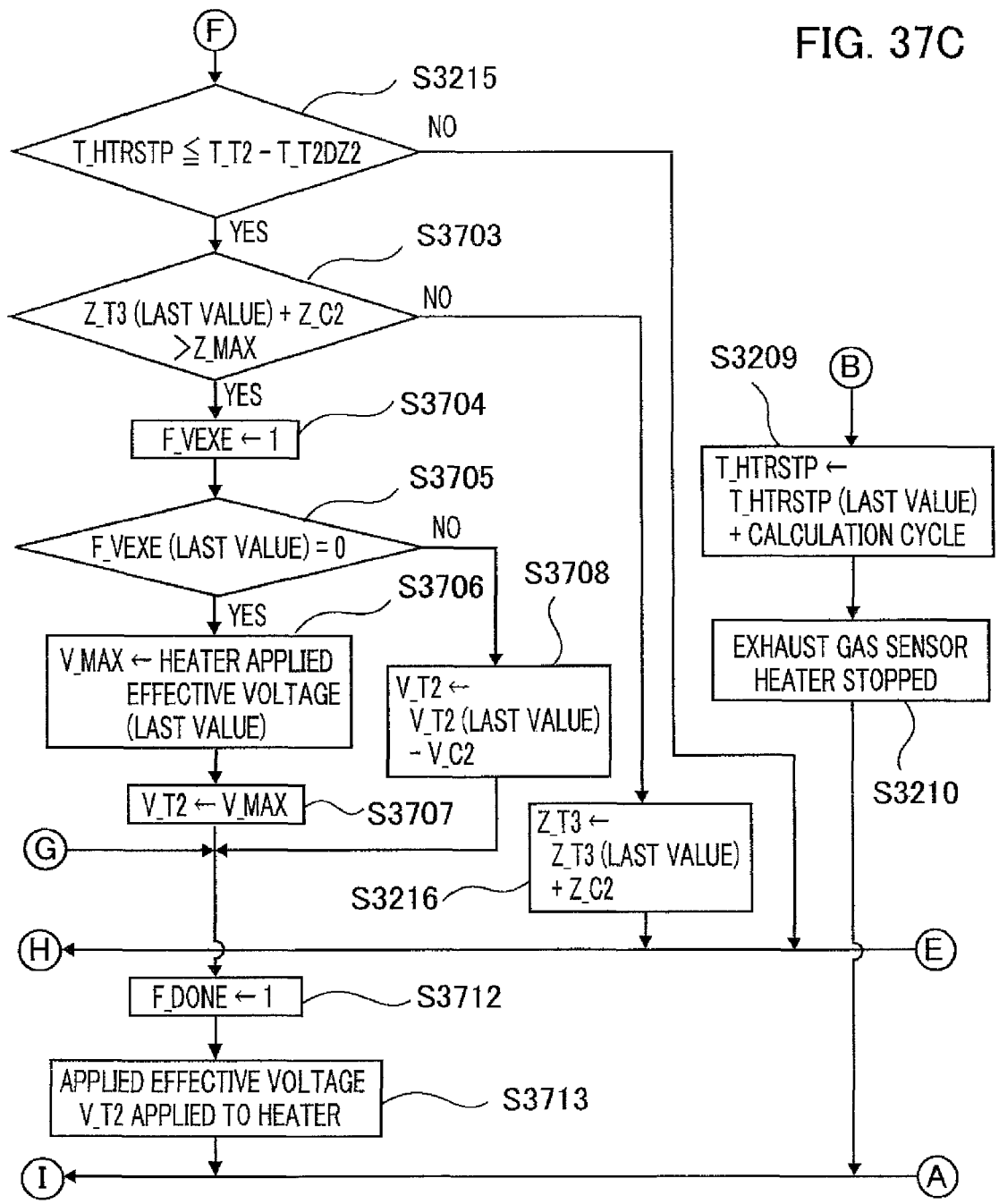

In FIG. 37A, in the case where an initialization condition has been established in the step S3201, initialization to be performed in the steps S3701 and S3702 is added. That is to say, in the step S3701, the initial value (Z_MAXINI) of the maximum impedance, which can be measured by the impedance measurement means that measures the sensor element impedance of the exhaust gas sensor, is stored in Z_MAX; in the step S3702, "0" is stored in a flag (F_VEXE) that indicates that instead of making the heater control device 112 set the applied effective voltage for the heater in such a way that the sensor element impedance becomes equal to the third target impedance 2103 (Z_T3), a means for setting the applied effective voltage for the heater directly in accordance with the heater stopping period (the second control period 302) is being implemented.

The initial value (Z_MAXINI) of the maximum impedance, which can be measured by the impedance measurement means, can be determined by the restriction on the configuration of hardware such as a designed sensor element. Alternatively, the initial value (Z_MAXINI) may be set to the upper limit value in a range where the accuracy of measurement of an impedance measured by the impedance measurement means is high.

After that, in the process from the step S3204 to the step S3213, the same processing as in Embodiment 11 is performed; in the case where it is determined in the step S3213 that the elapsed time T_HTRSTP after the internal combustion engine has automatically stopped is not the same as or larger than a value obtained by adding a dead band T_T2DZ1 corresponding to the upper dead band amount of the heater stopping period (T_T2) to the heater stopping period (T_T2), and in the case where it is determined in the step S3215 that the elapsed time T_HTRSTP after the internal combustion engine has automatically stopped is the same as or smaller than a value obtained by subtracting a dead band T_T2DZ2 corresponding to the lower dead band amount of the heater stopping period (T_T2) from the heater stopping period (T_T2), it is determined in the step S3701 whether or not a value obtained by adding the addition correction amount Z_C2 to the last value of the third target impedance 2103 (Z_T3) is larger than the maximum impedance Z_MAX, which can be measured by the impedance measurement means that measures the sensor element impedance of the exhaust gas sensor. In the case where it is determined that the value obtained by adding the addition correction amount Z_C2 to the last value of the third target impedance 2103 (Z_T3) is larger than the maximum impedance Z_MAX, "1" is stored, in the step S3704, in the flag (F_VEXE) that indicates that the means for setting the applied effective voltage for the heater directly in accordance with the heater stopping period (the second control period 302) is being implemented.

Next, in the case where it is determined in the step S3705 that the last value of F_VEXE is "0", the last value of the applied effective voltage for the heater, as the heater applied effective voltage that is required to maintain the maximum impedance Z_MAX which can be measured by the impedance measurement means, is stored in V_MAX in the step S3706; then, in the step S3707, V_MAX is stored in the heater applied effective voltage V_T3. In contrast, in the case where it is determined in the step S3705 that the last value of F_VEXE is not "0", a value obtained by subtracting the subtraction correction amount V_C2 from the last value of the heater applied effective voltage V_T3, as the heater applied effective voltage, is stored in the heater applied effective voltage V_T3 in the step S3708. In the case where it is determined in the step S3703 that the value obtained by adding the addition correction amount Z_C2 to the last value of the third target impedance 2103 (Z_T3) is not larger than the maximum impedance Z_MAX, which can be measured by the impedance measurement means that measures the sensor element impedance of the exhaust gas sensor, the step S3703 is followed by the step S3216, where the same processing as in Embodiment 11 is performed.

In contrast, in the case where it is determined in the step S3213 that the elapsed time T_HTRSTP from the start of the automatic stop mode is the same as or larger than the value obtained by adding a dead band T_T2DZ1 corresponding to the upper dead band amount of the heater stopping period (T_T2) to the heater stopping period (T_T2), it is determined in the step S3709 whether or not the value obtained by subtracting the subtraction correction amount Z_C1 from the last value of the third target impedance 2103 (Z_T3) is the same as or smaller than the maximum impedance Z_MAX, which can be measured by the impedance measurement means that measures the sensor element impedance of the exhaust gas sensor. In the case where it is determined that the value obtained by subtracting the subtraction correction amount Z_C1 from the last value of the third target impedance 2103 (Z_T3) is not the same as or smaller than the maximum impedance Z_MAX, a value obtained by adding the addition correction amount V_C1 to the last value of the heater applied effective voltage V_T3, as the heater applied effective voltage, is stored in the heater applied effective voltage V_T3 in the step S3710.

In contrast, in the case where it is determined in the step S3709 that the value obtained by subtracting the subtraction correction amount Z_C1 from the last value of the third target impedance 2103 (Z_T3) is the same as or smaller than the maximum impedance Z_MAX, "0" is stored, in the step S3711, in the flag (F_VEXE) that indicates that the means for setting the applied effective voltage for the heater directly in accordance with the heater stopping period (the second control period 302) is being implemented; then, the step S3711 is followed by the step S3214, where the same processing as in Embodiment 11 is performed.

After the present value of the heater applied effective voltage is stored in the heater applied effective voltage V_T3 in one of the steps S3707, S3708, and S3709, "1" is stored in F_DONE in the step S3712; then, in the step S3713, the heater applied effective voltage V_T3 is applied to the heater.

In addition, in Embodiment 14, the addition correction amount V_C1 and the subtraction correction amount V_C2 are made to be values that are preliminarily set through a matching test or the like.

As described above, in contrast to the invention according to Embodiment 11, Embodiment 14 of the present invention is configured in such a way that in the case where the third target impedance is set to a value that is the same as or larger than the maximum impedance which can be measured by the impedance measurement means, the target heater applied effective voltage is set in accordance with the second control period.

A sensor element impedance has a characteristic that as the temperature is lower, the change thereof caused by the change in the sensor element temperature is larger; in the case where an impedance is measured in the low-temperature region, it is required to change the measurement sensitivity (i.e., the resolution) depending on whether the measurement is performed in the high-temperature region or in the low-temperature region or to change the feedback gain when the target impedance is feedback-controlled; however, The invention according to Embodiment 14 makes it possible to perform the control in the low-temperature region, without requiring any additional hardware modification, which leads to a cost hike.

Embodiment 15

Next, there will be explained an exhaust-gas-sensor heater control device according to Embodiment 15 of the present invention. Embodiment 15 differs from Embodiment 12 in the following points. That is to say, FIGS. 38A and 38B configure a flowchart for explaining characteristic control in Embodiment 14; in FIGS. 38A and 38B, the steps S3801 through S3803 are added, in comparison with FIGS. 35A and 35B of Embodiment 12.

The difference between FIGS. 38A/38B and FIGS. 35A/35B will be explained below.

Figure 38A:
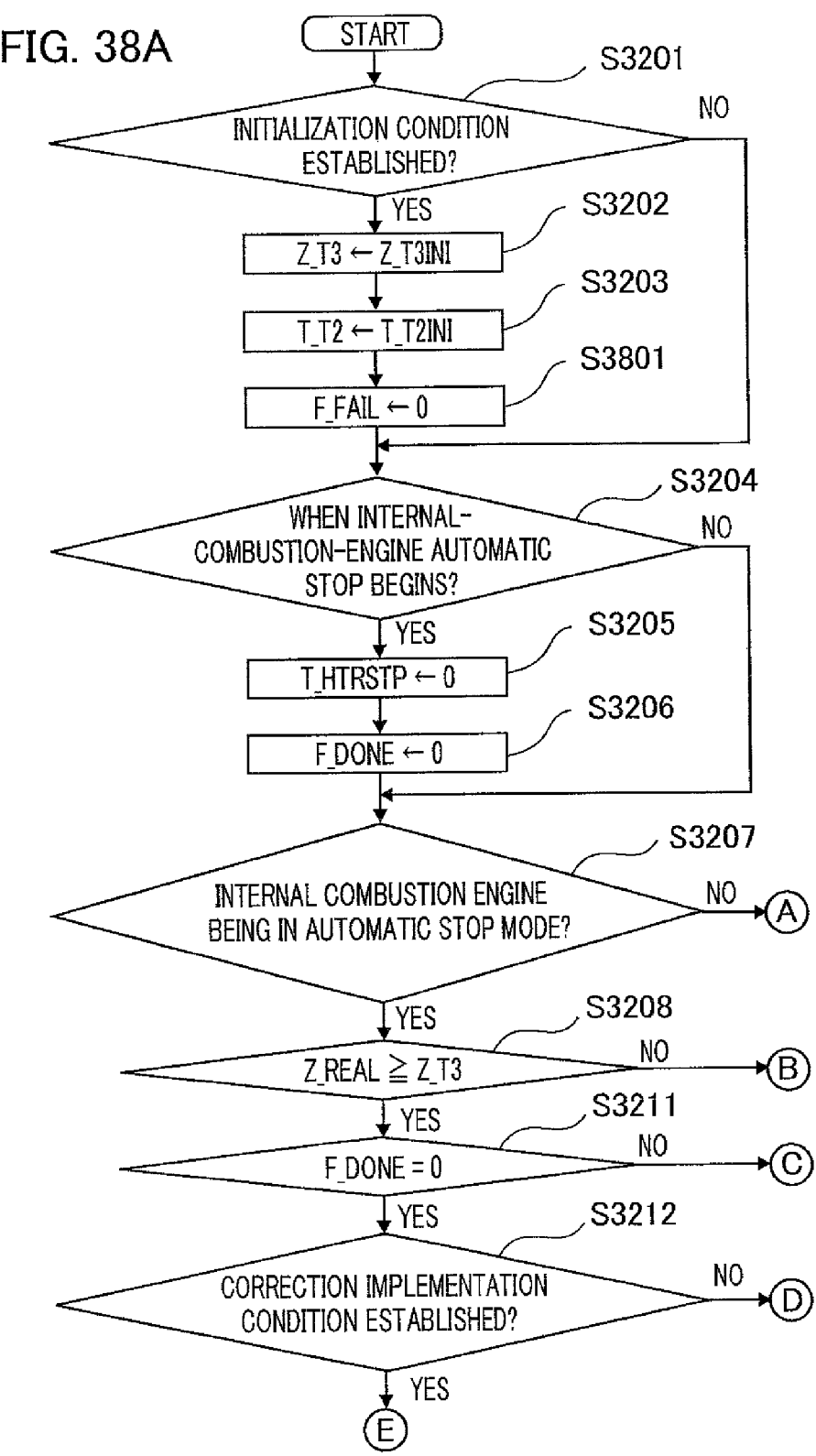
FIGS. 38A and 38B configure a flowchart representing a method of detecting a failure of the exhaust gas sensor, in Embodiment 15 of the present invention.
Figure 38B:
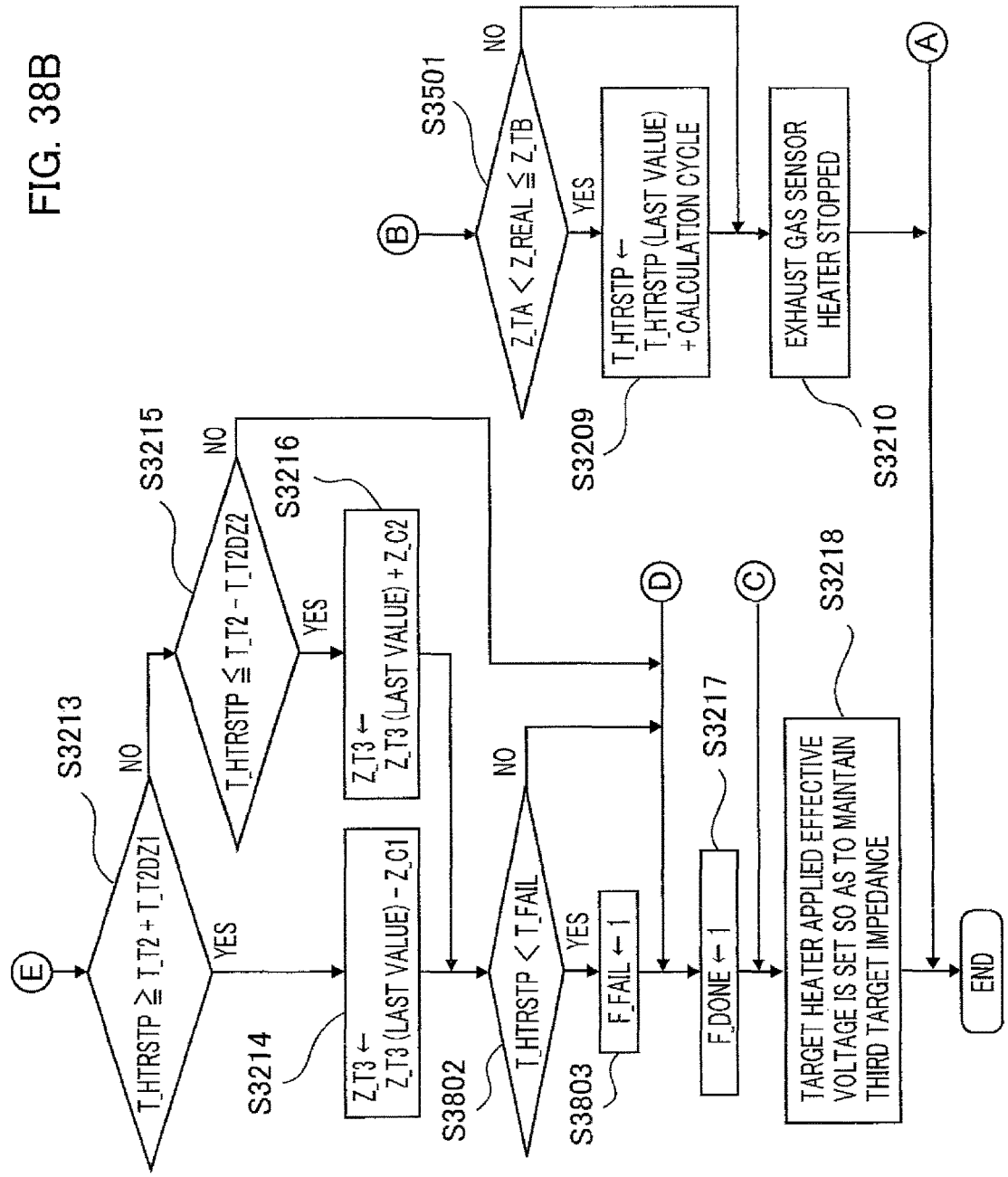

In FIG. 38A, in the case where an initialization condition has been established in the step S3201, "0" is stored, in the step S3801, in an exhaust gas sensor failure flag F_FAIL that indicates that the exhaust gas sensor is in a failure state, so that initialization is performed.

After that, in the process from the step S3204 to the step S3216, the same processing as in Embodiment 12 is performed; when in the step S3214 or S3216, the third target impedance 2103 (Z_T3) is updated, it is determined in the step S3802 whether or not the elapsed time T_HTRSTP after the internal combustion engine has automatically stopped is shorter than the lower limit value of the elapsed time after the internal combustion engine has automatically stopped, in the case of the impedance-normal sensor element. In the case where it is determined in the step S3802 that the elapsed time T_HTRSTP after the internal combustion engine has automatically stopped is shorter than the lower limit value of the elapsed time after the internal combustion engine has automatically stopped, it is determined that the exhaust gas sensor has failed; then, in the step S3803, "1" is stored in the exhaust gas sensor failure flag F_FAIL, and the step S3803 is followed by the step S3217; thereafter, the same processing as in Embodiment 12 is performed.

In contrast, in the case where it is determined in the step S3802 that the elapsed time T_HTRSTP after the internal combustion engine has automatically stopped is not shorter than the lower limit value of the elapsed time after the internal combustion engine has automatically stopped, the step S3802 is followed by the step S3217; thereafter, the same processing as in Embodiment 12 is performed.

As described above, Embodiment 15 of the present invention is configured in such a way that failure determination for an exhaust gas sensor is performed based on the shortness of the elapsed time from a time point when the sensor element impedance is the impedance A to a time point when the sensor element impedance is the impedance B, in Embodiment 12, or the impedance changing amount per predetermined time from a time point when the sensor element impedance is the impedance A to a time point when the sensor element impedance is the impedance B, in Embodiment 13.

Accordingly, by performing failure determination for the exhaust gas sensor during a heater stopping period at a time when the internal combustion engine is in the automatic stop mode, the determination can more accurately be performed without being affected by the exhaust gas sensor ambient environment such as the exhaust gas sensor ambient temperature, and the frequency of the failure determination can be increased.

In each of Embodiments 11 through 15, it may be allowed that at a time of keying-off, the third target impedance 2103 (Z_T3) is stored in the initial value Z_T3INI and the initial value (Z_T3INI) of the third target impedance 2103 is stored in a rewritable nonvolatile memory, and then, at a time of the next keying-on, this Z_T3INI is utilized.

In addition, the respective exhaust gas sensors 105 and 106 in Embodiments 1 through 15 may be either an exhaust gas sensor that detects the air-fuel ratio of an exhaust gas (a so-called linear A/F sensor) or an exhaust gas sensor that detects the tendency of rich/lean with respect to the theoretical air-fuel ratio (a so-called λO2 sensor).

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine control apparatus of a vehicle, said internal combustion engine control apparatus comprising:
    an automatic stop/automatic start device, for an internal combustion engine, that automatically stops the internal combustion engine when a stopping condition for the internal combustion engine is established and automatically starts the internal combustion engine when a starting condition for the internal combustion engine is established;
    an exhaust gas sensor that is provided in an exhaust path of the internal combustion engine and detects at least one of the air-fuel ratio in an exhaust gas and the rich/lean tendency of the exhaust gas with respect to the theoretical air-fuel ratio;
    a heater that heats the exhaust gas sensor; and
    a heater control device that controls an applied effective voltage for the heater in such a way that the applied effective voltage becomes equal to a target heater applied effective voltage, wherein the heater control device includes a first control period in which the target heater applied effective voltage is set to a first target applied effective voltage with which a sensor element temperature of the exhaust gas sensor becomes equal to a sensor element target temperature at a time when the internal combustion engine is being operated; a second control period in which after the automatic stop mode of the internal combustion engine has started, the target heater applied effective voltage is set to a second target applied effective voltage that is lower than the first target applied effective voltage; a second control period end determiner that determines, during the second control period, the end of the second control period; and a third control period in which after determination of the end of the second control period, the target heater applied effective voltage is controlled to be a third target applied effective voltage that is higher than the second target applied effective voltage and with which the sensor element temperature of the exhaust gas sensor becomes equal to a sensor element target temperature at a time when the internal combustion engine is in the automatic stop mode after being operated, and just prior to being restarted,
    wherein the heater control device includes an automatic stop mode elapsed time measurer that measures an elapsed time from the start of the automatic stop mode of the internal combustion engine; and the second control period end determiner determines that the second control period has ended, when the elapsed time from the start of the automatic stop mode, measured by the automatic stop mode elapsed time measurer, expands as wide as a second control period end duration.

2. The internal combustion engine control apparatus according to claim 1, further including a fuel injection amount corrector that corrects the amount of fuel injected into the internal combustion engine, in accordance with a detection value of the exhaust gas sensor, wherein the heater control device includes a fourth control period in which after the internal combustion engine has automatically started, the target heater applied effective voltage is set to a fourth target applied effective voltage, which is the same as or higher than the first target applied effective voltage, until the sensor element temperature becomes equal to the sensor element target temperature at a time when the internal combustion engine is being operated; the fourth control period is set in such a way as to end by the time the fuel injection amount corrector starts the operation thereof after the internal combustion engine has automatically started; and the sensor element target temperature at a time when the internal combustion engine is in the automatic stop mode is set in such a way that the sum of the heater power consumption amounts in the second control period, the third control period, and the fourth control period becomes minimum.

3. The internal combustion engine control apparatus according to claim 1, wherein the second control period end duration is set to a period from a time point when the automatic stop mode of the internal combustion engine starts to a time point when the sensor element temperature of the exhaust gas sensor reaches the sensor element target temperature at a time when the internal combustion engine is in the automatic stop mode.

4. The internal combustion engine control apparatus according to claim 1, wherein the heater control device includes an automatic stop/automatic start continuity determiner that determines whether or not the automatic stop/automatic start of the internal combustion engine continues; and in the case where the automatic stop/automatic start continuity determiner determines that the automatic stop/automatic start is continuing, the second control period end duration is corrected to become shorter.

5. The internal combustion engine control apparatus according to claim 1, wherein the heater control device includes the automatic stop/automatic start continuity determiner that determines whether or not the automatic stop/automatic start of the internal combustion engine continues; and in the case where the automatic stop/automatic start continuity determiner determines that the automatic stop/automatic start is continuing, the third target applied effective voltage is corrected to become higher.

6. The internal combustion engine control apparatus according to claim 4, wherein the state where the automatic stop/automatic start continues is a state where after the internal combustion engine has started, the automatic stop mode of the internal combustion engine is started again before the exhaust gas sensor is activated.

7. The internal combustion engine control apparatus according to claim 1, wherein the heater control device includes an impedance measurer that measures an sensor element impedance of the exhaust gas sensor, and an applied effective voltage setter that sets an applied effective voltage for the heater in such a way that the sensor element impedance measured by the impedance measurer becomes equal to a target impedance; in the first control period, the applied effective voltage setter sets the first target applied effective voltage in such a manner that the sensor element impedance becomes equal to a first target impedance related to the sensor element target temperature at a time when the internal combustion engine is being operated; in the second control period after the start of the automatic stop mode of the internal combustion engine, the applied effective voltage setter sets the second target applied effective voltage in such a manner that the sensor element impedance becomes equal to a second target impedance that is higher than the first target impedance; and after the second control period end determiner determines that the second control period has ended, the applied effective voltage setter sets the third target applied effective voltage in such a manner that in the third control period, the sensor element impedance becomes equal to a third target impedance related to the sensor element target temperature at a time when the internal combustion engine is in the automatic stop mode.

8. The internal combustion engine control apparatus according to claim 7, wherein in the second control period after the start of the automatic stop mode of the internal combustion engine, the second control period end determiner determines that the second control period has ended, when the sensor element impedance reaches the third target impedance in the second control period.

9. The internal combustion engine control apparatus according to claim 7, wherein in the second control period after the start of the automatic stop mode of the internal combustion engine, the applied effective voltage setter sets the second target applied effective voltage to a target applied effective voltage that is lower than the first target applied effective voltage or 0 V.

10. The internal combustion engine control apparatus according to claim 7, further including a fuel injection amount corrector that corrects the amount of fuel injected into the internal combustion engine, in accordance with a detection value of the exhaust gas sensor, wherein the heater control device includes a fourth control period in which after the internal combustion engine has automatically started, the target heater applied effective voltage is set to a fourth target applied effective voltage, which is the same as or higher than the first target applied effective voltage, until the sensor element temperature becomes equal to the sensor element target temperature at a time when the internal combustion engine is being operated; the fourth control period is set in such a way as to end by the time the fuel injection amount corrector starts the operation thereof after the internal combustion engine has automatically started; and the sensor element target temperature at a time when the internal combustion engine is in the automatic stop mode is set in such a way that the sum of the heater power consumption amounts in the second control period, the third control period, and the fourth control period becomes minimum.

11. The internal combustion engine control apparatus according to claim 7, wherein the heater control device includes a sensor ambient temperature estimator that estimates an ambient temperature of the exhaust gas sensor; and the third target impedance is corrected in accordance with a sensor ambient temperature estimated by the sensor ambient temperature estimator.

12. The internal combustion engine control apparatus according to claim 7, wherein the third target impedance is corrected to become lower as the elapsed time from the start of the automatic stop mode, measured by the automatic stop mode elapsed time measurer, becomes longer.

13. The internal combustion engine control apparatus according to claim 7, wherein the heater control device includes a reference second control period that is a reference period of the second control period; and the third target impedance is corrected to become higher as the second control period is shorter than the reference second control period, and the third target impedance is corrected to become lower as the second control period is longer than the reference second control period.

14. The internal combustion engine control apparatus according to claim 13, wherein the heater control device includes an impedance A, which is a first passing point in a process in which during the second control period, the sensor element impedance rises and reaches the third target impedance, an impedance B in a process in which the sensor element impedance passes through the impedance A and then reaches the third target impedance, an elapsed time measurer that measures an elapsed time in which the sensor element impedance changes from the impedance A to the impedance B, and a reference elapsed time, which is a reference value of an elapsed time measured by the elapsed time measurer; and the third target impedance is corrected to become higher as the elapsed time measured by the elapsed time measurer is shorter than the reference elapsed time, and the third target impedance is corrected to become lower as the elapsed time measured by the elapsed time measurer is longer than the reference elapsed time.

15. The internal combustion engine control apparatus according to claim 14, wherein the third target impedance is corrected to become higher as the impedance changing amount from the impedance A to the impedance B per predetermined time is larger than the reference value of the impedance changing amount from the impedance A to the impedance B per predetermined time, and the third target impedance is corrected to become lower as the impedance changing amount from the impedance A to the impedance B per predetermined time is smaller than the reference value of the impedance changing amount from the impedance A to the impedance B per predetermined time.

16. The internal combustion engine control apparatus according to claim 13, wherein in the case where the third target impedance is set to an impedance that is the same as or higher than a maximum impedance that can be measured by the impedance measurement means, the target heater applied effective voltage is set in accordance with the second control period.

17. The internal combustion engine control apparatus according to claim 15, further including a failure determiner that performs a determination on a failure of the exhaust gas sensor, based on the shortness of the second control period with respect to the reference second control period, the shortness of the elapsed time from a time point when the sensor element impedance is equal to the impedance A to a time point when the sensor element impedance is equal to the impedance B, or the impedance changing amount from the impedance A to the impedance B per predetermined time.

18. An internal combustion engine control apparatus of a vehicle, said internal combustion engine control apparatus comprising:
an automatic stop/automatic start device, for an internal combustion engine, that automatically stops the internal combustion engine when a stopping condition for the internal combustion engine is established and automatically starts the internal combustion engine when a starting condition for the internal combustion engine is established;
an exhaust gas sensor that is provided in an exhaust path of the internal combustion engine and detects at least one of the air-fuel ratio in an exhaust gas and the rich/lean tendency of the exhaust gas with respect to the theoretical air-fuel ratio;
a heater that heats the exhaust gas sensor; and
a heater control device that controls an applied effective voltage for the heater in such a way that the applied effective voltage becomes equal to a target heater applied effective voltage, wherein the heater control device includes a first control period in which the target heater applied effective voltage is set to a first target applied effective voltage with which a sensor element temperature of the exhaust gas sensor becomes equal to a sensor element target temperature at a time when the internal combustion engine is being operated; a second control period in which after the automatic stop mode of the internal combustion engine has started, the target heater applied effective voltage is set to a second target applied effective voltage that is lower than the first target applied effective voltage; a second control period end determiner that determines, during the second control period, the end of the second control period; and a third control period in which after determination of the end of the second control period, the target heater applied effective voltage is controlled to be a third target applied effective voltage that is higher than the second target applied effective voltage and with which the sensor element temperature of the exhaust gas sensor becomes equal to a sensor element target temperature at a time when the internal combustion engine is in the automatic stop mode after being operated, and just prior to being restarted,
wherein the heater control device includes a sensor ambient temperature estimator that estimates an ambient temperature of the exhaust gas sensor; and the third target applied effective voltage is corrected in accordance with a sensor ambient temperature estimated by the sensor ambient temperature estimator.

19. An internal combustion engine control apparatus of a vehicle, said internal combustion engine control apparatus comprising:
an automatic stop/automatic start device, for an internal combustion engine, that automatically stops the internal combustion engine when a stopping condition for the internal combustion engine is established and automatically starts the internal combustion engine when a starting condition for the internal combustion engine is established;
an exhaust gas sensor that is provided in an exhaust path of the internal combustion engine and detects at least one of the air-fuel ratio in an exhaust gas and the rich/lean tendency of the exhaust gas with respect to the theoretical air-fuel ratio:
a heater that heats the exhaust gas sensor; and
a heater control device that controls an applied effective voltage for the heater in such a way that the applied effective voltage becomes equal to a target heater applied effective voltage, wherein the heater control device includes a first control period in which the target heater applied effective voltage is set to a first target applied effective voltage with which a sensor element temperature of the exhaust gas sensor becomes equal to a sensor element target temperature at a time when the internal combustion engine is being operated; a second control period in which after the automatic stop mode of the internal combustion engine has started, the target heater applied effective voltage is set to a second target applied effective voltage that is lower than the first target applied effective voltage; a second control period end determiner that determines, during the second control period, the end of the second control period; and a third control period in which after determination of the end of the second control period, the target heater applied effective voltage is controlled to be a third target applies effective voltage that is higher than the second target applied effective voltage and with which the sensor element temperature of the exhaust gas sensor becomes equal to a sensor element target temperature at a time when the internal combustion engine is in the automatic stop mode after being operated, and just prior to being restarted,
wherein the heater control device includes the automatic stop mode elapsed time measurer that measures an elapsed time from the start of the automatic stop mode of the internal combustion engine; and the third target applied effective voltage is corrected to become higher as the elapsed time from the start of the automatic stop mode, measured by the automatic stop mode elapsed time measurer, becomes longer.

20. An internal combustion engine control apparatus of a vehicle, said internal combustion engine control apparatus comprising:

an automatic stop/automatic start device, for an internal combustion engine, that automatically stops the internal combustion engine when a stopping condition for the internal combustion engine is established and automatically starts the internal combustion engine when a starting condition for the internal combustion engine is established;

an exhaust gas sensor that is provided in an exhaust path of the internal combustion engine and detects at least one of the air-fuel ratio in an exhaust gas and the rich/lean tendency of the exhaust gas with respect to the theoretical air-fuel ratio;

a heater that heats the exhaust gas sensor; and a heater control device that controls an applied effective voltage for the heater in such a way that the applied effective voltage becomes equal to a target heater applied effective voltage, wherein the heater control device includes a first control period in which the target heater applied effective voltage is set to a first target applied effective voltage with which a sensor element temperature of the exhaust gas sensor becomes equal to a sensor element target temperature at a time when the internal combustion engine is being operated; a second control period in which after the automatic stop mode of the internal combustion engine has started, the target heater applied effective voltage is set to a second target applied effective voltage that is lower than the first target applied effective voltage; a second control period end determiner that determines, during the second control period, the end of the second control period; and a third control period in which after determination of the end of the second control period, the target heater applied effective voltage is controlled to be a third target applied effective voltage that is higher than the second target applied effective voltage and with which the sensor element temperature of the exhaust gas sensor becomes equal to a sensor element target temperature at a time when the internal combustion engine is in the automatic stop mode after being operated, and just prior to being restarted, wherein the heater control device includes an automatic stop period measurer that measures the automatic stop period from a start of the automatic stop mode of the internal combustion engine to an end of the automatic stop mode thereof, and a fourth control period in which after the internal combustion engine has automatically started, the target heater applied effective voltage is set to a fourth target applied effective voltage, which is the same as or higher than the first target applied effective voltage, until the sensor element temperature becomes equal to the sensor element target temperature at a time when the internal combustion engine is being operated; and in the fourth control period, one or both of the fourth target applied effective voltage and a voltage application period in which the fourth target applied effective voltage is applied are corrected in accordance with the automatic stop period measured by the automatic stop period measurer.

21. An internal combustion engine control apparatus of a vehicle, said internal combustion engine control apparatus comprising:

an automatic stop/automatic start device, for an internal combustion engine, that automatically stops the internal combustion engine when a stopping condition for the internal combustion engine is established and automatically starts the internal combustion engine when a starting condition for the internal combustion engine is established;

an exhaust gas sensor that is provided in an exhaust path of the internal combustion engine and detects at least one of the air-fuel ratio in an exhaust gas and the rich/lean tendency of the exhaust gas with respect to the theoretical air-fuel ratio;

a heater that heats the exhaust gas sensor: and a heater control device that controls an applied effective voltage for the heater in such a way that the applied effective voltage become equal to a target heater applied effective voltage, wherein the heater control device includes a first control period in which the target heater applied effective voltage is set to a first target applied effective voltage with which a sensor element temperature of the exhaust gas sensor becomes equal to a sensor element target temperature at a time when the internal combustion engine is being operated; a second control period in which after the automatic stop mode of the internal combustion engine has started, the target heater applied effective voltage is set to a second target applied effective voltage that is lower than the first target applied effective voltage; a second control period end determiner that determines, during the second control period, the end of the second control period; and a third control period in which after determination of the end of the second control period, the target heater applied effective voltage is controlled to be a third target applied effective voltage that is higher than the second target applied effective voltage and with which the sensor element temperature of the exhaust gas sensor becomes equal to a sensor element target temperature at a time when the internal combustion engine is in the automatic stop mode after being operated, and just prior to being restarted, wherein the heater control device includes the sensor ambient temperature estimator that estimates an ambient temperature of the exhaust gas sensor, and a fourth control period in which after the internal combustion engine has automatically started, the target heater applied effective voltage is set to a fourth target applied effective voltage, which is the same as or higher than the first target applied effective voltage, until the sensor element temperature becomes equal to the sensor element target temperature at a time when the internal combustion engine is being operated; and in the fourth control period, one or both of the fourth target applied effective voltage and the voltage application period in which the fourth target applied effective voltage is applied are corrected based on a sensor ambient temperature estimated by the sensor ambient temperature estimator.

* * * * *